June 27, 1961  J. A. WEIDENHAMMER  2,990,538
TAPE TO CARD AND CARD TO TAPE CONVERTER
Filed Nov. 26, 1954                                  60 Sheets-Sheet 1

INVENTOR.
JAMES A. WEIDENHAMMER
BY P. E. Henninger
ATTORNEY

June 27, 1961   J. A. WEIDENHAMMER   2,990,538
TAPE TO CARD AND CARD TO TAPE CONVERTER
Filed Nov. 26, 1954   60 Sheets-Sheet 2
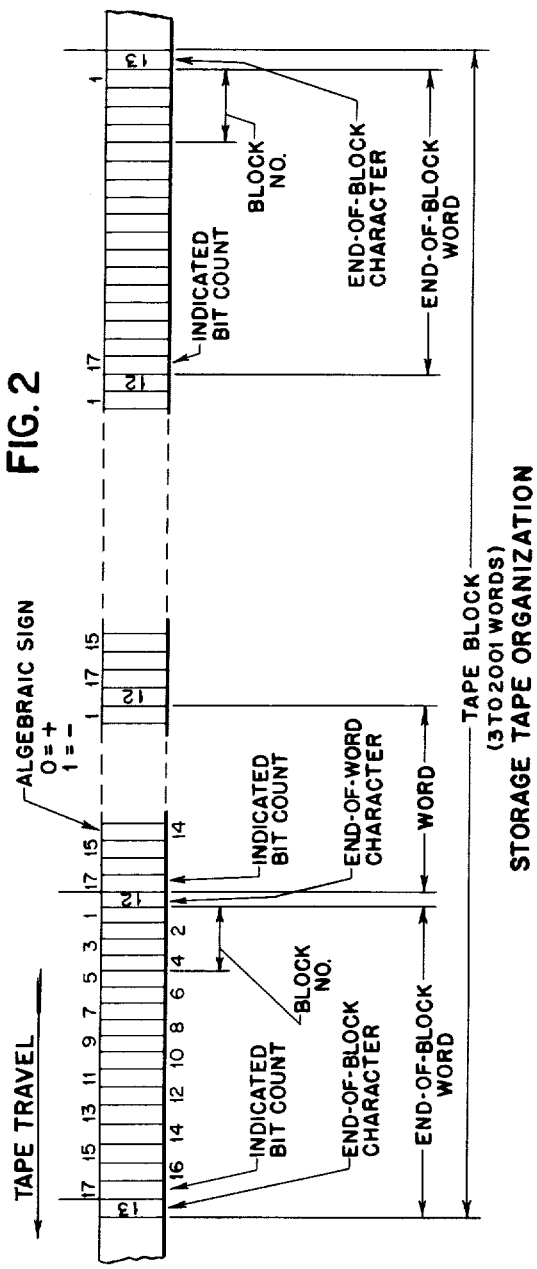
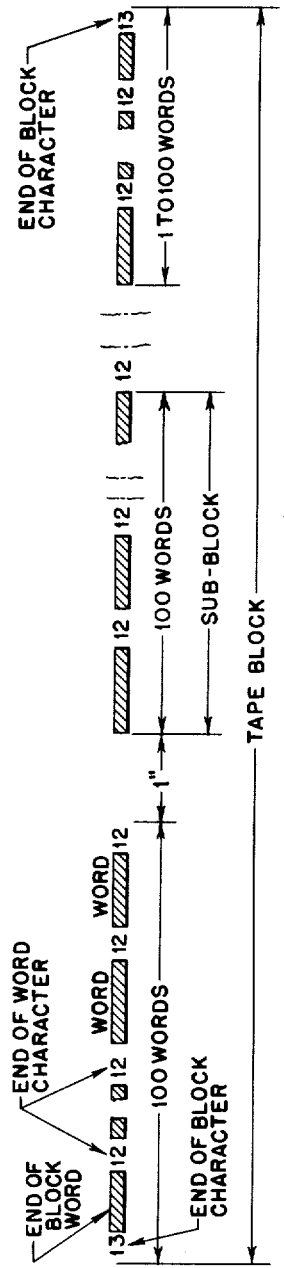
INVENTOR.
JAMES A. WEIDENHAMMER
BY P. E. Henninger
ATTORNEY

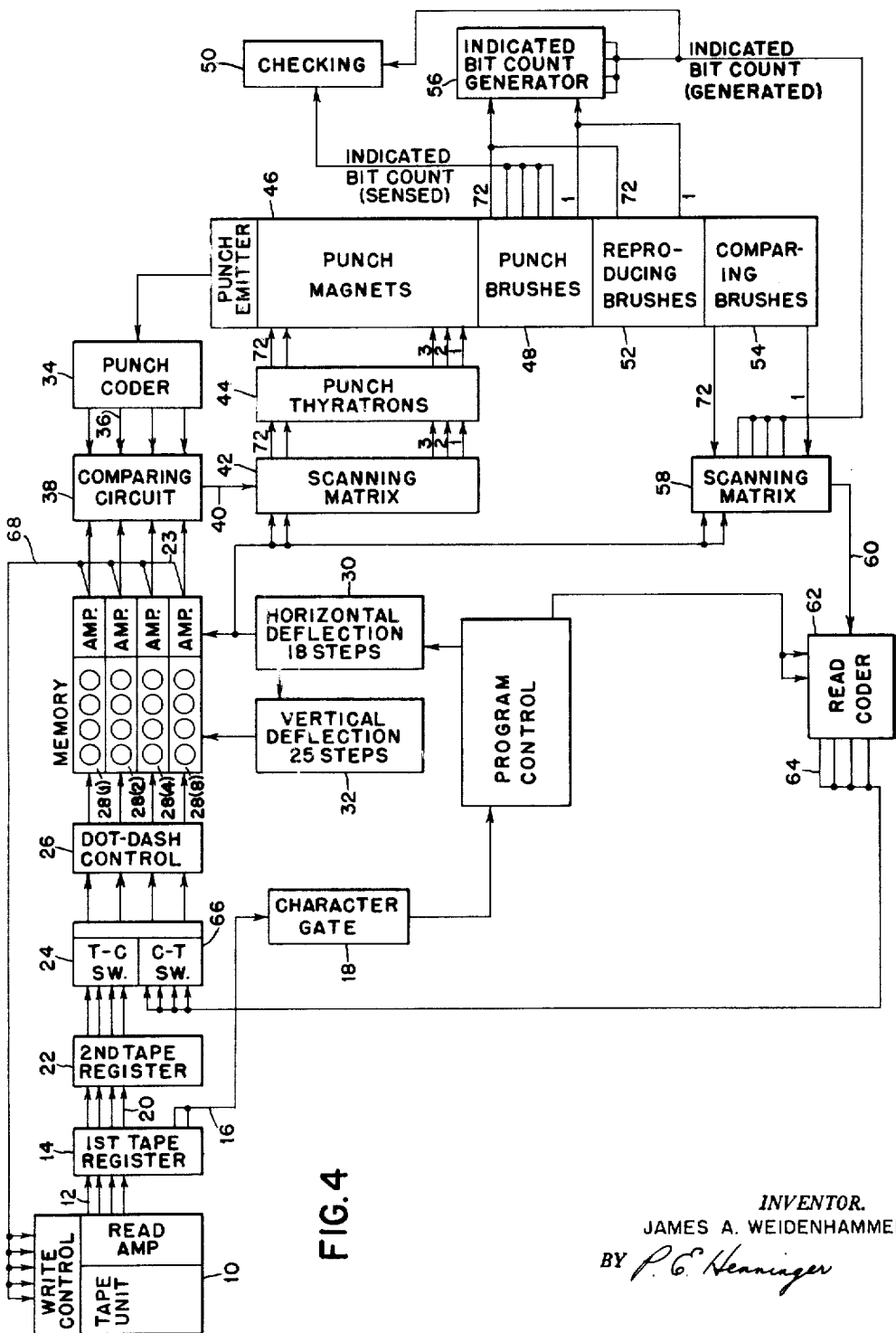

June 27, 1961 J. A. WEIDENHAMMER 2,990,538
TAPE TO CARD AND CARD TO TAPE CONVERTER
Filed Nov. 26, 1954 60 Sheets-Sheet 4
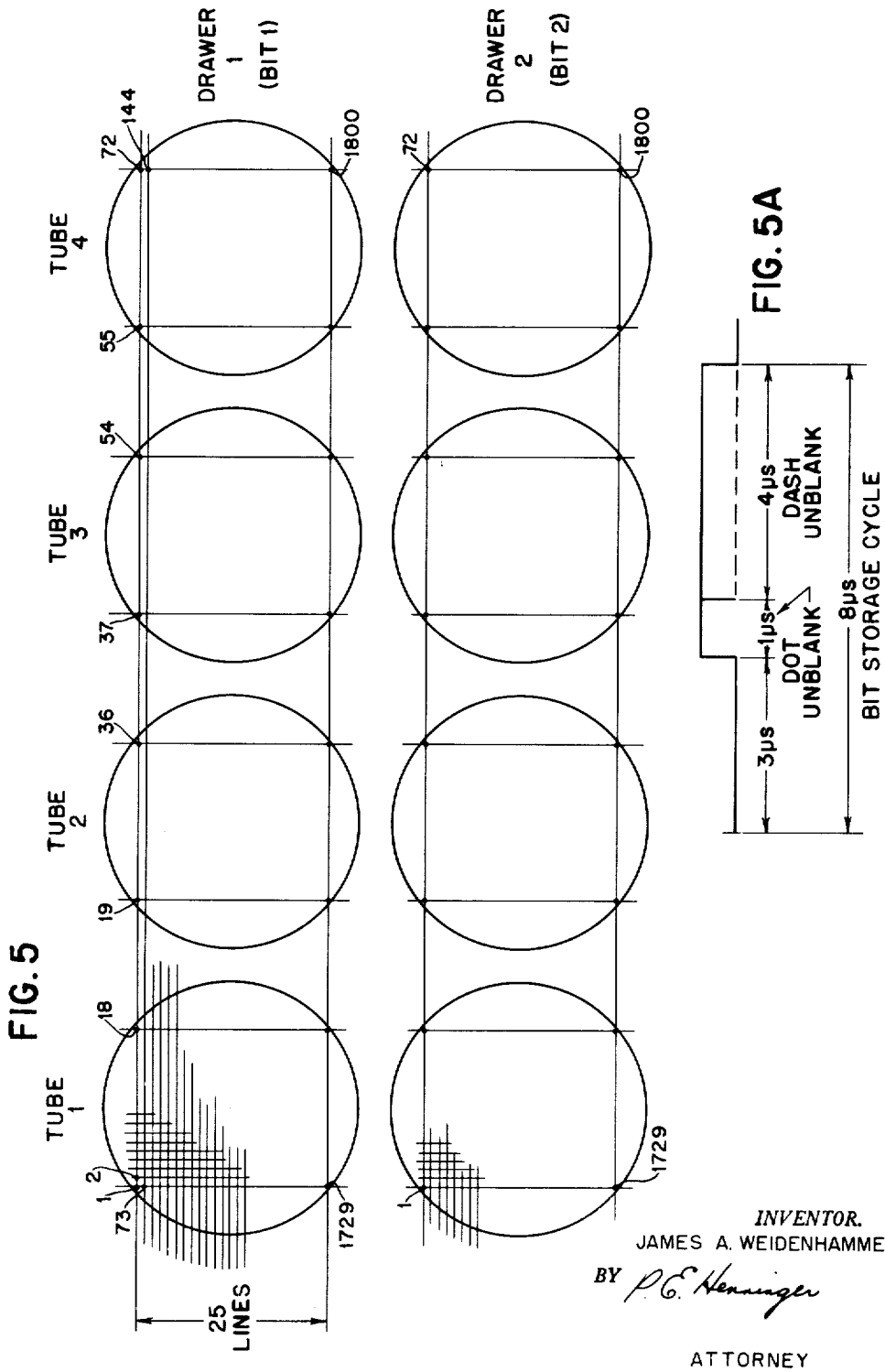
*INVENTOR.*
JAMES A. WEIDENHAMMER
BY P.E. Henninger
ATTORNEY June 27, 1961     J. A. WEIDENHAMMER     2,990,538
TAPE TO CARD AND CARD TO TAPE CONVERTER
Filed Nov. 26, 1954     60 Sheets-Sheet 5

INVENTOR
JAMES A. WEIDENHAMMER
BY P. E. Henninger
ATTORNEY

June 27, 1961  J. A. WEIDENHAMMER  2,990,538
TAPE TO CARD AND CARD TO TAPE CONVERTER
Filed Nov. 26, 1954  60 Sheets-Sheet 6

INVENTOR
JAMES A. WEIDENHAMMER
BY *P. E. Henninger*
ATTORNEY

June 27, 1961 J. A. WEIDENHAMMER 2,990,538
TAPE TO CARD AND CARD TO TAPE CONVERTER
Filed Nov. 26, 1954 60 Sheets-Sheet 7

INVENTOR
JAMES A. WEIDENHAMMER
BY
ATTORNEY

June 27, 1961  J. A. WEIDENHAMMER  2,990,538
TAPE TO CARD AND CARD TO TAPE CONVERTER
Filed Nov. 26, 1954  60 Sheets-Sheet 10

INVENTOR
JAMES A. WEIDENHAMMER
BY P. E. Henninger
ATTORNEY

June 27, 1961  J. A. WEIDENHAMMER  2,990,538
TAPE TO CARD AND CARD TO TAPE CONVERTER
Filed Nov. 26, 1954  60 Sheets-Sheet 11

INVENTOR
JAMES A. WEIDENHAMMER
BY P.C. Henninger
ATTORNEY

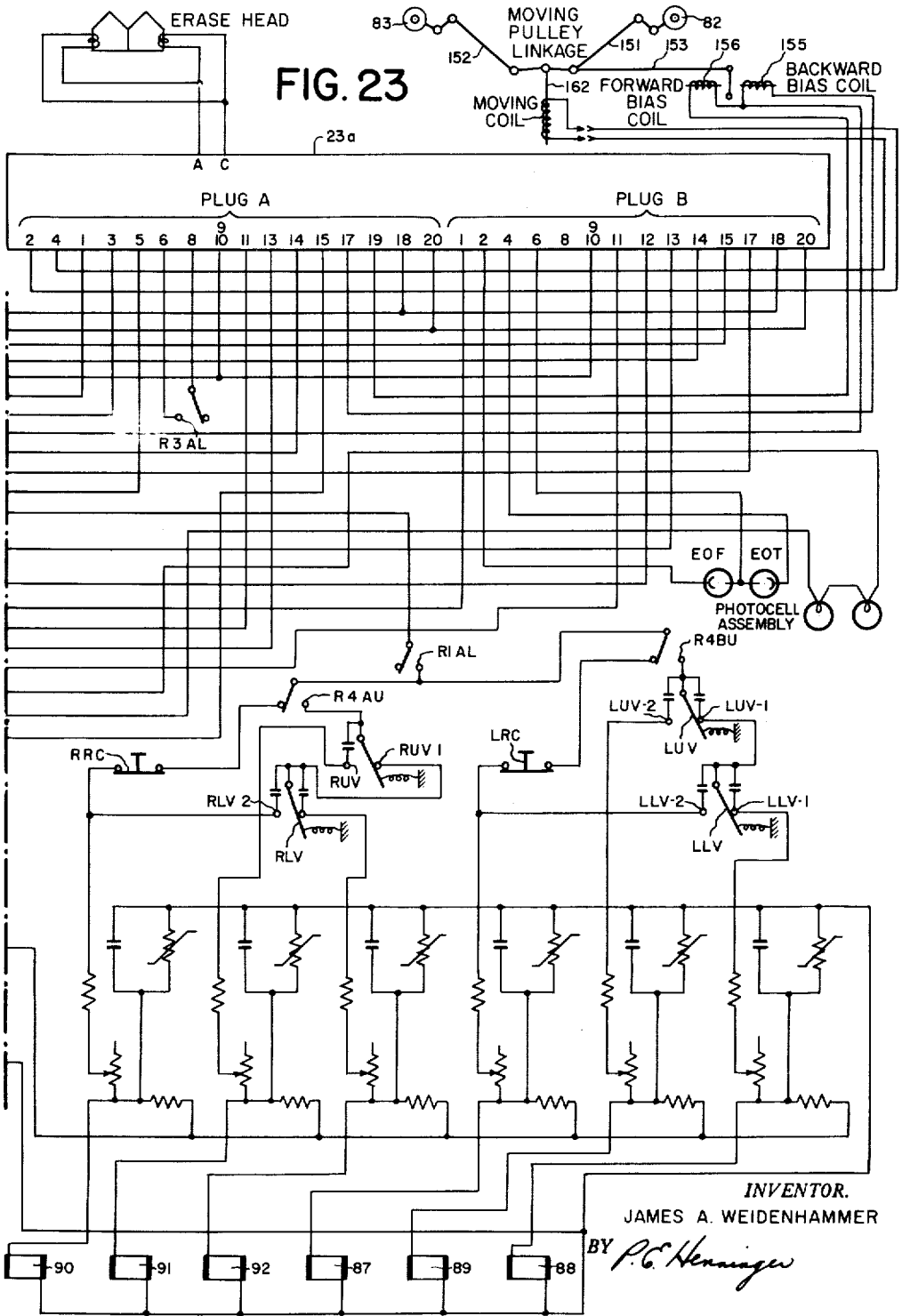

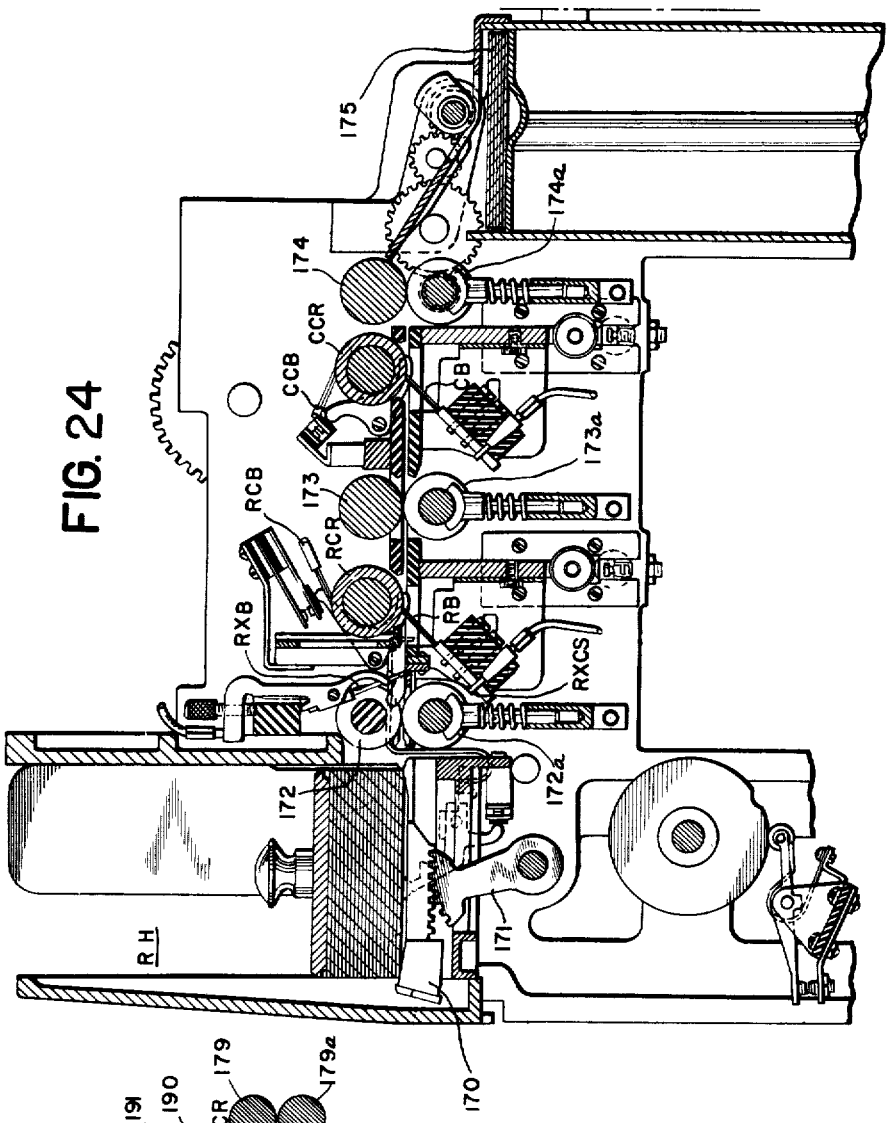
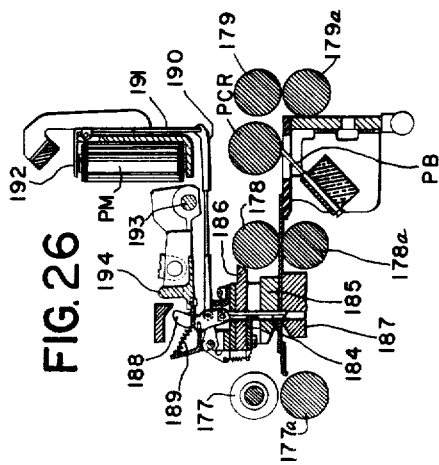

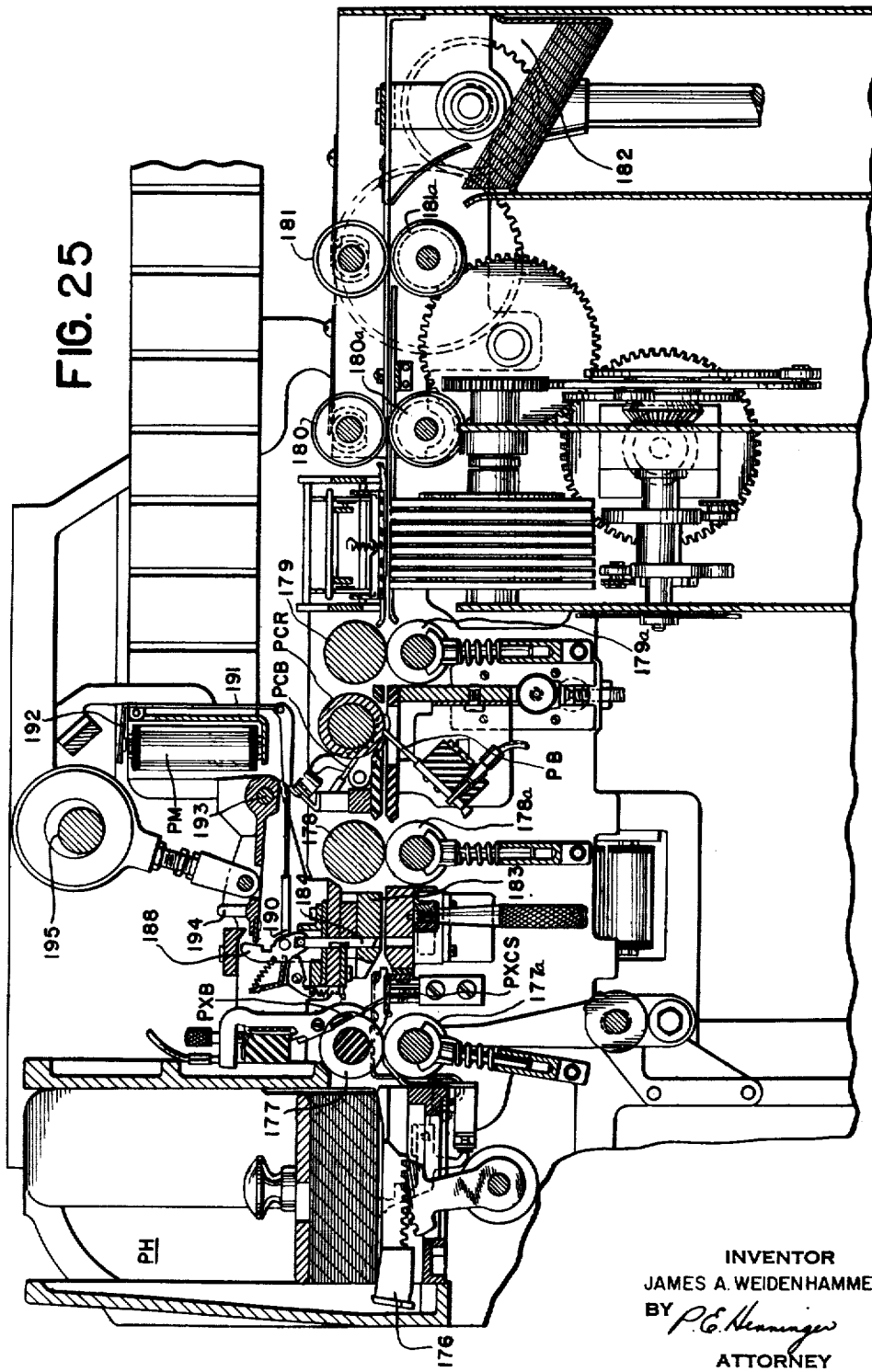

June 27, 1961  J. A. WEIDENHAMMER  2,990,538
TAPE TO CARD AND CARD TO TAPE CONVERTER
Filed Nov. 26, 1954  60 Sheets-Sheet 20

INVENTOR.
JAMES A. WEIDENHAMMER
BY P. E. Henninger
ATTORNEY

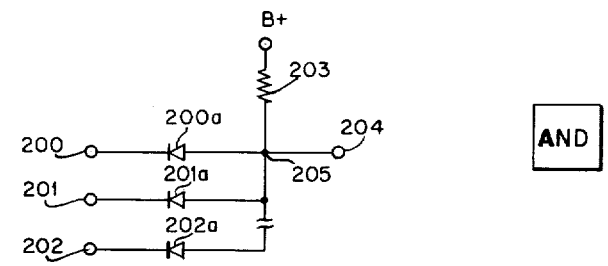
FIG. 30
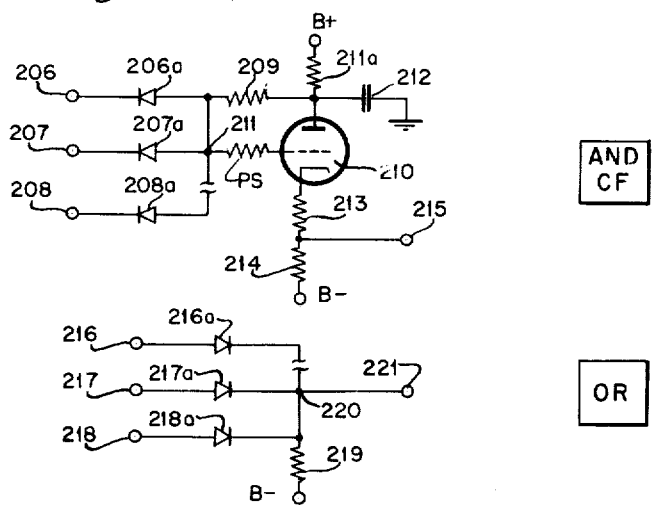
FIG. 31
FIG. 32
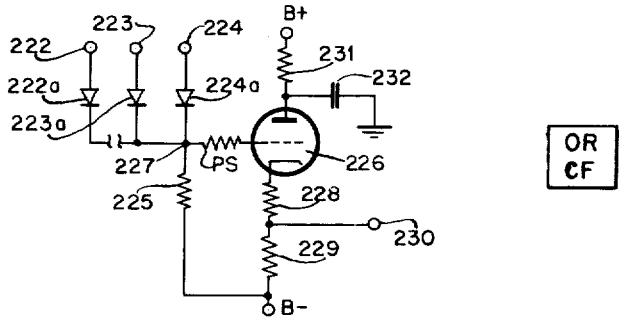
FIG. 33
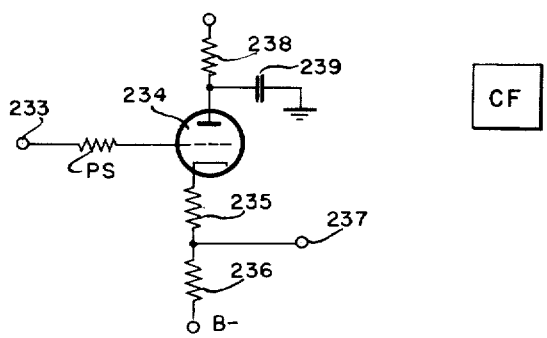
FIG. 34
*INVENTOR.*
JAMES A. WEIDENHAMMER
BY P. E. Henninger
ATTORNEY June 27, 1961   J. A. WEIDENHAMMER   2,990,538
TAPE TO CARD AND CARD TO TAPE CONVERTER
Filed Nov. 26, 1954   60 Sheets-Sheet 23

INVENTOR.
JAMES A. WEIDENHAMMER
BY P. E. Henninger
ATTORNEY

*INVENTOR.*
JAMES A. WEIDENHAMMER
BY *P.E. Heninger*

ATTORNEY

June 27, 1961   J. A. WEIDENHAMMER   2,990,538
TAPE TO CARD AND CARD TO TAPE CONVERTER
Filed Nov. 26, 1954   60 Sheets-Sheet 25

*INVENTOR.*
JAMES A. WEIDENHAMMER
BY P. E. Henninger
ATTORNEY

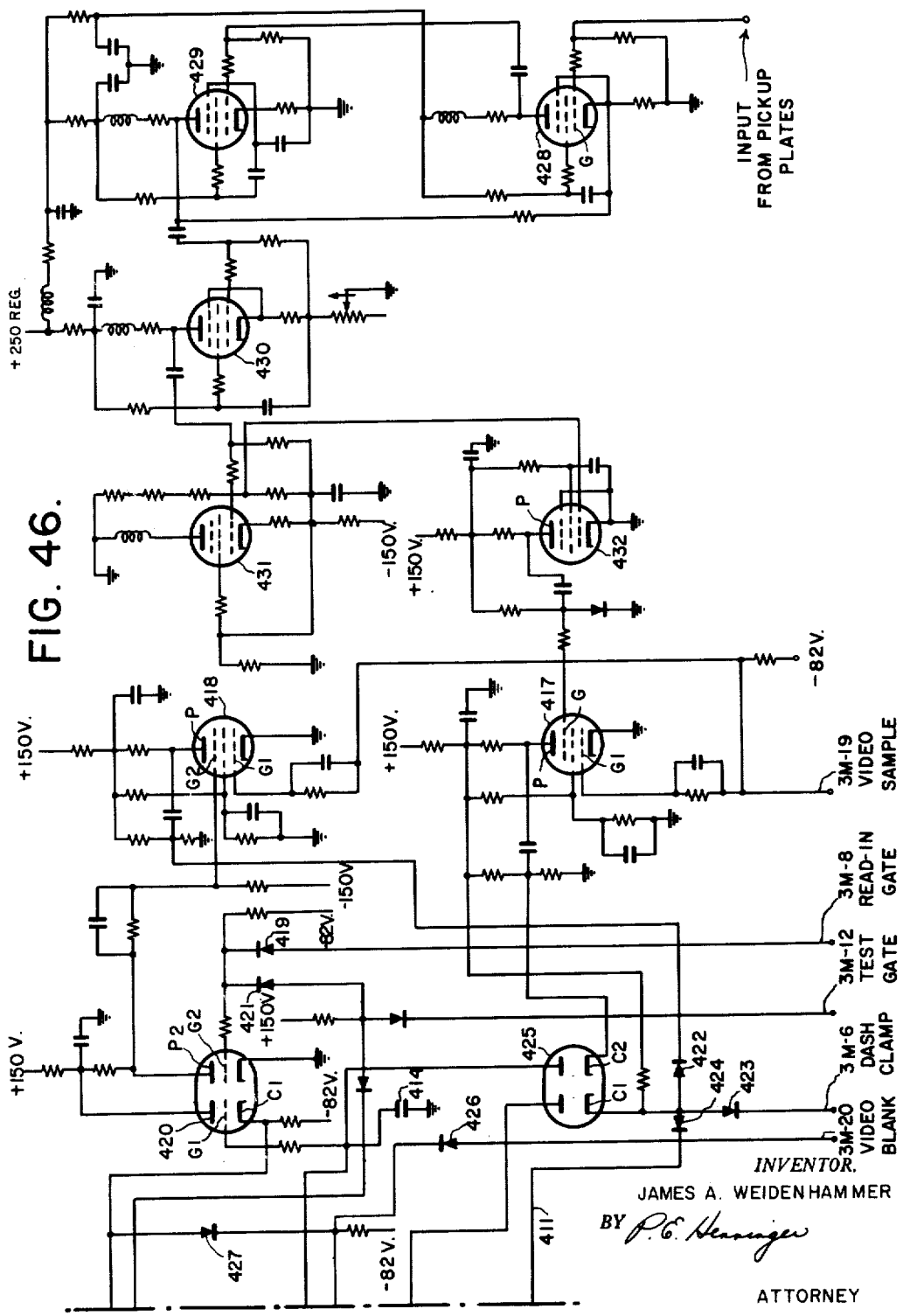

June 27, 1961     J. A. WEIDENHAMMER     2,990,538
TAPE TO CARD AND CARD TO TAPE CONVERTER
Filed Nov. 26, 1954     60 Sheets-Sheet 28
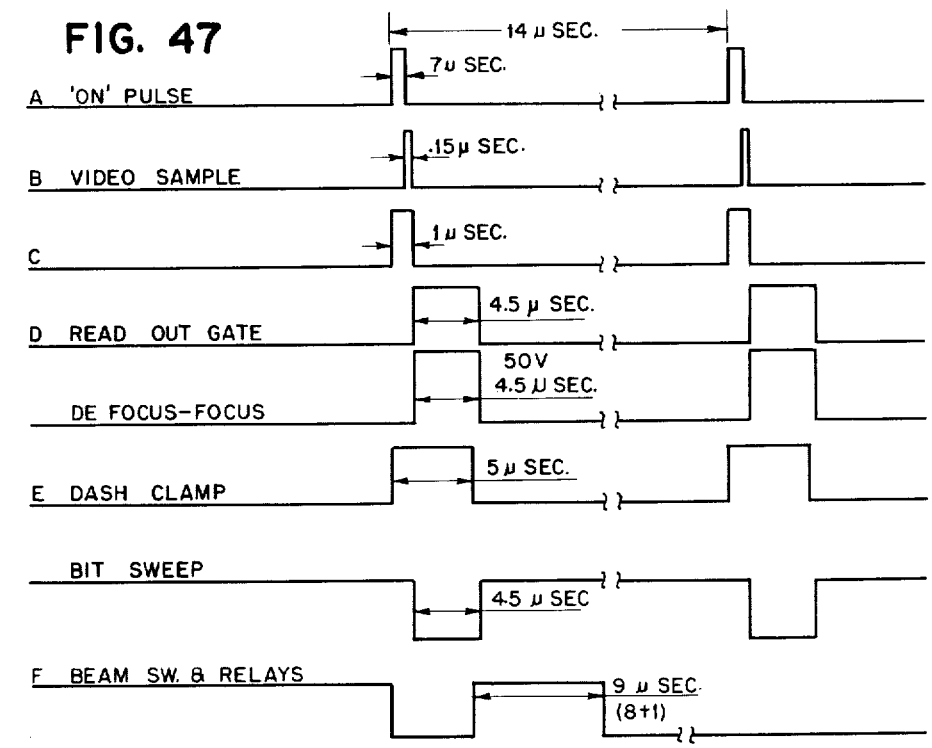
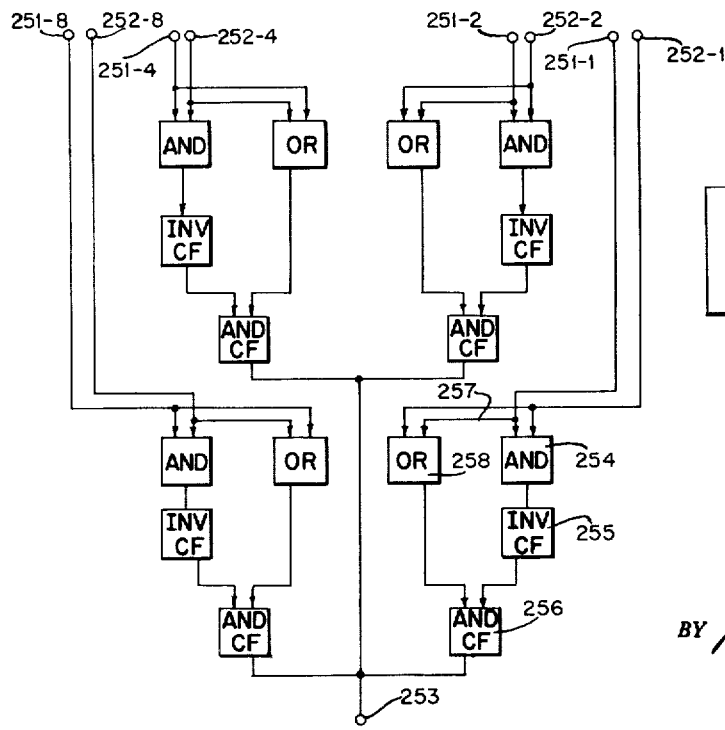
FIG. 38
INEQUALITY DETECTOR
*INVENTOR.*
JAMES A. WEIDENHAMMER
BY
ATTORNEY INVENTOR.
JAMES A. WEIDENHAMMER
BY P.E. Henninger
ATTORNEY

INVENTOR.
JAMES A. WEIDENHAMMER
ATTORNEY

June 27, 1961

J. A. WEIDENHAMMER 2,990,538

TAPE TO CARD AND CARD TO TAPE CONVERTER

Filed Nov. 26, 1954

FIG. 54 VERTICAL DEFLECTION RINGS

INVENTOR.
JAMES A. WEIDENHAMMER
BY P. E. Henninger
ATTORNEY

*INVENTOR.*
JAMES A. WEIDENHAMMER
BY P. E. Henninger
ATTORNEY

June 27, 1961    J. A. WEIDENHAMMER    2,990,538
TAPE TO CARD AND CARD TO TAPE CONVERTER
Filed Nov. 26, 1954    60 Sheets-Sheet 43

June 27, 1961 J. A. WEIDENHAMMER 2,990,538
TAPE TO CARD AND CARD TO TAPE CONVERTER
Filed Nov. 26, 1954 60 Sheets-Sheet 44

INVENTOR.
JAMES A. WEIDENHAMMER
BY
ATTORNEY

June 27, 1961  J. A. WEIDENHAMMER  2,990,538
TAPE TO CARD AND CARD TO TAPE CONVERTER
Filed Nov. 26, 1954  60 Sheets—Sheet 50

INVENTOR.
JAMES A. WEIDENHAMMER
BY P. E. Henninger
ATTORNEY

June 27, 1961   J. A. WEIDENHAMMER   2,990,538
TAPE TO CARD AND CARD TO TAPE CONVERTER
Filed Nov. 26, 1954   60 Sheets-Sheet 54

INVENTOR.
JAMES A. WEIDENHAMMER
BY P. E. Henninger
ATTORNEY

INVENTOR.
JAMES A. WEIDENHAMMER

June 27, 1961     J. A. WEIDENHAMMER     2,990,538
TAPE TO CARD AND CARD TO TAPE CONVERTER
Filed Nov. 26, 1954     60 Sheets-Sheet 56

INVENTOR.
JAMES A. WEIDENHAMMER
BY
ATTORNEY

INVENTOR.
JAMES A. WEIDENHAMMER
ATTORNEY

June 27, 1961  J. A. WEIDENHAMMER  2,990,538
TAPE TO CARD AND CARD TO TAPE CONVERTER
Filed Nov. 26, 1954                                         60 Sheets-Sheet 60
FIG. 79
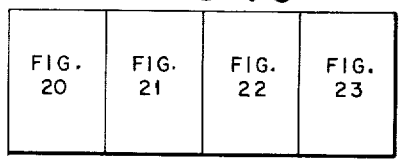
FIG. 80
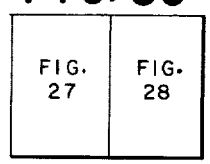
FIG. 81
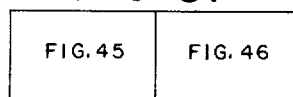
FIG. 82
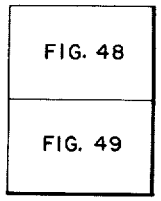
FIG. 83
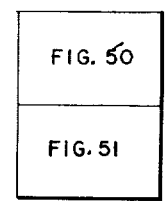
FIG. 84
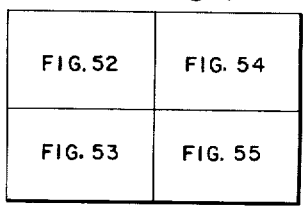
FIG. 85
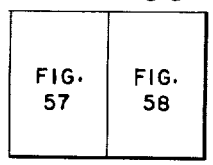
FIG. 86
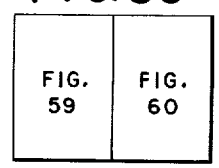
FIG. 87
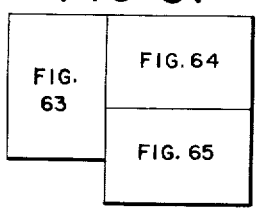
FIG. 88
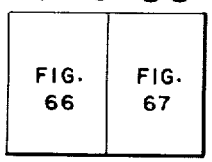
FIG. 89
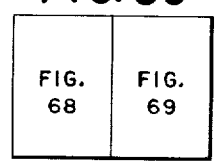
FIG. 90
*INVENTOR.*
JAMES A. WEIDENHAMMER
BY P. E. Henninger
ATTORNEY United States Patent Office 2,990,538
Patented June 27, 1961

2,990,538
TAPE TO CARD AND CARD TO TAPE CONVERTER
James A. Weidenhammer, Poughkeepsie, N.Y., assignor to International Business Machines Corporation, New York, N.Y., a corporation of New York
Filed Nov. 26, 1954, Ser. No. 471,244
19 Claims. (Cl. 340—172.5)

This invention relates to a record converting machine. More particularly, the invention relates to an electronic machine for reading punched statistical card records and for transcribing the records so read as magnetic records on continuous record media such as tape, in one mode of operation; and for reading magnetic records from continuous record media such as tape, and for transcribing the magnetic records so read as punched records in cards, in a second mode of operation. The invention may, therefore, be referred to as a card-to-tape and tape-to-card converter.

It is a primary object of the invention to provide in a unitary machine a system adapted for selective operation as a card-to-tape data converter or as a tape-to-card data converter.

It is a further object of this invention to provide a machine capable, in a selected mode of operation, of reading a punched card code, interpreting such code, and reinscribing the interpreted data upon a magnetic medium in a different code; and one also capable, in a second selected mode of operation, of reading a coded magnetic record medium, interpreting such code, and reinscribing the interpreted data by punching the same into statistical cards in a different code.

It is a further object of this invention to read data punched in a card at one point of a card reading cycle and for generating a check bit count as a result of such reading, reading the data punched in the card at a later point in the card reading cycle for interpreting the data punched therein, and merging the interpreted data and the generated check bit count for confluence through the system and for reinscription on the record receiving media.

It is a specific object of the invention to generate a check bit count in the form of the modulo 4.

It is a further object of the invention to provide a record tape processing system in which records are inscribed on a magnetic record medium in the form of an inverse binary code, and in which the positions of the binary −4− bit and the binary −8− are interchanged, thereby providing a significant bit in the binary −2− or the adjacent binary −8− positions of all characters.

It is a specific object of the invention to provide a pair of tape input registers wherein the data entered into a first register is gated into a second register by a skew gate pulse generated from either the −2− bit track of a record tape or from the adjacent −8− bit track thereof.

It is a further object of the invention to provide an electrostatic storage memory system for data read either from magnetic tape or from punched cards, and in this regard it is a specific object of the invention to provide an electrostatic memory scanning system adapted to scan each row of electrostatic storage once for each row of a statistical card to be punched therefrom.

It is a further object of the invention to provide a system for verifying data punched into statistical cards under control of data stored into memory from tape.

It is a specific object of the invention to provide a system wherein magnetically recorded data is arranged in blocks and sub-blocks on the record medium, and wherein blocks of information on the magnetic record medium may be selectively identified and punched into cards.

It is a further object of the invention to provide a system adapted to read magnetically recorded data and having means therein for recognizing useful records read from the magnetic medium and for rejecting other records read therefrom.

It is a further object of the invention to provide a system capable of automatically reading into electrostatic memory a predetermined number of words under control of a character counter.

It is a further object of the invention to automatically and continuously read data from memory until the entire memory capacity has been punched out into statistical cards.

It is a still further object of the invention to automatically punch a check bit character into a statistical card during the operation of reading from memory and punching data so read into cards.

It is a further object of this invention to provide a tape-to-card and card-to-tape record converter in which the same storage buffer is used for converting card data into tape data and tape data into card data.

It is a further object of the invention to provide a memory control system in which the pulses originating from a record tape control the memory cycle. To this end, it is a specific object of the invention to provide a plurality of single shot multivibrators arranged in a ring, whereby the memory cycle is rendered self-timing under control of record tape originated impulses.

It is a further object of the invention to provide a block search system which may be manually set to any four digit number to locate a particular record or records recorded on tape. In this connection, it is a specific object to interrogate an input register rather than records stored in memory for the set-up number.

It is an object of this invention to process magnetically recorded tape records on a tape which is sensed at the rate of 140 inches per second and which has a record density of 500 bits per inch, whereby a character occurs on the average of every 14 microseconds. As a related objective, there is provided herein a plurality of cathode ray tubes into each one of which a separate bit of a character may be stored concurrently.

It is a further object of this invention to provide a record converter in which data recorded in cards in the Hollerith code is translated for storage in electrostatic memory in the binary notation and in which data recorded on tape in the binary notation and stored in memory is translated to the Hollerith code for punching into record cards. To this end, it is a specific object of the invention to provide a series of coder cams which serve as the coding and decoding agents for both directions of translation.

By virtue of the system of electrostatic data storage used herein, it is necessary to scan the same row of electrostatic memory 12 times for each record, since there are 12 rows of index points in each card which are read at sequential time periods. It is, therefore, an object of this invention to provide an electrostatic storage read-out system which does not destroy the record in electrostatic storage as it is scanned successively.

It is a further object of the invention to provide a system in which during read-out from electrostatic memory, each row of the raster being scanned 12 times, each scan is compared against a different setting of coder cams to determine the presence or absence of significant data in each of the successive index point positions of a card into which the data is being punched.

It is also an object of the invention to provide an indicated check bit count computer circuit which is common to both directions of the conversion operation. To this end, the invention includes a system in which a punched card is read under one set of brushes and the factors read therefrom are entered into a relay system where an indicated check bit count is generated. The data from the card is read under a second set of brushes whereafter the data and the indicated bit count are merged for recording on tape. Conversely, in the operation of reading on tape, the indicated check bit count and data will be punched into a card whereafter the data punched into a card is read again, the factors read from the card are entered into the indicated check bit count computer, and a new indicated check bit count is then generated thereby, whereafter the indicated check bit count, as punched into the card, is compared with the newly generated indicated check bit count.

It is still a further object of the invention to provide a system having a magnetic record tape driving mechanism which is automatically conditioned for reading complete sub-blocks of data from tape into electrostatic storage.

Other objects and advantages of the invention will appear as the detail description thereof proceeds in light of the drawings forming a part of this application, and in which drawings FIG. 1 is a front elevational view of the inter-connected units comprising the tape-to-card and card-to-tape converter, these units consisting of a reproducing card punch, a power supply unit, a pluggable unit rack, an electrostatic memory rack and a tape drive unit;

FIG. 2 is a diagrammatic view of the manner in which data on a storage tape are organized;

FIG. 2A is a diagrammatic illustration of the manner in which data on an input-output tape are organized;

FIG. 4 is a diagrammatic illustration in block form indicating the flow of data through the system;

FIG. 5 is a diagrammatic view illustrating two electrostatic memory drawers, each consisting of four cathode ray tubes;

FIG. 5A is a diagram showing the bit storage cycle;

Figure 21:
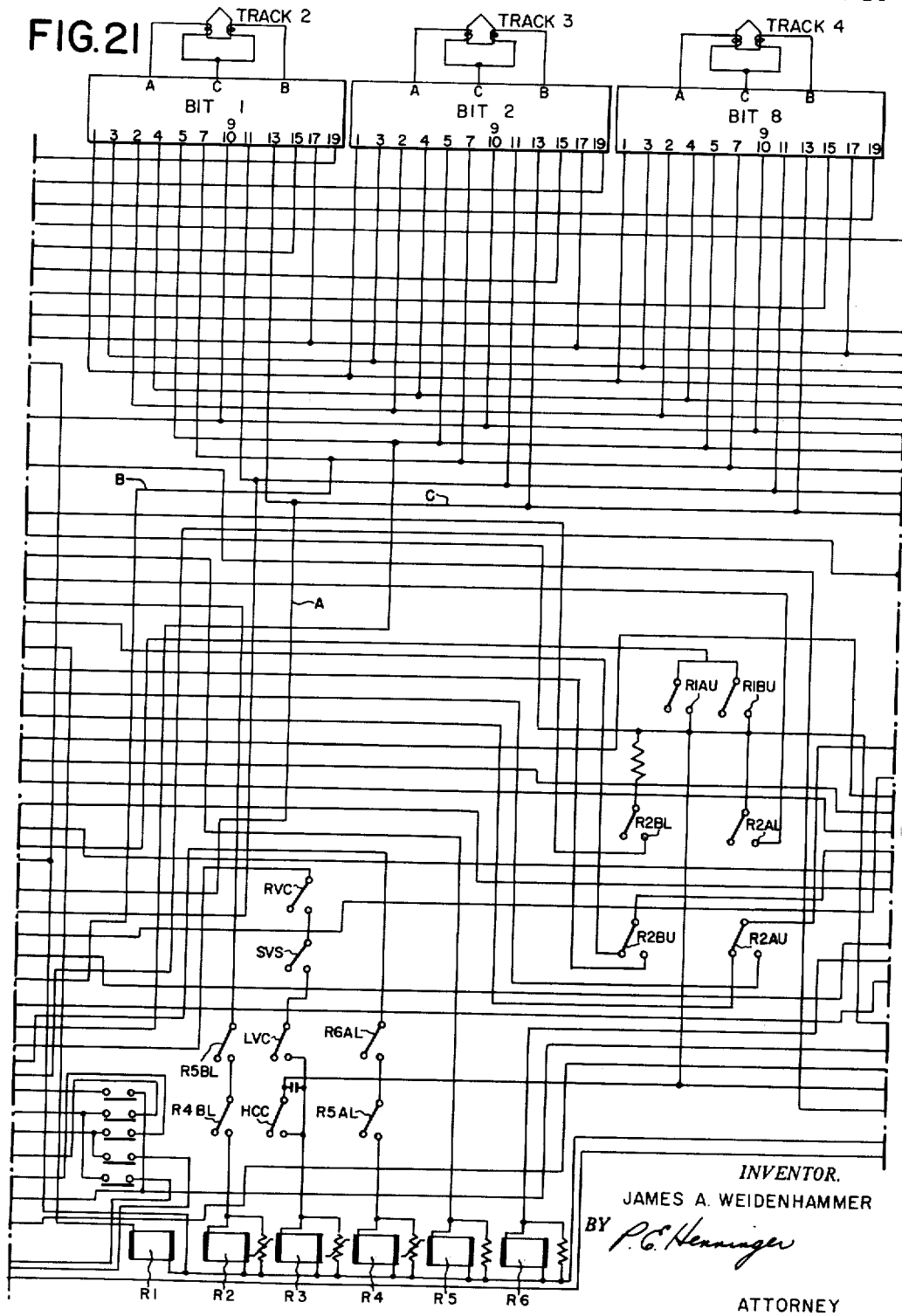
Figure 22:
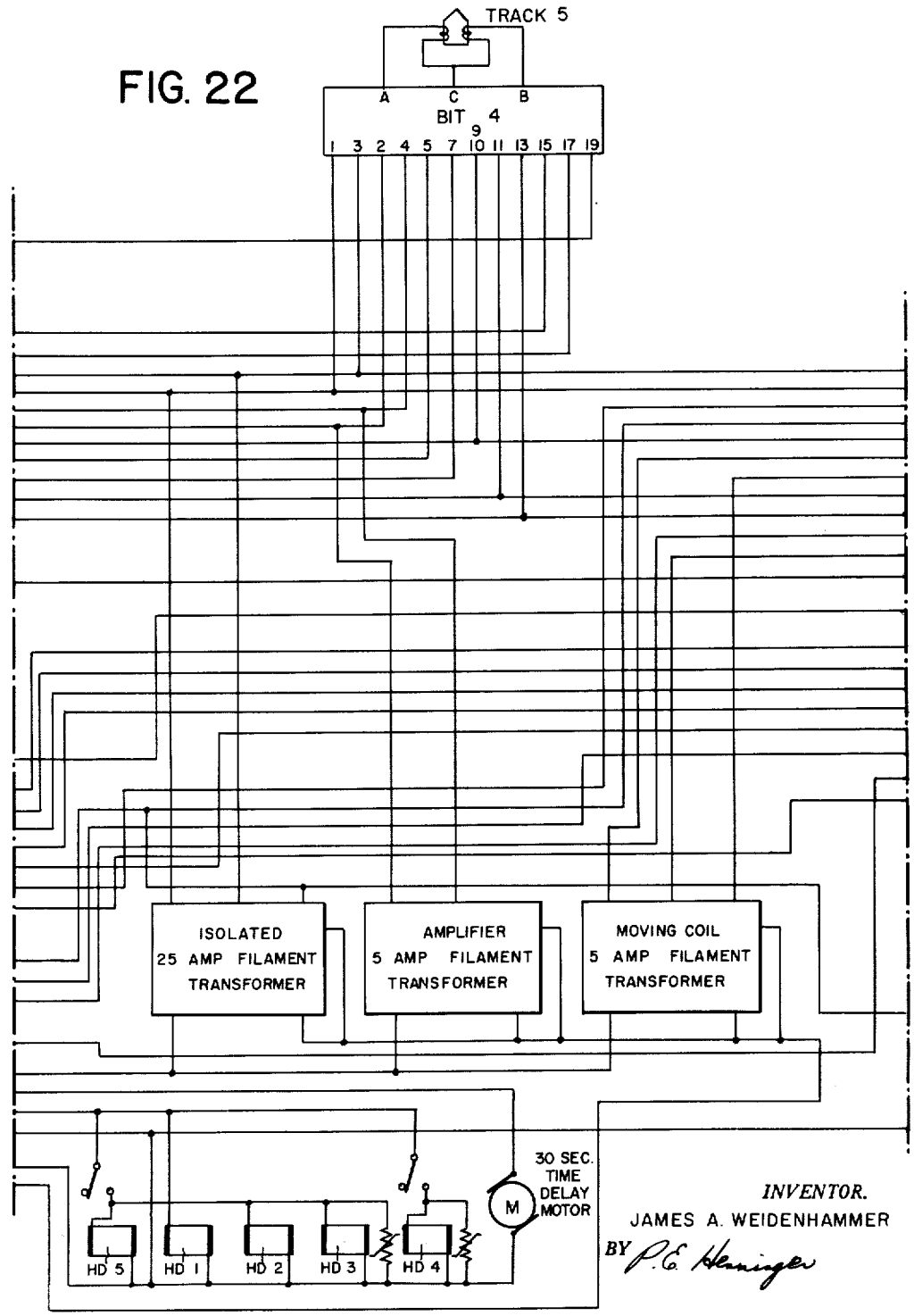
Figure 27:
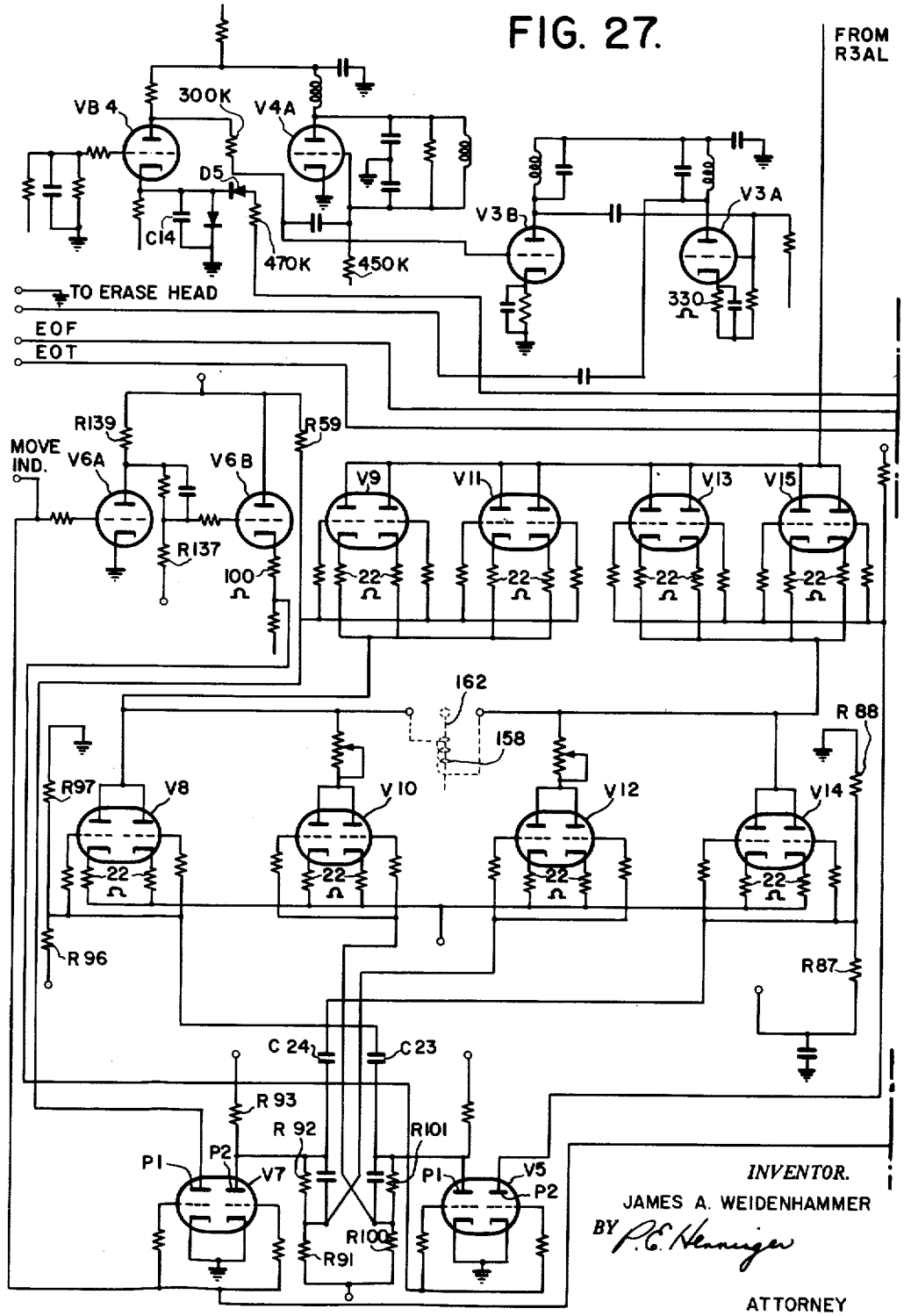
Figure 28:
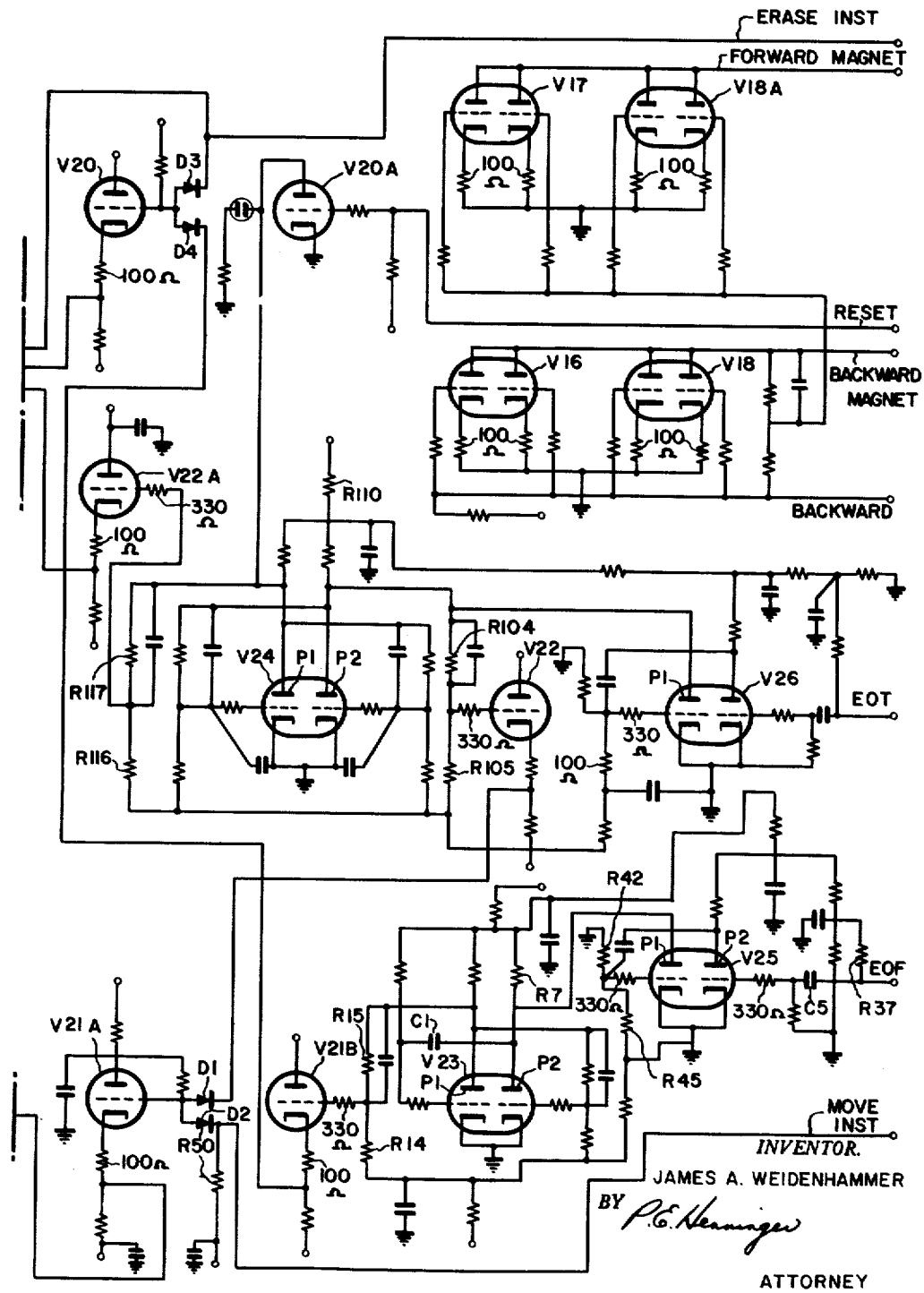
Figure 29:
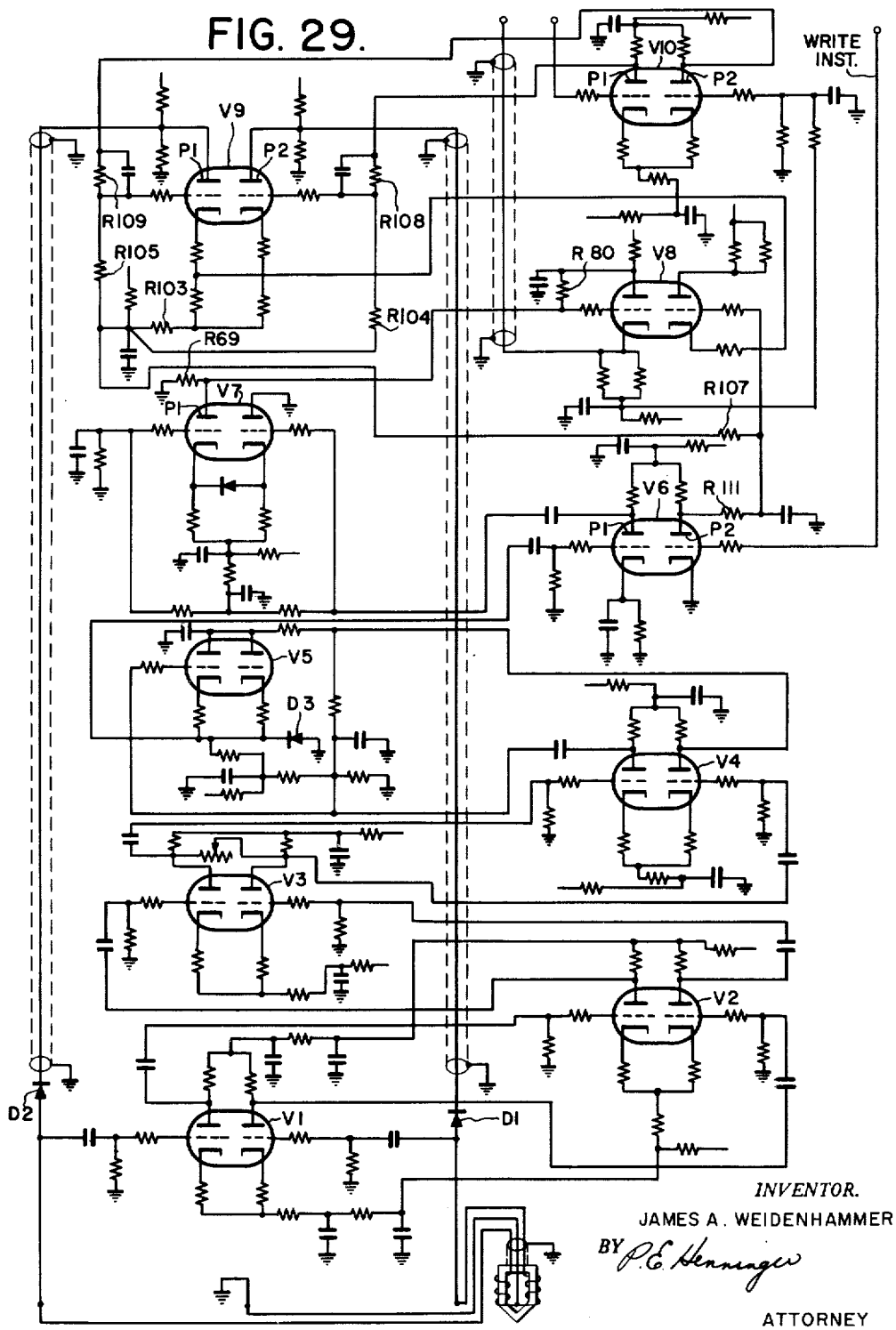
Figure 35:
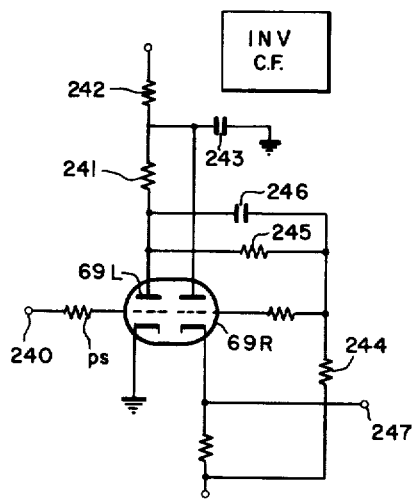
Figure 37:
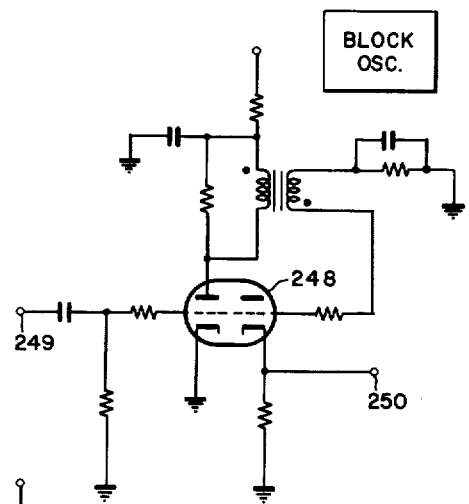
Figure 39:
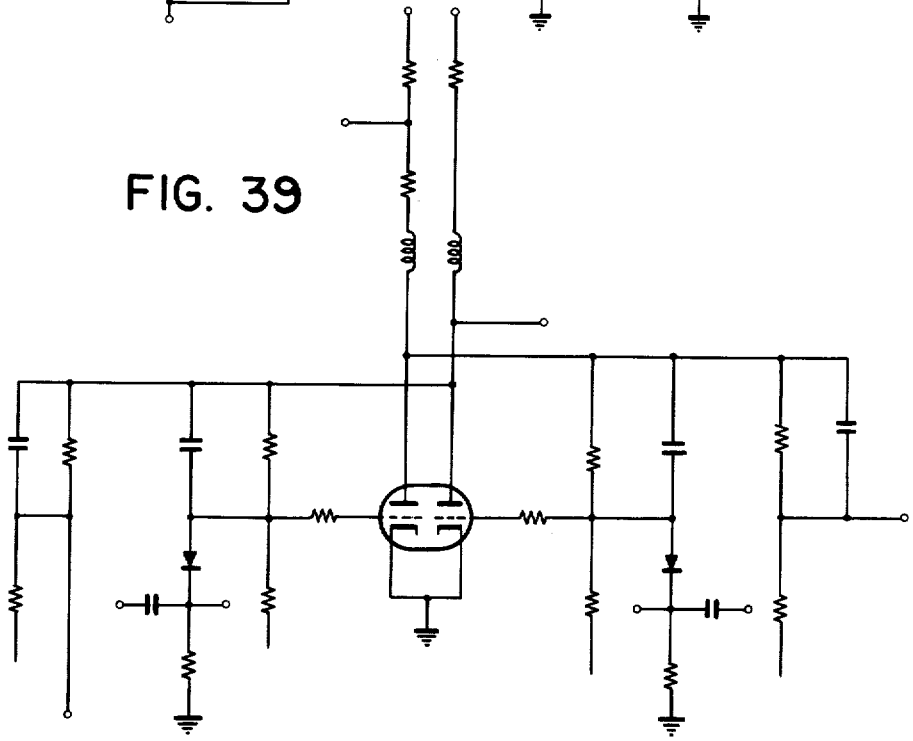
Figure 40:
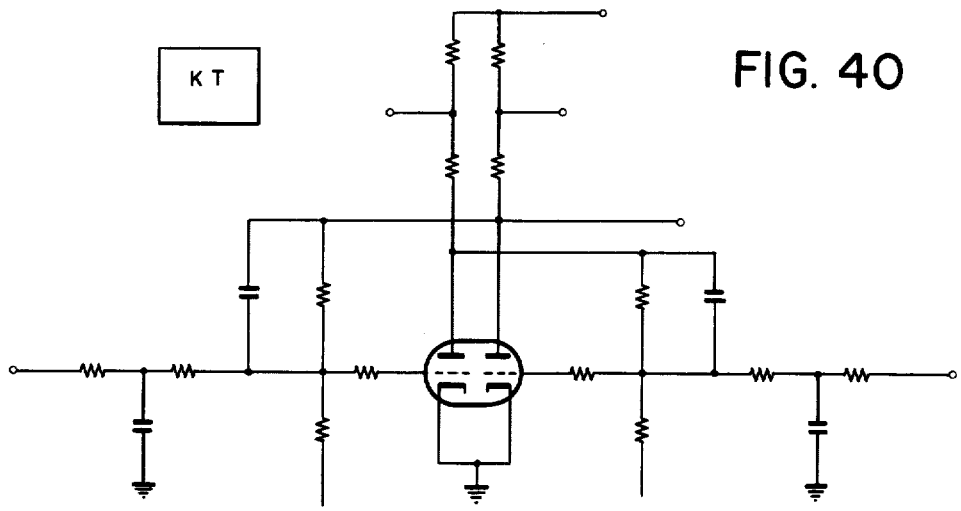
Figure 41:
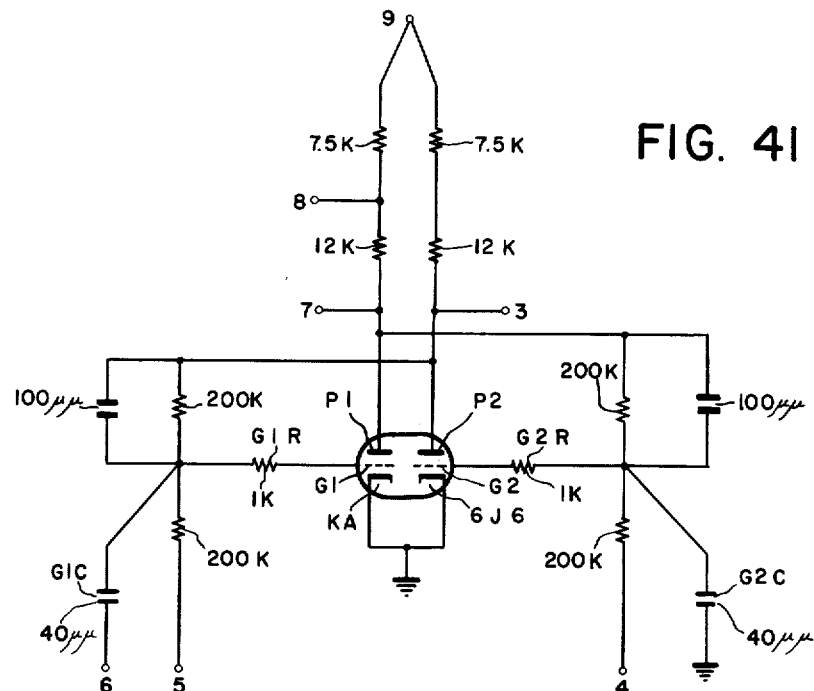
Figure 42:
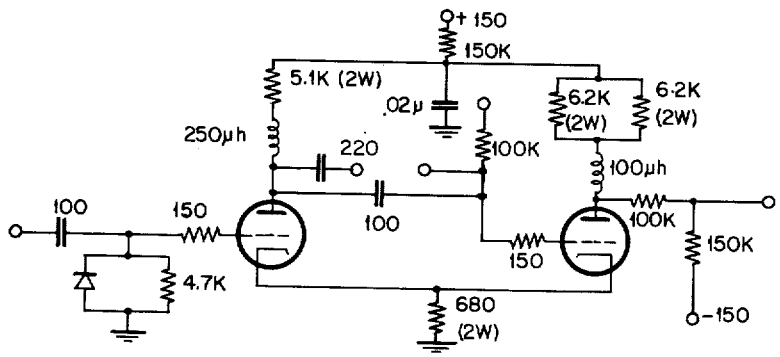
Figure 43:
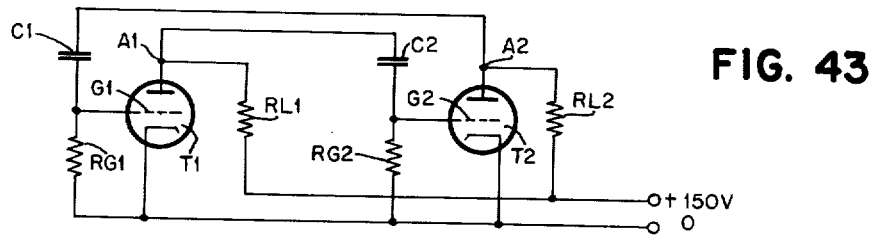
Figure 36:
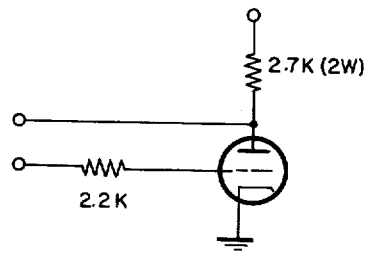
Figure 44:
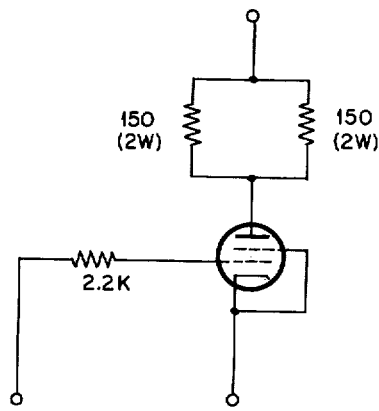

FIGS. 20 through 23 when arranged as shown in FIG. 79 comprise the control circuits for the tape unit including the read-write and erase circuits;

FIG. 24 is a vertical section of the reading side of the reproducing punch utilized in the system;

FIG. 25 is a similar view of the punch side of the machine on which cards are reproduced in the tape-to-card operation;

FIG. 26 is a detail view in vertical section showing the punching mechanism in operated position;

FIGS. 27 and 28 when arranged as shown in FIG. 80 constitute a diagrammatic illustration of the tape motion control circuits indicated by the block 23a in FIG. 23;

FIG. 29 is a schematic illustration of the read-write amplifier circuits associated with each of the read-write heads shown in FIGS. 21 and 22;

FIG. 30 is the schematic wiring diagram and the block symbol of a crystal diode AND circuit;

FIG. 31 is the schematic wiring diagram and the block symbol of an AND-cathode follower circuit;

FIG. 32 is the schematic wiring diagram and the block symbol of an OR circuit;

FIG. 33 is the schematic wiring diagram and the block symbol of an OR-cathode follower circuit;

FIG. 34 is the schematic wiring diagram and the block symbol of a cathode follower circuit;

FIG. 35 is the schematic wiring diagram and the block symbol of an inverter-cathode follower circuit;

FIG. 36 is the schematic wiring diagram and the block symbol of a plate pull-over inverter;

FIG. 37 is the schematic wiring diagram and the block symbol of a blocking oscillator;

FIG. 38 is a diagrammatic illustration in block form, together with the block symbol of an inequality detector;

FIG. 39 is the schematic wiring diagram of a bi-stable electronic trigger, illustrative in principle of triggers of similar nature used throughout the system;

FIG. 40 is the schematic wiring diagram and the block symbol for a key trigger adapted to operate from manually operated contacts, relays or cam contacts;

FIG. 41 is the schematic wiring diagram of a high speed electronic trigger;

FIG. 42 is the schematic wiring diagram and the block symbol of a single shot multivibrator;

FIG. 43 is the schematic wiring diagram of an exemplary single shot multivibrator utilized herein for purpose of explanation; and FIG. 44 is the schematic wiring diagram and the block symbol of a thyratron.

Throughout the systems diagrams, which are presented largely in block form, the block symbols associated with the several devices illustrated in FIGS. 30 through 44 will represent the presence in said block diagram of a circuit such as that with which the block symbol is associated. It will be understood that the elemental circuits may be altered within the skill of those in the art to obtain differences in their detail performance, and such alteration is in fact contemplated as the systems circuits may require.

Figure 45:
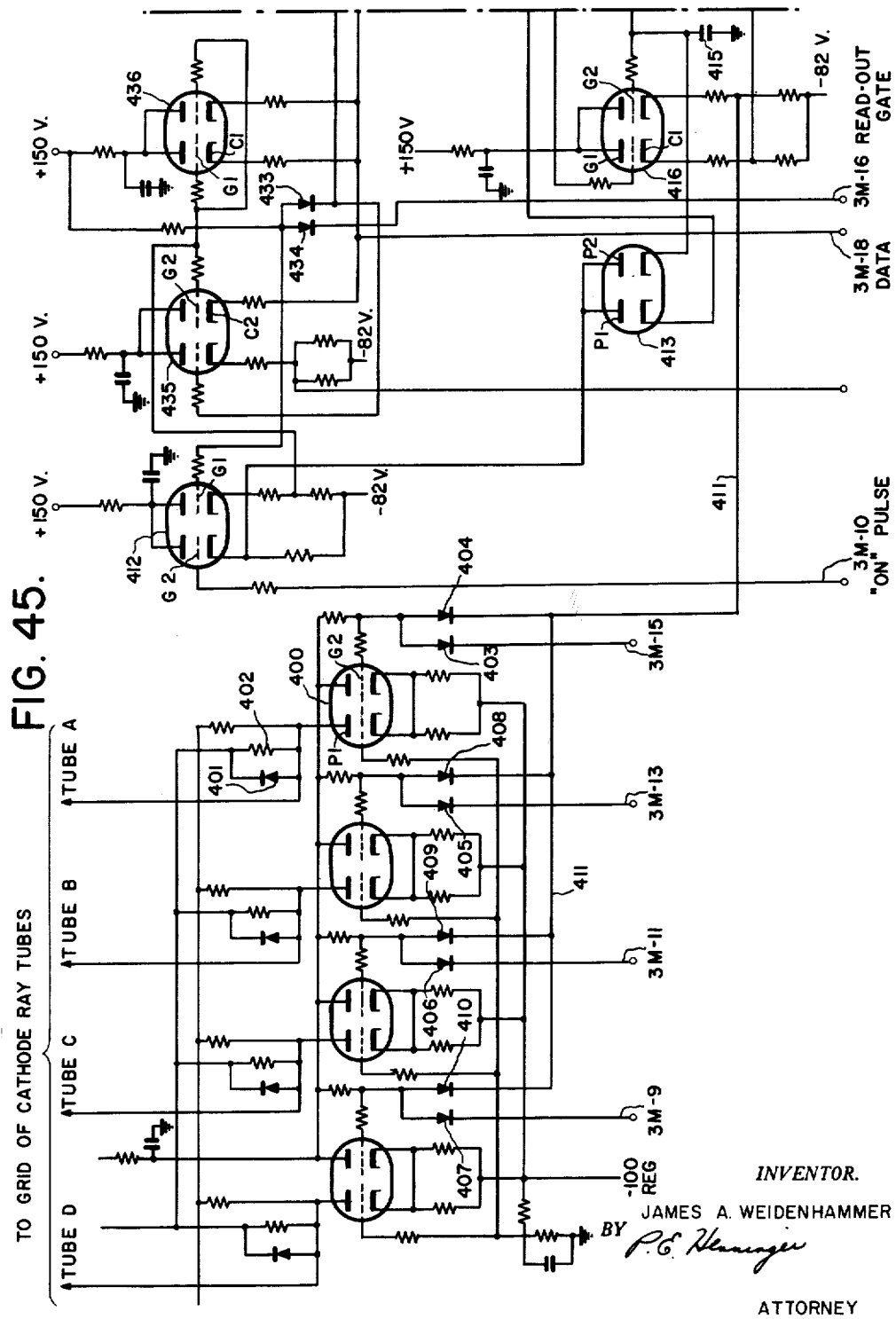
Figure 48:
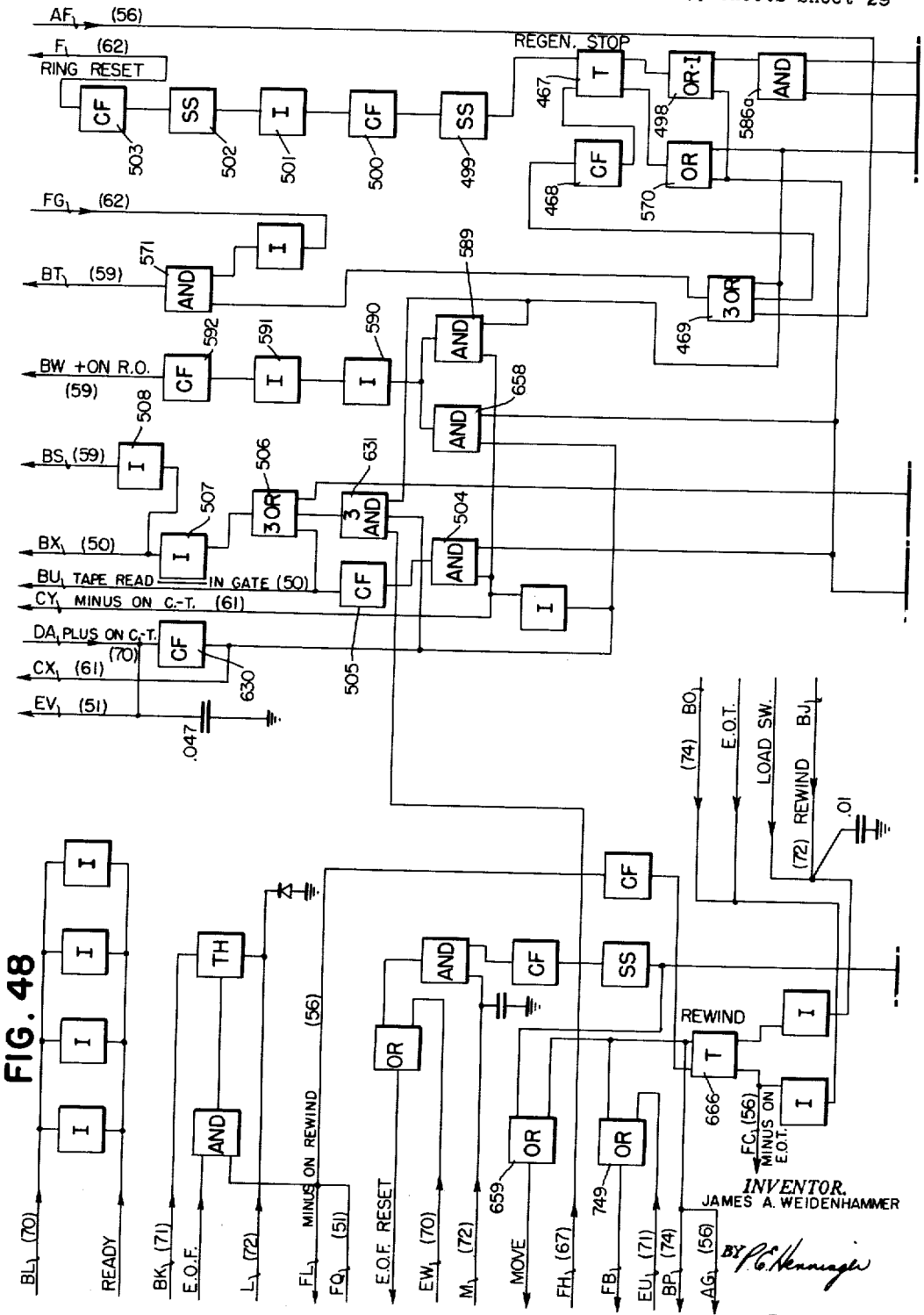
Figure 49:
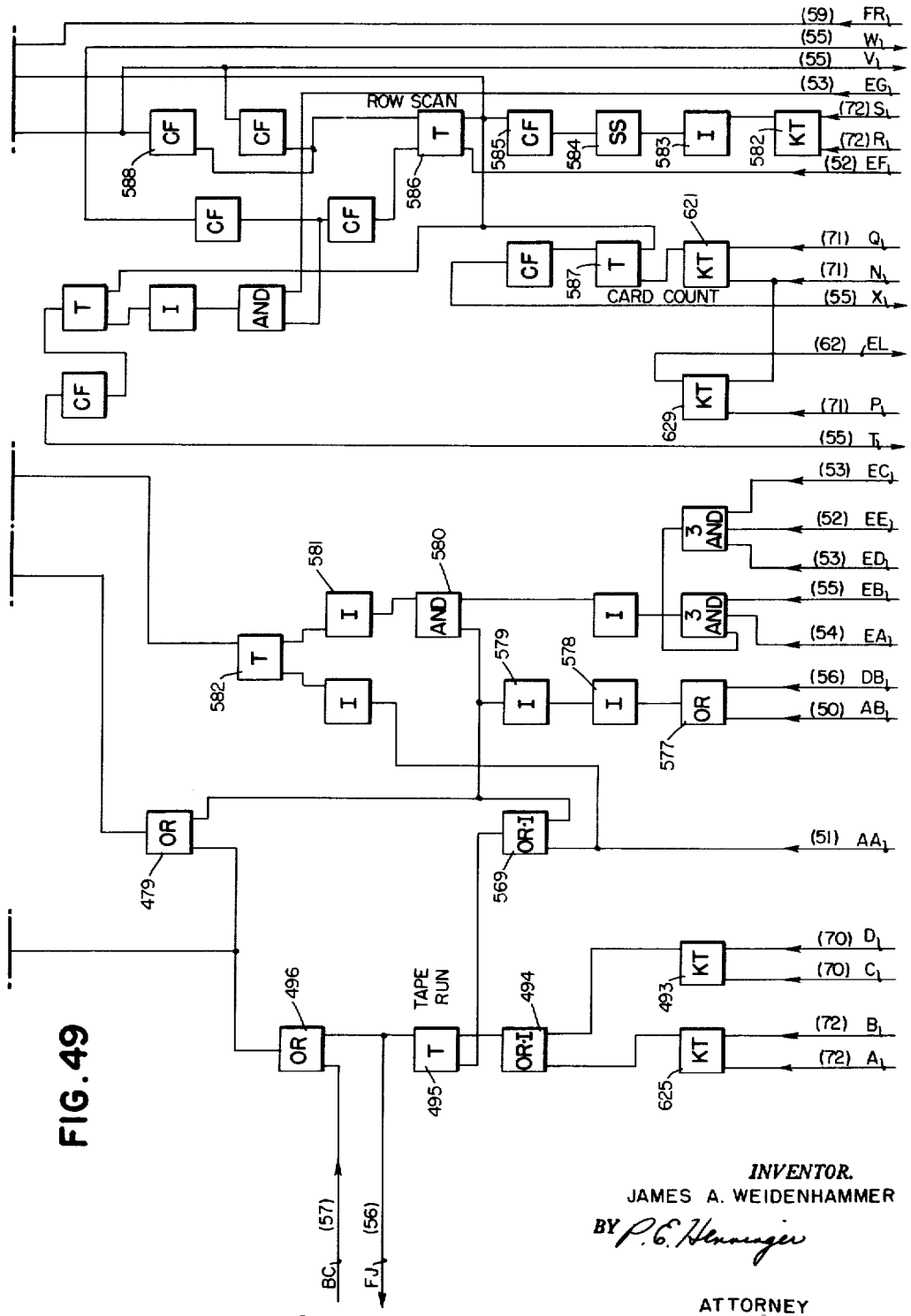
Figure 50:
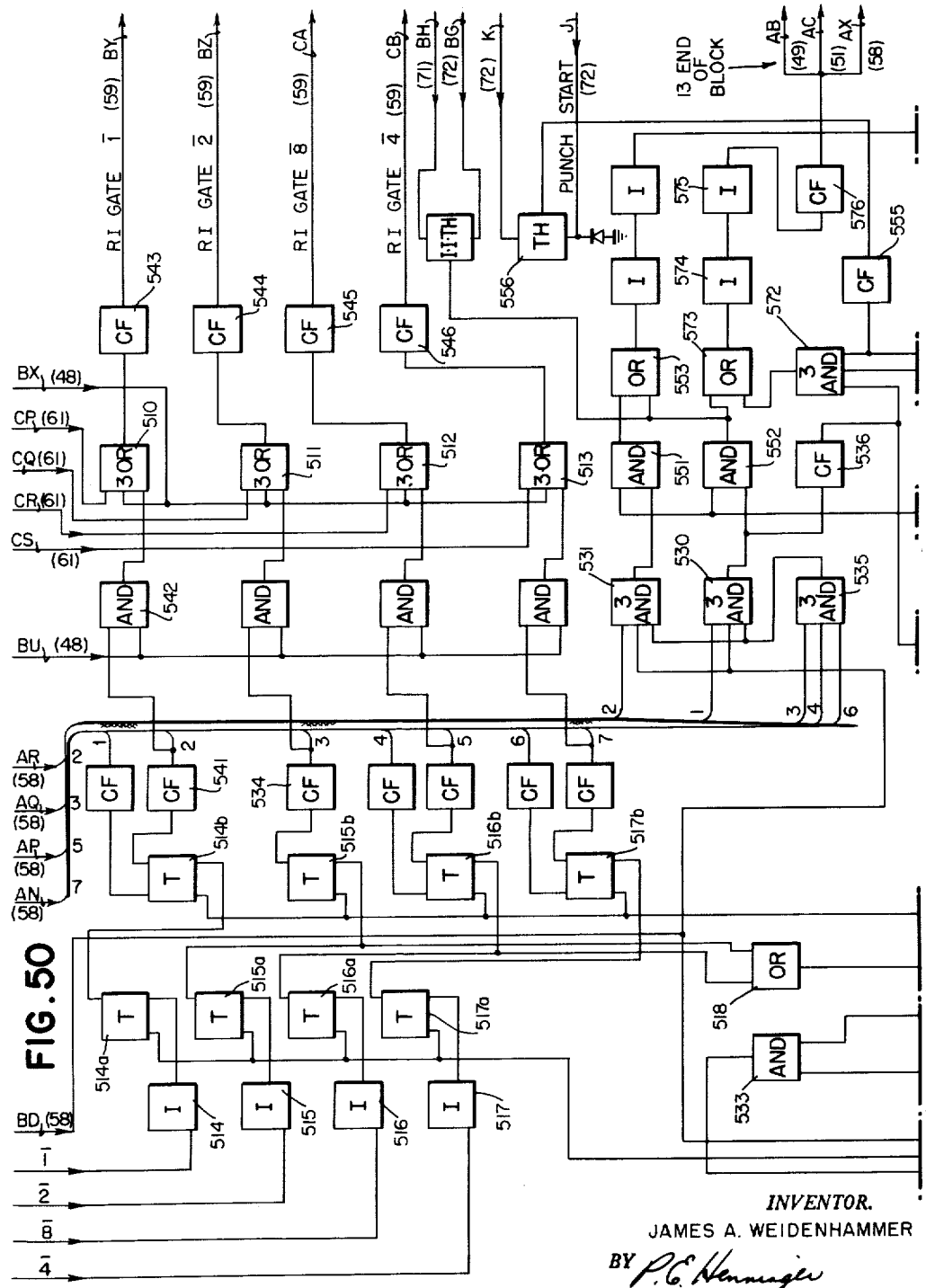
Figure 51:
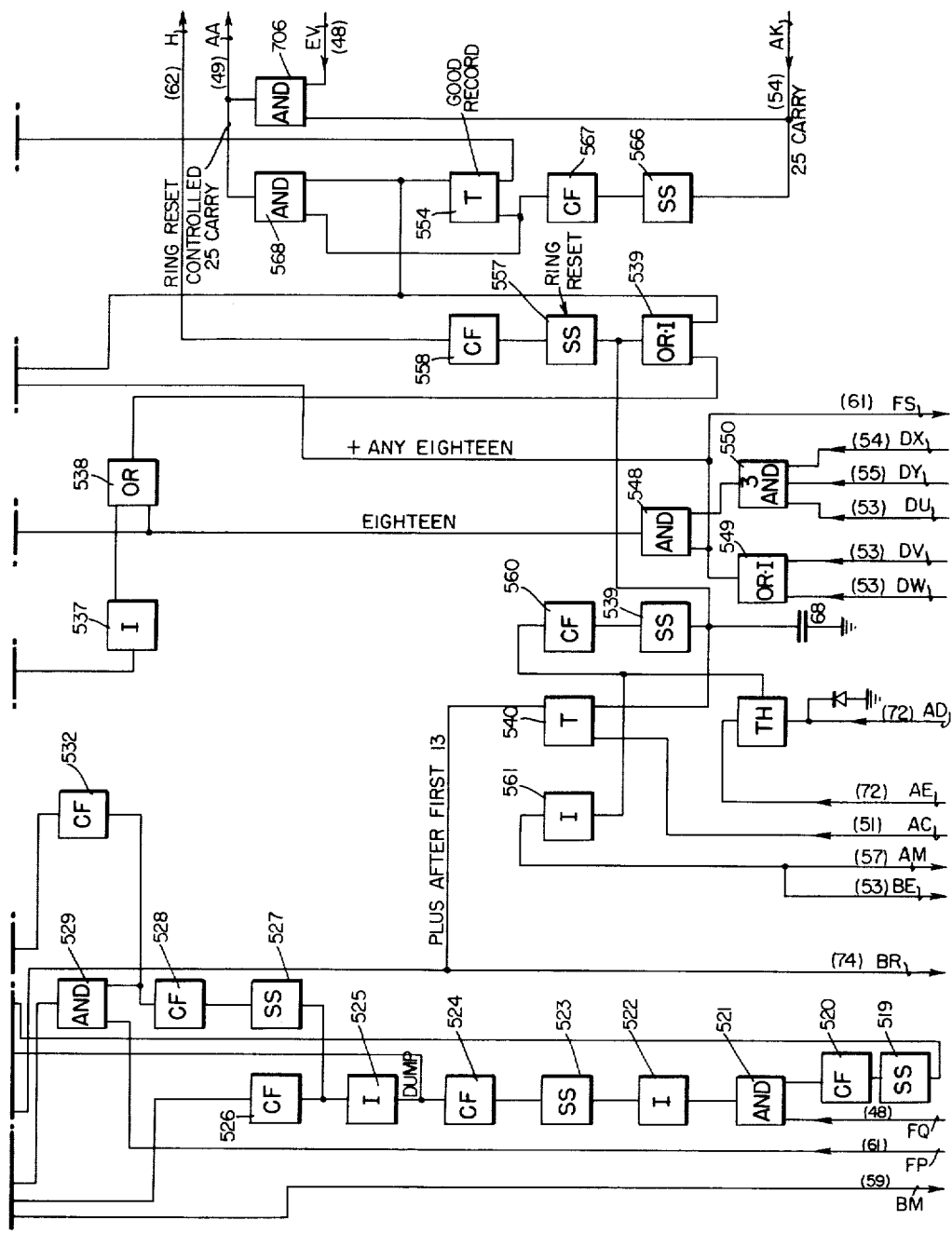
Figure 56:
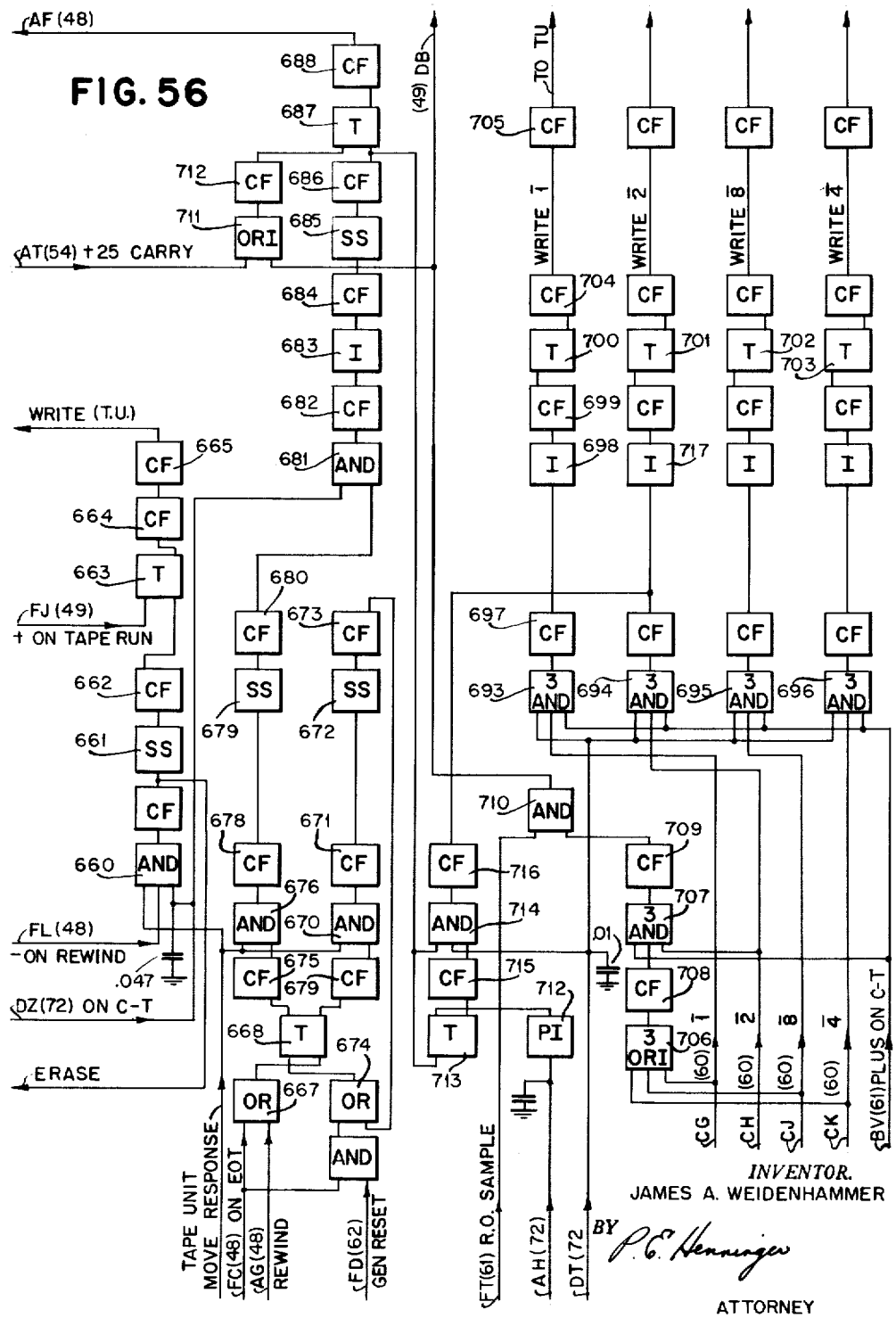
Figure 57:
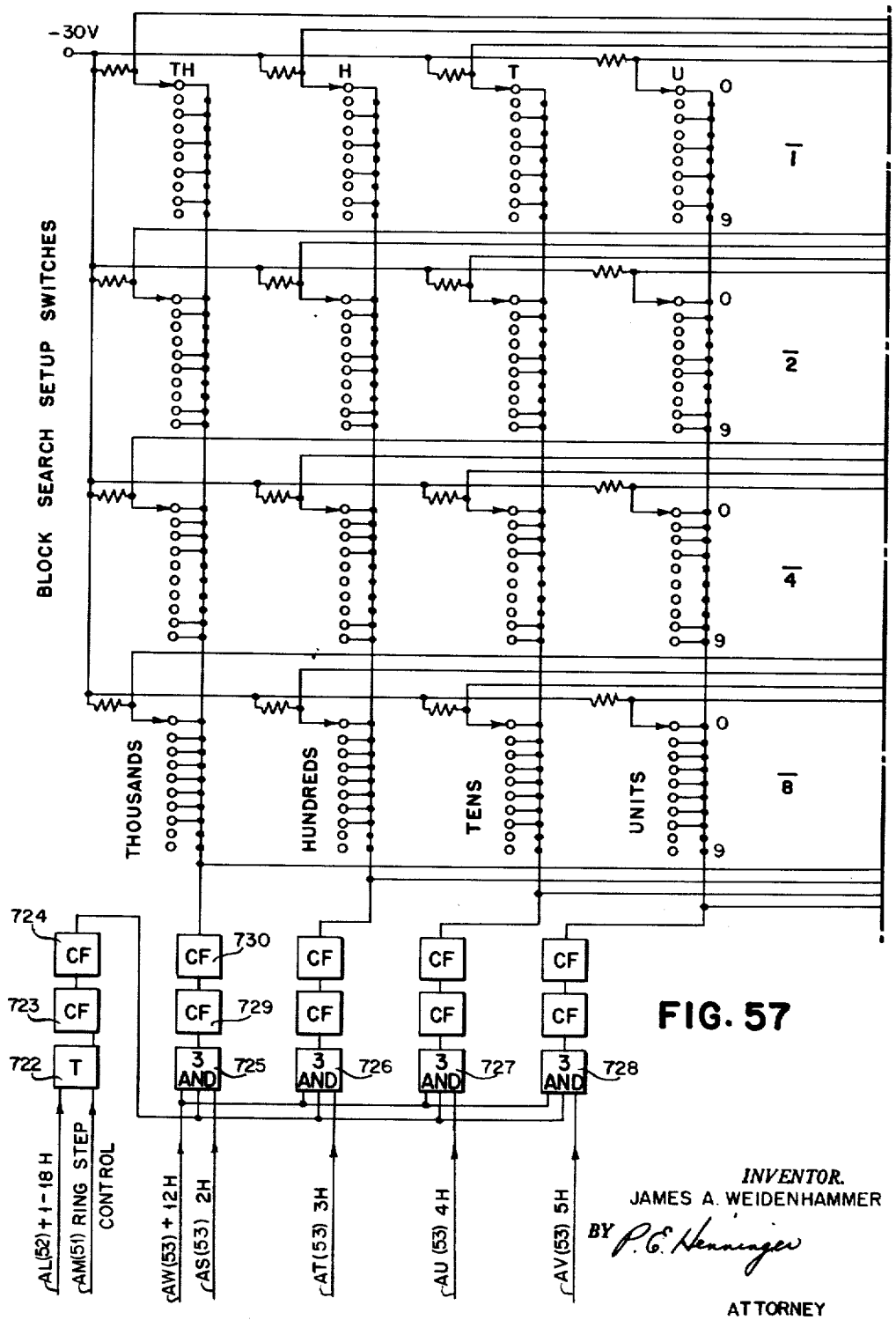
Figure 58:
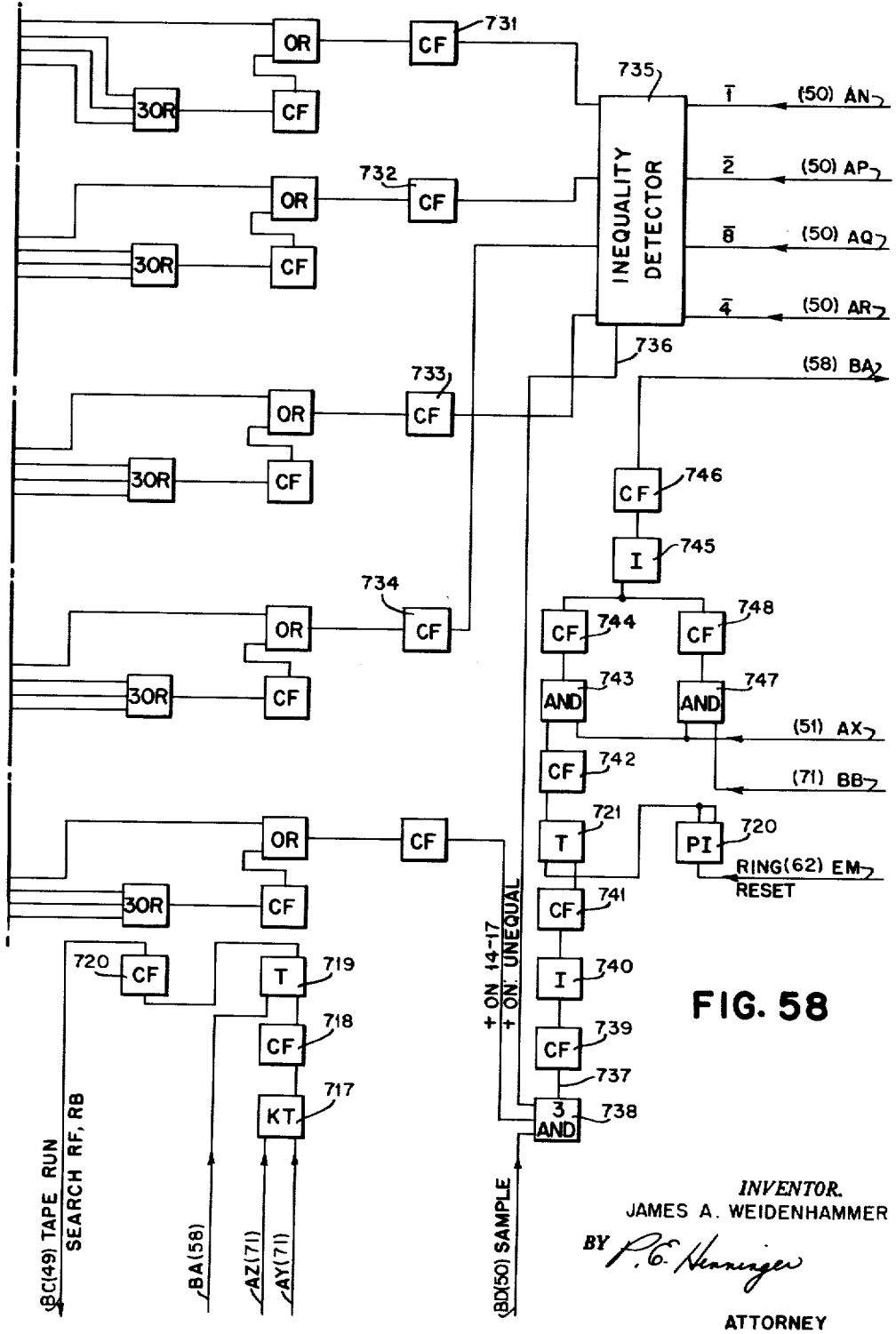
Figure 59:
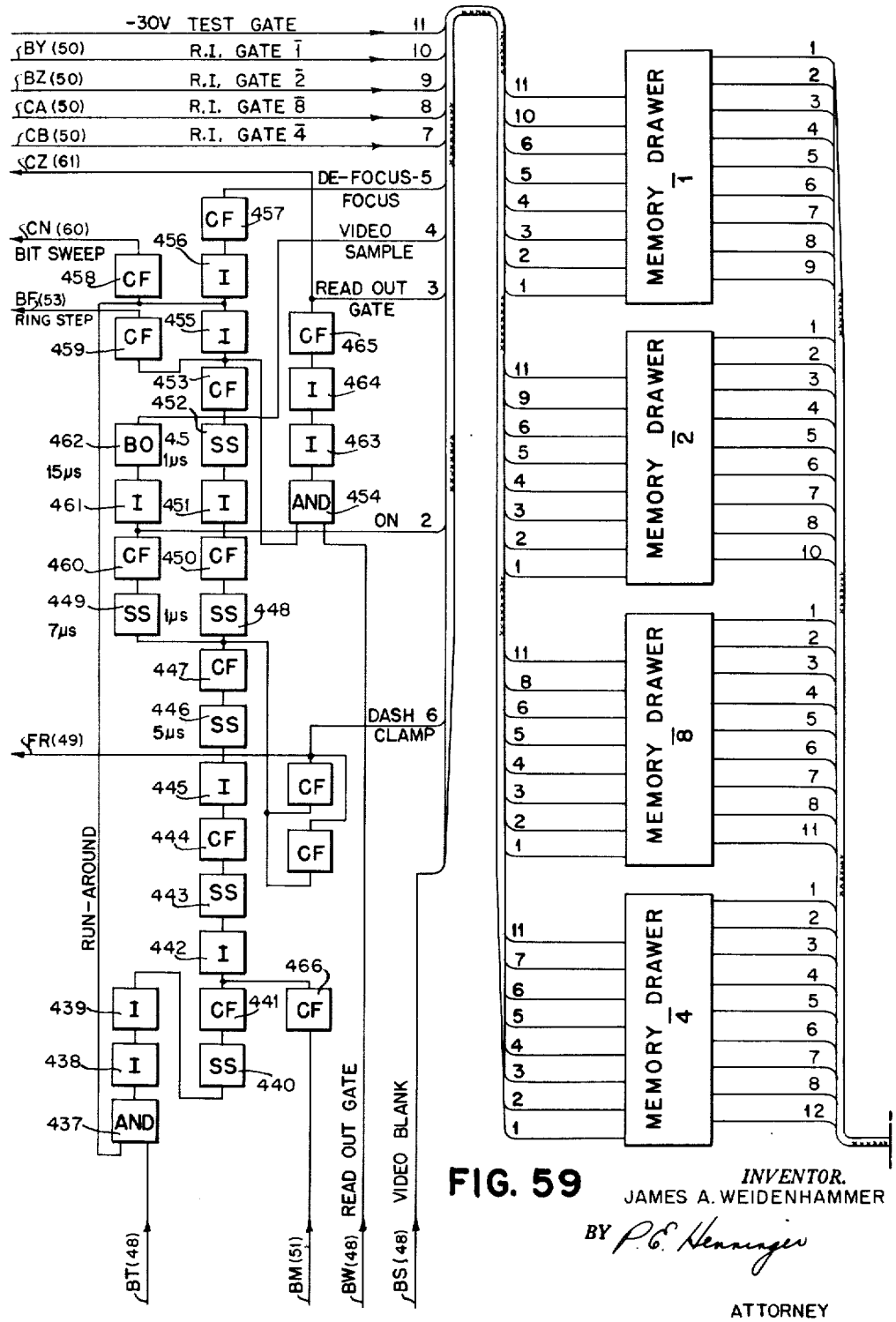
Figure 60:
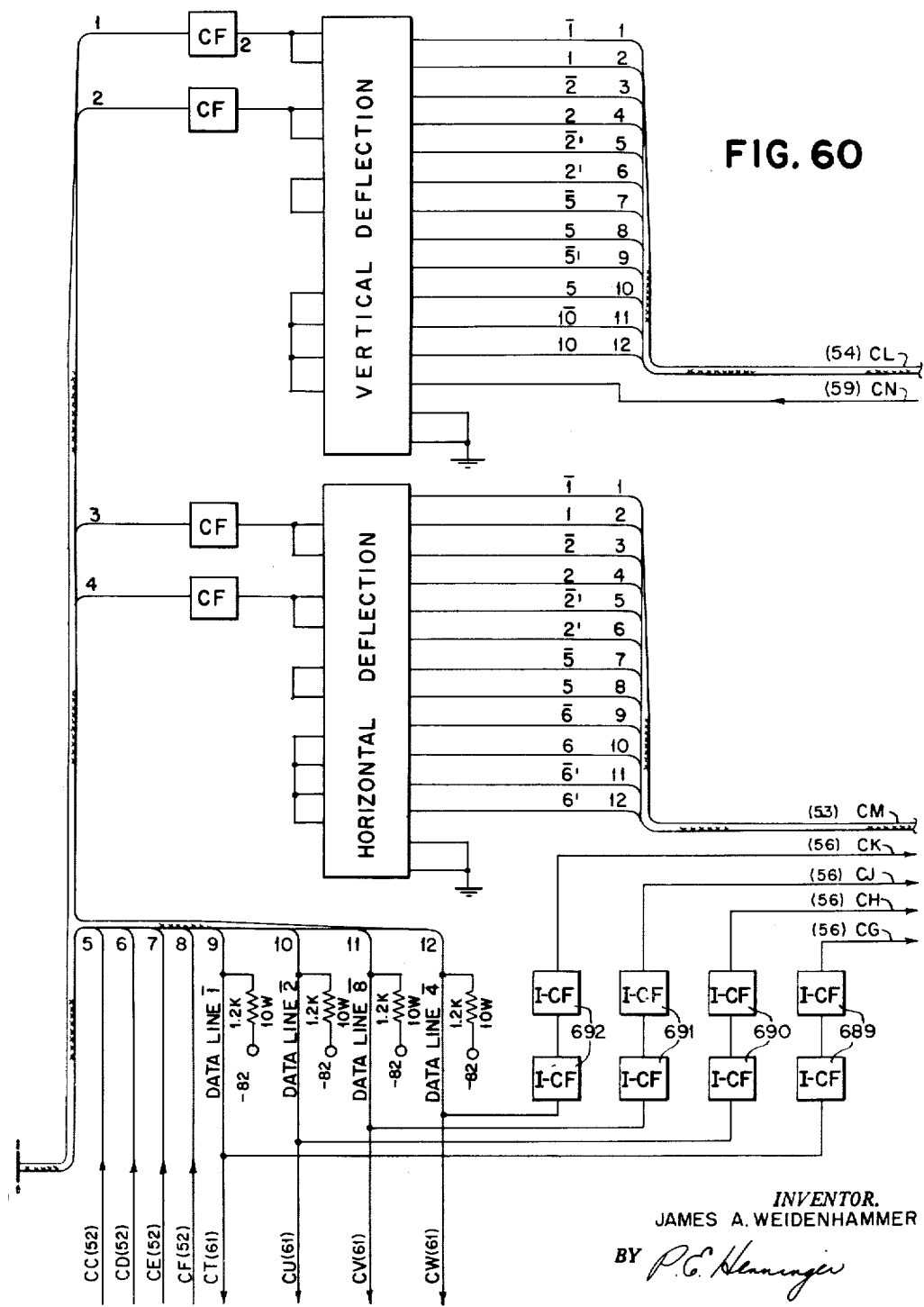
Figure 61:
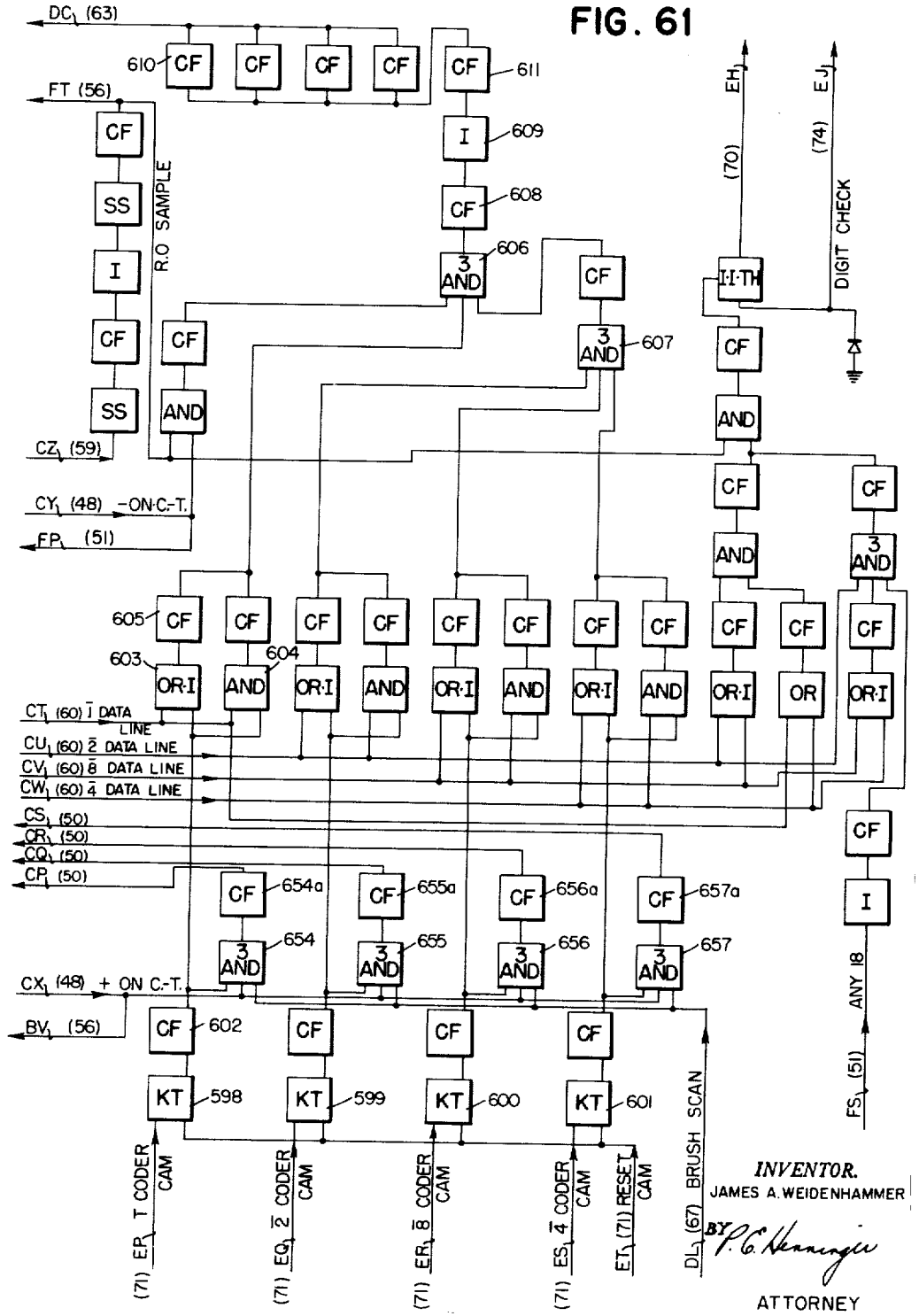
Figure 62:
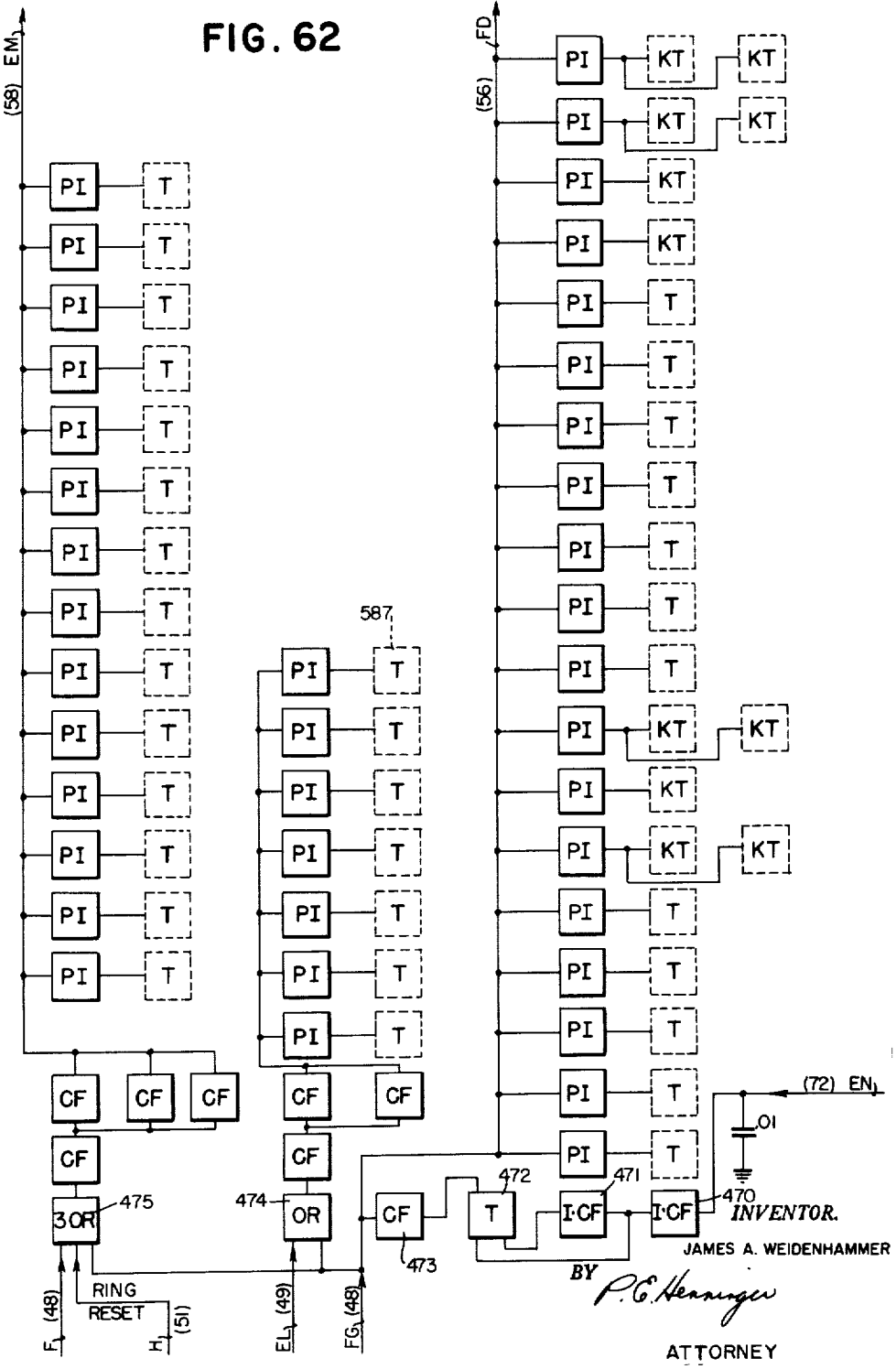
Figure 63:
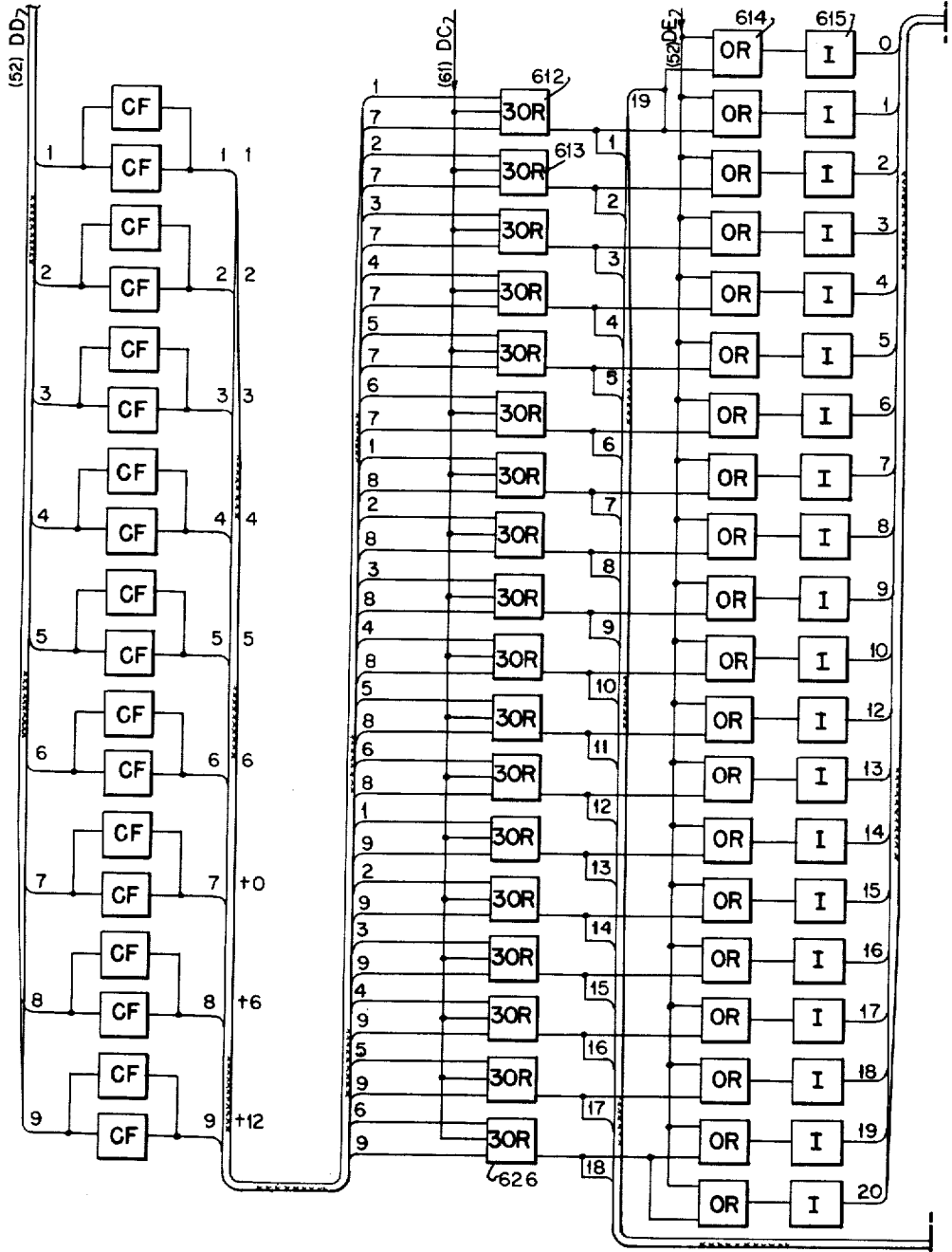
Figure 64:
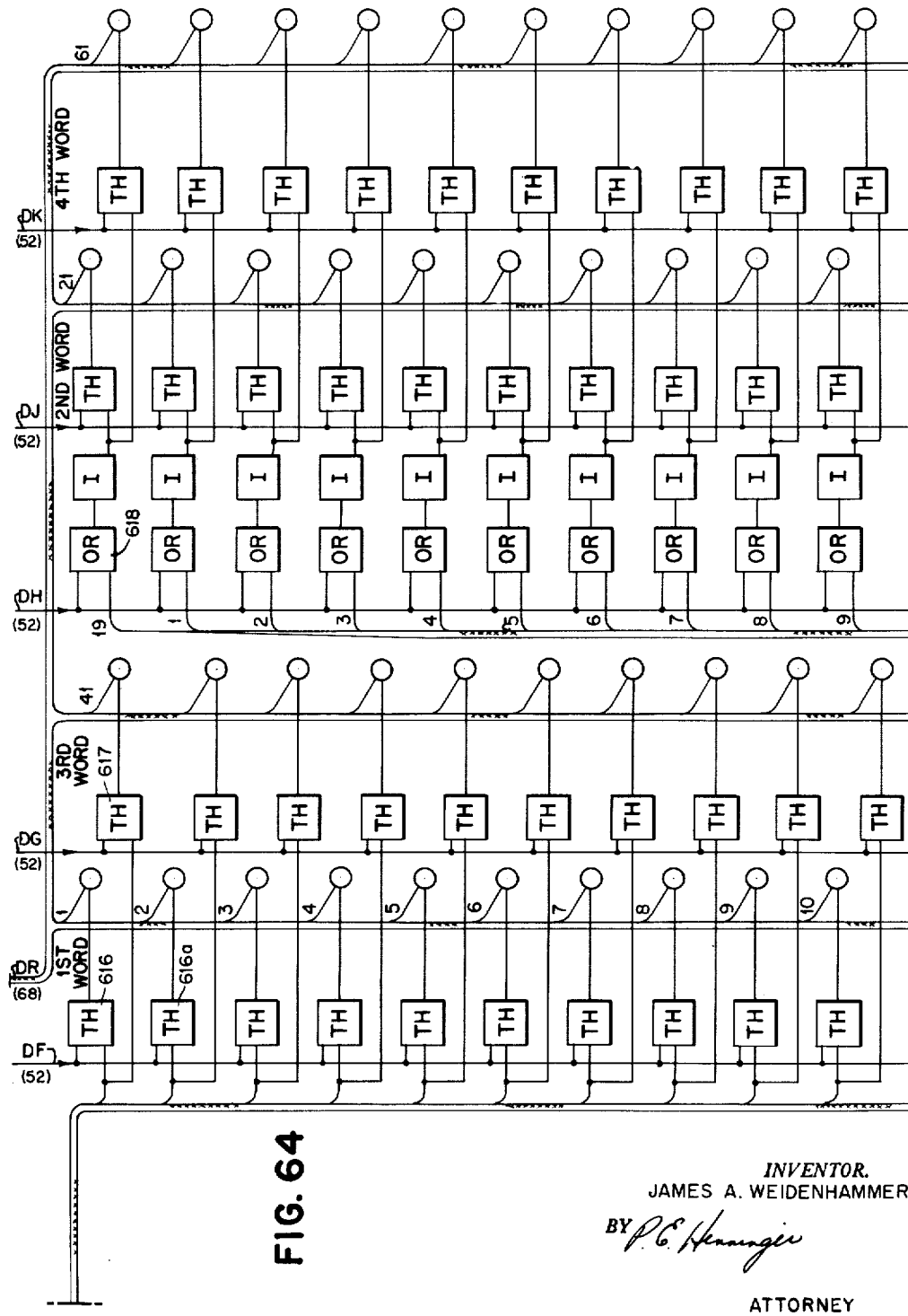
Figure 65:
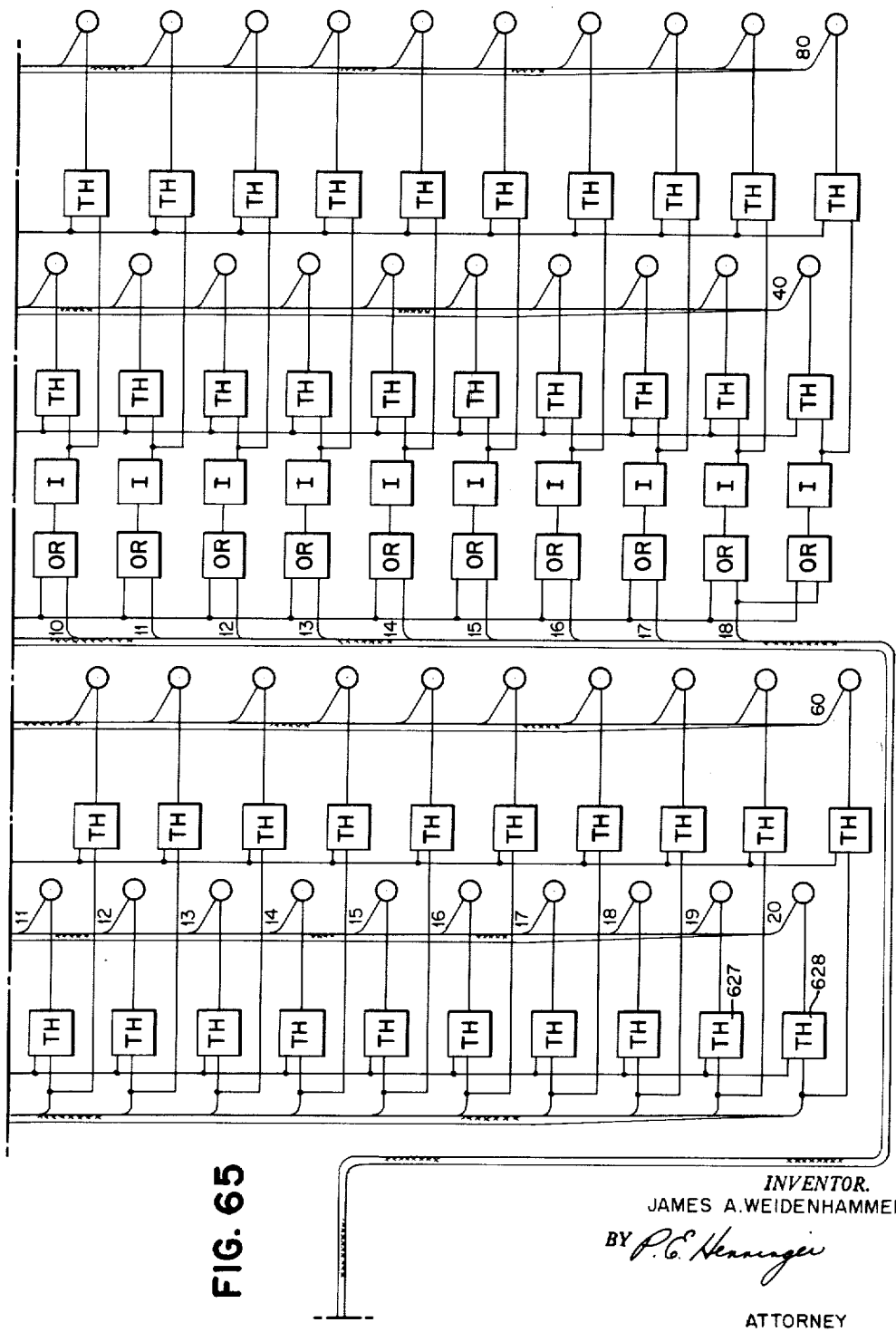
Figure 66:
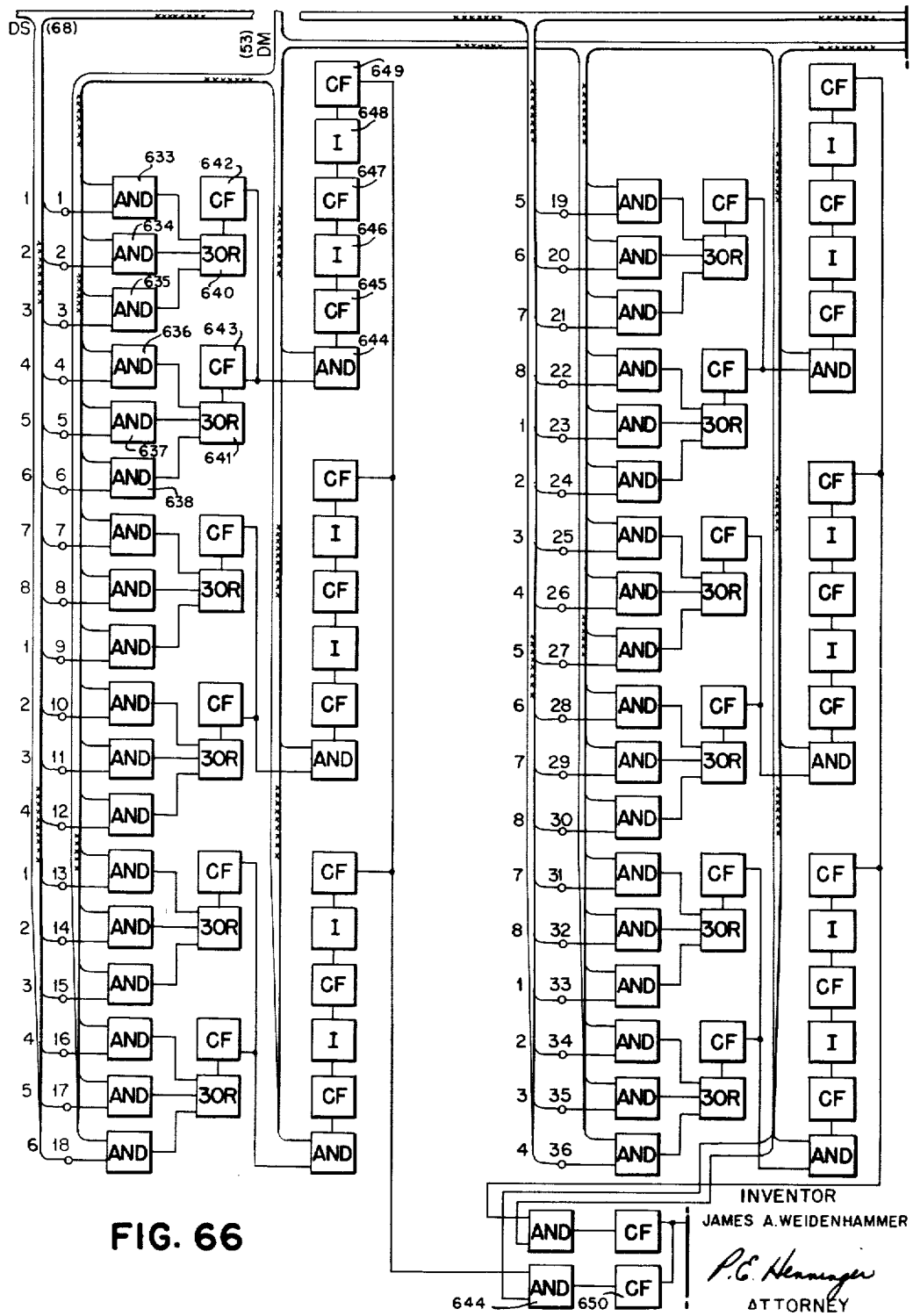
Figure 67:
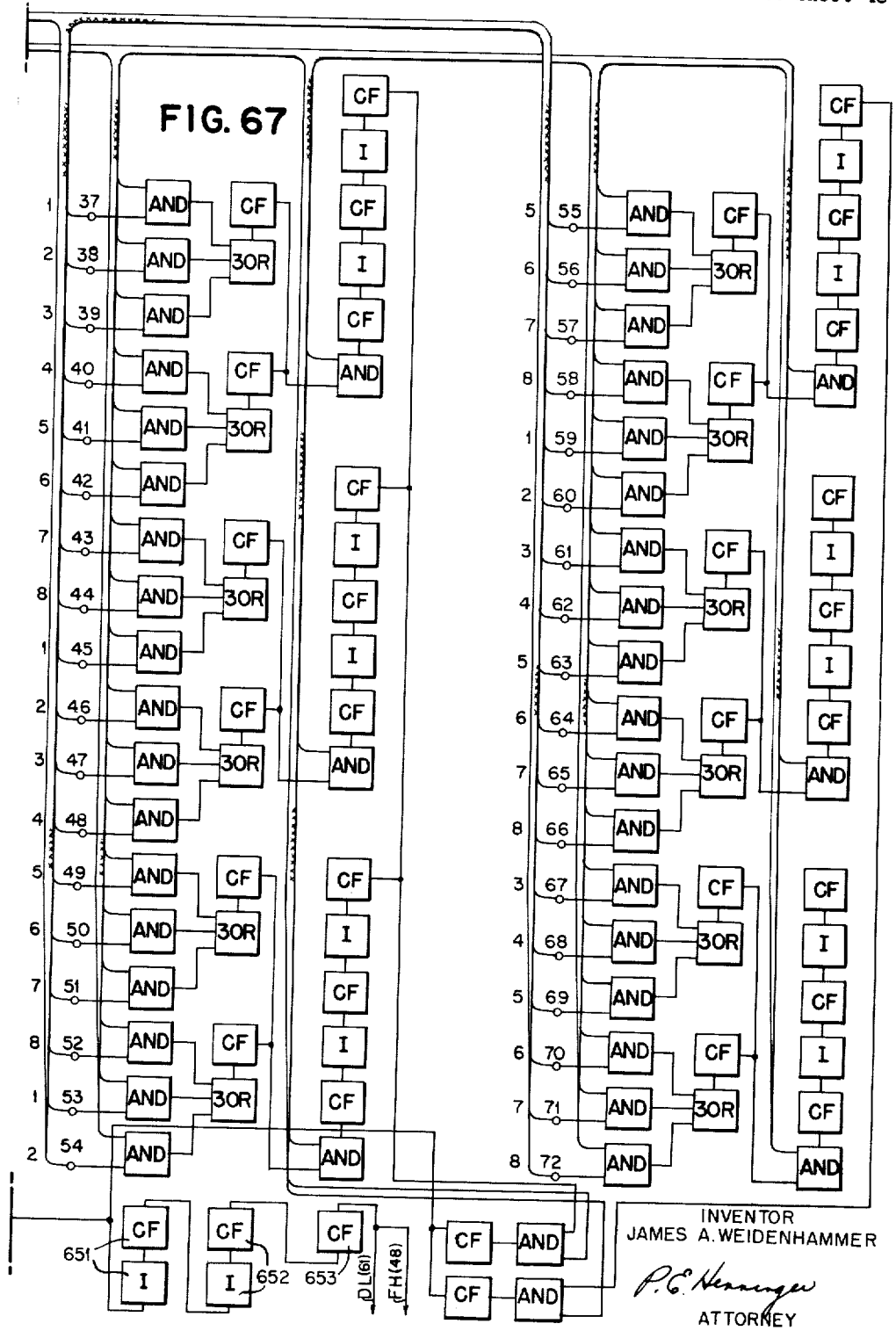
Figure 68:
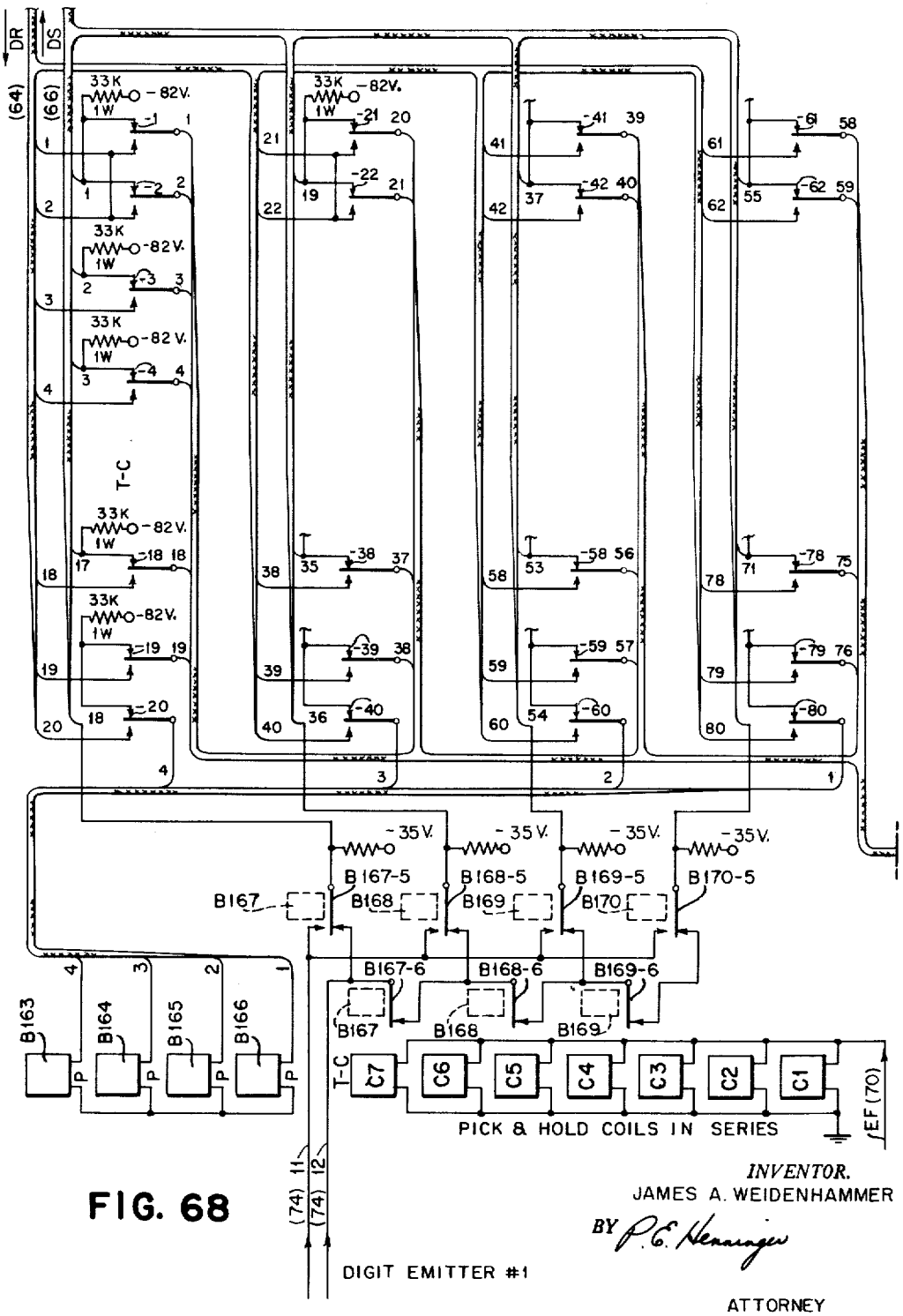
Figure 69:
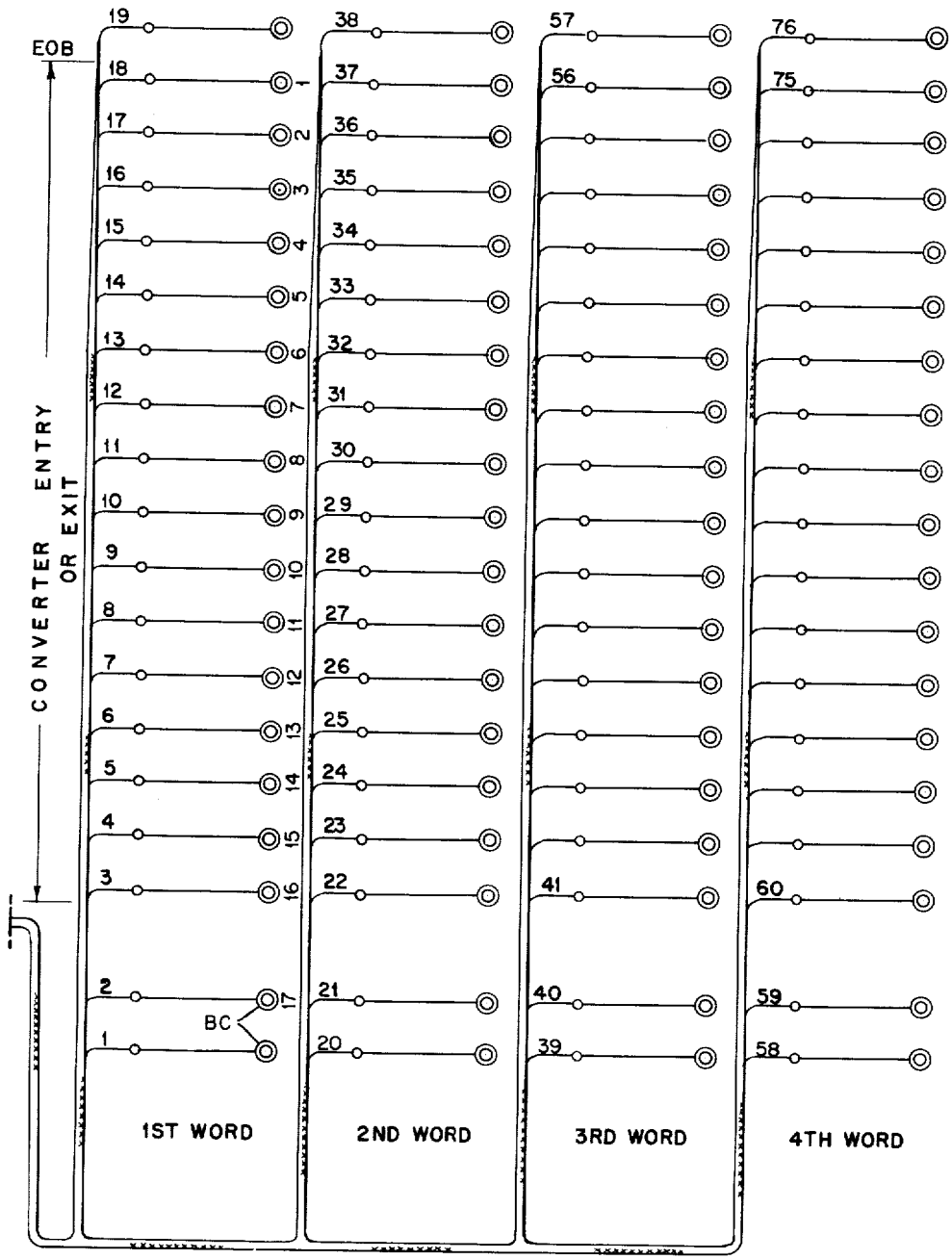
Figure 70:
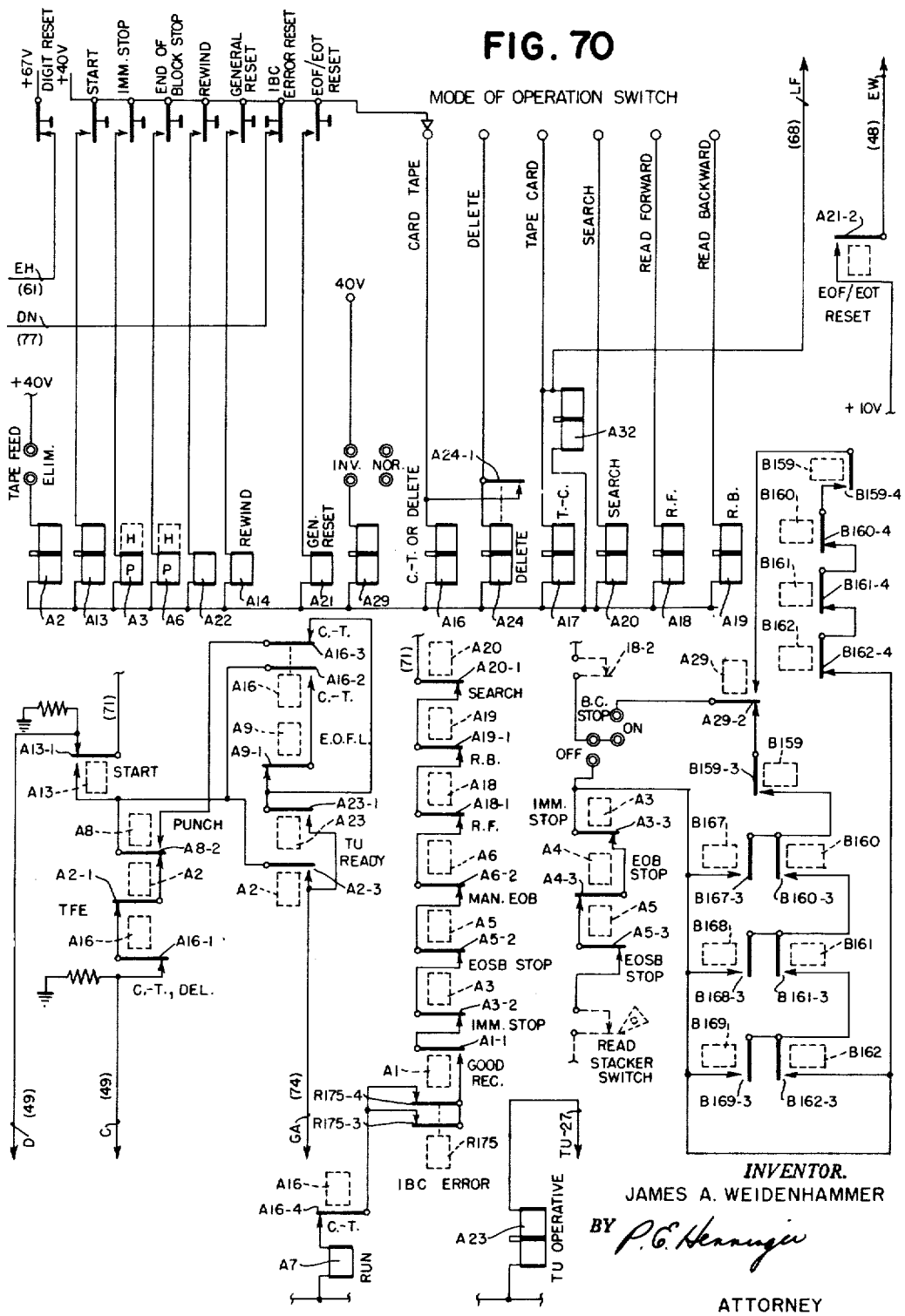
Figure 71:
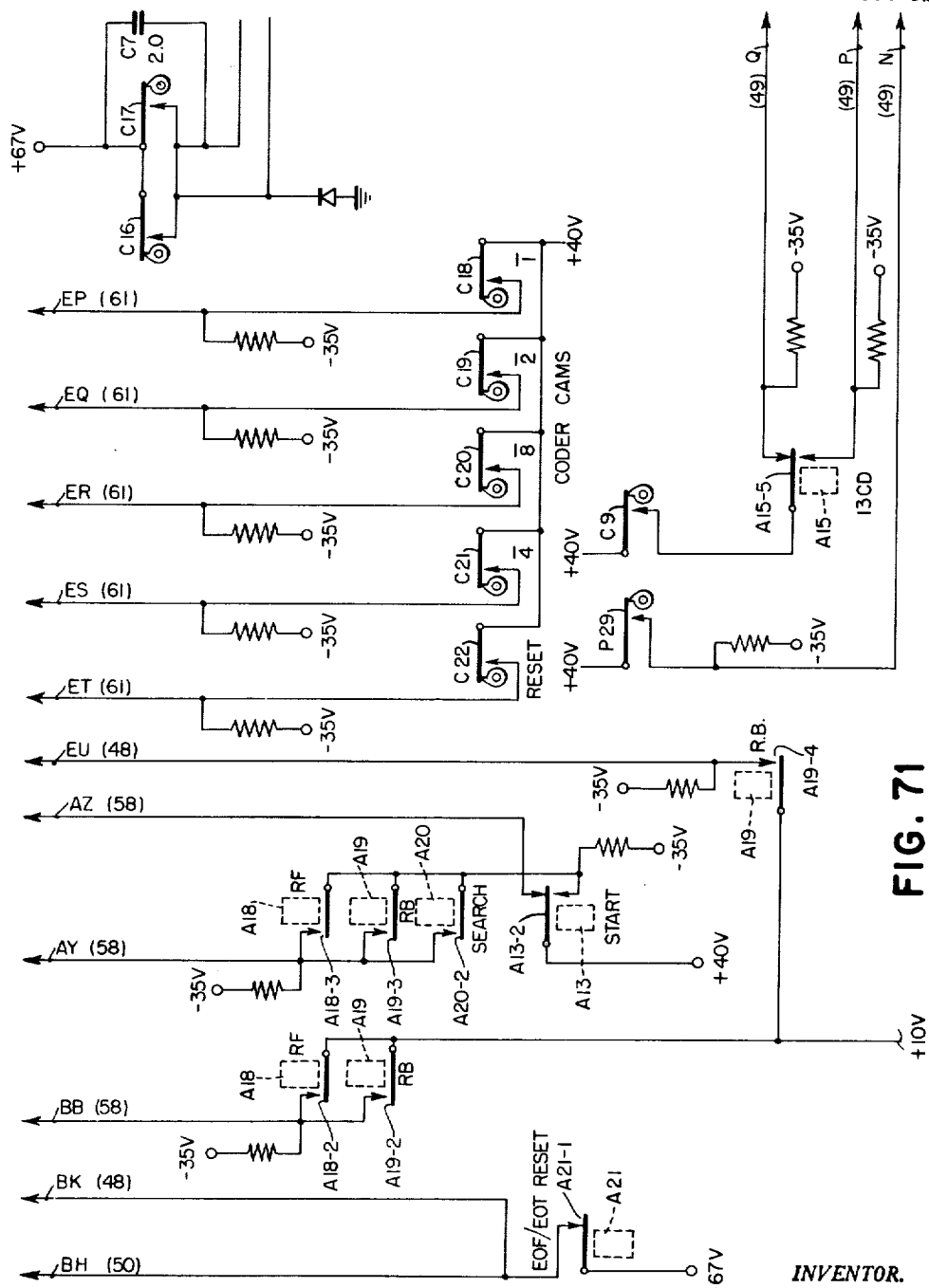
Figure 72:
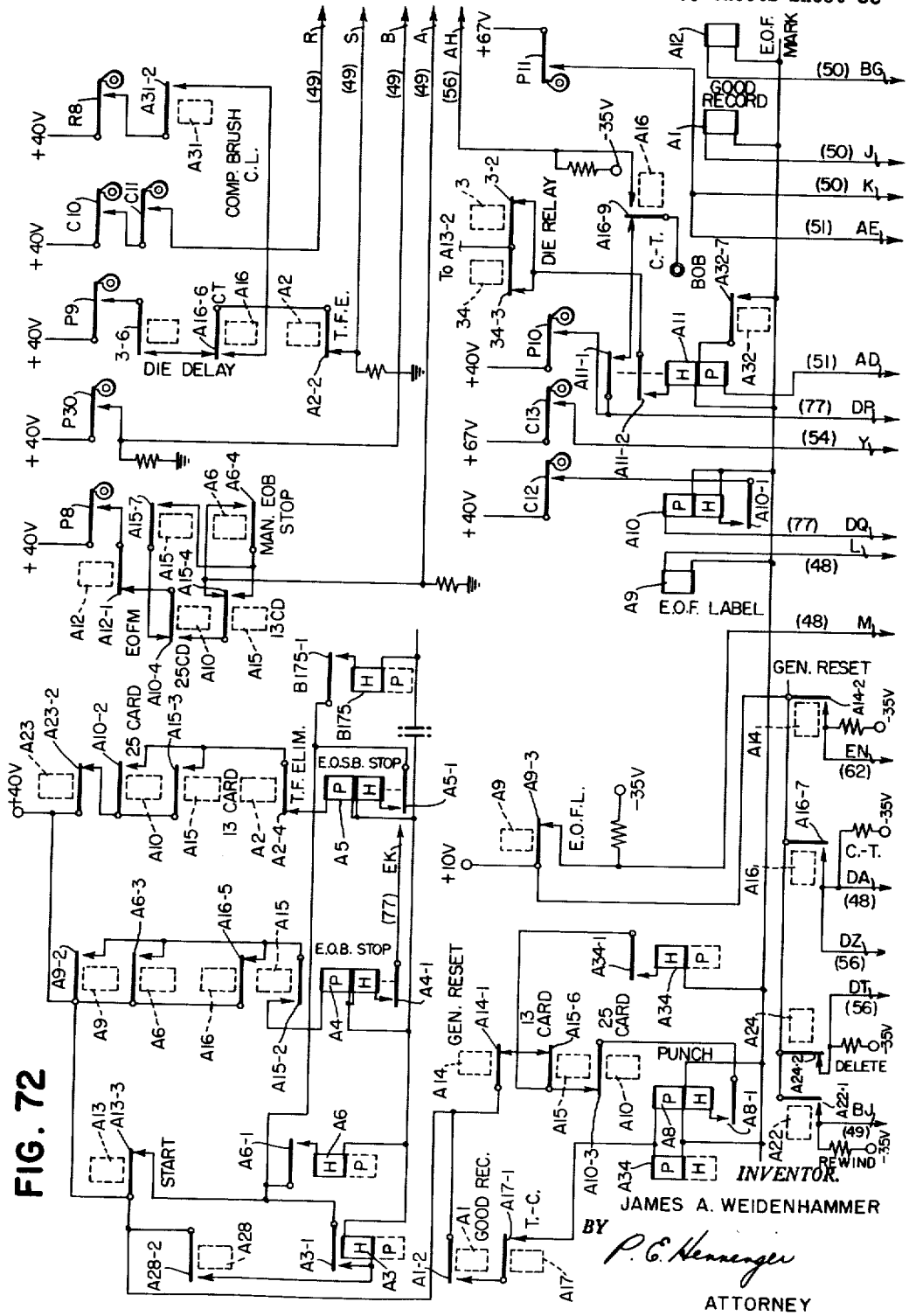
Figure 73:
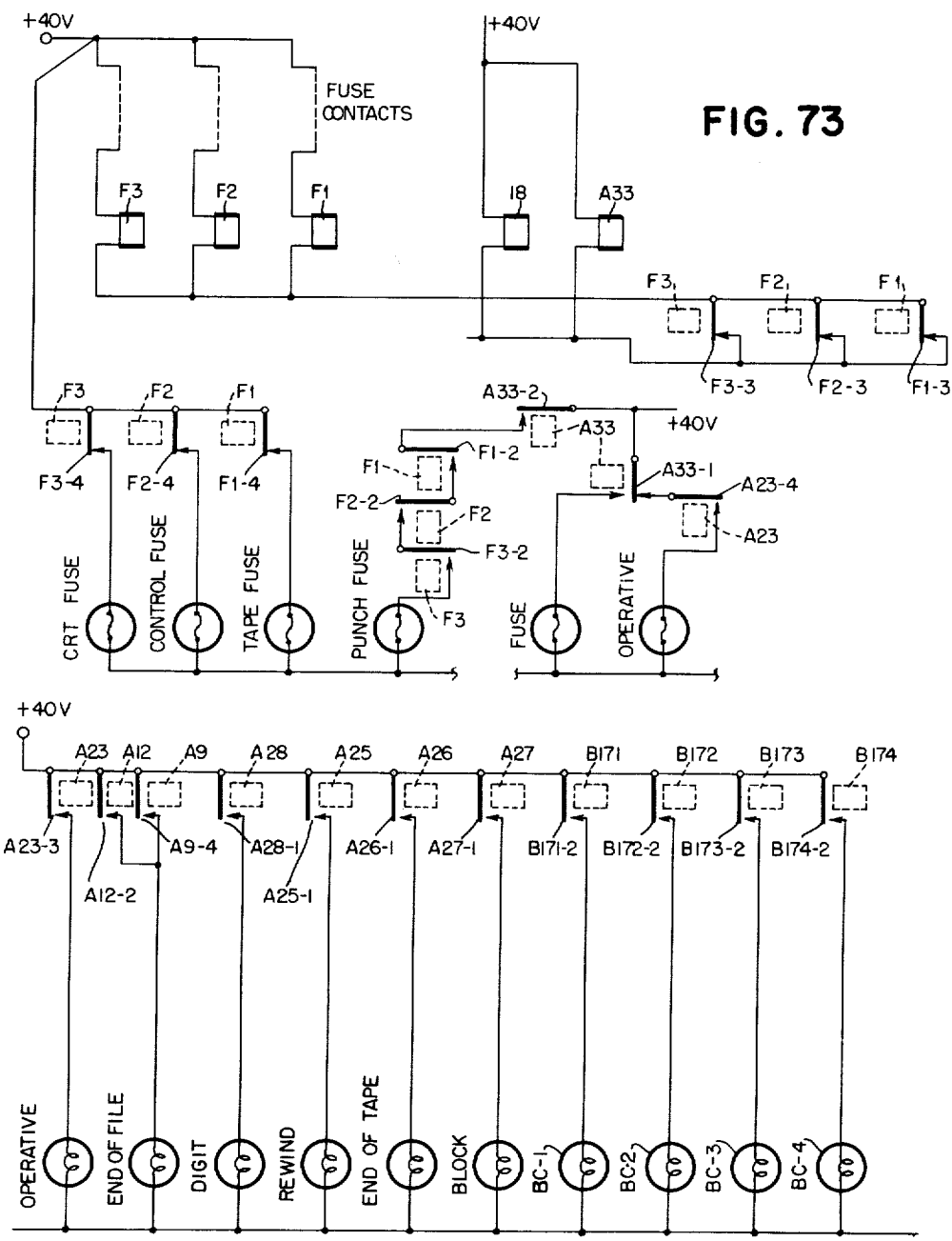
Figure 74:
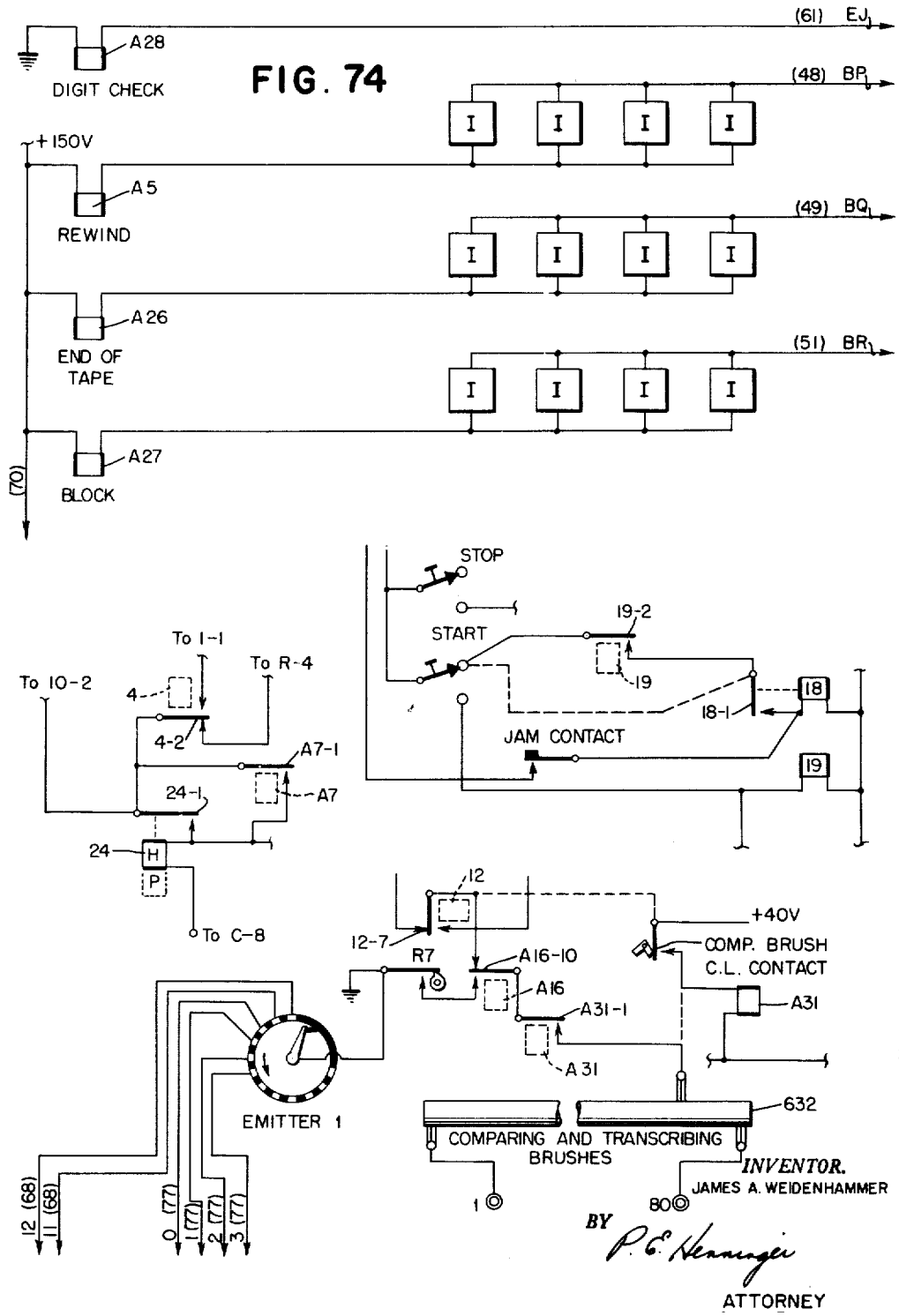
Figure 75:
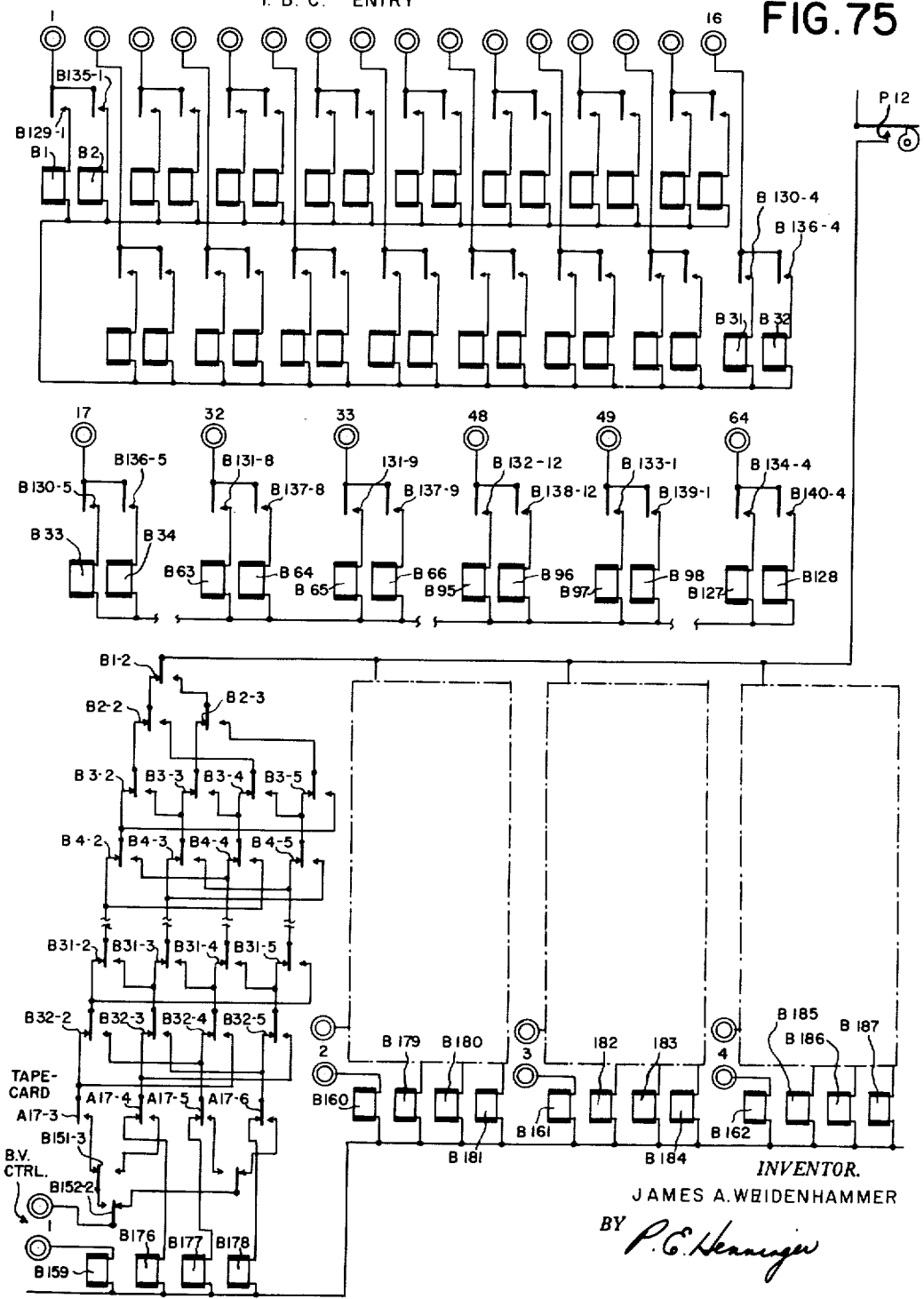

FIGS. 45 and 46 when arranged as shown in FIG. 81 comprise the schematic wiring diagram of a video amplifier system;

FIG. 47 is a timing chart indicating the sequence of pulses for storing data in electrostatic storage;

FIGS. 48 through 76 comprise, principally in block form, the overall system diagram;

FIGS. 48 and 49 when arranged as shown in FIG. 82 mainly illustrate certain tape motion and electrostatic storage control circuits;

FIGS. 50 and 51 when arranged as shown in FIG. 83 comprise the tape input registers and control circuits associated therewith;

FIGS. 52 through 55 when arranged as indicated in FIG. 84 show the circuitry of the horizontal and vertical deflection rings;

FIG. 56 is a schematic diagram of the tape recording delay and gating circuits;

FIGS. 57 and 58 when arranged as shown in FIG. 85 comprise the block search set-up switches and their associated circuits;

FIGS. 59 and 60 when arranged as shown in FIG. 86 show, in block form, the four electrostatic memory drawers and their associated horizontal and vertical deflection control circuits;

FIG. 61 is a schematic diagram of the coder cam controlled circuits;

FIG. 62 is a schematic diagram of the horizontal and vertical ring triggers;

FIGS. 63, 64 and 65 when arranged as shown in FIG. 87 illustrate the punch control thyratron circuitry;

FIGS. 66 and 67 when arranged as shown in FIG. 88 comprise the brush scanning commutator circuits;

FIGS. 68 and 69 when arranged as shown in FIG. 89 illustrate data converter circuits and their associated control panel hubs;

FIGS. 70, 71 and 72 taken together constitute a schematic diagram of the stop, reset, operational mode control and coder cam circuits;

FIG. 73 is a schematic diagram of the indicating lamp and fuse circuits;

FIG. 74 is a schematic diagram of the control relay and punch emitter circuits;

FIG. 75 is a schematic diagram of the indicated bit count entry circuits.

Figure 76:
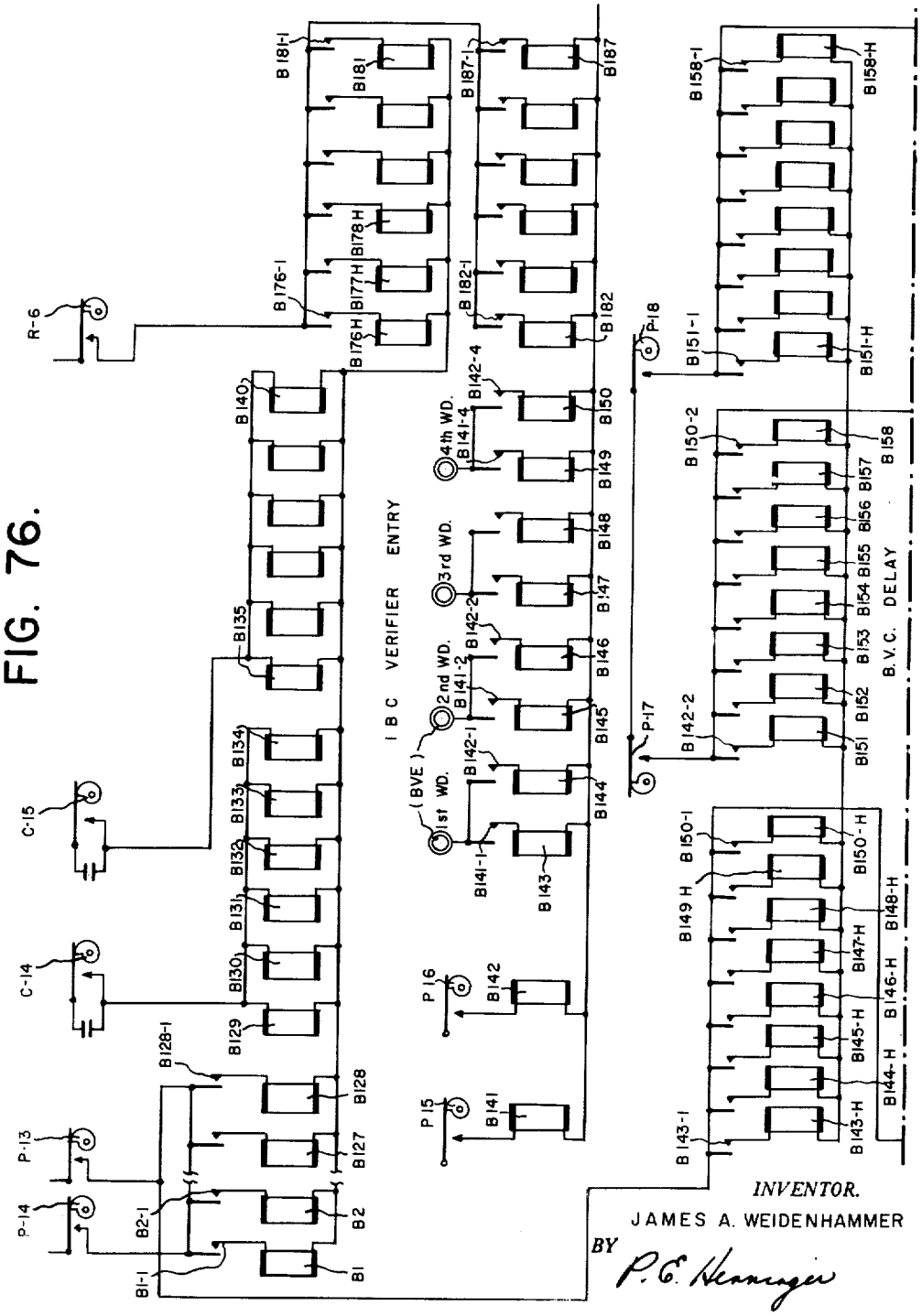
Figure 77:
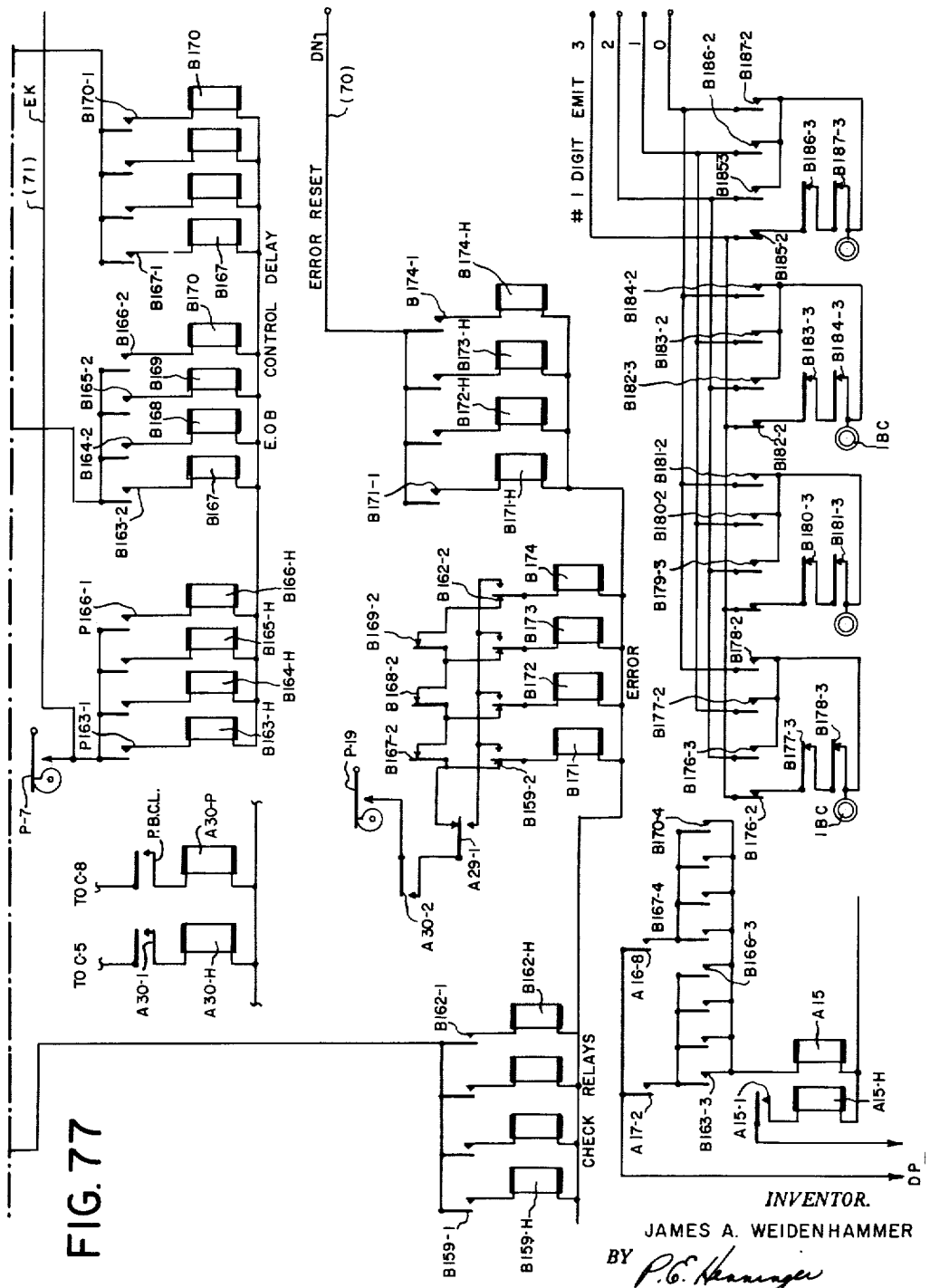
Figure 78:
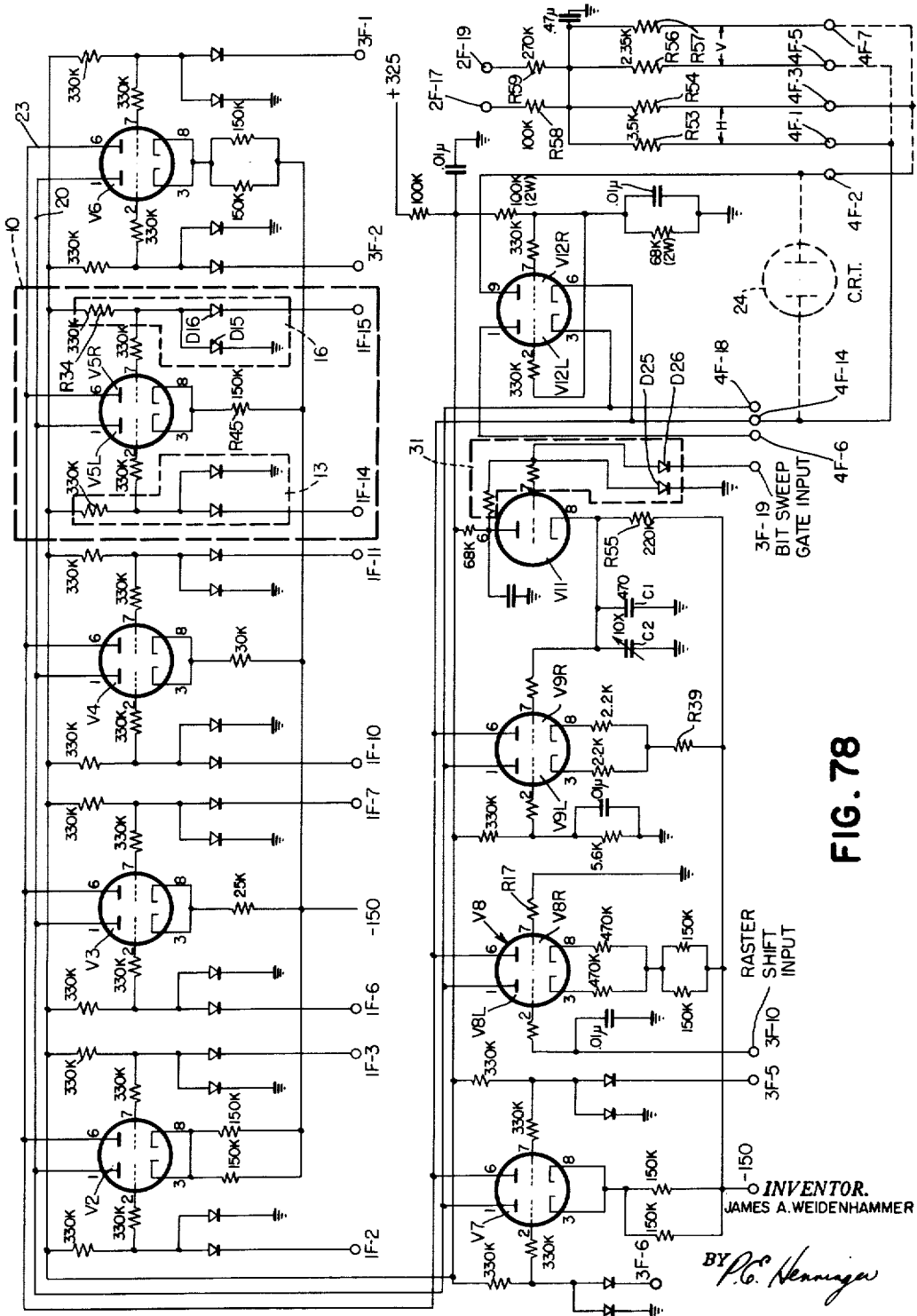

FIGS. 76 and 77 when arranged as shown in FIG. 90 illustrate a relay storage and interpreting network;

FIG. 78 is the schematic diagram of the system employed for obtaining the necessary voltages used in the cathode ray deflection system; and FIGS. 79 through 90 are diagrams showing the arrangement of certain groups of figures comprising related system circuits.

Throughout the systems block diagrams of FIGS. 48 through 77, the inputs and outputs are generally located at the edge of the figures. Each input or output line has a direction arrow thereon which indicates whether the signal on that line is an input or an output. Each line will be identified by a reference character which will be common to that particular line throughout the figures wherever the line appears. The number of the figure from which a line originates or to which a line is connected is indicated parenthetically following the reference character. Thus, in FIG. 48 the line on which the signal RING RESET appears and which is an output of the cathode follower 503 is identified by the reference character F. The character (62) following the reference character F indicates that the line F is connected to circuitry shown in FIG. 62. The fact that the arrow at the end of the line F points outwardly is an indication that the signal RING RESET is an output of the cathode follower 503. Where a lead constitutes an input connection to a component of a given figure, the arrow connected with the input line will point in the opposite direction, i.e. inwardly.

*Brief functional description*

Figures 1, 3:
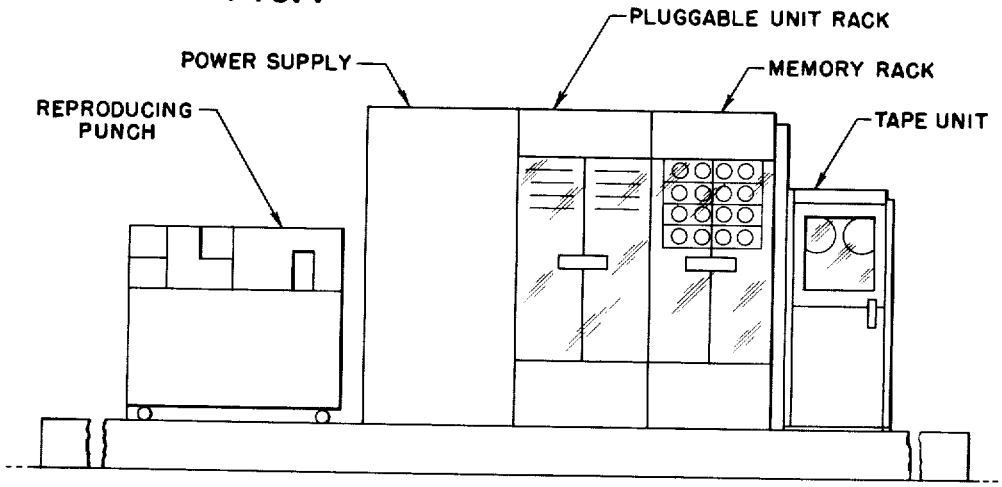
FIG. 3 is a diagrammatic view representing a section of magnetic tape showing the disposition of four binary tape tracks thereon and the coding thereof for representing numeric values 0 through 13.

As shown in FIG. 1 the machine which is the subject of this application consists of a reproducing punch which may, for example, be an I.B.M. Type 519 such as shown in the George F. Daly Patent No. 2,448,781, dated September 7, 1948. The reproducing punch serves as a punched card reader during the operation of preparing a magnetic tape. During the operation of reading records from magnetic tape and recording such records in punched cards, the reproducing punch serves as a punched card output device. The reproducing punch is coupled through an electronic assembly to a magnetic tape unit of the general type shown in the J. A. Weidenhammer et al. application for U.S. patent, Serial No. 290,396, filed May 28, 1952, for Tape Feed Mechanism, now abandoned, and which has been replaced by continuing application Serial No. 535,052, filed September 19, 1955.

Since the computer, in connection with which the subject machine is an auxiliary, is designed for exclusive use of magnetic tape as input and output means, for reasons of speed, punched card input data or output data is available only through the use of the instant tape-to-card and card-to-tape converter.

The reproducing punch which forms a part of the combination herein punches and reads standard I.B.M. 80 column cards, using a 12 unit code, at a rate of 100 cards per minute. Input to and output from the reproducing punch are basically parallel, being signals at 12 sequential time intervals on 80 parallel lines. The tape unit input and output are signals on four parallel lines, each set of simultaneous signals constituting a character, so that characters are read in or out in a serial fashion. Furthermore, the calculator adapted to employ the magnetic tape record has a basic rate of information input or output of 70,000 characters per second as compared to a reproducing punch rate of 133 characters per second, making it impractical to synchronize punch and tape unit by lowering tape speed.

The foregoing considerations make it necessary to operate the tape unit intermittently where records of suitable size are separated by a blank inter-record space in order to provide tape starting and stopping clearance. In tape-to-card conversion, for example, the tape is started, a complete record is sensed and stored in a memory large enough to store the whole record, the tape stops in the inter-record space, and the punch then begins to punch cards, reading a maximum of 80 characters from the memory during each punch cycle, until the entire record has been punched on a series of cards, each such record being greater than 80 characters in length. The tape then starts again and the operation is repeated. It is obvious that very long records without inter-record space, which can be handled in the computer, would entail a prohibitive amount of memory in a converter of the present kind. For this reason a special organization of the tape record is proposed for the card input-output operations, providing start-stop space at reasonable intervals in the tape block. Storage tapes not intended for card input-output may, of course, be prepared in solid blocks of recording.

The arrangement of information on tape is shown in FIGS. 2 and 2A. Each word consists of 18 character spaces, including one end-of-block character code. The tape record designed for use in the computer may comprise any number of words from 3 to 2001 which may be recorded consecutively to form a block. A special end-of-block character is recorded at the beginning and end of each tape block. Start-stop space is provided only between full blocks on standard storage tape. For card input-output purposes, however, the tapes are specially prepared as shown in FIG. 2A, where the large tape blocks of the storage tape are sub-divided into sub-blocks of 100 words, with any remainder less than 100 words in the last sub-block. One inch of start-stop space is provided between sub-blocks, as well as between blocks, with the block limits defined by the end-of-block character code.

As seen by reference to FIGS. 2 and 2A, the character 13 is used as the end-of-block character, whereas the character 12 is employed as the end-of-word character. By comparing the tape of FIG. 2 with that of FIG. 2A, it will be noted that the substantial difference between the two lies in the provision of the one inch space between sub-blocks of 100 words appearing in FIG. 2A, whereas in the tape of FIG. 2 the data on the tape is not so divided into sub-blocks but runs consecutively. The word at the end of each block is generally referred to as the end-of-block word in respect to both the computer storage tape and the input-output tape, which will be dealt with herein.

With input-output tapes having sub-blocks of 100 words, the converter is required to store complete sub-blocks of 100 words or 1800 characters. This amount of storage can be provided by four memory drawers (four cathode ray tubes per drawer). The use of at least four memory drawers is also dictated by the character repetition frequency of the tape unit.

The tape code herein employed is shown in FIG. 3. This code is basically a binary code wherein the signals are inverted. Whereas in the normal binary code a $-1-$ is represented by a signal in the $-1-$ track, for example, in the inverted binary code a $-1-$ is represented by the absence of a signal in the $-1-$ position, but by the presence of signals in the $-2-$, $-4-$ and $-8-$ positions. Therefore, when a signal is detected on the tape, it is interpreted as the absence of a significant signal. Thus, for the digit zero a significant signal is recorded in each of the four tracks of the tape, and these are interpreted respectively as "$\bar{1}$," "$\bar{2}$," "$\bar{4}$" and "$\bar{8}$." (Herein a dash over a number should be read "not." Thus, "$\bar{1}$" is read as "not 1.") The reason for the inversion of the normal binary signals lies in the fact that an active set of signals is thereby provided for every character including zero, thereby differentiating between zeros and a blank space on tape, without additional synchronizing or timing tracks.

By reference to FIG. 3 it will also be seen that the respective tracks on the tape are not arranged in numeric sequence. Thus, in the normal binary arrangement, the four numerically arranged tracks represent the values $-1-$, $-2-$, $-4-$ and $-8-$ in the order named. In the present case the $-4-$ track and the $-8-$ track have been interchanged. Thus, the "$\bar{8}$" track is one of the center tracks of the tape, whereas the "$\bar{1}$" track is at the outside. This arrangement results in the presence of a signal in one or both of the center tracks for every character used. This arrangement is used to minimize the effect of tape skew as it passes over the read-write heads by sensing character gate timing from the two center tracks of the tape only.

FIG. 4 is a diagrammatic illustration of the manner in which the machine is organized, and this figure shows the flow of information in the converter. In the tape-to-card operation let it be assumed that the tape unit 10 has started to feed tape through the read-write head therein. The first character sensed by the reading heads produces an output signal on one or more of four lines 12. These signals set one or more of four triggers which comprise a first tape register 14. Any character will produce signals on one or both of the center tracks of the tape due to the signal inversion and the special arrangement of track order. Setting of the corresponding triggers in the first tape register 14 causes a signal on a line 16 to initiate a character gate 18. The character gate is a time delay unit set to about seven microseconds, half of the time interval between characters. The end of the time delay in the character gate is used to reset the first tape register 14, which has now had sufficient time to accept the most retarded bit of the character being read from tape. Resetting of the first tape register restores it to receive the next character from the tape unit. The signals resulting from the resetting of the triggers in the first tape register, previously set by character bits read from tape, are transferred on lines 20 to set corresponding triggers in a second tape register 22. The end of the character gate time delay also initiates one bit-storage cycle in the memory units, which extends for eight microseconds. The bit storage cycle timing is represented in FIG. 5A.

Initially, the deflection controls of all sixteen memory tubes are conditioned to deflect the beams to the left spot of the upper row of each of the four tubes in the first column. This is indicated in FIG. 5, which is a diagrammatic representation of the cathode ray storage tubes 1, 2, 3 and 4 of drawer No. 1 and drawer No. 2, which respectively receive bit $-1-$ and bit $-2-$ of a character. For the first character the beams of the left column of cathode ray tubes of all four memory drawers are unblanked to write a dot.

In FIG. 4 the four triggers of the second tape register 22 are connected through tape-card switches 24 to the dot-dash control circuits 26 of the four corresponding memory drawers 28(1), 28(2), 28(4) and 28(8). The setting of any trigger effects the dot-dash controls to store a dash in the corresponding memory tube. In this manner a dash is stored in the upper left spot of the memory deck corresponding to the tape tracks in which signals were sensed for the first character.

Completion of the eight microsecond bit storage cycle steps the horizontal deflection circuits 30, so that the next character is recorded in the second spot in the top row of all four memory drawers. The action is repeated until 18 characters have been stored, after which the horizontal deflection circuits 30 return the cathode ray beams to the extreme left position. The second tube in all four memory drawers is then unblanked and 18 characters are stored in the top lines of these tubes, the $-1-$, $-2-$, $-4-$ and $-8-$ bits in the second tubes of the memory drawers 28(1) through 28(8). In a similar manner 18 characters are stored in the third column of tubes, and finally 18 more characters may be stored in the 4th column of the tubes. After the 72nd character has been stored, the vertical deflection circuits 32 step the cathode ray beams down one line, and the storage sequence is repeated, starting with the first column of tubes as before.

The tape will run until a complete sub-block of 100 characters has been stored, at which time a character counter stops the tape unit in a sub-block space. The last sub-block of a block may have less than 100 words, in which event the end-of-block 13 code will stop the tape in the tape unit.

After a sub-block of characters has been stored in memory as described above, punching of the first row of card holes will begin in the reproducing punch. The punch sets up a punch coder 34 to provide signal levels on lines 36 representing the four bit equivalent of the digit value of the row of holes being punched. A comparing circuit 38 matches the code set up by the punch coder 34 with the output from memory. The memory drawers are scanned at high speed, eight microseconds per character, in the same sequence used for reading from tape. The four memory output lines then carry signals which successively represent the character read into memory, in the same order. Characters 1 through 72 are scanned for the first card. It will be remembered that the standard IBM card has 80 columns and that the reproducing punch accepts these cards in row-by-row order, i.e. 80 columns at a time. When a match is detected between memory output and the punch coder 34, an output signal appears on a line 40, feeding a punch scanning matrix 42. This matrix is a switching circuit with 72 output lines, conditioned by the horizontal scanning controls, so that a signal on line 40 causes a signal on one of the 72 output lines corresponding to the column of memory which is being sampled. Signals on the output lines fire corresponding thyratrons 44 which are connected through the punch control panel to the punch magnets in the reproducer 46.

After the leading row of holes in the card is punched, as described above, the action is repeated for the remaining 11 rows, scanning the first 72 characters in memory only, and changing the setting of the punch coder for each row of holes to sample the corresponding digit values. The remainder of the memory is punched out in succeeding cards, 72 characters at a time, after which the tape starts to read a new sub-block of words into memory.

In FIG. 2 it will be noted that the 17th character of each word is an indicated bit count. This is the modulo 4 count of the bits recorded for the 16 remaining characters of the word. It appears as a 3's complement because of the inverted nature of the recording code. This indicated bit count is carried throughout the system as a check against erroneous transmission of data.

After a card is punched, it is read by punch brushes 48, which send signals to a checking circuit 50.

The checking circuit consists of relay storage, wherein each hole punched has its bit value of –1–, –2– or –3– set up in a relay. After the complete card is sensed, the four words punched in that card can be verified by comparing the settings of the storage relays for the characters 1 through 16 of each word against the value punched for the character 17, i.e. the indicated bit count.

For transferring information from punched cards to magnetic tape, the reading feed section of the reproducing punches is used. For a general solution, provision must be made for inserting end-of-word codes and for generating an indicated bit count for each word.

When a card is sensed in the reproducing punch, it passes through two sets of brushes, first the reproducing brushes 52, then the comparing brushes 54. It is generally desired to read from cards into memory until a complete sub-block of 100 words (25 cards) is stored, after which the tape unit starts and records the sub-block or magnetic tape. By reading from the comparing brushes 54 into memory, the earlier reading of the same card by the reproducing brushes 52 can be used to generate the indicated bit count. The reproducing brushes 52 are plugged to an indicated bit count generator 56 which may use the same relays provided for tape-to-card checking. The modulo 4 count provided for each word by the setting of the relays in the indicated bit counter generator is held until the following card cycle when the same card is sensed by the comparing brushes 54. The output of the comparing brushes, as well as the signals from the indicated bit count generator 56 enter a scanning matrix 58. This matrix is a switching circuit conditioned by the memory horizontal deflection circuits 30 to sample the 72 inputs in synchronism with the scanning of the memory unit as information is stored.

As the leading row of holes on the card is sensed by the comparing brushes 54, signals appear on a single output line 60, serially corresponding to the presence of holes in a card. These signals are fed to a read coder 62 which converts the signals on line 60 into simultaneous signals on four parallel lines 64, representing the –4– bit code for the digit being sensed on the card. In the conventional manner, lines 64 are connected through card-tape switches 66 to the memory dot-dash control circuits 26 to store dashes in the electrostatic memory corresponding in value and location to the holes sensed on the card, and to the indicated bit count generated by the indicated bit count generator 56. The first 72 positions of memory are scanned twelve times, once for each row of holes on the first card, then the process is repeated for positions 73 through 144, reading from the second card, and further repeated until 25 cards have been read into the 25 raster lines of the cathode ray tubes.

The tape unit 10 then starts and writes the complete sub-block from memory. During this operation the memory is scanned in rapid succession through all 1800 positions in sequence. The output of each memory drawer proceeds by way of lines 68 to the tape unit write control circuits. Each memory drawer controls signals on the corresponding track on the tape.

The end-of-word 12 code is not normally punched into the cards, but it may be generated by suitable relay circuits associated with the reproducing punch and inserted by way of control panel wiring. This procedure is varied at the start of a new block, when a 13 end-of-block character must be written on the tape in place of the first end-of-word character code 12.

Provision has also been made for a comparing circuit which may be set to a given block serial number. In FIG. 2 of the drawings it will be noted that the first four positions of each word block are designed to receive a block number by which the block may be identified. The provision of the comparing circuits, therefore, will permit running of tape continuously at full speed without punching until a preselected block has been reached, whereupon the tape will be stopped and normal tape-to-card conversion can then follow. Considerable time can thus be saved where an entire reel of tape information is not to be punched out.

Full blocks will not necessarily contain multiples of 100 words. Therefore, the last sub-block of a tape block may contain 1 to 100 words, and consequently the last card of the block may have as many as three unpunched word fields out of a total of 4. During tape-to-card conversion, such unpunched fields require special consideration, because the record read into memory is not large enough to write over all columns of the previous record, and unless prevented, parts of an old record might be punched into word fields of the last card which should in fact remain blank.

*Tape drive mechanism and circuits*

Each tape unit includes a tape feeding mechanism capable of feeding magnetic tape through a reading and recording head at high speed, with an acceleration and deceleration time of not more than five milliseconds, and with the ability to reverse direction of tape feed in ten milliseconds or less.

Such a menchanism is disclosed in the aforesaid continuation application of James Weidenhammer et al., Serial No. 535,052, filed September 19, 1955, and includes a tape feeding mechanism having a pair of tape reels which may be independently rotated for either reeling or unreeling tape thereon. It is contemplated that each tape reel be power driven through a clutch mechanism which is adapted to selectively drive the reel in either direction.

The clutch mechanisms of said application are controlled in accordance with positions assumed by a loop in the tape, and the control system is so designed as to maintain these loops substantially constant in length. These loops provide a tape source upon which a tape feeding mechanism may call as a source of tape to be fed through a record reading or recording head in either direction.

The mechanism for feeding the tape through the record reading and recording head is also power driven, but is independent of the power drive for the tape reels. The tape may be reeled or unreeled and fed through a record reading or reproducing head at high speed and without substantial torque or tension on the tape.

Figure 6:
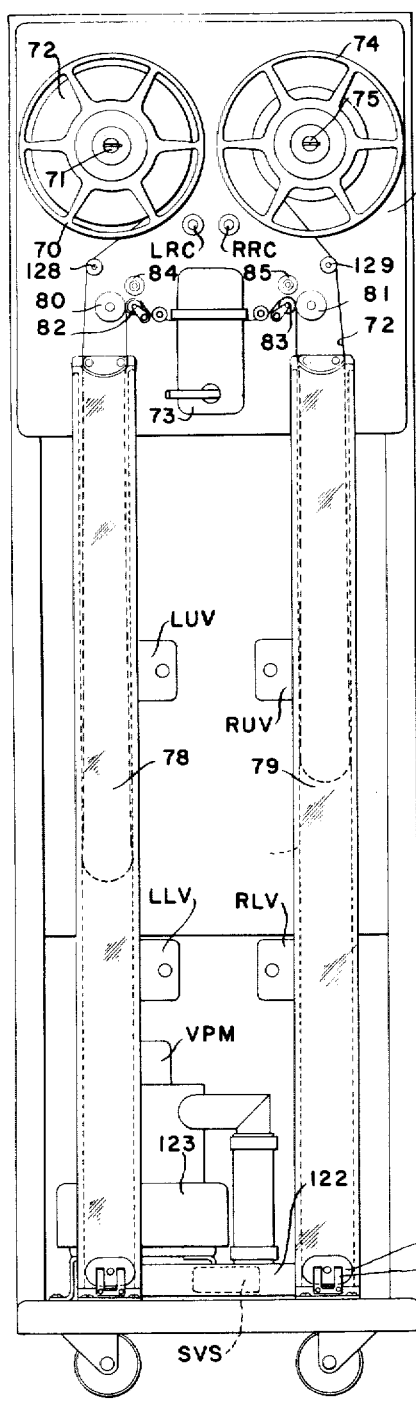
FIG. 6 is a front elevational view of the tape feeding mechanism utilized in the system.
Figure 7:
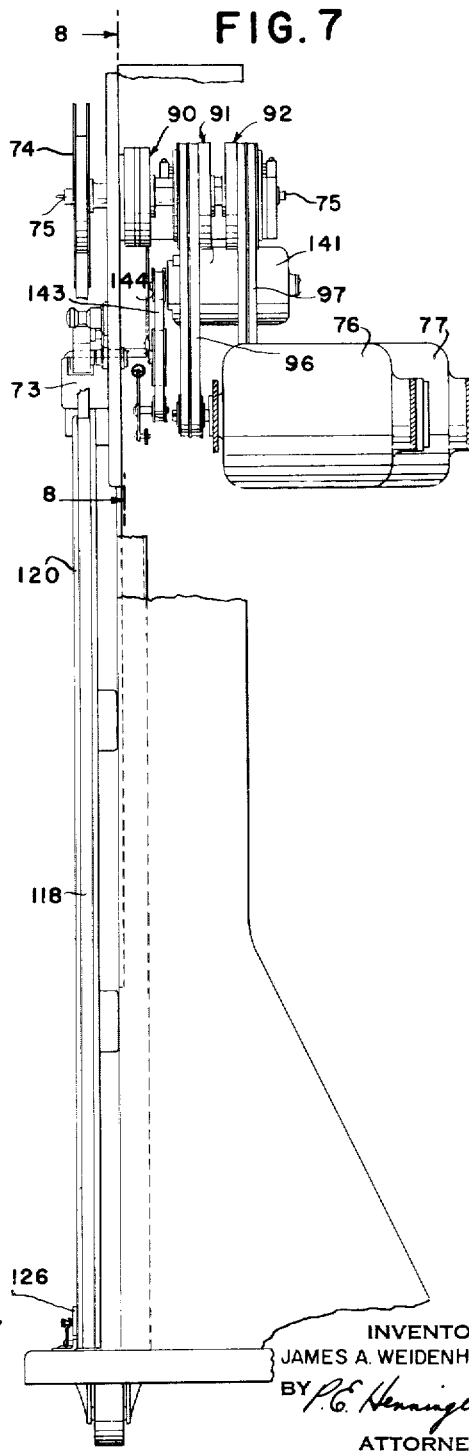
FIG. 7 is a side elevational view of the tape feeding mechanism with the upper portion of the outer casing broken away to show the location of underlying mechanism.

A general understanding of the tape drive and its function may be attained by reference to FIGS. 6 and 7 of the drawings. In these figures are shown a pair of tape reels which are adapted to hold a coil of record tape, these reels being intermittently driven and controlled in such manner as to provide a pair of tape loops as a source of tape to be fed through the tape sensing head. A tape reel 70 (FIG. 6), which may be designated as a file reel, is mounted on a drive spindle 71. As shown, the reel 70 contains a coil of tape 72 on which data has been recorded. The tape is to be fed from this reel to form a U-shaped loop, as shown in FIG. 6, and thence through a tape reading and recording head 73. In its forward feed direction, the tape will pass through the tape reading head 73 from left to right and after forming another U-shaped loop it will be coiled on a second reel 74, which may be designated herein as a machine reel. The machine reel 74 is mounted on a drive spindle 75.

The file reel drive spindle 71 and the machine reel drive spindle 75 are selectively rotated in either direction by a pair of motors 76 and 77. The motors 76 and 77 normally impart constant drive to a pair of electromagnetic clutch mechanisms mounted respectively on the drive spindles 71 and 75. An electromagnetic brake is mounted on each of the drive spindles so that the spindles 71 and 75 may be locked against rotation. The nature of the electromagnetic clutches and the electromagnetic brake will be developed in greater detail later.

Upon selective clutching of the electromagnetic clutch mechanisms in drive relation to the drive spindles 71 and 75, these spindles and, consequently, the tape reels attached thereto may be caused to reel or unreel tape from the respective coils thereon.

Since the mechanism is designed for high speed feed of tape through the tape head 73, it is important that a supply of tape be provided with little load or tension thereon, and to this end the driving mechanism for the reels 70 and 74 provides a pair of tape loops disposed in a pair of tape control columns 78 and 79. Each of the columns 78 and 79 is provided with means responsive to the length of the respective tape loops for maintaining an optimum length of tape within the columns. The loop sensitive means within the columns 78 and 79 control the reel drive mechanism in such manner that the loops, so to speak, are self-compensating. The tape reel drive mechanism for each reel is not only independently operative, as will be seen by the description below, but also both reels are driven independently of the tape drive mechanism which feeds the tape through the tape head 73.

Tape, from the loop supply in columns 78 and 79, is driven through the tape head 73 by means of a pair of rotating drive capstans. In FIG. 6 a tape drive capstant 80 may be deemed to be constantly rotated in a clockwise direction so that the tape, when in contact therewith, is fed from right to left through the tape head. This may be designated as the reverse or backward drive, and and capstan 81 as the forward drive capstan.

ing capstan 81 may be deemed to be constantly driven in a counterclockwise direction so that the tape, when in contact therewith, is fed from left to right through the head, and this may be designated as the forward drive, and capstan 81 as the forward drive capstan.

In connection with the drive capstans 80 and 81, there are provided idler pulleys 82 and 83, respectively. When pulley 82, when actuated in one direction, moves a tape, trained thereabout as shown in FIG. 6, into driving contact with the reverse drive capstan 80, while the pulley 83, when actuated in the opposite direction, moves the tape into driving contact with the forward drive capstan 81. As will be pointed out more fully later, these idler pulleys 82 and 83 are mounted on a common linkage system which imparts the proper related movement to the pulleys for selectively driving a tape either forward or in reverse through the tape head 73.

A non-rotary stop capstan 84 is associated with idler pulley 82, so that this pulley may be moved into contact therewith to hold the tape stationary and, in like manner, idler pulley 83 has associated therewith a stop capstan 85.

The operation of the mechanism for driving the tape reels 70 and 74 may now be described in connection with FIGS. 8, 9 and 10. The file reel drive spindle 71 and the machine reel drive spindle 75 are mounted for rotation in a frame member 86 (FIG. 9). The spindle 71 has mounted thereon a file reel brake 87 (FIG. 9), an electromagnetic unreeling clutch 88 and an electromagnetic reeling clutch 89.

The machine reel spindle 75 has mounted thereon an electromagnetic machine reel brake 90, an electromagnetic reeling clutch 91 and an electromagnetic unreeling clutch 92.

Figure 8:
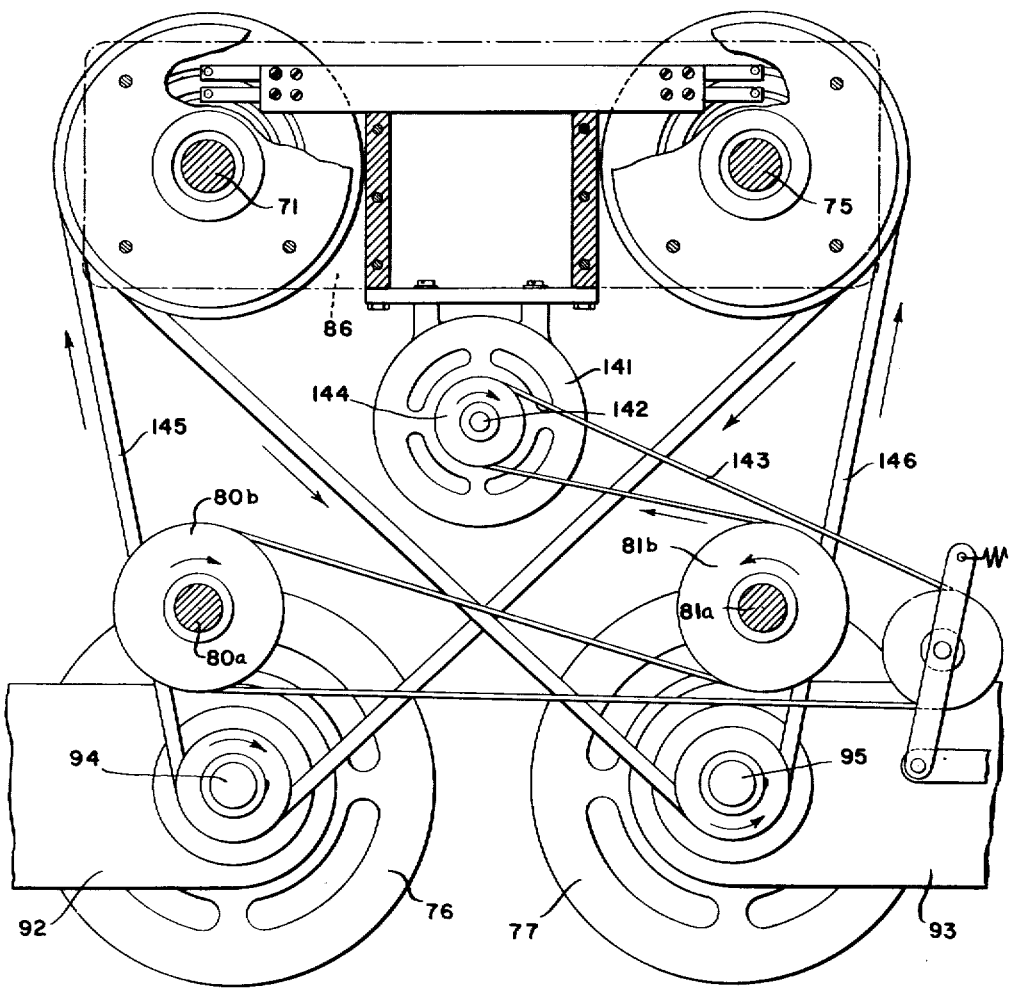
FIG. 8 is a view on line 8—8 of FIG. 7 illustrating the tape driving mechanism and certain adjuncts thereto.
Figure 9:
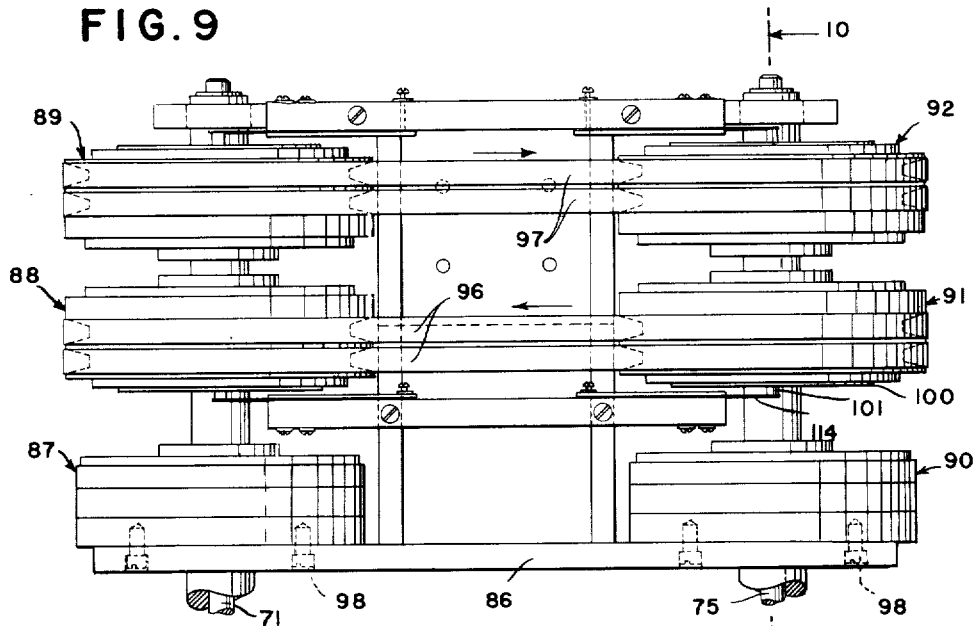
FIG. 9 is a plan view of the tape reel drive mechanism comprising electrostatic clutches and brakes.

The drive rings of the clutch elements 88, 89, 91 and 92 are continuously rotated under the influence of the drive motors 76 and 77 (FIG. 8). By reference to this figure it will be seen that the drive motors 76 and 77 are mounted on supporting structures 93 and 93a, respectively, in such position that the motor shafts 94 and 95 respectively extend forwardly into substantially vertical alignment with their related magnetic clutch structures.

By reference to FIG. 9 of the drawings, it will be seen that the first pair of clutches 88 and 91 are in substantial, transverse alignment on their respective shafts and that the second pair of clutches 89 and 92 are also substantially aligned. The clutches 88 and 91 are driven counterclockwise by the motor 77 through a drive belt 96, while the clutches 89 and 92 are driven clockwise by the motor 76 through a drive belt 97, the motor shaft 94 having a normal clockwise rotation and the motor shaft 95 having a normal counterclockwise rotation.

By reference to FIG. 6, it may be seen that the file reel 70 will reel tape thereon when driven counterclockwise, while the machine reel 74 will reel tape thereon when driven clockwise. In light of this arrangement, the clutch 89 (FIG. 9) operates as a reeling clutch for the file reel 70, while the clutch 92 operates as an unreeling clutch for the machine reel 74. By the same token, the clutch 88 operates as an unreeling clutch for the file reel 70, while the clutch 91 operates as a reeling clutch for the machine reel 74.

The file reel brake 87 and the machine reel brake 90 have their respective outer shells fixed to the frame member 86 by means of machine screws 98, thereby providing an anchor for these shells when either brake is energized to lock its respective shaft against rotation.

Figure 10:
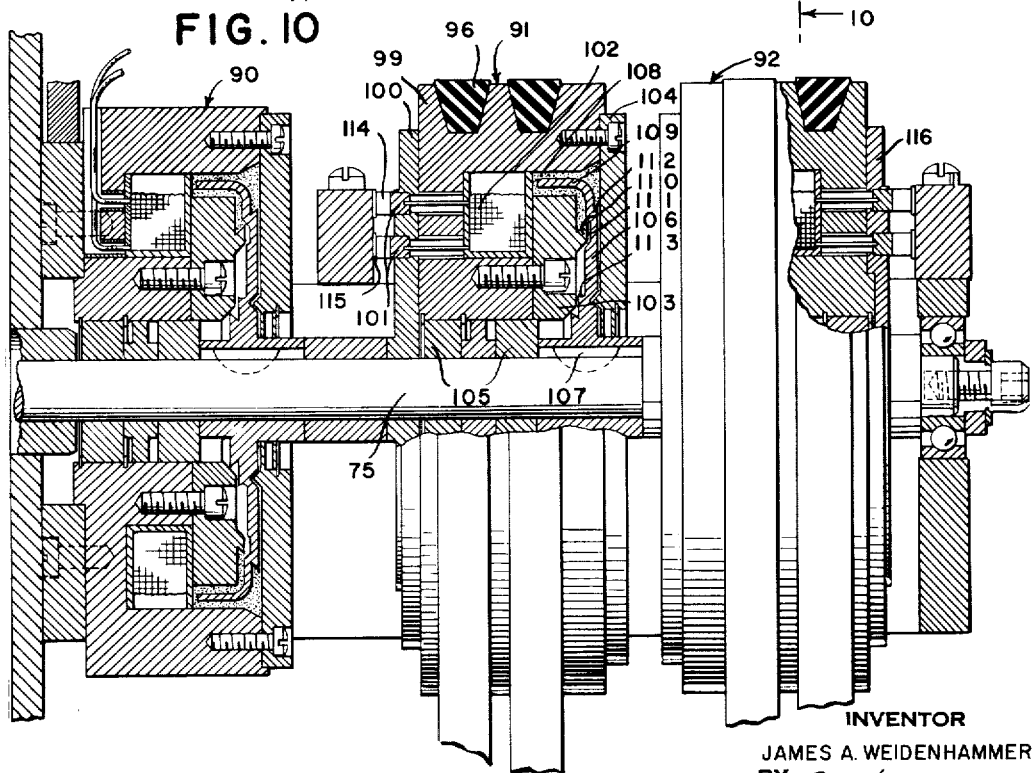
FIG. 10 is a view on line 10—10 of FIG. 9 showing parts in cross-section and other parts in full line.

FIG. 10 of the drawings illustrates the specific nature of the brake and clutch units. These units are identical and a description of one will, therefore, suffice as a description of all. The driving member 99 is mounted for free rotation on the shaft 75. The driving member includes an end plate 100 in which is mounted a pair of commutator rings 101 which provide a current path for an electromagnetic coil 102 mounted within an annular recess in the driving member 99 and held therein by an annular plate 103. The opposite face of the driving member has fixed thereto a closure plate 104. Suitable hub rings 105 support the driving member for rotation on the shaft 75.

A driven member 106 mounted within the driving member 99 is spaced from and disposed between the annular plate 103 of the driving member and its closure plate 104. This driven member 106 is keyed to the shaft 75 by means of a suitable keying structure 107.

It will now be apparent that the shaft 75 will be driven when the driving member 99 and the driven member 106 are caused to rotate in unison. The drive coupling between the two members is achieved through the use of iron powder 108 disposed between the members. The circumference of the annular plate 103 is such that its periphery is spaced from the inner wall of the recess formed in the driving member 99. This forms an annular channel adapted to receive an inturned flange 109 of the driven member 106. The inturned flange 109 is so positioned as to provide a substantially equal space on opposite faces thereof with reference to the oppositely disposed walls of the annular channel. The iron powder 108 is in an amount to substantially fill the remaining space of the channel. When a current is applied to the coil 102, it will cause the iron powder to "freeze" and thereby clutch the inturned flange 109 of the driven member 106 to the driving member 99 whenever the coil is energized to thus magnetize the powder.

Centrifugal force, acting on the iron powder, ordinarily maintains the powder adjacent the inside of the inturned end 109 of the driven member 106 but, to avoid the possibility of leakage of the powder into the bearing structure of that assembly, the annular plate 103 is provided with an annular rib 110 which extends into an annular groove 111 on the inner face of the driven member 106. The anular rib 110 is outwardly slanted to provide a trough for powder that may find its way inwardly along the clutch structure. Ribs 112 and 113 are formed on the face of the driven member 106 for preventing passage of powder inwardly along the face thereof.

The commutator rings 101 are in contact with a brush 114 carried on the end of a resilient contact strip 115 which is connected into the control circuit by means of suitable terminal screws.

The clutches at the rear end of the spindles 71 and 75 are of the same construction as just described and their mounting on their respective shafts is the same except that they are reversed so that the end plate 116 is oppositely disposed to place the commutator rings in a more accessible position.

The brake assemblies 87 and 90 are also constructed exactly like the clutch assembly, just described, and the manner of mounting these on their respective shafts is also the same with the exception that the casing is held stationary in the brake assemblies.

It will now be clear that the energization of the coils in the several clutch assemblies will result in the corresponding forward or reverse drive of the respective spindles 71 and 75. By the same token, these spindles will be held against rotation whenever the coil in the brake assembly associated therewith is energized. Since the casings of the brakes 87 and 90 are fixed, the leads for energizing the electromagnetic coils therein may be taken through the end wall of the brake assemblies. As will be seen later, the control circuit is such that drive, through either of the clutches on a drive spindle, will take place only upon deenergization of the associated brake assembly coil, and that the coil in the brake assembly will be energized to hold its associated spindle against rotation when neither of the clutch coils is energized.

Figures 11, 12:
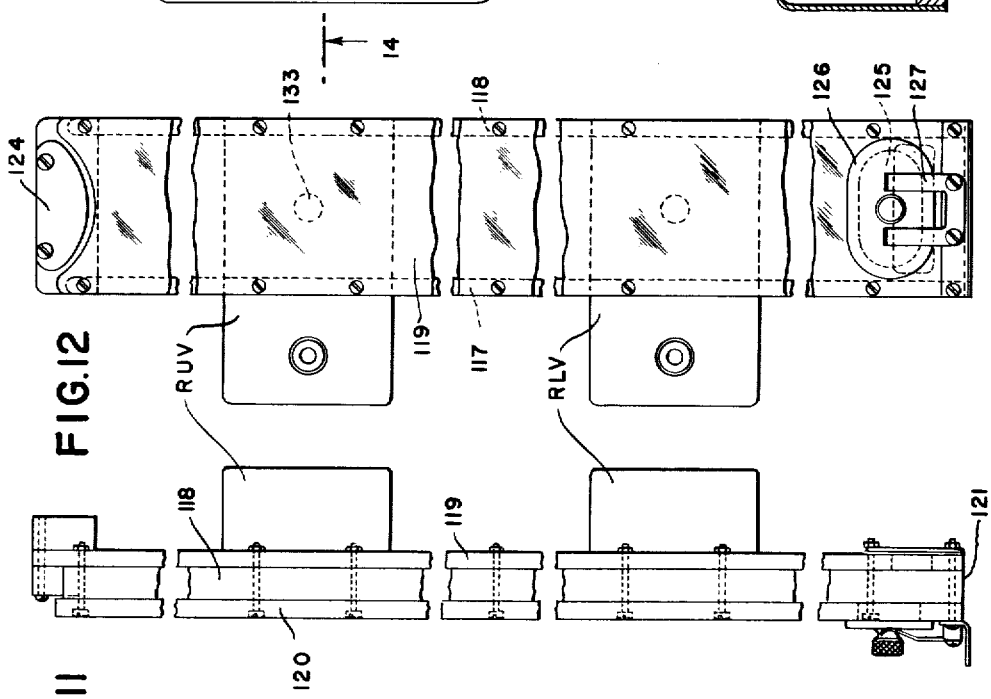
FIG. 11 is a side elevational view of a vacuum column provided for tape loop control.
FIG. 12 is a front elevational view of the vacuum column of FIG. 11.

As stated above, the position of the tape loops in control columns 78 and 79 is utilized to control the rotary movement of the tape reels. For this purpose, there is illustrated a vacuum switch control system. The control columns 78 and 79 are of the same construction, and their detailed construction is seen in FIGS. 11 and 12 which illustrate that control column indicated as 79 in FIG. 6. Column 78 of FIG. 6 is identical in construction. The column 79 (FIGS. 11 and 12) comprises a pair of side walls 117 and 118, a back panel 119, a transparent face panel 120 and a bottom wall 121, all hermetically sealed together.

At the base of the two columns 78 and 79 is a header 122 (FIG. 6) with which the columns communicate. The header 122 is connected with a vacuum pump 123 adapted to be driven by a suitable vacuum pump motor VPM, so that the control columns 78 and 79 may be evacuated, provided the columns are closed against the atmosphere by the position of the tape loop, as described below.

At the upper end of each control column is a guide plate 124 (FIG. 12) whose arcuate lower face is slightly spaced from a corresponding arcuate upper edge of the transparent face panel 120. The lateral extremities of plate 124, as shown in FIG. 12, serve to support the opposite bights of a tape loop within the control column, while the arcuate slot formed between the lower arcuate face of the guide plate and the upper edge of the face panel constitutes a guide through which a tape loop may be threaded for insertion into a control column. The face plate 120 has formed, at the bottom thereof, a hand opening 125 (FIG. 12) normally closed by an air-tight closure 126, held in position by a spring clip 127. This hand opening constitutes a clean-out passage.

The width of the side walls 117—118 within the vacuum columns 78 and 79 is substantially equal to the width of the tape 72 (FIG. 6). When a tape loop is formed, therefore, in either of the vacuum columns 78 or 79, the oppositely disposed marginal edges of the loop will, respectively, be in substantial contact with the base plate 119 and the face plate 120 of the respective vacuum columns. The back of the tape in the tape loop is spaced from the side walls of the vacuum columns throughout substantially the entire length of the loop, but, as described presently, the closed end of the U-shaped loops are in substantial contact with the side walls. The structure of the tape guide 124 ensures this disposition of the tape, as will be apparent from the description which follows.

As the tape comes from the file reel 70, it passes over a guide idler 128 (FIG. 6). As the tape is fed to and from the machine reel 74, it passes over a guide idler 129. The horizontal distance between the outer periphery of the guide idler 128 and the drive capstan 80 is somewhat less than the spacing of the inner faces of the column side walls 117—118. The same is true of the horizontal spacing of the guide idler 129 and the drive capstan 81 at the right of the structure.

The particular horizontal spacing of the guide idlers and their associated drive capstans assures that the inner face of the tape is in contact with the oppositely disposed ends of the guide plate 124 located at the top of the vacuum columns 78 and 79. These guide plates, therefore, determine the spacing of the tape bights at the entrance to the columns. Since the distance between the ends of the guide plate 124 is somewhat less than the internal width of the vacuum columns, the back of the tape will be spaced slightly from the column side walls through the major portion of the tape loops, the loops, however, widening out at the closed or lower end of the U-shaped loops to thus contact the side walls of the columns, thereby forming an air seal between the lower portion of the tape loop and the column walls.

Figure 13:
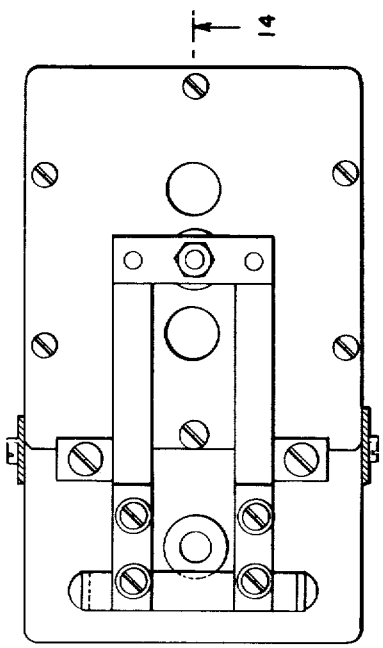
FIG. 13 is a plan view of a vacuum operated switch used in connection with the vacuum columns of FIGS. 11 and 12.
Figure 14:
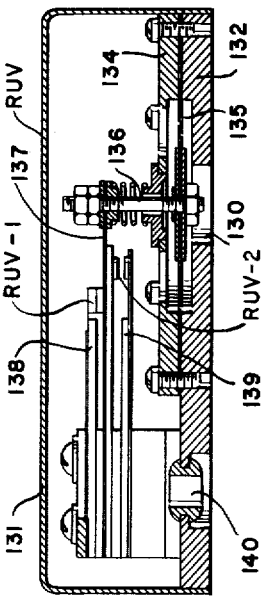
FIG. 14 is a cross-sectional view on line 14—14 of FIG. 13.

Spaced along the length of each of the control columns 78 and 79 are two vacuum operated switches RUV and RLV, for example, the details of which are shown in FIGS. 13 and 14. In FIG. 6 the vacuum switch LUV is the left upper vacuum switch, while the switch LLV is the left lower vacuum switch in column 78. In similar fashion the control column 79 has a right upper vacuum switch RUV and a right lower vacuum switch RLV.

The vacuum switches have a normally closed contact point and a normally open contact point. The switches communicate with the interior of their respective control columns through an aperture in the back plate 130 thereof. By reference to FIG. 14 it is seen that the switch structure is encased in a shell 131 which fits tightly against a base plate 132, the base plate being attached to the back panel 119 of the control column so that an aperture 133 of the back panel (FIG. 12) registers with the passage 130 (FIG. 14) in the base 132 of the switch structure. Within a cavity formed between this base plate 132 and an overlying block 134 is a pressure responsive diaphragm 135 to which a contact operating shaft 136 is attached, this connection between the diaphragm and the shaft 136 being air-tight. Adjustably secured to the opposite end of the contact operating shaft 136 is a spring contact finger 137 having contact points thereon adapted to contact corresponding points on fixed contact fingers 138 and 139. Downward deflection of the diaphragm 135 (FIG. 14), under the influence of atmospheric pressure, when its associated control column is evacuated will cause the point RUV-2 on the contact fingers 137 and 139 to engage.

For the sake of uniformity herein, it may be assumed that the contact carried on the finger 138 is a normally closed contact while the contact on the finger 139 is a normally open contact. Furthermore, the contact on the arm 138 in FIG. 14 may be designated as the RUV-1 contact, whereas the contact on the arm 139 may be designated as the RUV-2 contact. A similar system of numbering will be applied to the other vacuum switches.

Under the foregoing conditions, any time that the diaphragm 135 is subject (on its under side in FIG. 14) to vacuum within the vacuum columns, atmospheric pressure on the opposite side of the diaphragm will cause transfer of the switch points, i.e. the points RUV-1 of FIG. 14, for example, will open, while the points RUV-2 will close.

Electrical connections with the switch blades are made by wires (not shown) leading through a bushing 140 at one end of the base plate 132.

During normal operation of the machine, the tape loops in columns 78 and 79 will be disposed between the vacuum switches RUV and RLV in the right hand column (FIG. 6) and between the switches LUV and LLV of the left hand column. Under this condition, the switches LUV and RUV only are subject to atmospheric pressure, whereas switches LLV and RLV are influenced by the vacuum in the columns 78 and 79, the lower or closed end of the U-shaped tape loops touching the side walls, as described above, and thus constituting at contact with the column side walls, an air seal above the switches LLV and RLV.

The device is so desgined that the closed end of the U-shaped tape loops in the control columns 78 and 79 are maintained between the respective upper and lower vacuum switches. To this end the vacuum switch LUV is in the control circuit of the magnetic coil in the unreeling clutch 88 of reel 70 so that, as viewed in FIG. 6, when the switch LUV is subjected to vacuum tape will be fed from reel 70 to the vacuum column 78, while the vacuum switch LLV is in the control circuit for the magnetic coil of the reeling clutch 89 of reel 70, so that when the vacuum switch LLV is subjected to atmosphere, as described below, tape will be reeled out of vacuum column 78. In like manner the vacuum switch RUV is in the control circuit of the unreeling clutch 92 of reel 74, while the vacuum switch RLV is in the control circuit for its reeling clutch 91.

Should either tape loop drop below its lower vacuum switch, such switch will be subject to atmospheric pressure on both sides of its diaphragm 135 (FIG. 14) causing the contact points thereof to transfer. Consequently, under such conditions, the switch LLV will call into action the reeling clutch 89 of the file reel 72, while the switch RLV will call into operation the reeling clutch 91 of the machine reel 74.

Such tape loops will be taken up by the reeling action of the respective reels, or either thereof, until the closed end of the U-shaped loop is above the lower control column switch, whereupon the switch will again transfer its contact points under influence of vacuum within the column and the reeling operation will cease.

In like fashion, the upper vacuum switches LUV and RUV, which are subjected to atmospheric pressure on both sides during the desired operation of the machine, will transfer their contact points when the closed end of the U-shaped tape loop rises above these switches so that the upper switch is subjected to the vacuum within its respective control column. The low pressure on the bottom side of the diaphragm 135 (FIG. 14) will thereupon permit atmospheric pressure on the upper side to transfer the contact points of the upper switch structure. Upon such transfer the switch LUV will serve to energize the coil in the unreeling clutch 88, and the switch RUV will call into action the unreeling clutch 92, whereby the file reel 70 and machine reel 74, respectively, or either one of them, will be rotated to unreel tape therefrom and thereby lengthen the loop in the control columns 78 and 79, respectively, until the closed end of the U-shaped loop once more drops below the upper switches LUV and RUV.

From the foregoing it will be seen that the operation of the tape reels 72 and 74 is in effect a self-compensating operation whereby the tape loops in the control columns 78 and 79 are maintained in an optimum position. Furthermore, it is apparent that the controls for the reels 72 and 74 are independently actuated.

The second contact point of each vacuum switch is used to provide a circuit for their respective brake coils. When the control circuit is described below, it will become clear that a circuit is established through closed points of switches LUV and LLV to energize the coil of the file reel brake 87 and that a circuit is provided through closed points of switches RUV and RLV to energize the coil in the machine reel brake 90. It is intended that the brake coils be energized whenever the reeling and unreeling clutches are deenergized.

Figure 15:
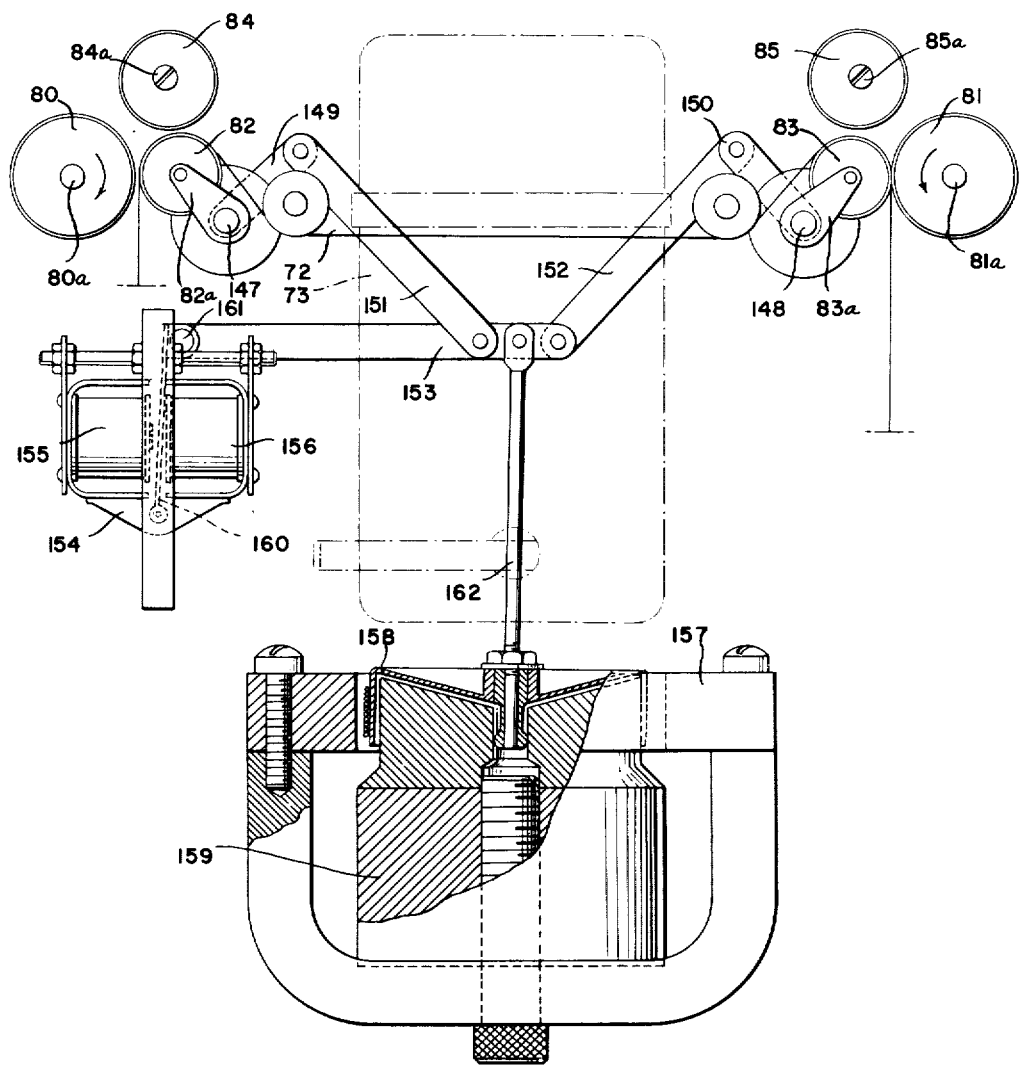
FIG. 15 illustrates the tape drive mechanism and the means for biasing the mechanism into tape driving position, the view showing the parts biased into position for driving the tape in a forward direction.
Figure 16:
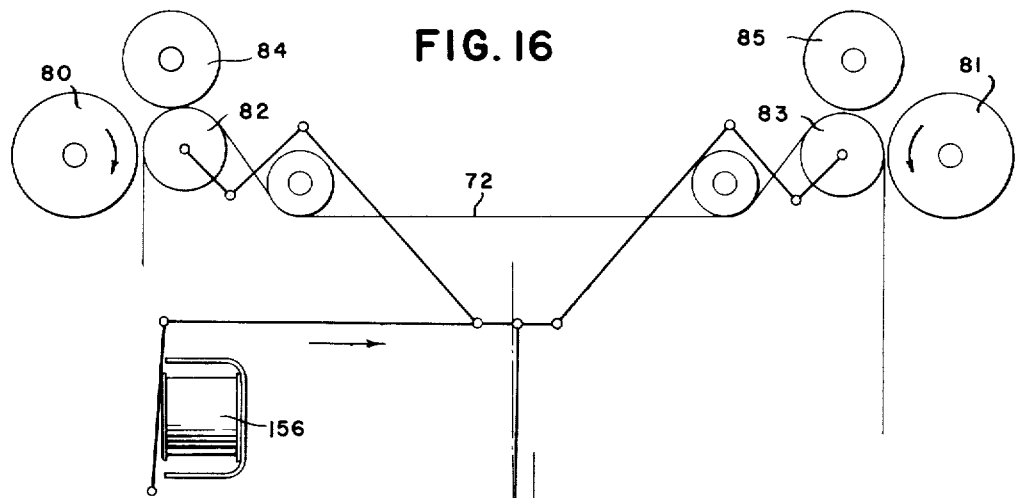
FIG. 16 is a diagrammatic view of the mechanism shown in FIG. 15 with the parts thereof biased into position to stop tape movement following feed of tape in a forward direction.
Figure 17:
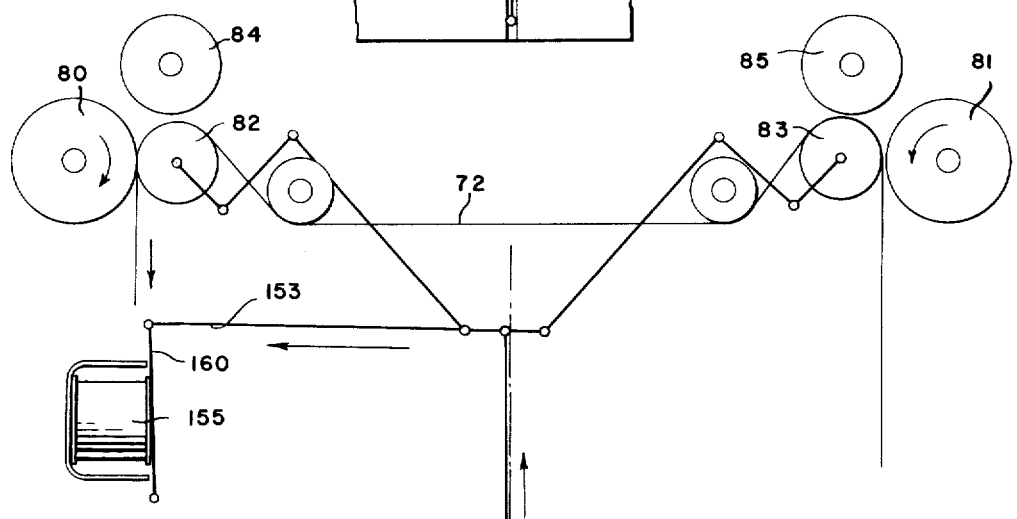
FIG. 17 is a diagrammatic view such as that in FIG. 16 and shows the mechanism biased into position to effect reverse feed of the tape.
Figure 18:
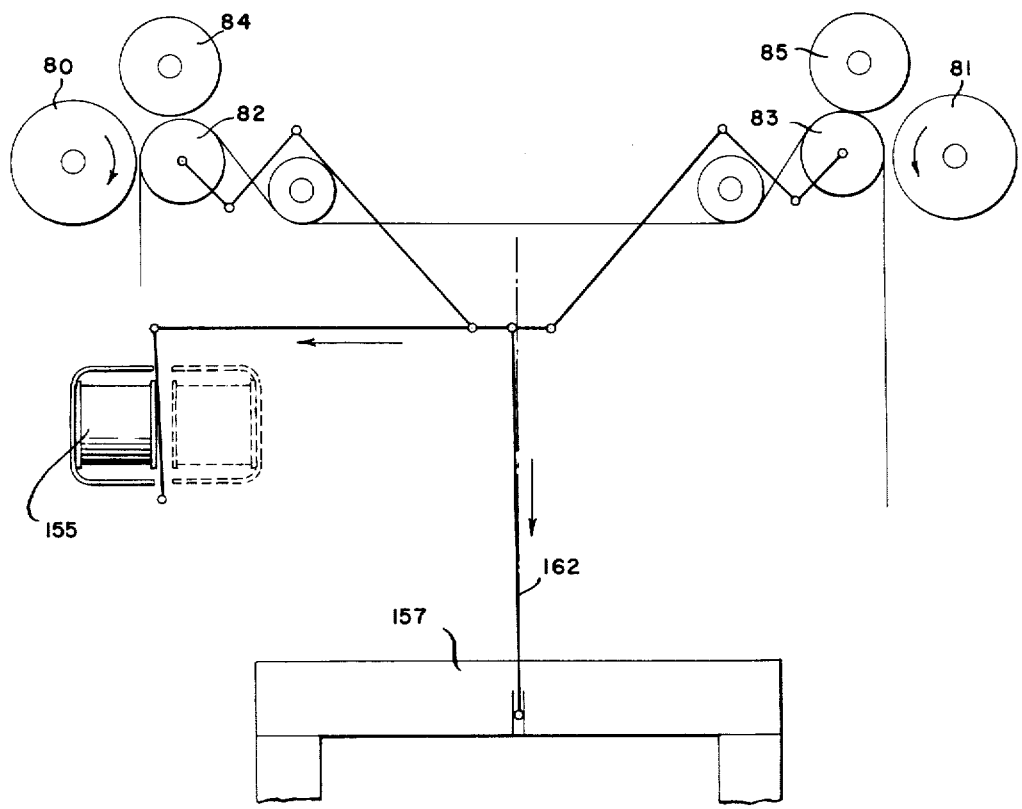
FIG. 18 is a diagrammatic view such as those in FIGS. 16 and 17, with the parts biased into position to halt tape feed following reverse feed of the tape.

The mechanism for driving the tape through the tape head 73 (FIG. 6) in a forward direction is shown in FIG. 15 of the drawings, while FIGS. 16 through 18 illustrate, diagrammatically only, the other drive and stop positions.

The drive capstan 80 (FIGS. 6 and 15) is constantly driven in a counterclockwise direction by means of a motor 141 (FIG. 8) whose shaft 142 rotates in a counterclockwise direction, and the drive capstan 81 (FIGS. 6 and 15) is constantly driven in a clockwise direction. The drive capstans 80 and 81 are journalled for rotation in the face panel 142 (FIG. 6) of the machine, and their respective shafts 80a and 81a (FIG. 8) extend to the rear of the panel 142 where they have affixed thereto belt pulleys 80b and 81b, respectively. A drive belt 143 is trained about the pulleys 80b and 81b and about a motor shaft pulley 144 of motor 141 so that upon clockwise rotation of the motor shaft 142 the capstan shaft 80a will also be rotated in a clockwise direction and the capstan shaft 81b will be driven in a counterclockwise direction.

By reference to FIG. 15 of the drawings it will be seen that the tape idler pulleys 82 and 83 are mounted for rotation at the free end of levers 82a and 83a, respectively. The inner ends of the levers 82a and 83a are fixed to pivot shafts 147 and 148, respectively, journalled for rocking movement in the face panel 142, and each of these shafts has attached thereto a short, upwardly extending link 149 and 150, respectively. The upper ends of the links 149 and 150 have pivoted thereto levers 151 and 152, respectively, which have their opposite ends pivoted to a common operating lever 153.

Under control of the foregoing structure the tape idler pulleys 82 and 83 may be engaged selectively with their related drive capstan or their stop capstan. Thus, the tape idler pulley 82 may be brought into contact with the reverse drive capstan 80 or with the forward stop capstan 84. The tape idler pulley 83 may be engaged selectively with the forward drive capstan 81 or with the reverse stop capstan 85. The stop capstans 84 and 85 are eccentrically mounted in the face panel 142 by means of screws 84a and 85a (FIG. 15) about which the capstans may be adjusted to vary their braking effect.

In order to impart controlled movement to the tape idler pulleys 82 and 83, there has been provided herein a forward-reverse actuator 154, comprising a pair of aligned, high speed relay magnets 155 and 156 (FIG. 15) and a stop or drive actuator 157 which consists of a coil 158 in a field of high flux density caused by a permanent magnet 159.

The high speed relay coils 155 and 156 are mounted on a supporting yoke in axial relation to each other and with the provision of a space between the magnets to accommodate a pivoted armature 160 to the free end of which the operating lever 153 is attached by means of a pivot stud 161.

The coil 158 of the stop-drive actuator has affixed thereto a rod 162 which is connected to the operating lever 153 midway between the connections of the levers 151 and 152.

When the relay coil 156 is energized, the armature 160 will be attracted thereto and the operating lever 153 will be biased to the right in FIG. 15. This elevates the tape idler 82 a half-gap width above the tape idler 83. When the stop-drive actuator 157 is energized to repel the coil 158 thereof, an upward thrust will be delivered to the rod 162. This will further move the drive linkage to force the tape idler pulleys downwardly and outwardly until the tape idler pulley 83 is engaged with the forward drive capstan 81. This will cause the tape 72 to be driven downwardly into the control column 79 (FIG. 6)

and will also pull the tape through the head 73 from left to right.

The foregoing describes one of four stable positions into which the tape idler pulleys may be biased. The three other positions are illustrated in FIG. 16, 17 and 18.

FIG. 16 shows the position of the tape idler pulleys for stopping tape feed, following forward feed of the tape. At this point it may be appropriate to mention that the tape is always pulled through the tape head 73 from one side thereof and is stopped by braking the tape at a position on the other side thereof. This will insure sufficient tape tension at the tape head 73 at all times.

Reverting to FIG. 16, it will be seen that the tape 72, after being driven forward, as described above, is stopped by engaging the tape between the forward stop capstan 84 and the tape idler pulley 82. To achieve this function, the coil 156 must remain energized, but the flow of current through the stop drive actuator 157 is reversed whereby the coil 158 (FIG. 15) is attracted to the permanent magnet 159. This results in a downward pull on the rod 162. Such pull on the linkage system will tend to raise both tape idler pulleys 82 and 83, but since the tape idler pulley 82, in the forward drive position, was higher than the pulley 83, the idler pulley 82 engages the forward stop capstan 84 to brake tape movement. Engagement between the tape idler pulley 82 and its forward stop capstan 84 results from the upward bias given to the tape idler pulley 82 under the influence of the magnet 156.

In FIG. 17 the tape 72 is shown as moving in a reverse direction (i.e. in a backward feed direction) from that in FIG. 16, as indicated by the arrow. To bias the tape idler pulley 82 into contact with the reverse drive capstan 80 to produce this movement, it is necessary to energize the coil 155. This attracts the armature 160 and pulls the operating lever 153 to the left. This will serve to drive the tape idler pulley 82 one-half gap below the idler pulley 83 and condition the tape idler pulley 82 for engagement with the reverse drive capstan 80 when the moving coil 158 is energized to cause an upward movement of the rod 162. Such movement will serve to project the tape idler pulley 82 into engagement with the reverse drive capstan 80, whereby the tape 72 is driven in a reverse direction, i.e. from right to left through the head 73 in FIG. 15.

The reverse stop position of the tape drive mechanism is shown in FIG. 18, wherein the tape idler pulley 83 is brought into engagement with the reverse stop capstan 85. To achieve this engagement, the coil 155 must remain energized but the current in the moving coil 158 is reversed, whereby the coil is pulled downwardly so that the rod 162 exerts a downward pull on the operating lever 153 with a consequent upward movement of the tape moving idler pulley 83 into contact with the reverse stop capstan 85.

Figure 19:
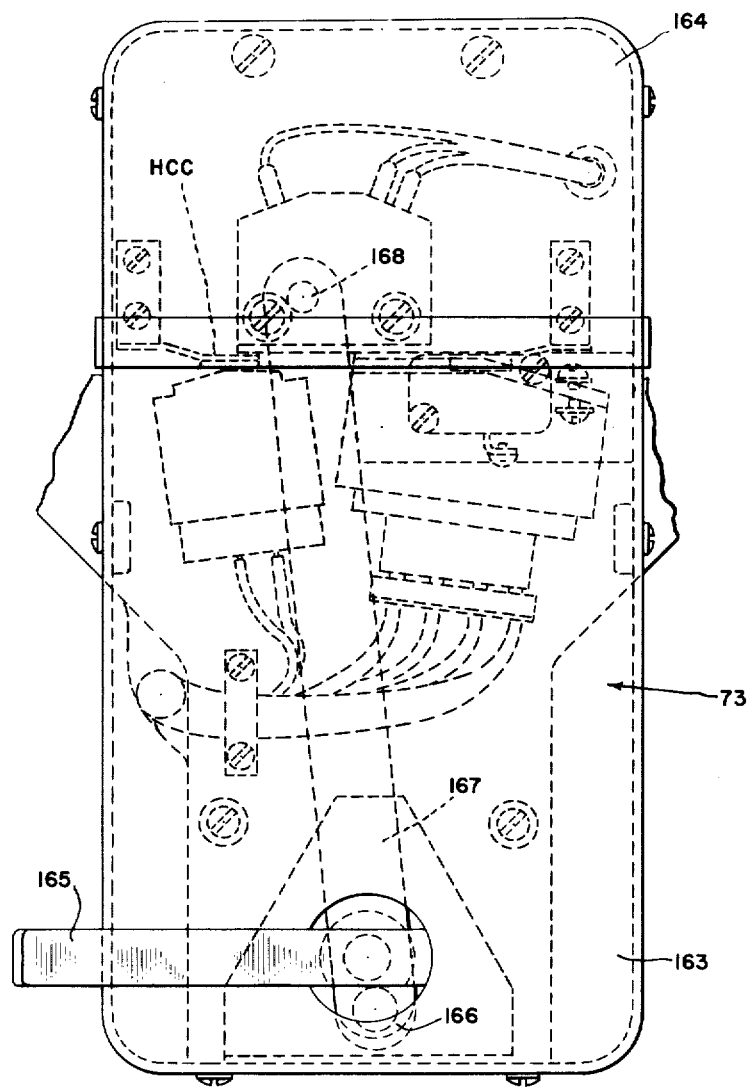
FIG. 19 is a front elevational view of a tape reading and writing head casing with certain underlying mechanism including a tape read-write head, an erase head, a head cover switch, a photocell assembly and a head cover operating mechanism shown in dotted line.

FIG. 19 is an elevational view of the read-write head showing in dotted lines certain underlying structure to which reference will be made. In FIG. 19 the read-write head mechanism is mounted in a two-part casing consisting of a fixed base portion 163 and a cover portion 164. The cover 164 is mounted in the face plate 142 of the tape unit (FIG. 6) for sliding movement in a vertical direction, so that it may be opened and closed by manipulation of a cover operating handle 165. The operating handle has a shaft extending through the face plate 142. The inner end of the shaft carries an eccentric 166 with which is connected a head cover operating rod 167. The operating rod 167 is attached to a stud 168 which extends rearwardly from the head cover 164 into an accessible position behind the face panel 142.

Thus, when the operating handle 165 is rotated in a counterclockwise direction as viewed in FIG. 19, the connection between the eccentric 166 and the operating rod 167 will project the rod 167 upwardly, so that the head cover 164 is raised in relation to the base 163. The opening of the head cover 164 facilitates the threading of the tape through the read-write head, and also avoids unnecessary frictional contact with the tape when the tape is being run through the head without reading from or writing thereon.

As shown in FIG. 19 the head cover 164 carries therein and end-of-tape photocell-light combination, while the base 163 is adapted to contain the four read-write heads and the erase head. Furthermore, the head cover 164 carries a spring contact HCC of the head cover switch which is adapted to rest against a contact in the base 164 when the head cover is closed. Closure of the head cover contact, as will appear later, is one of the requisites for operation of the machine.

*Tape drive circuits*

Figure 20:
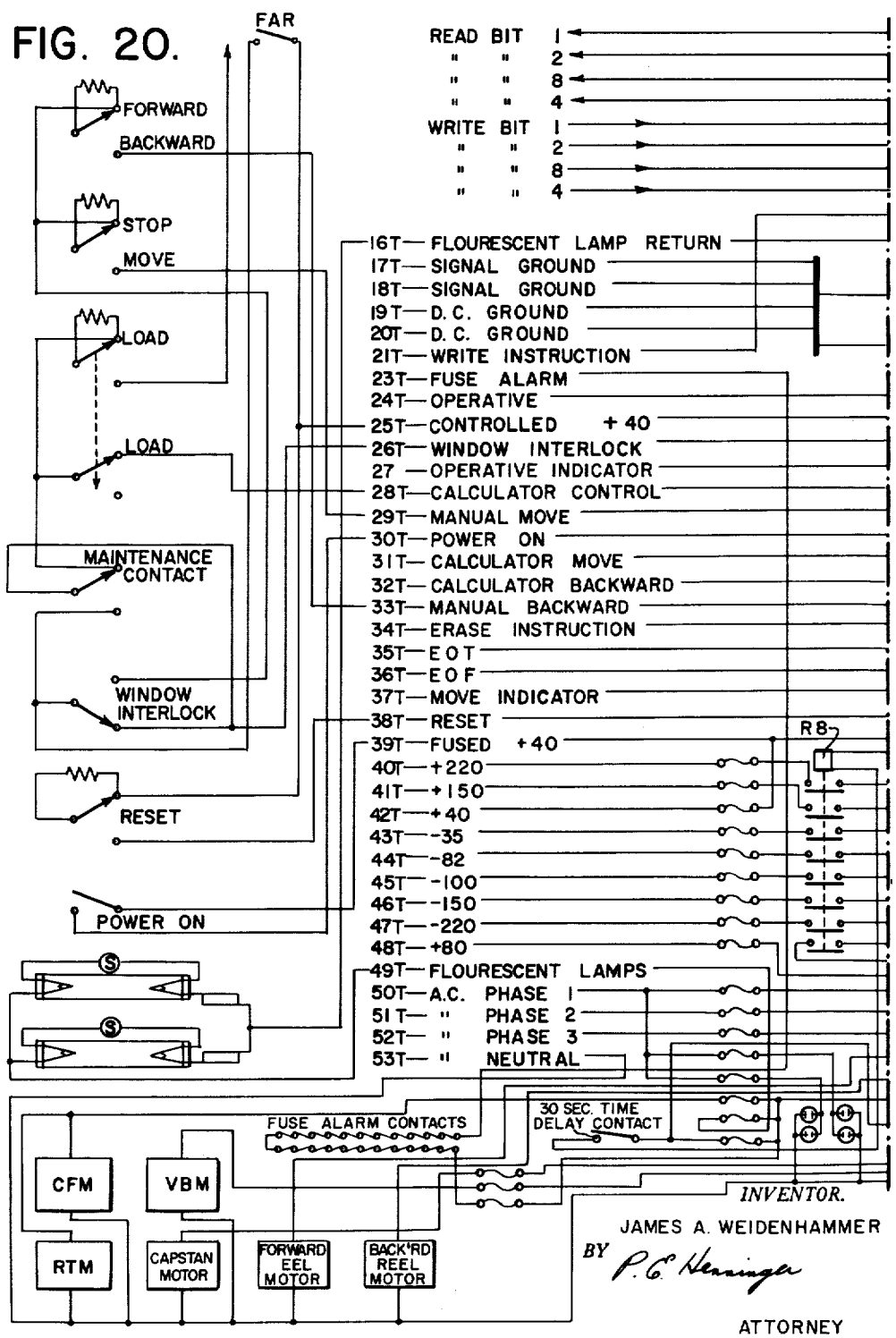

The circuits housed in the tape drive frame are shown in FIGS. 20 through 23. These circuits are those generally necessary for controlling the position and movement of the tape and for reading from and recording information on tape. These circuits are adapted for control in part by manually operated switches and in part by the signals that are received from the other units of the system. At the extreme left in FIG. 20 are a series of manually operated switches which are adapted to condition the tape frame circuits for operation. These switches are respectively labeled Forward-Backward, Stop-Move, Load, Maintenance Contact, Window Interlock, Reset and Power On. Also included in these circuits are the power leads which are connected to a suitable power supply unit, the details of which are unimportant insofar as this invention is concerned, so long as the requisite voltages for the various circuits are provided thereby.

The various relay circuits which are in the tape drive frame are adapted to operate at +40 volts. A source of +40 volts is connected to the input line 42T. In this line is a fuse and a return to the line 39T, so that the power is applied as a fused +40 volts to one contact of the Power On switch. When the Power On switch is closed, it applies the +40 volts to the Power On line 30T. Power On this line picks up the power on relay R1. Energization of the Power On relay R1 will result in the closure of its R1AU, R1BU and R1AL points. Closure of the R1AL points will energize the magnetic reel brakes. In FIG. 23 the right brake clutch 92 and the left brake clutch 89 are the same as the clutches bearing the same reference numerals in FIG. 9. Thus, when the R1AL points are closed, a circuit is established through the normally closed R4AU points, through the right reel release button RRC (see also FIG. 6), and to the right brake clutch 92 to energize this clutch. At the same time a similar circuit is established through the normally closed R4BU points, the left reel release contact LRC and to the left brake clutch 89, whereby the same is energized. It has been mentioned hereinabove that the brake clutches 89 and 92 are normally energized, and are deenergized only when either of the associated reels is called upon to feed tape.

Closure of the R1AU and R1BU points applies +40 volts to the controlled +40 volt terminal 25T. At the same time it also applies +40 volts to the photocell assembly comprising the end of file photocell EOF and the end of tape photocell EOT and their associated lamps (FIG. 23). The photocell lamp current also picks up the photocell lamp relay R6 (FIG. 21), thereby closing the contact R6AL. The contact R6AL is in the nature of a master contact, in that its closure results essentially in the actuation of all of the other contacts. Closure of the points R1AU and R1BU puts power on the heavy duty relay HD1, and the heavy duty relay HD1 effectively supplies 110 volt A.C. power to the cooling fan motor CFM (FIG. 20), the running time motor RTM, the fluorescent lamps on the front of the tape drive panel, which are an indication that power has been turned on, and a thirty second time delay motor, as well as to the filament transformers which supply power to the tubes.

The thirty second time delay contact closes and applies power to an 8-pole relay R8 (FIG. 20), and this applies all of the direct current power to each of the four read-write amplifiers associated with the respective read-write heads and also to the tape motion control circuits through which movement of the tape is controlled.

If the cover 164 of the head 73 is closed, the head cover contact HCC (FIGS. 19 and 21) will be closed. This will serve to energize the moving coil relay R3, thereby closing the contact R3AL. As a result of closure of contact R3AL, heavy duty relay HD4 (FIG. 22) will pick up and close its points HD4 to apply +40 volts to the vacuum blower motor VBM (FIG. 20). When the vacuum blower has come up to its proper speed, certain further contacts will be closed. Within the header 122 (FIG. 6) are three contacts operated by dampers which are influenced by the condition of the atmosphere in the header. These dampers are the right vacuum damper, the left vacuum damper and a vacuum supply safety damper. These dampers control respectively a right vacuum contact RVC, a left vacuum contact LVC, and a safety vacuum switch SVS (FIG. 21). Thus, when the vacuum in the vacuum system of the tape drive has come up to its proper level, then the right vacuum contact, the left vacuum contact and the safety vacuum switch will be closed. Closure of these points applies voltage to a contact on the 8-pole relay R8.

Should the photocell assembly (FIG. 23) fail for any reason, the circuit to the photocell lamp relay R6 will be broken, thereby dropping the relay R6 and rendering the unit inoperative, since its contact R6AL will be open.

The tape drive unit of FIG. 6 is normally encased in a cabinet which has a vertically sliding window in the upper half thereof, as indicated in FIG. 1. This cabinet has not been shown in the drawings of FIGS. 6 and 7, but it should be mentioned that the window controls a contact which is the window interlock contact at the extreme left of FIG. 20. The circuit under discussion cannot be rendered operative when the window interlock contact is open. It, therefore, follows that a safety measure has been provided in that the tape drive can be rendered operative only when the protecting window covers the reels, the tape drive capstans and the read-write head. When the window interlock is closed, it makes a circuit through the line 26T (FIG. 20), whereby the window interlock relay R5 is energized. The power to the window interlock line 26T is supplied by a pair of contacts on the fuse alarm relay FAR, which is normally closed, but which will open in case of fuse failure such as caused by an over-load thereon. The window interlock relay R5 closes its contacts R5BL and R5AL, and since the photocell lamp relay R6 is now energized, power is applied to the run relay R4. The energization of the run relay R4 will serve to close its points R4BL, and since R5BL point was closed upon energization of the window interlock relay R5, the calculator-manual relay R2 will be picked up, provided that +40 volts has been applied to the terminal 28T, which is the calculator control line.

As stated, when the head cover switch contact HCC was closed and the moving coil relay R3 was picked up thereby, contacts R3BL and R3AL were closed. Contact R3AL supplies B plus to the moving coil circuits within the tape motion control circuits to be described later.

The calculator-manual relay R2 will be picked up through points R5BL and R4BL if the load switch is closed, if the maintenance contact is closed and if the window interlock contact is closed.

With the calculator-manual relay R2 deenergized, the R2BU and R2AU points will be as shown. When these points are as shown, they permit the tape motion control circuits to be controlled by the move or backward instruction from the manual switches at the left. When the relay R2 is energized, the R2BU and R2AU points will be transferred, thereby connecting the tape motion control circuits for operation under the influence of the external control pulses, namely the CALCULATOR MOVE signal on line 31T and the CALCULATOR BACKWARD signal on line 32T.

Energization of the run relay R4 resulted in the closure of the R4AL, R4AU and R4BU points. The closure of the R4AL point puts power on the forward reel relay HD2, the backward reel relay HD3 and the capstan motor relay HD5, thereby energizing the forward reel drive motor, the backward reel drive motor and the capstan motor, respectively. Transferral of the points R4AU and R4BU conditions the tape motion clutch circuits for control by the position of the tape loops in the columns 78 and 79, and under the immediate control of the several vacuum switches LUV, LLV, RUV and RLV. The points R2BL and R2AL provide signals that have the same effect in essence.

The relay R2 is the last relay to be energized, and when this is picked up, its picks up the R2AL and R2BL points, conditioning the circuits for high and low impedance operation.

*Tape motion control circuits.*—The details of the tape motion control circuits, represented in FIG. 23 by means of a block 23a, are shown in FIGS. 27 and 28. When the backward line (FIG. 28) is down, the tubes V16 and V18, whose cathodes are returned to ground through 100 ohm resistors, will not conduct, and their plates will raise to a potential approaching +150 volts. The plate voltage passes through a voltage divider comprising resistances R17 and R18, thereby putting +8 volts on the grids of tubes V17 and V18A, causing these tubes to conduct and pull current through the forward magnet line and through the forward magnet 156 (FIG. 15) with which this line is connected.

When the potential on the backward line is raised, tubes V16 and V18 will conduct, pulling current through the backward magnet line and the backward magnet 155 (FIG. 15) to which it is connected. The plates of tubes V16 and V18 drop approximately 50 volts. This potential is divided by the resistances R17 and R18, thereby lowering the potential on the grids of tubes V17 and V18A. This is effective to deenergize the forward magnet 156.

Voltage on the move instruction line (FIG. 28) is passed to a diode D2, comprising one diode of an AND circuit, the cathode of the diode D2 being pulled from —35 volts through a 10K resistor R50. When called upon to move, the potential of the move instruction line must be lifted to ground or higher. The diode D1 of the AND circuit and its cathode will normally be at +5 volts unless the end of tape trigger has been energized.

The output of the triode V21A will be up provided the end of tape trigger has not been energized and the potential on the move instruction line has been raised. The output of the triode V21A (which is a cathode follower) feeds the grids of a triode V7 (FIG. 27). This is effective to pull down the potential at plate P1 of the triode V7 which, through the resistance R59, causes the triodes V9 and V11 to cease conduction. The potential on the plate P2 of the triode V7 is pulled down and this, through resistance R93 and a voltage divider comprising resistances R91 and R92, is fed to the grids of diode V12, causing this diode to cease conduction. The grids of the diode V14, which are biased through resistances R87 and R88, are normally kept out of the conducting region. The output of the triode V21A is also fed to the grid of a triode V6A (FIG. 27), which is an inverter, the plate of which is connected through resistances R139 and R137 to the grid of a triode V6B. The output of the inverter is taken from the cathode of the triode V6B to drive the grids of a triode V5. It may be noted that the output of the inverters V6A—V6B is the inverted move instruction signal on the move instruction line. The inverter signal applied to the triode V5 is in effect the mirrored signal of the triode V7. The output of plate P2 of the triode V5 will rise toward +150 volts, being driven out of the conduction region by the output of the triode V6B. This will cause triodes V13 and V15 to conduct. The potential at plate P1 of the triode V5 will also raise toward +150 volts, and this plate is coupled to a voltage divider consisting of resistances R100 and R101 and to the grids of a triode V10 which will be caused to conduct. The rising wave front at plate P1 of the triode V5 is coupled to a condenser C23 and through it to the grids of a triode V8, which is caused to conduct upon the arrival of this pulse. The order of conduction is approximately 100 mils for a period of ten milliseconds.

The moving coil 158 (FIGS. 15 and 23) is connected between the cathodes of tubes V9 and V11 on the one side and those of V13 and V15 on the other side. Resistances R96 and R97 (FIG. 27) constitute a voltage divider between ground and —150 volts, but normally hold the triode V8 out of the region in which it will conduct, except for the period when this pulse is fed from the plate P1 of the triode V5.

When the move instruction line drops, the cathode of the tube V21A will also drop. This drop is applied to the grids of the triode V7, pulling this triode out of the conducting region and thereby causing its plate P1 to rise toward +150 volts, and causing the triodes V9 and V11 to conduct. The plate P2 of the triode V7 will also rise toward +150 volts, which rise is applied to the grids of the tube V12 via the voltage divider R91 and R92, raising it to its conducting region. The plate P2 of the tube V7 is also coupled through a condenser C24 to the grids of the tube V14, which is caused to conduct a current of about 100 mils for a period of ten milliseconds in manner similar to the performance of the tube V8. In this manner current may be passed through the moving coil in either of two directions 150 mils being passed through the coil for the ten millisecond period to obtain rapid movement thereof into driving or stopping position.

The triode V4A is a shunt-fed Colpitts oscillator, the output of which is taken from the grid through 470 micromikes. The erase instruction is fed through a diode D5 to the cathode of the tube V4B. The grid of the tube V4B is tied to a voltage divider (—14 volts). When the potential on the erase line is raised by the arrival of an erase instruction, the cathode of the tube V4B is lifted to ground as the erase line, through diode D5, cutting off V4B, and causing the plate to rise toward +150 volts. This voltage is coupled to the grid of a triode V3B by way of a voltage divider consisting of a 300K resistance and a 450K resistance. The oscillator output is also applied to the grid of the triode V3B. When the erase line is down, the triode V4B conducts, pulling its plate down, and this signal is again coupled to the triode V3B, but under these conditions the oscillator output which is also present at the grid is not at a level which will cause the triode V3B to conduct.

The amplified oscillator signal is taken from the plate of the triode V3B and is used to drive class C stage V3A, the output of which drives the erase head. The output is taken from its plate in which circuit is included a resonated tank circuit. The oscillator frequency is 200 kc. The function of the diode D5 is to disconnect the erase line, i.e. the line on which the erase instruction is received, from the cathode of the triode V4B when the erase line is lowered. The cathode of the triode V4B will drift toward the potential of the erase line at a rate determined by the time constant of a condenser C14, in series with the parallel 82K resistance and the back resistance of the diode D5 in series with the 470K resistance. This causes the erase circuit to operate for nine milliseconds after the removal of the erase instruction.

The end of file photocell EOF (FIG. 23) has fed to it +75 volts by the 240K resistance R37 (FIG. 28). When a reflecting patch on the tape reflects light into the photocell, its resistance decreases, causing a 4 to 5 volt negative pulse to be fed through a condenser C5 to the right grid of a triode V25. The right half of the triode V25 is an inverted amplifier producing a positive signal at the output of its plate P2. This positive signal is R.C. coupled to the left grid of the triode V25, the left grid being normally biased to —20 volts. This causes the plate P1 of this triode to conduct, pulling its current through a resistance R7 in the output of plate P2 of a single shot multivibrator V23. The drop in potential at plate P1 of the multivibrator V23 is coupled through a condenser C1 to the left grid of the multivibrator V23. The time constant of the single shot multivibrator V23 is ten milliseconds. An output is taken from plate P1 of the single shot multivibrator V23 to a voltage divider comprising resistances R14 and R15, and to a cathode follower V21B. The output of the cathode follower V21B is fed through a diode D4 of an AND circuit consisting of diode D4 and a second diode D3 the output of which is an input to a triode V20. The diode D3 is driven by the erase circuit, and the cathode follower output of this AND circuit is taken from the cathode of the cathode follower V20. This output is used to gate the end-of-file output pulse with the erase instruction. An erasing operation is performed only while the system is conditioned for writing on tape. This insures that an end-of-file pulse is emitted from the tape motion control circuits only while in the writing mode.

The input from the end of tape photocell EOT is the same as that for the end of file photocell EOF. The triode V26 (FIG. 28) corresponds to the triode V25 and the plate P1 of the triode V26 draws on resistance R110, which is in the plate circuit of a bi-stable trigger V24. Both polarities from this trigger are utilized. One pulse of the trigger V24 is taken from its plate P2 through a voltage divider comprising resistances R104 and R105 to the grid of a triode V22 which is a cathode follower, the cathode output of which is fed to the diode D1 heretofore referred to. When the end-of-tape trigger is flipped, this output drops, causing the tape to stop. The opposite polarity is taken from plate P1 of the trigger B24 and through a voltage divider comprising resistances R116 and R117 is applied to the grid of a triode V22A. The output of the cathode follower is the normal end-to-tape pulse EOT. The reset pulse on the reset line is fed to the grid of a triode V20A, the plate of which is in parallel with the plate P1 of the trigger V24. A rise of potential on the reset line, as by the presence of a RESET signal, will cause the triode V20A to conduct, resulting in the resetting of the trigger V24.

*Vacuum column tape reel control.*—During the time that the tape 72 is actually being fed through the read-write head 73, it is under control of the vacuum switches RUV, RLV, LUV and LLV (FIGS. 6 and 23). As explained heretofore, these switches are sensitive to the pressure within the vacuum columns 78 and 79 and control the brake and clutch mechanism shown in FIGS. 9 and 10 of the drawings.

Whenever the tape reels 70 and 74 are at rest, they are under control of their respective brake clutches 87 and 90. The coils in the brake clutches 87 and 90 are energized as soon as their is power on the 40 volt line, and even before the run relay R4 (FIG. 21) is energized. When the Power On contact (FIG. 20) is closed, the relay R1, which is the Power On relay, will be energized and will close its R1AL point, so that the +80 volts on line 48T will be fed through the right reel release contact RRC and the left reel release contact LRC to energize respectively the right brake clutch 90 and the left brake clutch 87.

When the run relay R4 is energized, it transfers its R4AU and its R4BU points. Thereafter, the energizing circuit for the brake coils is throught the respective vacuum switch structures. Let it be assumed that the tape loops now occupy a normal, relatively stable position between the vacuum switches LUV and LLV in the column 79 and also between the vacuum switches RUV and RLV in the column 78. When the loops are thus positioned, the vacuum switches LUV and RUV are subject to atmospheric pressure, and the switches LLV and RLV are subject to the rarified atmosphere under the tape bights. Under these conditions the brake magnets will be energized from the +80 volt supply line, through the now closed points R1AL of the run relay R1, through the normally closed upper left vacuum switch point LUV-1, through the transferred point LLV-2 of the lower left vacuum switch LLV, which is now subject to the rarified atmosphere within the column 78, and to the left brake clutch coil 87. Energization of the clutch coil in the right brake clutch 90 is effected from the +80 volt line, through the closed R1AL point, through the now transferred R4AU point, through the normally closed RUV-1 point of the upper vacuum switch and through the now transferred RLV-2 point of the lower right vacuum switch and thence to the coil in the right brake clutch 90.

Should the tape loop in the vacuum column 79 rise above the upper left vacuum switch LUV, that switch will be subject to the rarified atmosphere in the column 78 with the result that its LUV-1 point will open and its LUV-2 point will be closed. The energizing circuit to the coil in the left brake clutch 87 is broken when the left upper vacuum switch point LUV-1 is open and the circuit to the unreeling clutch 89 is closed, the same being energized from the +80 volt power line through the closed R1AL points, the closed R4BU point and the now closed RUV-2 points of the left upper vacuum switch LUV to provide a circuit for energization of the unreeling clutch 89. When this happens the tape reel 70 will be turned in a clockwise direction to supply more tape to the vacuum column 78.

When the tape loop in the column 78 drops below the lower left vacuum switch LLV, that switch will be subjected to atmospheric pressure, with the result that its contact LLV-2 will be opened and its contact LLV-1 will be closed. The first effect of this transfer is the breaking of the circuit from the left brake clutch 87, through the point LLV-2 of the upper left vacuum switch. Therefore, upon closure of the LLV-1 point of the left lower vacuum switch, a circuit is provided for the reeling clutch 88, this circuit being from the +80 volt line, through the closed R1AL point, through the closed R4BU point, the closed LLV-1 point of the lower vacuum switch LLV to the clutch coil in the reeling clutch 88.

The function of the vacuum switches RUV and RLV in the right vacuum column 79 is precisely the same as that described in connection with the switches LUV and LLV in the left vacuum column 78. It is believed that the description thereof need not be enlarged on in this specification, since an understanding of the operation should be clear from the specific description given in connection with the vacuum switches in the left vacuum column 78. It is sufficient to say that as the tape loops in the respective vacuum columns rise above the upper vacuum switches, the upper vacuum switches LUV and RUV will be subject to rarified atmosphere in their respective columns, since the tape bights now seal off the column above the vacuum switches and permit the vacuum blower to rarify the columns below the tape bights and thereby influence the upper vacuum switches. This will cause the transfer of the upper vacuum switch points, whereby the unreeling clutches 89 and 91 are energized to supply tape to their respective vacuum columns. By the same token, when the tape loops drop below the lower vacuum switches RLV and LLV, these switches, which have been heretofore subject to vacuum within their respective columns 79 and 78 but are now subject to atmospheric pressure, will transfer their points to establish an energizing circuit for the reeling clutches, i.e. the reeling clutch 88 and the reeling clutch 92, respectively.

By way of summary of the tape loop control circuits, the following may be stated. When the bottom of the tape loop in column 78 is above the vacuum switch LUV, the vacuum switch LUV will be transferred, the vacuum switch LLV will be normal and the left unreeling clutch 88 will be energized, thereby supplying tape to the column. When the tape loop within the vacuum column 78 is normal, i.e. the bight thereof positioned between the left upper vacuum switch LUV and the left lower vacuum switch LLV, the switch LUV will be normal, the switch LLV will be normal, whereby the file reel brake 87 is energized to halt feed of tape into the column. When the tape loop is too low, i.e. when the bight thereof is below the left lower vacuum switch LLV, the left upper vacuum switch will be normal, the left lower vacuum switch will be transferred and the left take-up clutch 89 will be energized, thereby drawing tape from the column.

When the tape in the column 79 is too high, i.e. above the right upper vacuum switch RUV, the right upper vacuum switch will be transferred, the right lower vacuum switch will remain normal with the result that the left unreeling clutch 92 will be energized, thereby supplying additional tape to the column. When the tape is in normal position within the column 79, i.e. when its bight is positioned between the right upper vacuum switch RUV and the right lower vacuum switch RLV, the right upper vacuum switch will be normal, the right lower vacuum switch will be normal with the result that the machine reel brake 90 will be energized, thereby halting feed of tape to the column. When the tape loop in the column 79 is too low, i.e. when the bight thereof is below the right lower vacuum switch RLV, the right upper vacuum switch RUV will be normal, the right lower vacuum switch will be transferred, thereby energizing the right take-up clutch 91 and drawing tape from the column.

It will be noted that the file reel brake 87 is normally energized when both the left upper vacuum switch and the left lower vacuum switch are in their normal positions, but that the circuit of the file reel brake is broken upon transfer of either of the switches LUV or LLV. By the same token, the machine reel brake 90 is normally energized through the normal position of the right upper vacuum switch RUV and the right lower vacuum switch RLV. If, therefore either of these switches is transferred, the circuit to the machine reel brake is broken. By this expedient the drive spindles are released for rotation upon energization of either the take-up clutch or the unreeling clutch in either of the tape columns 78 and 79.

At such time that the reeling or unreeling clutch coils are deenergized, the circuit is such, as pointed out hereinbefore, that the brake coils 87 and 90 are energized to lock the reels 70 and 74, respectively, against rotation. It remains to be noted, however, that the reels 70 and 74 may be selectively released from the influence of their brakes by breaking the energizing circuit by opening the reel release contacts RCC (FIGS. 6 and 23), insofar as the right reel is concerned and LRC, insofar as the left reel is concerned. The reel release contacts are operative when the Power On relay R1 is energized and its R1AL point is therefore closed, and when the run relay R4 is deenergized and its points R4AU and R4BU are in their transferred position as shown in FIG. 23. Under these conditions the energizing current for the brake coils is through their respective right reel release contacts RRC and left reel release contacts LRC, either of which when opened will deenergize its associated brake clutch coil.

*Read-write circuits.*—In FIGS. 21 and 22 the read-write amplification circuits associated with each of the four read-write heads is shown in FIGS. 21 and 22 in the form of a block. Into each of these blocks is entered the respective write bit line, and from each of these blocks is taken the respective read bit line. Thus, in FIG. 21, the line "write bit –1–," for example, enters the read-write circuits associated with the read-write head identified with bit –1–. By the same token, a line "read bit –1–," for example, comes from the read-write circuits associated with bit –1–. The circuit within each of the read-write circuit control blocks of FIGS. 21 and 22 is shown in FIG. 29.

In FIG. 29 the reading circuits include four stages of double-ended amplification comprising four tubes V1, V2, V3 and V4. To gain adjustment in the plates of V3 the potential on the plates of the tube V3 is fed through the tube V4 which operates as a common cathode OR circuit, the cathode potential of which is determined by the higher of the two grids. The grids of the tube V5 are returned to —7 volts. The cathodes of this tube are clamped to ground through a diode D3. This effectively limits base line noise. The signal from the cathodes of tube V5 is differentiated in the grid circuit of an inverter V6. This voltage appears in inverted form at the output of plate P1 of the tube V6, and from thence it is RC-coupled to a peak sensing circuit including a tube V7. The right grid of the peak sensing tube V7 is returned to —135 volts. The left grid of the tube V7 is returned to —30 volts. Since the cathodes of the tube V7 are common, the left side of the tube V7 will under these conditions, conduct while the right side will not conduct. The inverted differentiated signal is fed to the right grid of the tube V7. The second half of this inverted, differentiated pulse causes the right section of the tube V7 to conduct, cutting off the left side, causing the left plate P1 to rise toward a potential determined by the division of current between resistances R69 and R80. This pulse is on the grid of the output cathode follower V8. The result, therefore, is a sequence pulse, the upper level of which is +5, and the lower level of which is —30 with a fast rising wave front occurring at the same time as the peak of the bit read from tape, and a pulse which is up for the time duration equal to half of the bit pulse read from the tape.

The tube V10 is a differential amplifier, the output of which is double-ended and which has a single ended input. The right grid of the amplifier V10 is tied to —11 volts which is approximately half-way between two signal levels fed to the left grid of the amplifier V10. When the signal applied to the left grid of the amplifier V10 is up, the left side of the tube will conduct, causing its plate P1 to be at low potential. At the same time the right side of the amplifier V10 will be cut off, causing its plate P2 to be at high potential. When the input signal level is down, the right half of the amplifier V10 will be rendered conductive, while the left half will be cut off. As a consequence of this operation, opposite potential levels will be on the plates P1 and P2 at any given time.

The signals from the plate P1 of the amplifier V10 are fed through a voltage divider comprising resistances R104 and R108, while the signal from the plate P2 of the amplifier V10 is fed through a voltage divider consisting of resistances R105 and R109. Voltage from the plate P1 of the amplifier V10 is fed to the right grid of a write tube V9, while the voltages from the plate P2 of the amplifier V10 are fed to the left grid of the write tube V9.

The outputs of the plates P1 and P2 of the write tube V9 are connected respectively through diodes D2 and D1 to the read-write head coils. The amount of current through the read-write coils is determined by the size of the resistors in the cathode circuit of the write tube V9, an important portion of which is the resistor R103. Common with the cathodes of the write tube V9 is the right cathode of the tube V8. When reading from tape, the right cathode of the tube V8 is held up, keeping both sections of the write tube V9 cut off. When called upon to write, the potential on right cathode of the tube V8 is dropped, so that either one section or the other of the write tube V9 can conduct, depending upon the output of the differential amplifier V10.

The diodes D1 and D2 in the lines leading to the read-write head coils serve to disconnect the writing circuit from these coils while they are engaged in a reading operation.

The write instruction enters on the write instruction line and is taken to the right grid of the inverter V6, the output of which is taken from its plate P2 and by way of a voltage divider comprising resistances R107 and R111 to the right grid of the tube V8, the cathode of which is connected in common to the cathodes of the tube V9. This will condition the tube V9 to conduct and energize the coils in the read-write head to write upon tape when such operation is called for.

*Reproducing punch*

As indicated hereinabove, the reproducing punch utilized herein may be of the type disclosed in the George F. Daly Patent No. 2,448,781, to which reference may be made for a complete disclosure of the type of machine contemplated. Not all of the functions for which the reproducing punch has been designed are utilized herein, and therefore only so much of the reproducing punch will be illustrated and described as appears necessary for an understanding of its function in the present combination.

FIGS. 24, 25 and 26 herein, which correspond to FIGS. 3A, 3B and 7 respectively of the aforesaid patent, show those features of the punch essential to its utilization in the present combination.

The punch structure has a pair of card hoppers RH (FIG. 24) and PH (FIG. 25), which are the read hoppers and punch hoppers, respectively. In FIG. 24 the read hopper RH has a card picker 170 therein which is reciprocated by means of a suitably driven gear sector 171, whereby cards are fed one by one from the bottom of a stack in the hopper. As cards are picked from the stack by the picker mechanism 170, they are advanced into a series of driven card feeding rollers consisting of contacting pairs of rollers 172—172a, 173—173a and 174—174a. These rollers effectively feed cards through card sensing stations located between sets of card feeding rollers, and finally deposit the cards so fed into a stacker 175.

Located between the three pairs of feed rollers associated with the reading hopper RH are two record sensing stations which include reading contact roller RCR and comparing contact roller CCR. These rollers are driven at the same speed at which the feed rollers are driven. Cooperating with the contact rollers RCR and CCR are the reading brushes RB and CB, respectively. The brushes RB are the reading brushes and the brushes CB are the comparing brushes. Likewise cooperating with the contact rollers RCR and CCR are two sets of common contact roller brushes RCB and CCB, respectively. Immediately behind the feed rollers 70—74a is a reading X brush RXB which cooperates with a reading X brush common strip RXCS.

The punch hopper PH (FIG. 25) has a card picker mechanism 176 associated therewith, the structure of which is identical with that associated with the reading hopper RH of FIG. 24. As cards are advanced by the picker mechanism 176, they come under the control of a series of driven card feeding rollers arranged in pairs 177—177a, 178—178a, 179—179a, 180—180a and 181—181a, the last of these pairs depositing the cards in a stacker mechanism 182. Positioned directly behind the feed roller pair 177—177a is a punch X common contact strip PXCS with which cooperates a punch X brush PXB. Following the punch X common contact strip PXCS is a punch station 183. Between the feeding roller pairs 178—

178a and 179—179a is a punch contact roller PCR having in contact therewith a punch common brush PCB and a series of punch brushes PB.

The X brushes referred to in connection with both the reading and punching side of the unit are adapted to sense the so-called X-holes of a card during the passage of the cards from the hoppers PH and RH. These X-holes exercise certain special control functions which determine how punching (and printing) is to be controlled.

The feed roller pairs on the punch side of the unit are driven intermittently one index point position at a time, and the timing is such that the movement of the cards is arrested while the punching operation is being performed. In other words, a card is fed one index point position when it remains at rest long enough for the punches to perforate, whereafter the card is advanced to the next index point position. In the present case the cards are placed in the hoppers PH and RH face down with the "12" index point positions to the right. All holes of similar value are perforated in a row at the same time, the "12" holes being perforated first and the "9" holes being perforated last.

Because of the fact that the feed rollers on the punch side of the unit rotate intermittently, whereas the card pickers operate with a continuous feeding movement, means are provided to separate the feed rollers 177 and 177a, while the picker is moving a card to the right in FIG. 25.

The mechanism comprising the punch station is shown in FIG. 26. The punch station usually includes 80 punches, one of which is shown at 184 in FIG. 26. These punches are vertically guided in a stripper plate 185 and a plate 186, and cooperate with a die 187.

Pivotally mounted on the upper end of each punch 184 is a punch operating hook 188 which is urged in a counterclockwise direction by a spring 189. Each punch is connected by a link 190 to an arm 191 forming part of a pivoted armature 192. The armature is associated with a punch magnet PM. Pivoted on a shaft 193 is a punch operating frame 194, the frame being adapted to continuous oscillation about its pivot under the influence of an eccentric 195 (FIG. 25).

There is a punch 184, an operating hook 188 and a punch magnet PM provided for each column on the card, which in the present case will require that the machine be equipped with at least 72 punches and their associated magnets and other parts.

When a punch magnet PM is energized, its armature 192 will rock the arm 191 and draw the link 190 to the right. This rocks the punch operating hook 188 in a clockwise direction, allowing it to hook over the free edge of the frame 194 on its downward stroke. This pushes the punch downwardly through a card between the stripper 185 and the die 187. Upon the return stroke of the frame 194, and deenergization of the previously energized magnet PM, the spring 189 will draw the hook 188 back to the position shown in FIG. 25.

It can be seen, therefore, that whenever one or more of the punch magnets PM are energized, a corresponding hole will be punched in a card within the punching station.

It may be appropriate to mention that all of the pulses generated by the comparing brushes, reproducing brushes and the punch brushes are available at a control panel. Furthermore, the control panel also serves as an appropriate entry mechanism for the pulses by which the punch magnets PM are energized.

Pluggable unit component circuits

Throughout the block diagrams are a class of component circuits which appear with repetitious regularity. These circuits include coincidence circuits, inverter circuits, trigger circuits, multivibrator circuits and the like with which those in the art are generally familiar. While the component circuits employed herein may differ in certain details of construction and performance from those generally known, those in the art will be so fully informed as to their nature from an examination of the drawings relating thereto that extended detail descriptions can be avoided. Therefore, only a minimum description will follow in respect to these circuits.

*AND circuits.*—FIG. 30 includes a schematic circuit diagram of a crystal diode AND circuit. This diode AND circuit comprises input terminals 200, 201 and 202, diodes 200a, 201a and 202a, a pull-up resistor 203 and an output terminal 204. The input terminals 200, 201 and 202 are connected to the cathodes of their respective diodes 200a, 201a and 202a, whereas the anodes of these diodes are connected together at a junction 205. The circuit of FIG. 30 includes three diodes, and this constitutes this circuit a three-way AND circuit. It should be understood that only two diodes may be employed, or there may be employed a number of diodes greater than three, according to the number of inputs required. The pull-up resistor 203 is connected between the positive voltage terminal B+ and the junction 205. If one or more of the input terminals are negative, the junction 205 and the output terminal 204 will be negative. When all of the input terminal 200 through 202 are positive simultaneously, the junction 205 and the output terminal 204 will also be positive.

Throughout the block diagrams of the circuit, and AND circuit such as schematically shown in FIG. 30 will be represented by the block symbol comprising part of FIG. 30.

*AND-cathode follower circuits.*—It will appear commonly throughout the block diagram of the system that the output of an AND circuit such as shown in FIG. 30 comprises the input of a cathode follower. In FIG. 31 has been illustrated an improved type AND circuit which comprises input terminals 206, 207 and 208, respective crystal diodes 206a, 207a and 208a, a pull-up resistor 209 and a cathode follower 210. The input terminals 206–208 are connected respectively to the cathodes of the diodes 206a–208a. The anodes of these diodes are connected together at junction 211, which is connected through a parasitic suppressor resistor PS to the grid of the cathode follower 210. The anode of the cathode follower 210 is connected through a de-coupling resistor 211a, to the B+ terminal and through a capacitor 212 to ground. The resistor 211a and the capacitor 212 together constitute a de-coupling circuit between the high voltage supply and the anode of the cathode follower. The cathode of the cathode follower 210 is connected through resistors 213 and 214 to the B— terminal. The resistors 213 and 214 serve as a voltage dividing network which places the output terminal 215 at the proper potential.

If all the input terminals 206–208 are positive, the junction 211 and the grid of the cathode follower 210 will be positive. This will cause the cathode follower 210 to conduct and, in turn, cause the output terminal 215 to be positive. The cathode follower 210 is used whenever it is desired to isolate the input terminals 206–208 from the output terminal 215, or whenever the current requirements of a load connected to the terminal 215 are such that they cannot be supplied by the input terminals 206–208 and must be supplied by the cathode follower.

When one or more of the input terminals 206–208 are negative, the output terminal 215 will be negative, but when all of the input terminals are positive simultaneously, a positive pulse will appear at the output terminal 215.

Throughout the block diagrams of the system an AND-cathode follower circuit such as described will be represented by the block symbol comprising a part of FIG. 31.

*OR circuits.*—The crystal diodes utilized in the AND circuit may also be employed in a network known as an OR circuit. Whereas the AND circuit requires the simultaneous coincidence of all input pulses to produce an output pulse, an OR circuit will pass a pulse on any one of its input terminals. A typical OR circuit is shown in FIG. 32. In FIG. 32 the circuit comprises input terminals 216, 217 and 218, respective diodes 216a, 217a, and 218a, and a pull-down resistor 219. The input terminals 216-218 are connected to the anodes of their respective diodes 216a-218a, and the cathodes of these diodes are connected together at the junction 220. It should be understood that any number of diodes can be used depending upon the number of input terminals that are required. If three inputs are employed, such as shown in FIG. 32, the circuit may be referred to as a three-way OR circuit.

The pull-down resistor 219 is connected between the B— terminal and the junction 220. When one or more of the input terminals 216-218 are positive, the junction 220, and hence the output terminal 221, will be positive. However, if all of the input terminals 216-218 are negative, the junction 220 and hence the output terminal 221 will be negative.

The block diagram symbol of the OR circuit of FIG. 32 is used throughout the block diagram circuits of the system and where so used it will represent a circuit such as just described.

*OR-cathode follower circuits.*—In the measure that the AND circuit may be connected to a cathode follower to secure improved performance, so may an OR circuit be connected to a cathode follower. A combination of an OR circuit and a cathode follower is shown in FIG. 33. In this figure the OR-cathode follower circuit comprises a plurality of inputs 222, 223, and 224, respectively connected diodes 222a, 223a and 224a, a pull-down resistor 225 and a cathode follower 226. The cathodes of the diodes 222a-224a are connected together at junction 227, which is connected through a parasitic resistor PS to the grid of the cathode follower 226. The cathode of the cathode follower is connected to the B— terminal through a voltage divider comprising resistances 228 and 229. The output terminal 230 of this circuit is taken from the junction between the resistors 228 and 229. The anode of the cathode follower 226 is connected through decoupling components comprising a resistance 231 and a condenser 232 to the B+ terminal.

When one or more of the input terminals 222-224 are positive, the junction 227, and consequently the grid of the cathode follower 226, will be positive, thereby causing the cathode follower 226 to conduct. This condition causes the output terminal 230 to be at a positive level. Conversely, if all the inputs 222-224 are negative, the output terminal 230 will also be negative. It should be understood that, as in the case of the AND circuits described above, any number of input terminals and diodes can be used in an OR circuit.

It should be further understood that the operation of the OR circuit of FIG. 32 and the OR circuit of FIG. 33 is functionally similar and that these circuits may be interchanged unless circuit requirements dictate the use of the cathode follower adjunct of the circuit in FIG. 33.

Wherever the circuit of FIG. 33 is used throughout the block diagrams of the system, it will be indicated by the block symbol forming a part of FIG. 33.

*Cathode follower circuits.*—A cathode follower circuit is an non-inverting circuit which is operable to produce a positive voltage at its output terminal when a positive voltage is applied to its input terminal. FIG. 34 comprises a schematic diagram of a cathode follower circuit and its corresponding block symbol. In FIG. 34 an input terminal 233 is connected through a parasitic suppressing resistor PS to the control grid of the tube 234. The cathode of the cathode follower tube 234 is connected to a B— terminal through a voltage divider consisting of resistances 235 and 236. The output terminal 237 is connected to the junction between the resistances 235 and 236. The anode of the cathode follower is connected through a de-coupling network comprising resistances 238 and a condenser 239 to the B+ terminal.

If the input terminal 233 is positive, the cathode follower 234 is rendered fully conducting, thereby causing its output terminal 237 to be positive. Conversely, if the input terminal 233 is negative, the output terminal 237 will be negative also. The cathode follower of FIG. 34 is normally used for isolation purposes, or as a circuit for driving units where a particular signal source cannot supply the necessary current.

The block symbol of FIG. 34 will identify the cathode follower circuit throughout the block diagrams of the system.

*Inverter circuits.*—The system uses a great number of inverters which are circuits that produce a negative shift at the plate when a positive pulse is applied to the grid and a positive shift at the plate when a negative pulse is applied to the grid. This property renders these circuits very usful in inverting logical conditions. Generally, an inverter is used to drive a cathode follower, and in many instances an inverter is fed by an AND or an OR circuit.

FIG. 35 illustrates an inverter circuit which produces a negative voltage pulse at its output terminal when a positive voltage is applied to the input terminal and vice versa. The input terminal 240 is connected through a parasitic resistor PS to the grid of the inverter which may be a type 69L tube. If the input terminal 240 is positive, the grid of the tube will be positive, thereby permitting the tube to conduct. The anode of the 69L tube is connected to the B+ terminal, through an anode load resistor 241 and a de-coupling network comprising a resistor 242 and a condenser 243. The connection between the anode of the 69L tube and the B— terminal comprises voltage dividing resistors 244 and 245. The anode of the inverter is, in the case of an inverter cathode follower combination, directly coupled to the grid of the cathode follower which may be a type 69R tube. A common coupling capacitor 246 is connected in parallel with the resistor 245. Since the type 69L tube is fully conductive, its anode is down, causing the grid of the 69R tube to be down, whereupon the type 69R tube becomes less conductive. Because the type 69R tube is operating as a cathode follower, its output terminal 247, which is connected to its cathode, will be down. Whenever the input terminal 240 is down, the inverter will be cut off, thereby causing its anode to be at the B+ potential. The action of the voltage dividing resistors 244 and 245 causes the grid of the cathode follower to be up, so that its output terminal 247 is also up.

The block diagram of FIG. 35 will be used to indicate the circuit of FIG. 35 wherever it appears in the overall block diagram circuit drawings hereof.

*AND and OR inverters.*—Frequently a logical element is required which comprises a diode OR circuit or a diode AND circuit driving an inverter. Such circuit, for example, an OR-inverter circuit, is formed by connecting the output terminal 221 of the diode OR circuit of FIG. 32 to the input terminal 240 of the inverter circuit of FIG. 35. In such combination, when all the input terminals 216-218 of FIG. 32 are down, the output terminal 247 of the inverter circuit of FIG. 35 will be up. However, by causing one or more of the input terminals 216-218 of FIG. 32 to be up, the output terminal 247 of FIG. 35 will be down.

*Plate pull-over inverters.*—It is frequently desirable to flip triggers by means of plate pull-over. Herein, plate pull-over inverters are used for this purpose. FIG. 36 illustrates the circuit and the block symbol of the plate pull-over inverter used herein.

*Blocking oscillator circuit.*—FIG. 37 shows a blocking oscillator of the type illustrated and described in FIGS. 6-1, p. 207, vol. 19, Wave Forms, Radiation Laboratory Series, McGraw-Hill, First Edition, 1949. In FIG. 37 the right side of the tube 248 serves as a blocking oscillator, and the left side of the tube serves as a triggering tube. By applying a positive pulse to the input terminal 249, the left side of the tube 248 will be caused to become fully conductive, thereby triggering the right side of the tube so as to produce a positive pulse at the output terminal 250. For all practical purposes, the positive output signal may be considered to be at terminal 250 at the same time that the positive input pulse is applied to the terminal 249. The blocking oscillator provides a large current pulse in response to the application of a voltage pulse at the terminal 249.

The blocking oscillator circuit may be represented in block diagram form by the block symbol forming a part of FIG. 37.

*Inequality detector.*—FIG. 38 is the block diagram circuit and the block symbol form an inequality detector of the type which compares the plus and/or minus conditions present at the inputs of an AND-inverter circuit. Four such identical coincidence and inverter circuits are provided for determining the presence of any inequality in the −1−, −2−, −4− and −8− bit lines at any particular time.

The −1−, −2−, −4− and −8− binary bits may be simultaneously entered into a different one of the four comparison circuits, and a pulse is developed at the output whenever an inequality exists in any one of the four circuits. For example, if the binary-decimal values 0101 and 1010 are inserted at input terminals at the several inputs, each order of the two binary-decimal numbers is compared and only one output is produced to indicate the presence of inequality in one or more orders of the binary numbers. With this preface, it will be sufficient to examine one of the four identical comparison circuits.

Considering the hypothetical case wherein a binary −1− bit is present at terminal 251–1 and none at 252–1, the output terminal 253, in such case, should be up. The absence of coincidence at the input of the OR circuit 254 causes its output to be down. However, this condition is inverted by the inverter-cathode follower circuit 255, and the input terminal to the AND-cathode follower circuit 256 will be positive. Inasmuch as the input 257 of the OR circuit 258 is positive, the output of the OR circuit 258 will be positive, thereby forming coincidence of pulses in the AND circuit 258. Since both inputs to this circuit are positive, the output of the AND circuit 256 will be positive with the result that the output terminal 258 will also be positive, indicating the presence of inequality between the two inputs. On the other hand, if two −1− bit inputs are simultaneously impressed on the terminals 251–1 and 252–1, the inverter circuit 255 will cause the input to the AND circuit 256 to be negative, thereby eliminating the latter's input coincidence and preventing the output terminal 252 from becoming positive. The −2− bits of two digits are entered respectively at the input terminals 251–2 and 252–2, the −4− bits of two digits are entered at terminals 251–4 and 252–4, while the −8− bits are entered at terminals 251–8 and 252–8, each one of the bit input sets having a discriminating circuit such as that described in connection with the treatment of a pair of −1− bits.

*Electronic triggers.*—One of the components appearing with great frequency through the system diagrams is the bi-stable electronic trigger. FIG. 39 is the circuit of a high speed, electronic trigger used in the system, while FIG. 40 illustrates a so-called electronic key trigger which is used throughout the circuit. The key trigger is so designed as to be operative from manually operable contacts, cam contacts and relay contacts, and therefore is usually rendered less sensitive than the high-speed triggers. Since trigger circuits may be, and usually are subject to detailed variation, we shall resort herein to the use of an exemplary trigger for the purpose, explaining the general characteristics and operation of electronic triggers, and such example may be seen in FIG. 41 which comprises an electronic trigger commonly referred to in the art as an Eccles-Jordan trigger. Such an electronic trigger comprises, for example, two cross-coupled triodes (shown in FIG. 41 as being included in one envelope and as comprising a 6J6 type tube) in which the plate P1 is cross-coupled through a 200K ohm resistor in series with a 1K ohm resistor to the grid G2. Likewise, the plate P2 is cross-coupled to the grid G1 by a 200K ohm resistor in series with a 1K ohm resistor. Each of the 200K ohm resistors is shunted by a 100 micromicrofarad condenser.

The left side of the tube may be rendered conductive by voltage applied via the terminal 5 and the 200K ohm resistor in series with the 1K ohm resistor G1R or by a minus voltage which may be applied to the terminal 7 directly to the plate P1, in order to "pull-over" the plate. Under either of these two condition, either of which may occur in the operation of a trigger, the left side of the tube is rendered conductive, lowering the voltage at plate P1, which, through the cross-coupling previously described, maintains the grid G2 relatively negative, so that the right side of the tube is blocked while the left side conducts, thus making plates P1 negative and P2 positive. This is one state of stability of the trigger.

In a similar manner, the right side of the tube may be rendered conductive, whereupon the reduction in voltage at the plate P2 is applied by the cross-coupling connection, previously described, to the grid G1 to block the left side of the tube, whereupon the plate P1 now becomes positive. When the left side of the trigger is conducting, the trigger may be considered as being "on." When the right side is conducting, the trigger is described as being "off." Thus, with plate P1 positive, the trigger is Off and with plate P2 positive, the trigger is On.

If, for example, the left side of the tube is conducting and minus voltages are applied simultaneously to the grids G1 and G2, the trigger will change its conducting state, the left side being blocked and the right side being rendered conductive. In order to properly operate the trigger in this fashion, with simultaneous negative potentials applied to both the grids G1 and G2, such negative potentials are usually applied to the grids by way of individual capacity couplings. A trigger, the conducting state of which is changed by the simultaneous application of pulses to its control grids, is commonly referred to as a binary trigger.

If the left side of the trigger is conducting, and a negative voltage is applied to the terminal 6, this negative voltage will be differentiated by the condenser G1C to a negative pulse which will be applied through the 1K ohm resistor to the grid G1, blocking the left side of the tube, and thereby turning the trigger On. If a positive pulse of sufficient magnitude is applied to the terminal 6, this positive pulse will likewise be differentiated by the condenser G1C and applied through the 1K ohm resistor to the grid G1 as a plus pulse. If at the time such plus pulse is applied, the left side of the tube is blocked so that the plate P1 is positive, the pulse will trip the trigger On, thereby rendering the plate P1 negative.

As it has been noted, trigger elements of this type are more sensitive to negative pulses than to positive pulses. A positive pulse of a given value which, when applied to the terminal 5 and thus applied to the grid G1 will flip it On, will not be of sufficient strength to operate the trigger when applied to the terminal 6 and when differentiated by the condenser G1C. By proper choice of values, however, this sluggishness can be overcome. While various means of tripping the trigger have been described, these are not intended to be exhaustive, but are merely indicative of the most common way triggers are flipped during operation of the system.

In FIG. 41, a 40 micromicrofarad condenser is connected between the junction of the two 200K ohm resistors on the right side and ground. The plate P1 is supplied with two resistors in series, one of 12K ohms adjacent the plate and the other of 7.5K ohms, while the plate P2 is also supplied with two similar resistors, also in series. The terminal 8 provides a tap in the plate resistance of the plate P1. The terminal 9 is usually connected to a source of +150 volts.

*Single shot multivibrators.*—The common timing element employed in this system is the single shot multivibrator. FIG. 42 schematically illustrates a single shot multivibrator circuit used in the system and also includes the block symbol representation thereof used throughout the block diagrams of the system. Inasmuch as the multivibrator circuits will vary in detail among themselves, resort will be had to an exemplary single shot multivibrator circuit for purpose of explaining the operation thereof. An exemplary single shot multivibrator circuit is shown in FIG. 43. It has been pointed out hereinbefore that the electronic tirgger is nothing more than two retroactively resistance-coupled triodes. If two triodes with normally conducting grids are retroactively capacity-coupled, the resulting circuit will oscillate and is known as a multivibrator. This arrangement is shown in FIG. 35A. In this system single shot multivibrators are used for generating timing pulses having a variety of pulse durations.

When power is first turned on, assume that tube T1 starts conducting first, the resulting drop in voltage at the point A1 is transmitted to the grid G2 and keeps the tube T2 cut-off. As soon as the condenser C2 is fully charged, the voltage charge at point A1 is no longer transmitted to the grid G2 and the grid G2 rises to cathode potential. The tube T2 now starts conducting and the point A2 drops in voltage. The negative shift at the point A2 is transmitted to the grid G1 and cuts off the tube T1. When the voltage across the condenser C1 reaches a steady state value, the grid G1 again rises to cathode potential and the tube T1 starts conducting. The cycle is then repeated at timed intervals which are determined by the values of C and RG. The single shot multivibrator resembles a trigger circuit in that it may be flipped into a certain state, but it then returns to its previous state after a predetermined time without being pulsed from an external source. Its normal state will be called its stable state, and its abnormal state will be called its quasi-stable state, for it will remain stable in this latter state until the predetermined time has elapsed.

*Circuit description*

*Memory circuit.*—FIGS. 45 and 46 comprise the wiring diagram of the video amplifier, beam control and associated control switching circuits for one of the four memory drawers. The circuits for the remaining three drawers are identical. In the upper left portion of FIG. 45, four lines are shown which are labeled "To Grid of Cathode Ray Tubes." Four cathode ray tubes are used in the drawer, these being IBM type 85. Each of the four lines at the upper left of FIG. 45, therefore, control a grid of one of the four tubes comprising a memory drawer.

In order to turn the beam on in a given tube, it is necessary to raise the voltage of its associated grid circuit control line. A 40 volt pulse is required. An understanding of the control of a single tube will be sufficient to demonstrate the manner in which these tubes are controlled. As an example, let it be assumed that tube A is to be controlled. The unblanking pulse for this tube is derived from plate P1 of the tube 400, which may be a type 5965. A diode 401 and a resistor 402 in this plate circuit provide the necessary clamping. The tube 400 is connected as a cathode-coupled switch. In order to turn on the beam of cathode ray tube A, it is necessary to provide a positive pulse to the grid G2 of the tube 400. This grid is connected to an AND circuit consisting of diodes 403 and 404. Diodes 403, 405, 406 and 407 connect to terminals 3M-15, 3M-13, 3M-11 and 3M-9 respectively. These terminals are connected to external control circuits which determine which of the four cathode ray tubes will be selected for use at any given time. The other diodes of the AND circuits, i.e. 404, 408, 409 and 410 are connected in common to a line 411 which is in the beam control switching circuit. The timing and duration of the signal on the line 411 determines whether a dot or a dash will be written on the selected cathode ray tube target.

The terminal 3M-10 receives the ON PULSE signal. It will be understood that every memory bit cycle, either while reading or while writing, is initiated by the signal ON PULSE. In the timing chart (FIG. 47), it is seen that the signal ON PULSE is a positive signal of seven microseconds' duration. This timing pulse is transmitted to the grid G2 of a cathode follower 412, which may be a type 5965. The output of the cathode follower raises the potential of plates P1 and P2 of a tube 413 which may be a type 6AL5. This immediately charges a pair of capacitors 414 and 415 to +10 volts from their normal state at −30 volts. The capacity of the condenser 415 is directly connected to the grid G2 of a cathode follower 416. The output of the cathode follower 416 is directly connected to the control line 411 which, therefore, turns on the beam in the selected cathode ray tube. The beam will remain turned on until the capacitor 415 is discharged to −30 volts by suitable means.

To read a dot into the cathode ray tube, the capacitor 415 should be discharged to −30 volts at video sample time. This provides a dot duration of approximately .7 microsecond. The VIDEO SAMPLE signal as seen in the timing chart is applied to terminal 3M-19 in FIG. 46 during every memory bit cycle. The signal VIDEO SAMPLE is a 40 volt pulse, 1.15 microseconds in duration. The signal VIDEO SAMPLE is delivered to the grid G1 of a type 6AS6 tube 417, and also to the grid G1 of a similar tube 418. If a dot is to be written under external control, the terminal 3M-8 will be held at −30 volts by the READ-IN GATE signal. This terminal will be held at +10 volts at all other times. The terminal 3M-8 is connected to a diode 419 of an OR circuit controlling grid G2 of a tube 420 which may be a type 5965. The other branch of the OR circuit connected to a diode 421 is always held at a minus level. This is done by connecting a terminal 3M-12 to a constant −30 volt TEST GATE signal. The right half of the tube 420 is an inverter, so that the raising of its grid G2 to +10 volts maintains its plate P2 at its lower level. The plate P2 is connected through a suitable voltage divider to the grid G2 of the tube 418, maintaining the tube 418 in a cut-off condition, and thereby preventing the signal VIDEO SAMPLE from effecting its output.

However, when reading in a dot as previously stated, the OR circuit consisting of diodes 419 and 421 will be lowered to −30 volts. This raises the plate output at P2 of the tube 420 to its higher level, and correspondingly conditions the grid G2 of the tube 418 so that the positive pulse on the grid G1 of the tube 418 is able to cause the tube 418 to conduct at VIDEO SAMPLE time. The output of plate P of the tube 418 is capacity-coupled to a three-way AND circuit consisting of diodes 422, 423 and 424. The negative pulse from the plate P of the tube 418 resulting from the above mentioned signal VIDEO SAMPLE, therefore, lowers diode 422 of the three-way AND circuit from +10 volts to −30 volts. The output of the AND circuit is correspondingly lowered from +10 volts to −30 volts, and this pulse is transmitted to the cathode C1 of a diode 425 which discharges the capacitor 415 to −30 volts. As previously described, this turns off the beam in the selected cathode ray tube. The above describes the procedure for turning the beam on for a suitable dot duration of approximately .7 microsecond.

If a dash is to be written under external control, the procedure will be varied from the above, in that the READ-IN GATE signal at the terminal 3M-8 will not be present; therefore, the signal VIDEO SAMPLE at the terminal 3M-19 will not be able to effect discharge of the capacitor 415 at the end of that time. In the absence of this discharge by the signal VIDEO SAMPLE the beam will remain on for a longer period of time. Referring to the beam control timing chart (FIG. 47), it will be seen that the signal DASH CLAMP extends for approximately four microseconds following the signal VIDEO SAMPLE and is supplied during every memory cycle. The signal DASH CLAMP is applied to terminal 3M-6 which transmits the signal to the diode 423 of the aforementioned three-way AND circuit comprising the diodes 422, 423 and 424, which effectively discharges the capacitor 415 and thereby turns off the cathode ray beam. At the end of the dash writing time, therefore, the terminal 3M-6 is invariably lowered from +10 volts to −30 volts. If the capacitor 415 has not been previously charged to −30 volts, it will be discharged at this time due to the action of the three-way AND circuit operating through the left diode of tube 425. The branch of the three-way AND circuit connected to the diode 424 never discharges the capacitor 415 during read-in from external sources. This follows due to the fact that the signal VIDEO BLANK impressed on terminal 3M-20 is always at +10 volts during read-in from external sources. The terminal 3M-20, and consequently the signal VIDEO BLANK, is connected to a diode 426 of a two-way OR circuit composed of the diode 426 and a diode 427. The output of this OR circuit is therefore always at +10 volts during external read-in. It, being connected to the grid G1 of the cathode follower 416, maintains the output of the cathode follower 416, connected to diode 424, at +10 volts at all times during external read-in. The operation of writing dots and dashes on the target of the cathode ray tube differs not only in duration of the period during which the beam is turned on, but also requires certain other controls. These controls, defocus-focus and bit sweep, will be described in more detail in connection with the description of the logical circuitry.

*Memory drawer read-out circuits.*—In order to sense any given spot on the face of a cathode ray tube to determine whether this spot contains a dot or a dash, it is necessary to turn the beam on in the customary manner after suitable deflection voltages have been applied to the deflection plates. The beam control circuits are initially the same as those previously described for writing a dot up to the point where the capacitors 414 and 415 are charged from −30 volts to +10 volts to raise one of the selected control lines labeled tube A, tube B, etc. at the upper left portion of FIG. 45. When the beam is turned on, an output signal is detected on the pick-up plates associated with the cathode ray tube in the customary manner used in all Williams electrostatic storage systems. Basically, the signal on the pick-up plate will initially be a positive-going signal if the previously written information on the spot being interrogated was a dash, while it will be initially negative-going if the previously written information was a dot. At the right of FIG. 46, the INPUT signal is derived from the back-up plates associated with the cathode ray tube. This signal is applied to grid G1 of a tube 428 which may be a type 6CB6. The tube 428 is the first stage of a five-stage video amplifier consisting of tubes 428, 429, 430, 431 and 432. In the amplifier the signals are suitably clamped and shaped so that upon arrival of the signal VIDEO SAMPLE, which is of approximately .7 microsecond duration, and which arrives after the beginning of the signal ON PULSE at terminal 3M-10 (FIG. 45), the plate P of the tube 432 will show no change if a dot has been sensed on the face of the cathode ray tube. The condition of the plate P of the tube 432, however, will contain a large negative pulse if a dash is sensed.

Let it be assumed that a dot is sensed. Plate P of the tube 432, which is capacity-coupled to a grid G2 of the tube 417, will permit the signal VIDEO SAMPLE, which is positive-going and which is transmitted to the grid G1 of the tube 417, to cause the tube 417 to conduct. The resulting negative shift at the plate P of the tube 417, which is capacity-coupled to the cathode C2 of the diode 425, will result in the discharge of the capacitor 414, which is thereby dropped to −30 volts. The capacitor 414 is connected to grid G1 of the tube 420, this side of the tube being a cathode follower.

The cathode C1 of the tube 420 is connected to the diode 427 of the two-way OR circuit comprising diodes 426 and 427. The resulting shift to −30 volts at the output of the OR circuit is coupled through the cathode C1 of the cathode follower 416 and to the diode 424 of the three-way AND circuit, comprising diodes 422, 423 and 424. The diode 426 does not effect the operation of the two-way OR circuit, because the signal VIDEO BLANK impressed on terminal 3M-20 is positive only during external read-in cycles.

In the three-way AND circuit consisting of diodes 422, 423 and 424, the diode 422 is normally maintained at +10 volts during read-out operations, because the tube 418 is cut-off. The tube 418 is always cut-off during the read-out operation, because the tube 420 is conducting under control of the signal READ-IN GATE applied to terminal 3M-8. This line is normally at +10 volts except during read-in operations.

In the three-way AND circuit consisting of diodes 422, 423 and 424, the diode 422 is normally maintained at +10 volts during read-out operations, because the tube 418 is cut-off. The tube 418 is always cut-off during read-out operation, because the tube 420 is conducting under control of the signal READ-IN GATE applied to terminal 3M-8. This line is normally at +10 volts except during read-in operations.

The signal DASH CLAMP applied to terminal 3M-6 remains at +10 volts until a later time in the cycle so that the shift of the input to the diode 424 from +10 volts to −30 volts lowers the output of the AND circuit to −30 volts at video sample time if a dot has been sensed on the pick-up plates. This discharges the capacitor 415 through the left side of the diode 425, which in the previously described manner turns off the beam.

The detection of a dot discharges the capacitor 414 at video sample time, lowering the potential on cathode C1 of the cathode follower 420 to −30 volts as previously described to turn the beam off. This same output is connected to a diode 433 of a two-way AND circuit consisting of the diode 433 and a diode 434. Shortly after video sample time, the READ-OUT GATE signal is applied to terminal 3M-16. This signal is a 4.5 micro-second signal occurring just after the fall of the signal VIDEO SAMPLE. The signal READ-OUT GATE, which is a positive-going signal is applied to the diode 434 of the aforementioned two-way AND circuit, and because of the negative condition of diode 433, no change appears at the output of this AND circuit. The AND circuit comprising diodes 433 and 434 is connected to the grid G1 of the cathode follower 412, which in turn controls the grids G2 and G1 respectively of the cathode followers 435 and 436. The cathodes C2 and C1 of the cathode followers 435 and 436, respectively, are connected to terminal 3M-18 on which is impressed the signal DATA. The signal DATA, therefore, remains at −30 volts during the duration of the signal READ-OUT GATE on terminal 3M-16 when a dot is detected at the pick-up plate.

When a dash is detected at the pick-up plate, immediately after the beam is turned on, the output of the plate R in the tube 432 will be a large negative-going signal. This is capacity-coupled to the grid G2 of the tube 417, so that the positive signal VIDEO SAMPLE impressed on the grid G1 of the tube 417 is unable to cause the tube 417 to conduct. The resulting lack of signal on plate P of the tube 417 will fail to discharge the capacitor 414 by way of the diode 425 in the manner described when a dot is detected. Since the capacitor 414 remains at +10 volts, the cathode C1 of the cathode follower 420 will remain at +10 volts. As previously described, the cathode C1 of the cathode follower 420 is connected to the diode 433 of the two-way AND circuit comprising diode 433 and diode 434, so that when the signal READ-OUT GATE is applied to terminal 3M–16 shortly after video sample time, the output of this AND circuit is raised to +10 volts for the duration of the signal READ-OUT GATE. The output of the AND circuit comprising diodes 433 and 434 is applied to the cathode followers 412, 435 and 436, raising the signal DATA LINE at terminal 3M–18 from —30 volts to +10 volts for the duration of the signal READ-OUT GATE. Concurrently, the cathode C1 of the cathode follower 420 is connected to the diode 427 of the two-way OR circuit consisting of diodes 426 and 427, the output of which raises the grid G1 of the cathode follower 416 and its corresponding cathode output C1, holding the diode 424 of the three-way AND circut at +10 volts. In the previously described manner, this prevents discharge of the capacitor 415, through the left diode of the tube 425 by the output of the three-way AND circuit until the negative-going signal DASH CLAMP is applied to the terminal 3M–6 and to the diode 423. In the previously described manner, this turns the beam off after the dash duration.

*Regeneration circuit.*—In the description of the read-out operation, it was shown that regeneration takes place automatically during any read-out cycle because of the manner in which the beam is turned off under control of the PICK-UP PLATE signal applied to the tube 428. When regeneration is desired without generating the signal DATA at the terminal 3M–18, the same procedure is followed except that no READ-OUT GATE signal is impressed on terminal 3M–16, so that the terminal 3M–18 remains at a constant level of —30 volts during regeneration. When reading new information into a cathode ray tube from an external source as previously described, the regeneration procedure is rendered ineffective, even though no signals are being picked up on the pick-up plates, because the signal VIDEO BLANK applied to terminal 3M–20 is maintained at +10 volts at all times during the read-in operation. This makes the output of the OR circuit consist of diodes 426 and 427 +10 volts, thus preventing the discharge of the capacitor 414 from affecting the beam grid control.

*Memory timing and control circuits.*—The timing chart (FIG. 47) shows the duration and relationship of the various control pulses required for operation of the memory drawers. For the most part, these impulses are provided by circuitry shown in FIG. 59. A basic feature of the memory control circuits used in the card-tape-card converter is the fact that no constantly running clock is employed. This procedure has been adopted because of the random timing at which characters must be read into memory when information is received from the tape unit. When reading information from tape, therefore, each memory bit cycle is initiated at a random time depending on the arrival of a character from tape. During other modes of operation, such as during the process of regeneration or the process of reading out from memory to the punch, as well as during the reading of information into memory from the card brushes, a constant memory period of fourteen microseconds per bit is utilized. This constant period is not, however, provided by a constantly running clock, but is available in the memory timing chain itself when desired.

When the line BT in FIG. 59 is raised from —30 volts to +10 volts, a memory bit cycle is initiated. If this line is held constantly at +10 volts, recurrent memory cycles will take place every fourteen microseconds, so long as the +10 volt condition is maintained. These recurrent memory cycles are used during every mode of operation except when reading into memory from tape.

Assuming any mode of operation other than that of reading into memory from tape, raising the line BT to +10 volts raises the output of an AND circuit 437 to +10 volts. The output of the AND circuit 437 is double inverted in inverters 438 and 439 to establish good signal levels, and the output of the inverter 439 is utilized to trigger a single shot multivibrator 440. The output of the single shot multivibrator 440 is a pulse of eight microseconds' duration. The fall of the eight microsecond pulse emitted from the single shot multivibrator 440 is transmitted through a cathode follower 441, and is inverted in an inverter 442 to provide a triggering pulse which will fire a one microsecond single shot multivibrator 443. The one microsecond delay provided by the single shot multivibrator 443 is necessary to allow switching stabilization during the operation of reading in from tape. The fall of the one microsecond pulse emitted by the single shot multivibrator 443 is transmitted by way of a cathode follower 444, and is inverted in an inverter 445, the inverted pulse being utilized to fire a five microsecond single shot multivibrator 446. The rise of the five microsecond pulse emitted from the single shot multivibrator is transmitted by way of a cathode follower 447 and also fires a one microsecond single shot multivibrator 448. The positive five microsecond pulse emitted by the single shot multivibrator 446 is also utilized as the DASH CLAMP pulse.

The output of the cathode follower 447 also fires a single shot multivibrator 449 which generates a .7 microsecond pulse, which is the signal ON. The single shot multivibrator 448 furnishes a one microsecond delay which, upon the fall of its pulse, transmits a signal through a cathode follower 450 and an inverter 451 to fire a single shot multivibrator 452. The single shot multivibrator 452 provides a 4.5 microsecond pulse which is transmitted by way of a cathode follower 453 to an AND circuit 454, where it provides a pulse for the signal READ-OUT GATE. Likewise, by way of the cathode follower 453, inverters 455 and 456 and cathode follower 457, the single shot multivibrator 452 provides the defocus-focus pulse. The single shot multivibrator 452 also provides the BIT SWEEP signal by way of cathode follower 458, the RING STEP signal by way of cathode follower 459 and the RUN-AROUND signal by way of the inverter 455.

The DASH CLAMP pulse must be down before the end of the 4.5 microsecond pulse. The fall of the .7 microsecond pulse emitted from the single shot multivibrator 449 is transmitted by way of a cathode follower 460, and is inverted in an inverter 461 which transmits the inverted pulse to a unit 462 which furnishes the .15 microsecond VIDEO SAMPLE signal. The output of the 4.5 microsecond pulse is gated at the AND circuit 454 by the signal READ-OUT GATE. The output of the AND circuit 454 is double inverted in inverters 463 and 464 and it is powered in a power cathode follower 465 to be applied to the terminals 3M–16 of the memory drawers, as described, only when it is desired to read-out of memory.

The above circuitry, therefore, generates the necessary control signals used during each memory cycle. The remaining control circuitry in FIG. 59 is used primarily to provide the basic fourteen microsecond period of operation when the memory is being used in a recurrent fashion, as is the case at all times except when reading-in from tape.

The negative-going 4.5 microsecond pulse emitted from the inverter 455 is applied to the AND circuit 437. While the line BT is held at +10 volts, the end of the signal RUN-AROUND will trigger the eight microsecond single shot multivibrator 440 to start a new memory cycle. This action continues until the pulse on line BT drops to —30 volts. The line BT is lowered to —30 volts only during general reset, during short periods while entering or leaving the row scan operations, and primarily while reading-in from tape.

During a tape reading cycle, a memory cycle is started upon arrival of a character from tape. At the proper time, after reception of a character from tape, a one microsecond positive pulse will appear on the line BM, and this is applied to a cathode follower 466. The cathode follower 466 in conjunction with the cathode follower 441 comprises a cathode follower OR circuit. The fall of the one microsecond pulse, therefore, triggers the one microsecond single shot multivibrator 443, and a memory cycle is thereby started. During this one memory cycle, one character is read into memory.

*Regeneration.*—After a general reset, the converter will normally cause the memory to regenerate. This regeneration continues at all times except when new information is being stored in memory or when information is being read out of memory. The regeneration process is under control of the regeneration stop trigger 467 (FIG. 48). When the regeneration stop trigger is conducting on the right side, indicated by an X, as it normally is following a general resetting of the triggers, the output at its left side is at its higher level so that +10 volts are applied by an associated cathode follower 468 to a three-way OR circuit 469. The output of the three-way OR circuit 469 is the BT pulse, which, previously described, causes the memory timing circuit to go through recurrent cycles as long as the pulse is held up at +10 volts. The holding of one of the inputs of the OR circuit 469 at +10 volts by the regeneration stop trigger causes the output line BT to remain at +10 volts and results in continuous operation of the memory circuit at the rate of one bit cycle every fourteen microseconds.

When the machine is turned on, the first operation after the filaments and the like have heated up, should be a general resetting of the control circuits. This is accomplished by depressing the general reset button on the operator's panel. In FIG. 70 of the wiring diagram, closure of the general reset switch contact energizes a relay A14. In FIG. 72 a circuit is then completed from the +10 volt line through the normally open but now closed A14–2 contact to a line EN which has normally been maintained at —30 volts. When the line EN is raised to +10 volts, it causes all of the pull-over inverters in FIG. 62 to conduct. The pulse on the line EN entering FIG. 62 is passed through inverter-cathode followers 470 and 471 causing a trigger 472 to conduct on its right side, and the pulse thereof emitted from its left side is transmitted by way of a cathode follower 473 to the pull-over inverters at the right of the figure. The same pulse is passed to a two-way OR circuit 474 and by way of cathode followers to the pull-over inverters at the center of the figure. Likewise, the pulse passes by way of a three-way OR circuit 475, and by way of cathode followers to the pull-over inverters at the left of the figure. The pull-over inverters are connected in a conventional fashion to the various triggers in the machine to force the triggers to conduct in the desired initial condition. The triggers illustrated in FIG. 62 are conventionally shown, since these triggers are distributed throughout the system and the conventional grouping of the same in these figures is employed to simplify the block diagram.

Figure 52:
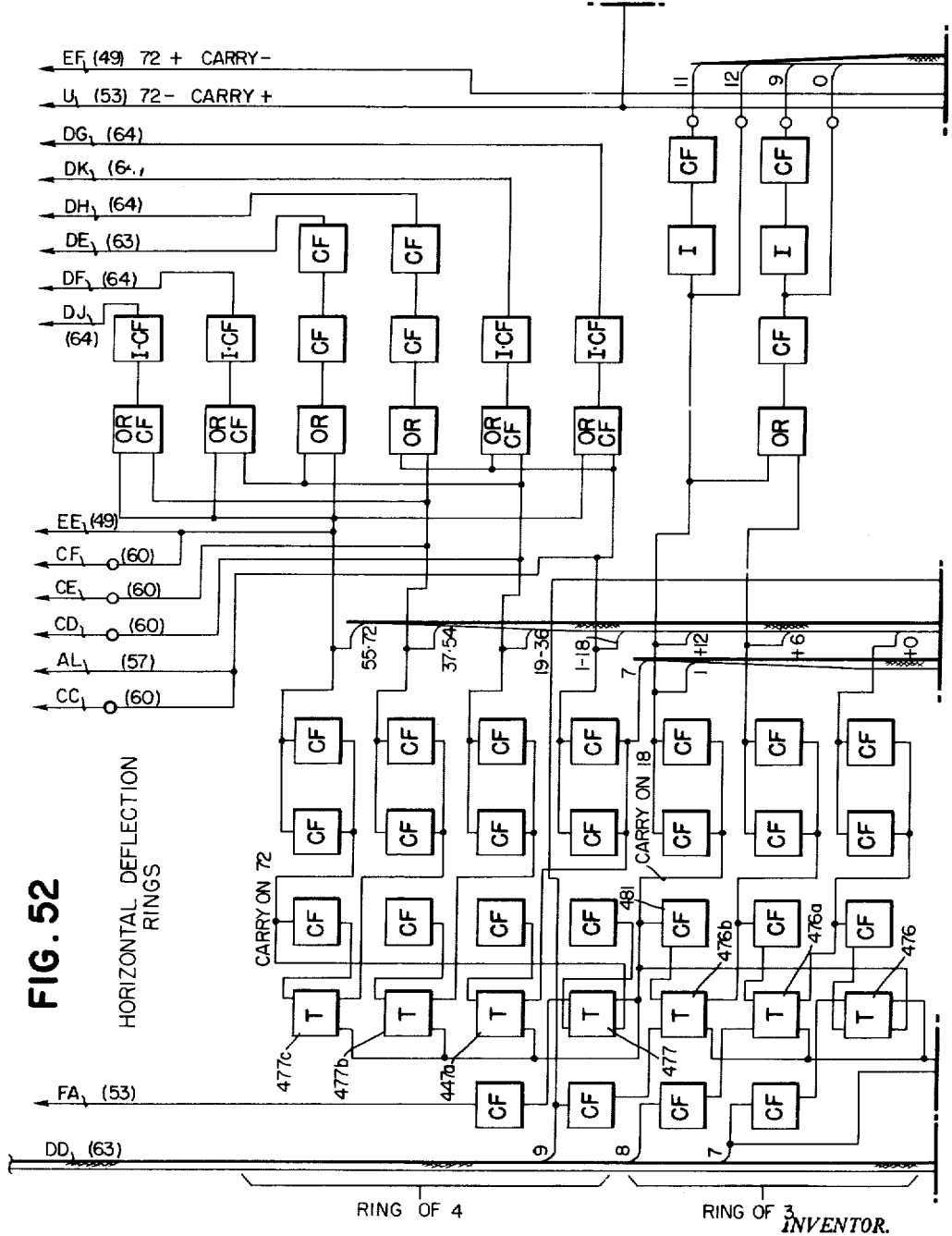
Figure 53:
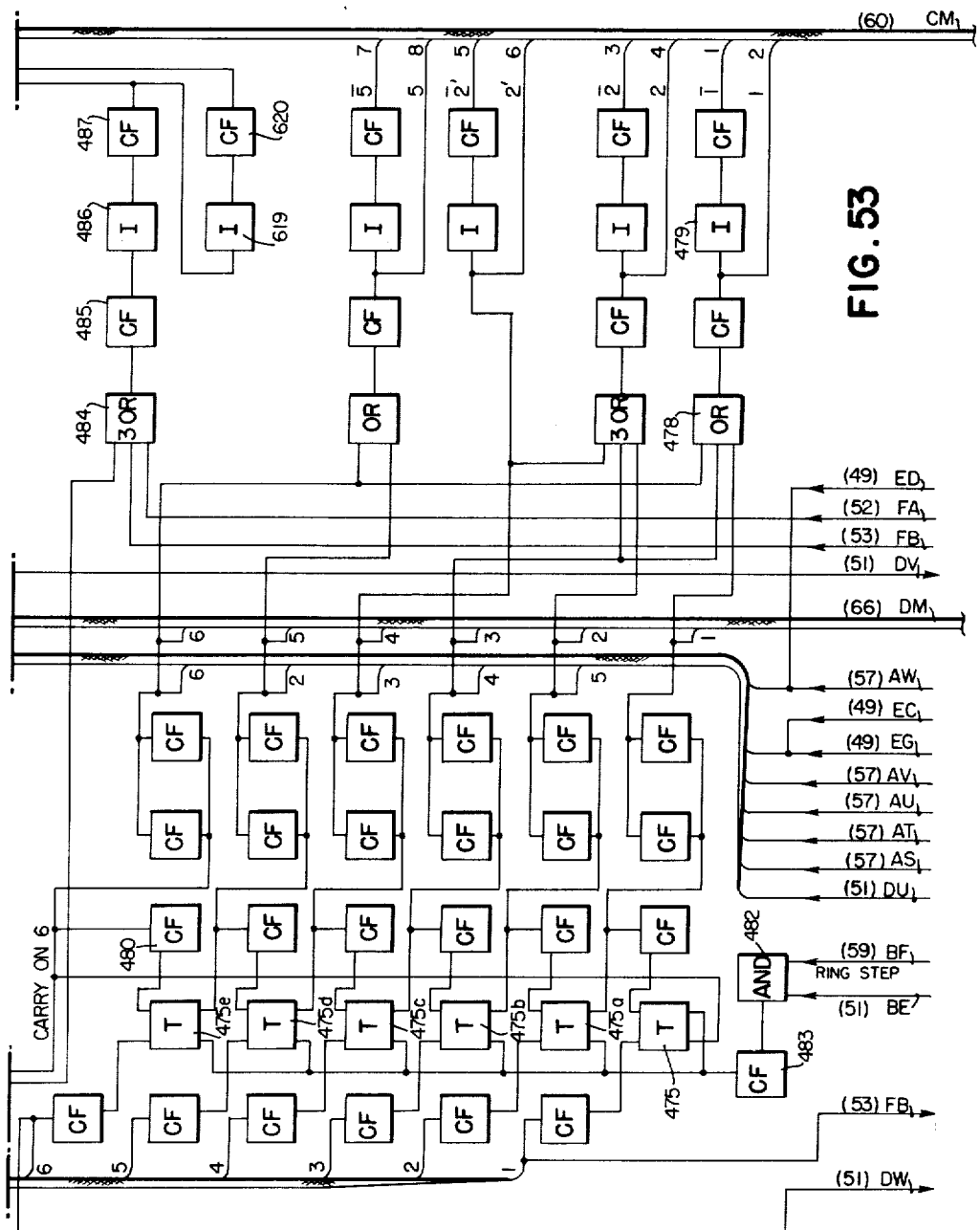

*Deflection control circuits.*—As stated in the broad functional description, the memory consists of four memory drawers. Each drawer stores either a $\bar{1}, \bar{2}, \bar{4}$ or $\bar{8}$ bit. The upper or #1 drawer, for example, stores the $\bar{1}$ bits of all of the 1800 possible characters of a sub-block of information. The 1800 bits of storage in each drawer are divided into four rasters on the four cathode ray tubes, each raster consisting of 18 spots horizontally and 25 spots vertically. The sequence used in regenerating the memory, as well as that used while reading into memory, consists of first unblanking the left tube only and writing in the left spot of the top row. Horizontal deflection is then stepped one space at a time so that bits are successively read into the 18 positions of the top row of the left tube from left to right. Horizontal deflection is then returned to the extreme left, and the second cathode ray tube only is unblanked and the 18 positions of the top row of this tube are then scanned in succession from left to right. The procedure is repeated for the third tube and the fourth tube until the first 72 bits have been stored in the top row of the four cathode ray tubes. The next 72 bits are stored in a similar fashion, starting with the left cathode ray tube but with vertical deflection shifted downwardly one space so that the bits are stored in the second row from the top. In this fashion the entire raster is filled until the 1800th character is stored in the right hand position of the 25th row from the top in the cathode ray tube at the right. The horizontal deflection is under control, therefore, of a ring which counts to 18 four times. This ring is shown in FIGS. 52 and 53.

The counting rings herein are conventional Overbeck United States rings, such as disclosed in the Overbeck Patent No. 2,404,918. The six triggers 475, 475a, 475b, 475c, 475d and 475e in FIG. 53 constitute a closed ring of 6. The carry pulse from this ring is transferred to a group of three triggers 476, 476a and 476b, which form a closed ring capable of counting to 3, advancing once every six memory bit cycles. The carry pulse from the ring of 3 which occurs once every 18 horizontal steps, advances the triggers 477, 477a, 477b and 477c (FIG. 52). The four triggers 477–477c constitute a closed ring capable of counting to 4. The final trigger of this group of four triggers, therefore, carries once in each 72 horizontal deflection steps.

When the rings have been reset by a general resetting operation as previously described, the output at the left of triggers 475, 476 and 477 will be at a high level. The output from the left side of trigger 475 will raise the output of the cathode followers associated therewith to +10 volts, and this pulse is applied as one input to an OR circuit 478 (FIG. 53). This serves to raise the one increment line connected to the horizontal deflection circuit (FIG. 60) to +10 volts. At the same time, by reason of the fact that the pulse from the OR circuit 478, by way of its associated cathode follower, is passed through an inverter 479, the line $\bar{1}$ connected to the horizontal deflection circuit (FIG. 60) is lowered to —30 volts. Since the remaining triggers 475a–475e of the first group of 6 are set with corresponding cathode followers at the lower level, it will be found that the $\bar{2}, \bar{2}'$, and 5 deflection control lines are all held at +10 volts, while the 2, 2' and 5 lines are held at —30 volts. Triggers 476a and 476b of the ring of 3 are both conditioned so that the $\bar{6}$ and $\bar{6}'$ lines are held at +10 volts. In the horizontal deflection circuits of FIG. 60 this combination of levels results in locating the horizontal deflection in position #1, which will direct the beam to its extreme left position.

As the ring of 6, comprising triggers 475–475e, advances one step at a time, the first trigger 475 is turned off and the second trigger 475a is turned on. In the next step, the trigger 475a is turned off and the third trigger 475b only is turned on, etc. In each case the trigger outputs are converted by the OR circuitry fed thereby (FIG. 53), in a straight forward manner into the corresponding combination of 1, 2 and 5 increments to deflect the beam up to 6 places. After 6 steps, the ring of 6 returns to trigger 475, but the resulting downward-going pulse on the output of a cathode follower 480 which is transmitted to the trigger 475 of the ring of 3, steps the ring of 3 from the first trigger 476 to the second trigger 476a. This causes the 6th increment line connected to terminal 1F–3 (see FIG. 78) of the horizontal deflection circuit to rise to +10 volts. This additional deflection of six spaces added to the deflection of one available from the lower ring results in a total deflection of seven spaces. In this manner deflection takes place from 7 to 12 horizontal steps.

Upon the second carry pulse from the ring of 6, the ring of 3 steps into its third position, i.e. its trigger 476b will be transferred and an additional deflection of 6 increments is added to the 6 previously established, so that the beam is positioned in locations 13 through 18 as the first ring of 6 is advanced.

The ring of 4 in FIG. 52 controls output lines CC, CD, EE and CF, connected to the terminals 3M–15, 3M–13, 3M–11 and 3M–9, respectively, in FIG. 45 of the four memory drawers, which select the appropriate one of the four cathode ray tubes to be unblanked. During the first 18 steps, the lowest trigger 477 of the group of 4 (FIG. 52) is on, so that the left hand tube is unblanked by the +10 volt condition of line CC. The downward-going pulse from a cathode follower 481 of the ring of 3, after the 18th character, steps the ring of 4 so that the first trigger 477 goes off and the second trigger 477a goes on. This returns line CC to −30 volts and raises line CD to +10 volts, thereby unblanking the second cathode ray tube only.

Figure 54:
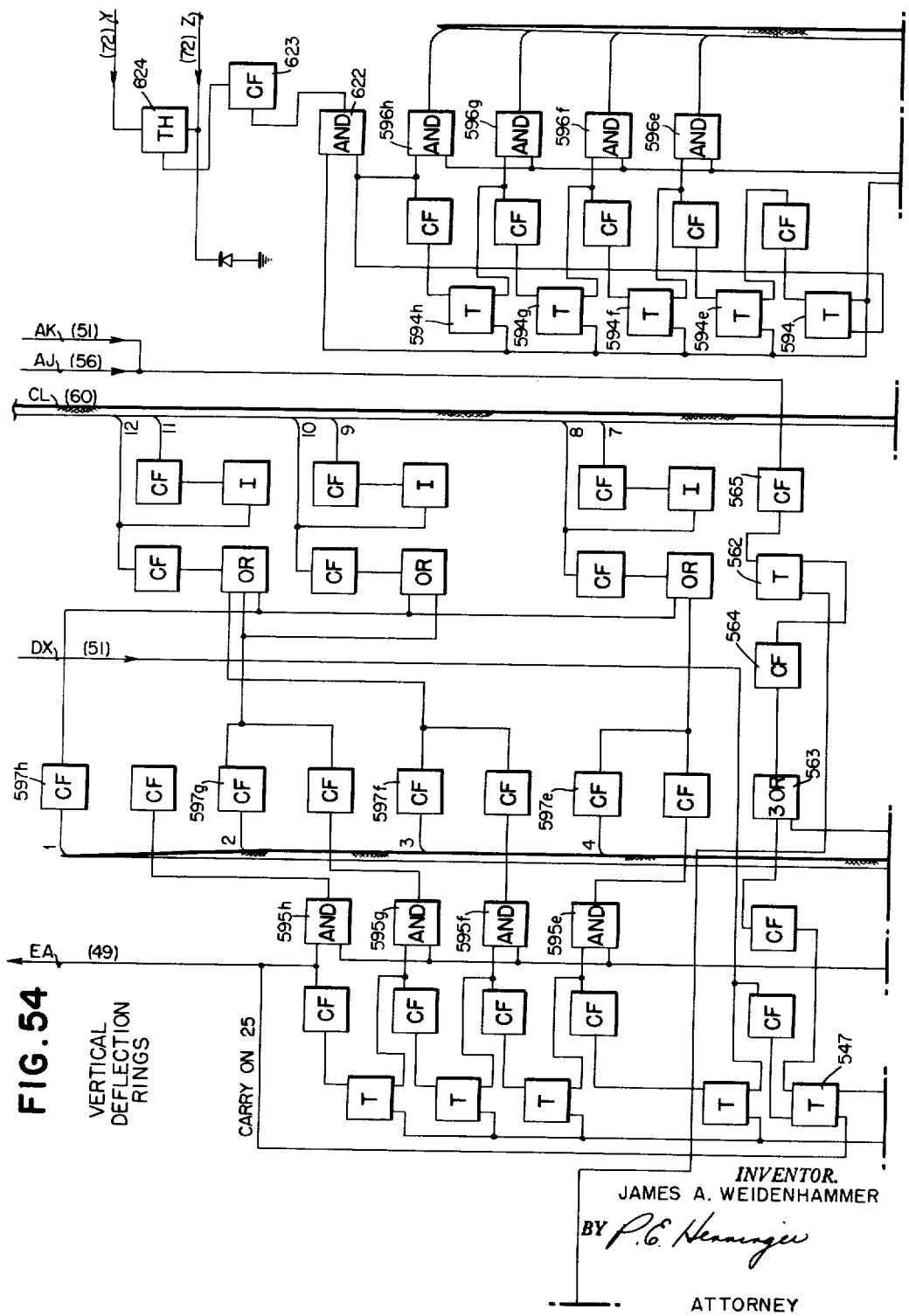
Figure 55:
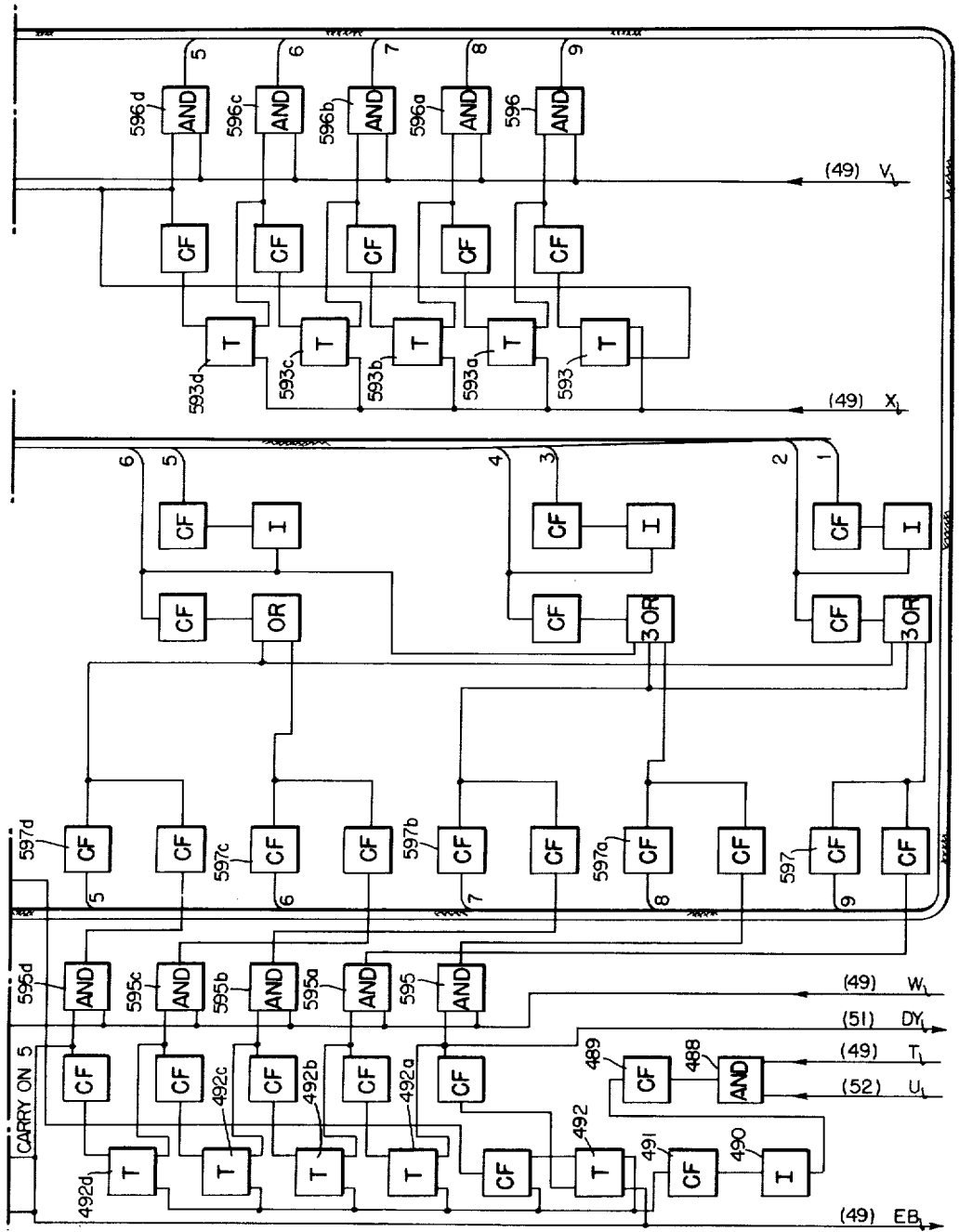

Vertical deflection is accomplished by a ring of 25 shown in FIGS. 54 and 55. This ring consists of two closed rings of five triggers each, the second ring being advanced in the customary way by the carry of the first ring after each five steps. The condition of the triggers comprising the ring of 25 is modified by switch circuits similar to those used for the horizontal deflection rings to furnish inputs to the vertical deflection circuit of FIG. 60. The count in the ring is converted into increments of 1, 2, 2′, 5, 5′ and 10.

The horizontal deflection and the vertical deflection circuits are shown in the general block diagram in FIG. 60. The internal circuitry of the logical blocks of FIG. 60 is shown in FIG. 78.

It will be noted by reference to FIG. 78 that the circuit therein consists of cathode-coupled switches, the grids of which are connected to the various increment input lines which are derived from the horizontal and vertical deflection rings. The switches act as current adding devices which produce a voltage drop proportional to the sum of the selected increments.

Each deflection circuit has complementary outputs on terminals 4F–6 and 4F–2 (FIG. 78) which provide the desired push-pull voltages to be applied to the deflection plates of the cathode ray tubes. The cathode follower logical blocks shown in FIG. 60 are special cathode followers, as shown in the wiring diagram of FIG. 78, controlled by the output of the deflection circuit to provide the driving power for the deflection plates of the cathode ray tubes. All the corresponding plates of the various cathode ray tubes are connected in parallel, the necessary tube selection being accomplished by unblanking the beam.

Stepping of the horizontal ring normally occurs during every memory bit cycle in the following manner. The end of the pulse from the 4.5 single shot multivibrator 452 (FIG. 59) is shortly after the end of the cathode ray beam turn-on period for a dash. It is then safe to deflect the beam at any time thereafter. The 4.5 microsecond positive-going pulse is, therefore, transmitted by way of the cathode followers 453 and 459, as the signal RING STEP. This signal is transmitted to an AND circuit 482 (FIG. 53). If the other input to the AND circuit 482 is +10 volts, a similar 4.5 microsecond positive-going pulse is available at the output of the AND circuit 482. This pulse is transmitted via a cathode follower 483, and is connected in common to the six triggers 475–475e of the first six stage ring, so that the fall of the 4.5 microsecond pulse causes advancing of the ring by one position. The line BE which is the second input to the AND circuit 482 is used to suppress ring stepping under certain conditions, which will be later described in connection with the sensing of a 13 at the beginning of a block.

When the horizontal ring has stepped 72 times it returns to its initial condition with the first triggers only of the 6 ring, the 3 ring and the 4 ring (FIGS. 52 and 53) on. When the ring is in its #1 position of 72, the output of a three-way OR circuit 484 (FIG. 53) is transmitted through a cathode follower 485 and is inverted from −30 volts to +30 volts in an inverter 486, this pulse being transmitted by way of a cathode follower 487 as the signal 72 CARRY +. The signal 72 CARRY + is transmitted to an AND circuit 488 in FIG. 55. The other input to the AND circuit 488 is normally at +10 volts except under special conditions, later to be described, so that the output corresponds to the 72 CARRY + input signal under normal conditions. The output of the AND circuit 488 is passed via a cathode follower 489 to an inverter 490, the output of which is passed via a cathode follower 491 to the first five stages 492, 492a, 492b, 492c and 492d of the trigger ring of the ring of 25 to cause an advance once for every complete cycle of the horizontal ring.

*Deflection circuits.*—The deflection control circuits are essentially cascode amplifiers, where the lower tube is represented by a plurality of current adder circuits. An amplifier of this nature is discussed at page 440, vol. 18, Radiation Laboratory Series, McGraw-Hill, 1948. The plurality of current adder circuits are arranged such that a particular current adder will give a designated deflection weight. A deflection weight is defined as a unit of deflection. In other words, to move the beam from position #1 to position #2 requires a deflection weight of −1−, whereas to move the beam from position #0 to #5 requires a deflection weight of 5.

In the circuit of FIG. 78, which for purpose of example may be assumed to control the horizontal deflection of the cathode ray beams, the several deflection increment units will provide different deflection weights which can be added to provide the necessary incremental movement of the beam. Thus, for the horizontal deflection of the cathode ray beam in the present embodiment, the triodes V2 and V3 will each provide deflection weight of −6−. The triode V4 will provide a deflection weight of −5−, the triode V5L—V5R will provide a deflection weight of −1−, and the triodes V6 and V7 will each provide deflection weights of −2−. As to be pointed out hereinafter, the amount of deflection provided by each of these units may be regulated by the size of the cathode resistor, and for the purpose of vertical deflection these resistors are varied in order to provide −5− deflection weights in triodes V2 and V4, −10− deflection weights in triode V3, −1− deflection weight in triode V5L—V5R and −2− deflection weights in each of triodes V6 and V7

In FIG. 78 the circuit contained within the rectangle 10 is typical of the current adders utilized in the deflection control circuit. The input terminals 1F–14 and 1F–15 are connected to an external circuit (the deflection ring) which supplies the adder pulses. Normally one of the input terminals will be up and the other input terminal will be down. An up potential is approximately +5 volts and a down potential is approximately −30 volts. Consider, for example, that terminal 1F–14 is up and terminal 1F–15 is down. Since terminal 1F–14 is up, both of the inputs of the AND circuit within the dotted line 30 are up so as to cause the control grid of the triode V5L to be up. Since the control grid of V5L is up, this tube will be fully conductive, and thereby develop a potential across the cathode resistor R45.

It was stated in the present example that terminal 1F–15 is down so as to cause one of the inputs of the AND circuit within the dotted line 16 to be down. The anode of diode D15 of AND circuit 16 is up since it is connected to ground. However, the juncture between the cathode and diode D16 and D15 and the pull-up resistor R34 will be down, thereby rendering tube V5R non-conductive due to the potential developed to cross the cathode resistor R45.

Thus, when the input terminal 1F–14 is up and the terminal 1F–15 is down, the triode V5L will be conductive and the triode V5R will be non-conductive. Since the grid of the tube V5L is approximately at ground potential, the cathode of this tube will also be approximately at ground potential, causing 150 volts to appear across the cathode resistor R45, i.e. between the cathode of tube V5L and −150 volt supply. Since 150 volts are applied across the cathode resistor R45, which is 150K, a current of one milliampere will flow through the resistor R45 and through the triode V5L to the conductor 20. It should be noted at this point that the anodes of triodes V5L and V5R are at the same potential and remain at the same potential regardless of whether a particular triode is conductive or non-conductive.

The one milliampere of current flowing through the triode V5L and the conductor 20 flows through a triode V12L and through the resistor connected as a plate load to the +325 volt supply.

Consider that the circuit is being used as a horizontal deflection circuit whereby the anode of triode V12L is connected through a resistor R53 in series with a resistor R58 to the terminal 2F–17 which will be connected to +325 volts, the anode of triode V12R will be connected through a resistor R54 in series with the resistor R58 to the terminal 2F–17.

It should be understood that if the circuit is being utilized as a vertical deflection circuit, the anodes of triodes V12L and V12R will be respectively connected through resistors R56 and R57 which are in series with resistor R59 to terminal 2F–19. In this situation, terminal 2F–19 will be connected to +325 volts.

It should also be noted that the anode of triode V5R of the current adder 10 is connected through a conductor 23 to the cathode of the triode V12R. Thus, it now becomes apparent that the triodes V12L and V12R serve respectively as the plate loads of triodes V5L and V5R. It should be pointed out that triodes V5L and V12L serve as a first cascode amplifier, while the triode V5R in conjunction with triode V12R serves as a second cascode amplifier. The current adder 10 causes one milliampere of current to flow through either triodes V12L or V12R depending on the status of the input terminals 1F–14 and 1F–15.

The deflection plates of a cathode ray tube will be connected to the anodes of triodes V12L and V12R.

In the example described above wherein input terminal 1F–14 is up and input terminal 1F–15 is down so that the current adder 10 causes one milliampere of current to flow through conductor 20, the current flowing through tube V12L causes a voltage drop to appear across the anode resistor connected between the anode of triode V12L and the +325 volt terminal. Assuming that all of the remaining current adders are contributing no current to conductor 23, no current will flow through tube V12R. Thus, the anode of tube V12R will be at approximately +325 volts. It is now apparent that if the deflection plates of a cathode ray tube are connected as illustrated for tube 24, the right deflection plate will be at a more positive potential than the left plate, due to the current flowing through the triode V12L and its associated plate load resistor.

If all of the current adders shown in FIG. 75 are operated such that the right half thereof is conducting, all of the current will flow through conductor 23 and thus through triode V12R. Under this condition, the anode of V12R and thus the right deflection plate of the cathode ray tube 24 will be at a negative potential with respect to its left plate. Thus, the beam of the cathode ray tube 24 will be located close to the left deflection plate.

Having defined a deflection weight as equivalent to a milliampere of current, the deflection weight which a particular current adder of FIG. 78 will contribute is dependent upon the value of the cathode resistor. The increment of current produced by the cathode resistor will be in inverse proportion to the value of the resistor. The following table indicates the commonly used deflection weights and the value of the cathode resistor which must be used to produce the corresponding weight.

Cathode resistor: Weight
- 300K ½
- 150K 1
- 75K 2
- 30K 5
- 25K 6
- 15K 10
- 150K in parallel with 15K 11

*Dash deflection circuit.*—During a time when a bit sweep or dash is not desired, the input terminal 3F–19 of the dash deflection circuit must be up. When terminal 3F–19 is up, the anodes of a pair of diodes D25 and D26 will be up, thereby causing coincidence to occur within the AND circuit within the dotted line 31, so that the grid of tube V11 will be up. Since tube V11 is rendered fully conductive, a potential will be developed across the cathode resistor R55 which charges capacitors C1 and C2 to approximately ground potential. Thus, capacitors C1 and C2 are fully charged. The capacitor C2 is variable to permit an adjustment on the time duration of the bit sweep. The fact that the cathode of tube V11 is at or near a ground potential, tube V9R will be conducting an amount of current similar to the value passing through triode V9L. Thus, it can be stated that since triodes V9L and V9R are contributing the same values of current to the tubes V12L and V12R, the position of the beam of the cathode ray tube will not be affected by the output of tubes V9L and V9R.

Consider now that the time has arrived when it is desired to cause an incremental deflection of the beam of the cathode ray tube to cause a dash to be written. At this time the input terminal 3F–19 of the dash deflection generator is caused to go down, so that the juncture of the cathodes of the diodes D25 and D26 will go down. Accordingly, tube V11 is rendered nonconductive whereby the capacitors C1 and C2 are permitted to charge to −150 volts through the resistor R55. In other words, since the tube V11 is cut off, it no longer requires that capacitors C1 and C2 have approximately ground potential supplied to their upper plates. Since the potential appearing on the upper plates of capacitors C1 and C2 is approaching a negative value, the triode V9R will begin to conduct less current, thereby causing the voltage appearing across the cathode resistor R39 to become smaller. Due to the smaller bias voltage appearing across resistance R39 triode V9L will begin to conduct a slightly greater amount of current. Since the triode V9L is now contributing more current through tube V12L the potential at the anode of tube V12L will be decreased slightly, thereby causing the left hand plate of the cathode ray tube 24 to be slightly negative with respect to the right hand plate. Accordingly, the beam of the tube will be deflected to the right, that is towards the right plate of the cathode ray tube 24.

At the time that the dash or incremental deflection is to be generated external circuitry must cause the terminal 3F–19 of the dash deflection circuit to go up, thereby rendering the AND circuit 31 operative, which in turn renders the inverter V11 fully conductive. The external circuits controlling the dash deflection circuit, and consequently dash deflection, are energized for a period of approximately 3.3 microseconds for the writing of a dash.

*Raster shift.*—The dual triode V8 permits the raster appearing on the face of a cathode ray tube to be shifted in a horizontal or vertical direction. If the tube V8 is present in a horizontal deflection circuit, it will permit the operator to shift the raster in a horizontal direction. The same tube in a vertical deflection circuit serves a similar function in a vertical direction. The grid of the half V8R of triode V8 is connected through a parasitic suppressing resistor R17 to ground, so that half will normally conduct approximately one milliampere of current. If the grid of the side V8L is connected to ground, this side will also conduct approximately one milliampere of current. If the position of the raster on the face of the cathode ray tube is such that it is desired to move it slightly to the right, a potential slightly above ground must be applied to the input terminal 3F–10 which is connected to the grid of triode V8L. Accordingly, triode V8L will conduct a current slightly greater than one milliampere, thereby developing a slightly greater voltage across the cathode resistor. This in turn causes the triode V8R to conduct a current slightly less than one milliampere. The additional current flowing through triode V8L flows through triode V12L, so that the potential at the anode thereof is caused to decrease slightly. The decreased current flowing through tube V8R flows through V12L, so that the anode thereof is caused to rise slightly. Accordingly, since the right hand deflection plate of the cathode ray tube 24 is now slightly more positive than the left hand plate, the entire raster will be shifted slightly to the right.

*Tape-to-card operation—reading tape record into memory.*—To operate as a tape-to-card converter, the mode of operation switch (FIG. 70) is closed to the tape-card terminal. This energizes the tape-card relay 17a. The tape unit is loaded with a reel of tape containing the information to be punched into a file of cards and blank cards are placed in the blank hopper of the reproducing punch. Depression of the start key (FIG. 70) on the operator's panel immediately causes the tape unit to start. Tape is then read until a good record is detected and stored in memory, all previous extraneous information read from tape being ignored. Continued or repeated depression of the start key causes the punch to feed cards from the punch hopper until a card arrives in punching position at the punch die. After a good record is available in memory and a blank card is in punching position in the punch die, the punch will perforate the card under control of the memory.

Depression of the start key (FIG. 70) energizes the start relay A13. When the relay A13 is energized, the contacts A13–1 (FIG. 70) are transferred, thereby completing a circuit by way of line C to a key trigger 493 (FIG. 49). The consequent setting of the key trigger 493 raises its output to +10 volts. This positive-going pulse is inverted by an OR inverter 494 and causes the setting of the tape run trigger 495. The output of the tape run trigger 495, when transferred, is +10 volts, which is transmitted by way of an OR circuit 496 to an OR circuit 497, and from thence the +10 volt pulse is transmitted to an OR inverter 498 (FIG. 48). The resulting negative shift transfers the previously mentioned regeneration stop trigger 467, thereby terminating memory regeneration in the manner previously described. The setting of the regeneration stop trigger 467 places a +10 volt pulse on its right hand output. This pulse effectively starts a 20 microsecond single shot multivibrator 499. The single short multivibrator 499 provides a sufficient delay to insure that the memory cycle during which regeneration is stopped can be fully completed, owing to the random time at which the TAPE START signal may be received. The single shot multivibrator 499 produces a positive-going twenty microsecond pulse at its output terminal, which is transmitted by a cathode follower 500 and is inverted in an inverter 501, the inverted pulse from the inverter 501 being utilized to start a three microsecond single shot multivibrator 502 at the termination of the twenty microsecond delay period. The resulting three microsecond positive-going pulse at the output of the single shot multivibrator 502 is transmitted via a cathode follower 503 as the signal RING RESET on line F. The line F carrying the signal RING RESET is a second input to the three-way OR circuit 475 (FIG. 62).

The resulting three microsecond positive-going pulse is, therefore, transmitted to the several pull-over inverters which reset the triggers comprising the vertical and horizontal deflection rings. In this manner the deflection circuits are returned to the #1 position in readiness for storage of the first tape character.

In FIG. 49 transfer of the tape run trigger 495 also results in the transmission of a positive-going pulse via OR circuits 496 and 497 to a two-way AND circuit 504 (FIG. 48). The other input of the AND circuit 504 is maintained at a positive level during tape-to-card operations. The resulting +10 volt level at the output of the AND circuit 504 is transmitted via a cathode follower 505 and the line BU as the signal TAPE READ-IN GATE. This signal is transmitted to AND circuits 542, etc. in FIG. 50, the function of which will be described at a later time. At the same time the +10 volt signal at the output of the cathode follower 505 (FIG. 48) is transmitted to a three-way OR circuit 506. The ouput signal from the three-way OR circuit 506 is double inverted in inverters 507 and 508 to provide a +10 volt signal on line BS connected to the output of the inverter 508 and a −30 volt level on the line BX connected to the output of the inverter 507. The +10 volt level pulse on line BS is transmitted to FIG. 59, where it is connected to terminals 3M–20 (FIG. 46) of the four cathode ray tube memory units. The pulse on the line BS is the signal VIDEO BLANK, previously referred to during the description of the memory circuits of FIGS. 45 and 46. It will be recalled that a +10 volt level at the terminal 3M–20 (FIG. 46) provides for external read-in of information into memory.

The −30 volt pulse on line BX (FIG. 48) is transmitted to the circuits of FIG. 50 as the signal MINUS ON VIDEO BLANK. In FIG. 50 the line BX is connected as one input to each of four three-way OR circuits 510, 511, 512 and 513. If it is assumed that the remaining inputs of the three-way OR circuits are also at −30 volts, it follows that the lines BY, BZ, CA and CB will be set at −30 volts also.

In FIG. 59, it will be seen that the lines BY, BZ, CA and CB carry the signals R.I. GATE $\bar{1}$, R.I. GATE $\bar{2}$, R.I GATE $\bar{8}$ and R.I. GATE $\bar{4}$, respectively. These lines, therefore, provide the read-in gate for the first four memory drawers and are connected to terminals 3M–8 of the corresponding drawer (FIG. 46).

It has been described heretofore during the discussion of the memory circuits that a negative condition of the read-in gate terminal results in the entry of dots into the memory tube. When a tape character is read, therefore, dots are normally stored in memory where the read-in gate lines BY, BZ, CA and CB remain at −30 volts. A dash is stored in a memory drawer for a given character when the output of the corresponding three-way OR circuits 510 through 513 (FIG. 50) is raised to +10 volts during tape reading operation.

When the read-write heads (FIGS. 21 and 22) sense the first recorded character, signals are produced on one or more of the read bit lines at the upper right of FIG. 20. These lines are respectively connected to the lines $\bar{1}, \bar{2}, \bar{8}$ and $\bar{4}$ in FIG. 50. As mentioned elsewhere herein, the magnetic spots recorded in the tape tracks represent respectively the absence of a 1, 2, 4 or 8 bit in the binary code for the decimal digit. The two center tracks represent the $\bar{2}$ and $\bar{8}$ values, with the result that every character code used will always have a magnetic signal in one or both of the two center tracks of the tape. This minimizes the effect of skew as the two center tracks alone are used to determine the arrival of a character at the reading heads.

The lines $\bar{1}, \bar{2}, \bar{8}$ and $\bar{4}$ of FIG. 50 enter inverters 514, 515, 516 and 517, respectively. In a conventional manner, each of these inverters when receiving a signal from the tape unit sets a respectively associated trigger 514a, 515a, 516a and 517a in the group of four triggers comprising a first tape input register.

The output of triggers 515a and 516a rises to a +10 volt value either singly or in combination for any significant character received from the first tape register in the tape unit. This causes a corresponding rise at the output terminal of a two-way OR circuit 518. The output of the OR circuit 518 constitutes the signal CHARACTER GATE which is utilized to set off a skew gate single shot multivibrator 519 (FIG. 51) which has a pulse period of seven microseconds designed to provide the necessary skew delay to insure that a trailing bit of a character will be received in the first register before entry operations are started. The output pulse from the single shot multivibrator 519 is passed through a cathode follower 520, through an AND circuit 521, the other input being the signal MINUS ON REWIND, and therefore being conditioned to pass the pulse from the cathode follower 520, and from the AND circuit 521 the pulse is passed through an inverter 522. The inverted pulse from the inverter 522 fires a one microsecond dump single shot multivibrator 523 is passed through a cathode follower 524, and into an inverter 525. The inverted output pulse emitted by the inverter 525 is transmitted by way of a power cathode follower 526 to the input of the triggers 514a–517a, comprising the first tape input register. This pulse effectively resets to normal any of the register triggers which were previously transferred by a signal from the tape unit. Each trigger of the first input register is connected to a corresponding trigger 514b, 515b, 516b and 517b, comprising a second tape input register. The connection between the respective triggers of the first tape input register and the second tape input register is such that the turning off of any of the triggers in the first tape register will turn on its corresponding trigger in the second tape register. At dump time, i.e. that time at which the setting of the first tape input register is transferred to the second tape input register, the setting of the first register resulting from the reception of a character from tape is transferred to the second register without alteration, leaving the first register in a reset condition ready for the reception of the next character from tape.

The previously mentioned negative-going one microsecond pulse generated by the dump single shot multivibrator 523 (FIG. 51) is also applied by way of the inverter 525 to a sample single shot multivibrator 527. This single shot multivibrator has a pulse duration of three microseconds, whereby the trailing edge of the dump pulse starts a three microsecond sampling period. The output of the sample single shot multivibrator 527 is transmitted by way of a cathode follower 528 and an AND circuit 529 to a pair of three-way AND circuits 530 and 531 (FIG. 50). The function of the AND circuits 530 and 531 will be described at a later point. The positive-going sample pulse is also applied by way of a cathode follower 532 to the four triggers 514b through 517b, constituting the second tape input register, so that the trailing end of the signal SAMPLE PULSE resets the second register in preparation for the next character.

*Good record recognition.*—The start of significant information on the tape is indicated by a character 13 followed eighteen spaces later by a character 12. All characters occurring before the 13 code is detected are therefore ignored and are not entered into memory. It will be recalled that the line BT (FIG. 48) was set to a level of −30 volts when regeneration was stopped at the beginning of a tape reading operation. This condition prevents further recurring memory cycles until the output of the OR circuit 496 represented by the line BT becomes again positive.

During tape reading, memory is controlled by the output of a two-way AND circuit 533 (FIG. 50). One input to the AND circuit 533 is the previously described dump pulse generated in the single shot multivibrator 523 (FIG. 51), which occurs shortly after reception of a tape character in the second tape register. Since the remaining input of the AND circuit 533 is negative until after a 13 is detected, no signal can be sent to initiate memory cycles for initial extraneous characters.

When the first 13 character is received in the second tape input register, comprising triggers 514b through 517b (FIG. 50), the output terminal of a three-way AND circuit 535 rises to +10 volts. This output represents the presence of 4, 8 and $\bar{2}$ in the second register. This combination, together with a −1− indicates a 13 character, i.e. a 13 character is represented by a −1−, a $\bar{2}$, an −8− and a −4− on tape. The presence of the −1− is determined in the AND circuit 530. This AND circuit output is a three microsecond positive-going signal at sample time when a 13 is present in the second input register. The 13 signal is transmitted through a cathode follower 536, an inverter 537 (FIG. 51), an OR circuit 538, an OR circuit 539, and from thence to a trigger 540, causing this trigger to transfer on the trailing edge of the 13 signal. Transfer of the trigger 540 raises its output terminal to +10 volts which establishes the signal PLUS AFTER FIRST 13. The signal PLUS AFTER FIRST 13 conditions the second input of the AND circuit 533 (FIG. 50) so that every following dump pulse can be transmitted to the memory control line BM to effect entry into memory of all characters succeeding the first 13 on tape.

The tape character immediately following the first 13 enters the first tape input register in the usual manner, initiating the skew and dump single shot multivibrators 519 and 523 (FIG. 51), respectively, to cause transfer of the data into the second input register. The dump signal from the dump single shot multivibrator 523 now proceeds through the AND circuit 533 to the line BM. The consequent positive-going three microsecond pulse on the line BM initiates a single bit cycle in the manner previously described. If, for example, a $\bar{1}$ bit is included in the character under discussion, the output of the power cathode follower 541 will be at +10 volts. This results in a +10 volt level at the output of an AND circuit 542 (FIG. 50). The second input of the AND circuit 542 is the signal READ-IN GATE on line BU which has been previously shown to be at +10 volts during tape read-in operations.

Passing from the AND circuit 542 to an input of the three-way OR circuit 510 changes the level of the output of a power cathode follower 543 from −30 volts to +10 volts for the duration of the register sample period. The output pulse from the power cathode follower 542, which is the signal R.I. GATE $\bar{1}$, is connected by means of the line BY to the read-in gate input of the $\bar{1}$ memory drawer, so that a dash is stored in the #1 position of this drawer to indicate that a $\bar{1}$ bit has been read from tape. Corresponding entries of dashes are made in the remaining drawers where corresponding bits are received from the tape unit. In channels where no bit has been received, dots will be stored in the usual manner, owing to the −30 volt level on the associated read-in gate line. The signals R.I. GATE $\bar{2}$, R.I. GATE $\bar{8}$ and R.I. GATE $\bar{4}$ are generated in similar fashion from the cathode followers 544, 545 and 546, respectively, and will be present as such on the lines BZ, CA and CB, respectively.

The information following the first 13 character is recognized as useful information only if properly identified as such. This identification consists of either a 12 or a 13 character in the 18th position following the first 13 character. In the absence of such identification, the information will enter into memory but the punch will not be signalled to start and the characters in memory will not be punched out.

When a 13 is again detected, the deflection rings will be reset so that the storage process begins in column one. If the 18th character check is then carried out successfully, the record will be accepted as a good record. The above rejection of undesired information may take place any number of times, since the check will be repeated each time a 13 character is detected, until a good record has finally been located. The test circuits are as follows. In FIG. 51 the lines DW, DV, DU, DY and DX are connected to various triggers such that only during the 18th position of the 1800 positions used will the output of the AND circuit 548 (FIG. 51) be at +10 volts. Referring to FIGS. 52 and 53, it will be seen that the line DW extends from the trigger 475e of the ring of 6, the line DV extends (by way of a cathode follower) from trigger 476b of the ring of 3, the line DU extends from trigger 477 of the ring of 4, the line DY extends from trigger 492 of the ring of 25 in FIG. 55, and the line DX extends from the trigger 547 of the ring of 25 in FIG. 54. The pulses on the lines DW and DV pass through an OR inverter 549 in FIG. 51, while the signals on lines DU, DY, and DX gate each other through a three-way AND circuit 550 in FIG. 51. Thus, when signals are present on each of the lines DU, DY and DX and either of the lines DW and DV, coincident pulses will be fed into the two-way AND circuit 548 whose output is the signal 18.

The signal 18 from the AND circuit 548 (FIG. 51) is connected as an input of two AND circuits 551 and 552, the other inputs being connected to the 13 and 12 sensing circuits previously described. The output of an OR circuit 553 (FIG. 51) is therefore positive only if a 12 or 13 character is sampled during the 18th step. The trailing edge of this three microsecond pulse transfers a good record trigger 554. The resulting positive condition of the output terminal at the right of the good record trigger 554 is connected by way of a cathode follower 555 to a punch start thyratron 556 (FIG. 50). This pulse causes the thyratron to fire and to emit a signal PUNCH START, which is transmitted to a good record relay A1 (FIG. 72). As will be shown later, this permits the punch to start and punch out the information in memory.

In the event that a good record indication is not provided by a 12 or 13 in the 18th position immediately following the first 13 detected, storage continues as described above until the next following 13 is sensed by the tape unit. The detection of a 13 results as usual in a positive-going pulse during sample time at the output of the three-way AND circuit 530 (FIG. 51). This signal is transmitted through the power cathode follower 536, and after inversion in the inverter 537 it becomes an input to the OR circuit 538. The other input of this OR circuit is the signal 18 previously described. The OR circuit 538 will, therefore, be negative on every 13 except where the 13 is the 18th character. In the present case where a good record was not detected, a negative three microsecond signal is present on the output terminal of the OR circuit 538. This signal is transmitted to the input terminal of the OR inverter 539 whose other input is negative at all times when the good record trigger has not been set by a GOOD RECORD signal. The inverted three microsecond pulse at the output of the OR inverter 539 initiates a ring reset single shot multivibrator 557. The single shot multivibrator 557 produces a three microsecond output signal by way of a cathode follower 558, which by way of the line H is the signal RING RESET which is an input to the three-way OR circuit 475 in FIG. 62. In the usual manner the positive signal at the output of the OR circuit 475 resets the horizontal and vertical ring triggers by means of their associated pull-over inverters. This returns the deflection circuits to the #1 starting position and storage resumes at the beginning for the information following the 13 character.

The above mentioned reset of the deflection ring returns the cathode ray tube beams to position #1 during entry of the 13 into memory. Normally the rings are stepped as the beam is turned off at the end of the dash duration. In this case, however, it is necessary to suppress such ring stepping to avoid stepping the beam into position #2, since it is desired to enter into position #1 the first character following the 13.

The aforementioned three microsecond signal from the OR inverter 539 (FIG. 51) is also applied as an input to a ten microsecond single shot multivibrator 559 (FIG. 51). The ten microsecond positive signal emitted by the single shot multivibrator 559 is transmitted by way of a cathode follower 560 and is inverted in an inverter 561, after which it is transmitted on the line BE to the two-way AND circuit 482 in FIG. 53. Since the output of the AND circuit 482 provides the stepping pulses for the horizontal deflection ring, the negative condition of line BE prevents the normal stepping signal RING STEP on line BF, which is the second input to the AND circuit 482, from being effective during the 13 entry cycle.

After a good record has been identified in the manner described above, storage continues in sequence as each character is received from the tape unit. This read-in process may be terminated in several ways. In many cases the record read into memory will be a full sub-block of information followed by other sub-blocks before an end-of-block 13 is encountered. In this instance the storing operation is ended and the tape is stopped in the inter-record space by virtue of the counting process reaching its maximum limit of 1800. The completion of 1800 steps is signalled by a positive-going signal, which is an output of a trigger 562 in FIG. 54. The input to the trigger 562 is derived from an OR circuit 563, the inputs of which are connected to the +0 and +1 triggers of the vertical deflection ring, so that a positive output results when the horizontal and vertical rings have returned to their starting position. The output of the OR circuit 563 is transmitted by way of a cathode follower 564 to flip the trigger 562. The output of the trigger 562 passes by way of a cathode follower 565 to a line AK as the signal 25 CARRY which is entered into a single shot multivibrator 566 (FIG. 51), thereby generating a pulse which is transmitted by way of a cathode follower 567 to reset the good record trigger 554 to its normal status with the trailing edge of the pulse from the single shot multivibrator 566. Since the good record trigger 554 is reset at the end of the 25 CARRY signal, the same signal can be transmitted through a two-way AND circuit 568, one input of which is under control of the good record trigger 554. The signal output of the AND circuit 568 is the CONTROLLED 25 CARRY signal on line AA. This signal is transmitted to the input pin of an OR inverter 569 in FIG. 49. The negative-going signal at the output of the OR inverter 569 restores the tape run trigger 495 to its off condition.

The resulting negative output from the tape run trigger 495 is transmitted through the OR circuit 497, and through an OR circuit 570 (FIG. 48), whose output is applied to the regeneration stop trigger 467. This returns the regeneration stop trigger 467 to its normal condition, which has been previously described, and permits continual regeneration of the memory. Resetting of the regeneration stop trigger 467 provides a positive pulse at the output of the cathode follower 468. The output of the cathode follower 468 constitutes one input to the three-way OR circuit 469, and thereby provides a positive-going signal on the line BT by way of an AND circuit 571. In FIG. 59 it may be seen that a positive signal on the line BT initiates continuous memory cycles for regeneration. This follows by virtue of the gating pulse that is supplied to the AND circuit 437, the second input of which is the RUN-AROUND signal. The line BM in FIG. 59 is now negative since no more characters are being received from tape.

Reading in from tape to memory may also be terminated before 1800 characters have been read-in when a partial sub-block is encountered, as may be the case with a sub-block at the end of a block which does not contain a full complement of 100 words. This condition is identified by an end-of-block 13 character at the end of the partial sub-block. A 13 END-OF-BLOCK signal is detected by the following circuit. If the 13 character is present in the second tape input register, the output of the three-way AND circuit 530 (FIG. 50) becomes positive. This pulse is transmitted by way of the cathode follower 536 to provide one input to a three-way AND circuit 572 (FIG. 51). A second input to the AND circuit 572 is the signal + ANY 18 which is generated when the deflection rings reach any multiple of 18, which is the only possible position in which the end-of-block 13 may occur. Finally, the third input to the three-way AND circuit 572 is the output of the good record trigger 554, which output is positive only after a good record has been recognized. The resulting positive-going signal at the output of the three-way AND circuit 572 is the 13 END-OF-BLOCK signal which is passed through an OR circuit 572, a pair of inverters 574 and 575 and a power cathode follower 576.

The line AC which carries the 13 END-OF-BLOCK signal transmits this signal to the first 13 trigger 540 (FIG. 51), restoring it to normal condition in readiness for the next tape reading operation. Simultaneously the signal is carried on line AB to the input of an OR circuit 577 in FIG. 49. The output of the OR circuit 577 becomes positive, producing a negative level at the output of the OR inverter 569. This signal proceeds by way of a pair of inverters 578 and 579. The output of the OR inverter 569 resets the tape run trigger 495 to terminate tape reading, as previously described, for an 1800 carry when reading complete sub-blocks.

When a partial sub-block has been entered into memory from tape, as described above, it is necessary to write dots in all remaining positions of the memory in order to erase old information remaining from the last previous record. The previously described three microsecond signal 13 END-OF-BLOCK at the output of the OR circuit 577 (FIG. 49) is applied to the input of a two-way AND circuit 580. The second input of the AND circuit 580 is positive at all times except on the occasion of the 1800th character. Ordinarily, therefore, the output of the AND circuit indicates the positive-going 13 END-OF-BLOCK signal when received at the input. The output signal of the AND circuit 580 is inverted in an inverter 581 and is transmitted to a run-out trigger 582. The positive condition at the output of the run-out trigger 582 resulting from its change of status is immediately applied as one input of the OR circuit 506 (FIG. 48). This continues to hold the line BX negative and the line BS positive. These two conditions are necessary to write dots into memory.

The tape run trigger 495 (FIG. 49) has been reset so that the line BU is negative. Resetting of the tape run trigger 495 also resets the regeneration stop trigger, as previously described, so that the condition of recurrent memory cycles is present. Therefore, dots will be entered into the remaining memory positions.

The above described 25 RUN-OUT condition continues until the arrival of the signal CONTROLLED 25 CARRY on line AA in FIG. 49.

*Tape-to-card-punching cards.*—In reference to FIG. 72 it was previously pointed out that the good record relay A1 is energized by firing of a thyratron under control of the good record trigger when a good record condition is detected during the reading of a tape record. A circuit is then completed through the normally open A1–2 contact, the A8–1 contact and the associated normally closed contacts as shown.

It may be generally understood that the relay A8 (FIG. 72) will remain continuously energized until all the records necessary to contain the sub-block read from tape into memory have been punched. This is normally 25 cards for a complete sub-block. It may be any lesser number for partial sub-blocks ending in a 13 end-of-block character. It was shown that the transfer of the start relay contact A13–1 in FIG. 70, under control of the manual start button, placed a +40 volt level on the line C to initially start the tape for reading of the first record. If the start key had been immediately released, the first record would be read from tape into memory as described, but punching would not take place owing to the absence of cards in the punching mechanism. In order to initiate continuous automatic operation of the machine, it is therefore necessary to continuously press the start button through several card-feeding cycles, or to manually depress it successively several times in order to feed cards to the necessary position in the punching mechanism to activate the automatic running interlock.

After the punch relay A8 (FIG. 72) has been energized, as mentioned, under control of a good record read into memory, further depression of the manual start button completes a circuit through the A13–1 points which are normally open, but now closed due to the energization of the start relay A13 (FIG. 70), through the A16–2 normally closed points, and through the ready relay contacts A23–1 to energize the relay R10 which is the start relay R9 in FIG. 21A, of the aforementioned Daly patent.

The relay A23 (FIG. 70), which is the ready relay, is energized under control of the tape unit whenever conditions are established to feed tape. In the punch control circuits of the aforesaid Daly patent, closure of the start contact R10C picks up the start relay R9. This will feed one card in the manner described in that patent. The first card cycle will move the lowest card in the card hopper to a position immediately preceding the punch station. The start key is held depressed, or if it is operated a second time, a second card feeding cycle takes place in the same manner. During the second punch feeding cycle the first card will pass through the punch die station, so that punching out of information in memory can take place. In the manner described in the aforesaid Daly patent, the die delay relay R (FIG. 21B of the Daly patent) is energized during this cycle, and in the following punching cycles as long as cards are present in the punch and die station. In FIG. 72 the cam contact P9 is a multi-lobe cam contact which closes on each of the punch index points 12 through 9 during punch feeding cycles only. At 12 index point time, therefore, when the card is in position to punch the leading or 12's rows of holes on the cards, the contact P9 closes completing a 40 volt circuit through the die delay contact 3–6, thence through normally closed A16–6 card-to-tape relay points, through line S to the input of a key trigger 582 (FIG. 49). Transfer of this key trigger places a negative pulse on its output; this pulse is inverted in an inverter 583 and is transmitted to a single shot multivibrator 584 which is adapted to produce a 50 microsecond pulse. The single shot pulse is transmitted through a cathode follower 585 and is entered into a row scan trigger 586, thereby turning this trigger. The output at the right of the row scan trigger 586, therefore, becomes positive at the end of the 50 microsecond delay to initiate storage scanning.

The 50 microsecond pulse from the single shot 584 is also gated with a DASH CLAMP signal from the circuits of FIG. 59. The output from the cathode follower 585 also constitutes an input to an AND circuit 586a (FIG. 48). The positive pulse at the output of the AND circuit 586 is applied to the OR inverter 498. The resulting negative pulse at the output of the OR inverter 498 is utilized to transfer the regeneration stop trigger 567, to end regeneration operations. As previously explained, transfer of the regeneration stop trigger 467 produces a deflection ring reset after a 20 microsecond delay, and it also terminates recurrent memory cycles under control of the regeneration stop trigger.

The trailing edge of the 50 microsecond positive-going pulse from the output pin of the single shot 584 (FIG. 49), in addition to turning the row scan trigger 586 on, is also connected to a card count trigger 587. Resetting of the card count trigger later in the card cycle, as will be described, advances a special card counting ring which selects the appropriate line for scanning. Setting of the row scan trigger 586 fifty microseconds following the termination of regeneration results in a +10 volt level of a cathode follower 588. This raises the input three-way OR circuit 469 (FIG. 48), raising the potential on the line BT, which produces recurrent memory cycles in the usual manner.

The same ROW SCAN signal is applied to an AND circuit 589 (FIG. 48), resulting in a +10 volt level on the line BW, since the other input to the AND circuit 589 is positive at all times during tape-to-card operation. The output of the AND circuit 289 is double inverted in inverters 590 and 591 and is powered from a power cathode follower 592.

In FIG. 59 the line BW, which carries the READ-OUT GATE signal places a +10 volt level on one input of the AND circuit 454. The other input to the AND circuit 454 is the 4.5 microsecond positive-going pulse available during each memory cycle immediately following the dot period. The resulting output from the AND circuit 454 is the read-out gate which is directly applied to terminals 3M–16 of the four memory drawers (FIG. 45). Within each memory drawer, as previously described, the read-out gates sample the pick-up plate amplifier outputs to provide a correspondingly timed data output on terminal 3M–18 in each instance where a dash is detected. In FIG. 60 the positive-going signal on the line CT indicates that a dash has been detected in the $\overline{1}$ memory drawer, etc.

Since the termination of regeneration prior to the row scanning operation produces an automatic deflection ring reset, it follows that horizontal deflection will begin in the #1 position. The normal horizontal deflection ring is used for row scanning. But since the top row of all four memory drawers must be scanned twelve times to punch the first card, then the second row must be scanned twelve times to punch the second card; it is necessary to provide a special counting and deflection ring to control vertical deflection during the row scanning operation. In FIGS. 54 and 55 this card counting ring is seen to consist of two closed rings of five triggers 593, 593a, 593b, 593c and 593d, comprising the first ring, and triggers 594, 594a, 594b, 594c and 594d, comprising the second ring. The ring composed of triggers 594 through 594d is advanced by the carry of the ring composed of the triggers 593 through 593d to provide an overall count of one ring.

The signal level MINUS ON ROW SCAN is connected by line W (FIG. 55) to the input of two-way AND circuits 595 through 595h (FIGS. 54 and 55). Lowering this input to these respective AND circuits in effect disconnects the normal vertical deflection ring from the vertical deflection increment circuits. At the same time a line V (FIG. 55), which transmits the signal PLUS ON ROW SCAN becomes +10 volts. This level is applied as one input to each of two-way AND circuits 596 through 596h, which then condition the cathode follower OR circuits 597 through 597h (FIGS. 54 and 55). The outputs of these cathode follower circuits 597 through 597h are connected to the vertical increment circuits in place of the normal vertical deflection ring of FIGS 54 and 55. In this manner the card count ring is permitted to control the vertical deflection of the beams during row scanning which, during punching of the first card, will take place in the first row since the card count ring is standing in its home position.

During the row scanning operation the cathode ray beams in the four memory drawers simultaneously refer to the corresponding position of the 72 in a given horizontal line, in this instance the upper row. That is, during the first memory cycle the row scanned at a given time, the level of the $\overline{1}$, $\overline{2}$, $\overline{8}$ and $\overline{4}$ data lines indicates the presence of a dash by a +10 volt level or a dot by a −30 volt level. When punching the 12's row of holes, the condition of the four data lines must be simultaneously sampled to ascertain whether the combination of dots and dashes corresponds with the Hollerith code hole being punched. Where a coincidence exists, it is desired to fire a thyratron connected to the punch magnet corresponding to the column of memory in which coincidence was detected. The circuits for accomplishing this function are shown in FIG. 61. In FIG. 61 the lines EP, EQ, ER and ES carry the signals $\overline{1}$ CODER CAM, $\overline{2}$, $\overline{8}$ and $\overline{4}$ CODER CAM, respectively, and are connected to corresponding multi-lobe cams in the punch unit. These cam contacts are designed to furnish suitable combinations of voltage levels during each punching cycle so that the presence of the +40 volt levels on certain lines correspond to the binary coding for the row of holes being punched at that time. Thus, when punching the 12's row of holes, the $\overline{1}$ coder cam and the $\overline{2}$ coder cam lines will be at +40 volts, while the $\overline{8}$ and $\overline{4}$ lines will be at zero volts. This change in level transfers the corresponding key triggers, raising the associated output to +10 volts, the remaining outputs being at −30 volts. The signal $\overline{1}$ CODER CAM is entered into a trigger 598, and the signals $\overline{2}$ CODER CAM, $\overline{8}$ CODER CAM and $\overline{4}$ CODER CAM are entered into triggers 599, 600 and 601, respectively. The output of the key triggers 598 through 601 are emitted to four AND circuits where they are compared with the corresponding data lines from the four memory tubes. Thus, for example, output of the key trigger 598 is transmitted by a cathode follower 602 to one input of an OR inverter 603, and it also constitutes one input to an AND circuit 604. The other inputs of both of these circuits are connected to the $\overline{1}$ data line. Thus, the OR inverter 603 has as its second input the signal $\overline{1}$ data line on the line CT. It is evident that the output of either of these logical units will be +10 volts only in the event that both inputs are simultaneously +10 volts or both inputs are both simultaneously −30 volts. Therefore, a +10 volt condition on the output of a cathode follower 605 indicates that the levels of the $\overline{1}$ coder cam and the $\overline{1}$ data lines are equivalent. A similar comparison is made for the remaining three values in three similar coincidence circuits.

The four outputs of the coincidence circuits are directed to AND circuits 606 (FIG. 61) and 607. One of the inputs to the AND circuit 606 consists of a three microsecond sampling pulse derived from the memory timing circuit. If all four of the coincidence circuits 604, etc. indicate a coincidence in pulses therein, meaning that the character read in that particular column of memory corresponds to the code being punched, there are positive-going three microsecond pulses available from the output of the AND circuit 606 by way of its associated cathode follower 608.

The three microsecond signal emitted from the cathode follower 608 is transmitted to an inverter 609, where it is inverted to appear as a negative-going three microsecond signal, each time coincidence is detected, at the output pin of the cathode follower 610 (FIG. 61), the signal being transmitted by way of a cathode follower 611 and a series of cathode followers in parallel, so that the signal is impressed on the line DC. The line DC is connected to one input of each of eighteen three-way OR circuits 612, etc. (FIG. 63). These OR circuits are utilized as minus AND circuits. The remaining two inputs of each of the three-way OR circuits 612, etc. are connected to the horizontal deflection ring. It may be understood, therefore, that when the horizontal deflection ring is in its home or first position, a negative-going pulse on line DC will result in a negative-going pulse only on the output terminal of the three-way OR circuit 612. Similarly, in the second position of the ring a negative-going signal on the line DC will result in a negative-going pulse on the output pin of the OR circuit 613 only. As the horizontal deflection ring moves through 72 stages, the foregoing OR circuit (utilized as —AND circuits) are scanned four times.

In FIG. 52 it will be seen that the line DE is negative during horizontal scanning of columns one through eighteen and 37 through 54. This line is connected in FIG. 63 to one input terminal of each of twenty two-way OR circuits 604, etc. These OR circuits are also employed logically as —AND circuits. The remaining inputs to the OR circuit 614, etc. are connected to the aforementioned three-way OR circuits 612, etc. For example, the output of the three-way OR circuit 612 may be a negative-going pulse during the scanning of memory columns 1, 19, 37 or 55, provided negative signals are present on the line DC at such times. Of these four, however, only scanning of columns 1 or 37 will produce a negative-going output from the two-way OR circuit 614. This signal produces a positive-going pulse by virtue of its passage through an associated inverter 615 which is fed thereby.

The inverters 615, etc., are coupled to sets of thyratrons. The inverter 615, for example, is coupled to two thyratons 616 and 617 in FIG. 64. It is desired to fire only the former of these during scanning of columns 1 through 18, and the latter only during the scanning of columns 37 through 54, so that the former is fired to indicate coincidence in column #1, while the latter is fired to indicate coincidence in column 37. The necessary differentiation is accomplished by pulses on lines DF and DR which are connected respectively to the #2 grids of each thyratron group. The line DF originates in FIG. 52 where it is powered during the horizontal scanning of columns 55 through 72, and then continuously through 18. The positive condition of the line DF directly connected to the #2 grid of the group of thyratons conditions these thyratrons to be fired by positive-going pulses on the #1 grids during scanning of columns 1 through 18. The early raising of the level at column 55 is to assure ample time to raise the level of the #2 grids, which inherently have a very high capacitance.

In similar fashion the line DG, which also originates in FIG. 52, is raised to +10 volts at column 19 to have the #2 grids of the thyratrons 617, etc. (FIGS. 64 and 65) conditioned positive in readiness for useful impulses during the scanning of columns 37 through 54. The three-way OR circuits 612, etc. (FIG. 63), previously described, are also connected to two-way OR circuits 618, etc., in FIGS. 64 and 65. These OR circuits also function as —AND circuits for scanning of columns 19 through 36 and 55 through 72. The operation of these OR circuits together with their associated inverters and thyratrons is similar to the corresponding circuitry previously described and should therefore require no additional explanation.

It has been previously shown that a positive-going pulse is present at the output of the cathode follower 487 in FIG. 53. This signal is the 72 CARRY + signal. The 72 CARRY + signal is also fed to an inverter 619 and by way of a cathode follower 620 emits the 72 CARRY — signal.

At the end of one row scanning cycle, therefore, the negative-going 72 CARRY — signal is transmitted through the line EF to the input of the row scan trigger 586 (FIG. 49). The resultant resetting of the row scan trigger returns the level of its output at the right to —30 volts.

The resulting return to —30 volts at the output of the OR circuit 570 (FIG. 48) immediately resets the regeneration stop trigger. The resetting of the regeneration stop trigger to its normal condition causes a regeneration cycle to occur thereafter in the usual manner, as previously described.

As the punch unit continues running, the 11th row of the card will reach the punched station. At this point the cam contact positive-going signal on line S (FIG. 49) will turn the key trigger 582 and will restart the cycle of events previously described in connection with the punch of the 12's rows of holes. The sole difference in procedure is in the combination of signals received from the punch coder cams on lines EP, DQ, etc. in FIG. 61. In this way the proper cam line is at +40 volts during subsequent row punching cycles. Suitable coder cam combinations are employed to sample the memory output for the appropriate character to be punched in the line of the card in the punching station.

Immediately after the last row of holes on the card (the 9's row) is punched, a cam contact C9 (FIG. 71) closes at 9.5 index time to complete a circuit through relay contact A15–5 normally closed points to apply a 40 volt pulse to the line Q. The line Q is connected to a key trigger 621 in FIG. 49. Setting of the key trigger 621 produces a negative-going signal at its output which is applied as an input to the card count trigger 587. This resets the card count trigger 587 which had a fifty microsecond pulse at its right input at the beginning of the first row scan for the card. The resulting negative signal at the output of the card count trigger 587 proceeds by way of the line X to FIG. 55 as the signal CARD COUNT, where it causes the card counting ring comprising the triggers 593 through 593d to advance one place in conventional manner. This prepares the card count ring to position the vertical deflection to cause scanning of the second line of all cathode ray tube rasters during punching of the second card at a later time.

During the following card cycle, closure of a cam contact P29 (FIG. 71) places a signal on line N. The line N is connected to the key trigger 621 (FIG. 49), and the pulse is there ineffective to restore this trigger which has just previously controlled restoration of the card count trigger to cause advancing of the card count ring.

Punching of successive cards proceeds to punch out the information on successive lines of memory. Normally, if a complete separate block of 1800 characters has been stored, this punching operation extends through 25 card cycles before a subsequent separate sub-block must be entered into memory from tape.

In FIG. 54 as the card count ring is advanced at the end of the 24th card punching cycle, and AND circuit 622 will conduct and emit a signal from its associated cathode follower 623 indicating that the card count ring is set at 25 in preparation for punching of the last or 25th card of a sub-block on the following punching cycle. The thyratron 624 into which the signal from the cathode follower 623 is fed does not, however, fire until the 25th card punching cycle, when the cam contact C13 (FIG. 72) closes early in the cycle at 11.5 index time. During the 25th card punching cycle, therefore, closing of the contact A10–4 (FIG. 72) allows a cam contact P8 to complete a circuit through line A. Line A is an input to a key trigger 625 (FIG. 49). When the key trigger 625 is transferred, the resulting output pulse which is passed through the OR inverter 494 transfers the tape run trigger 495. The output at the key trigger 625 is a positive-going pulse which is inverted in the OR inverter 494 before application to the tape run trigger 495. Transfer of the tape run trigger starts the tape, suspends regeneration and conditions memory to accept information from an external source in the manner previously described.

It has previously been stated that the final sub-block of a block may contain less than 1800 characters. The end of a partial sub-block is indicated by a positive pulse at the output of the three-way AND circuit 572 in FIG. 51. As punching of cards for the sub-block proceeds, the end-of-block 13 will be detected during punching of the final card of the group during scanning of the 11 row of holes. During this scanning operation the punch coder cams are arranged so that only the 2̄ cam is closed. Since the 13 end-of-block character can properly occur only in columns which are a multiple of 18, detection of such character is signalled by a negative-going pulse at the output of the three-way OR circuit 626 (FIG. 63). Depending on the column location of the 13 character, this fires one of four possible pairs of thyratrons. The outputs for the thyratrons effected by a 13 in column 18, for example, are those thyratrons 627 and 628 in FIG. 65. The former goes to the usual control panel plug hub, and is available for plugging to a punch magnet for punching an 11 hole in any selected column of the card. The latter is directly connected by way of cable DR to energize a relay B163 (FIG. 68). A corresponding relay and thyratron are provided for each of the three remaining positions in which an end-of-block 13 may properly occur. These relays are B164, B165 and B166 in FIG. 68.

Closure of cam contact P10 (FIG. 72) at 11.0 index time immediately thereafter completes a circuit through line DP by way of which the pulse is transmitted through a tape-to-card contact A17–a (FIG. 77), and through one of contacts B163–3, B164–3, etc. to energize the 13 card relay A15. The resulting closure of contact A15–4 in FIG. 72 will raise the line A to +40 volts. As previously described in conjunction with the 25 card relay, this transfers the tape run trigger 495 in FIG. 49, to cause starting of the tape and read-in of the next sub-block to memory. This follows by virtue of the fact that line A is connected as an input to the key trigger 625 (FIG. 49), which is turned by a pulse on line A, the output pulse from the trigger being inverted in the OR inverter 494 to turn the tape run trigger 495. Opening of contacts A15–6 (FIG. 72) serves to deenergize the punch relay A8 to stop the punch for at least one cycle duration. This operation is necessary since even though the tape unit is generally started immediately after punching of the last row of holes in the last card of the group, it is possible that much deleted or extraneous information will have to be passed through the tape unit before the next good record is recognized if the last previous record included the end of a block.

Closure of contact A15–3 (FIG. 72) energized relay A4. Energization of relay A4 will open contacts A4–3, which are the end-of-block stop contacts, in FIG. 70 to break the punch running circuits.

Transfer of the contact A15–5 (FIG. 71) completes a circuit through line P to the input of a key trigger 629 (FIG. 49). The transfer of the key trigger 629 raises its output to +10 volts. This +10 volt level is transmitted through line EL as the signal CARD COUNT RESET. The signal CARD COUNT RESET is transmitted to FIG. 62 (line EL), where it is impressed on the OR circuit 474, the output of which by way of its associated cathode followers causes the associated pull-over inverters to conduct, thereby resetting the attached triggers of the card count ring.

This resetting operation is necessary since an end-of-block 13 may occur before the card counting ring has been returned to its home position, in which condition it is not ready for the punching of the next sub-block. The same group of pull-over inverters also have a connection to the input line of the trigger 587 which in FIG. 62 symbolically represents the card count trigger 587 in FIG. 49. In FIG. 49 it has been seen that the output of the trigger 587 is the card count ring advancing control. The above mentioned reset prevents the card count ring from being advanced erroneously on the punch cycle immediately following.

Although a row scanning operation is carried out when the card is in position to punch the 12's row of holes, no 12 characters are actually read from memory to operate the punch thyratrons. Although 12's are present in certain positions of memory and are sampled by the coder cams, they are ineffective to fire thyratrons because the 12 lobe is omitted from the punch cam contacts which provide plate voltage to the punching thyratrons.

*Card-to-tape.*—When the mode of operation switch (FIG. 70) is set to the card-to-tape contact as shown, a card-to-tape relay A16 is continuously energized. Depressing the start key (FIG. 70) energizes the start relay A13 as previously described. Transfer of the contact A13–1 (FIG. 70) completes a circuit through contact A16–2 to energize relay 19. As previously mentioned, the relay 19 is in the reproducing punch circuit of the above mentioned Daly patent and controls the starting of a punch feeding cycle.

In the card-to-tape mode of operation, cards are present in the read-feed hopper of the reproducing punch, while the punch feed hopper is empty. Both feed units operate together at all times while reading cards, even though no punching is being done. With the start key held down, the reading unit will continue to take repeated feeding cycles. During the cycle when the first card passes under the reproducing brushes, no entry into memory takes place, as this station is used primarily for controlling the indicated bit count generating circuit. One cycle later as the card passes under the comparing brushes, entry is made into memory; at the same time the indicated bit count generated on the previous cycle is also entered into the appropriate column of memory. Operation of the indicated bit count circuits will be covered in a later section.

As each row of the card passes through the comparing brush station, a row scanning operation is initiated similar to that described in connection with the tape-to-card operation. At each cycle point a circuit is completed through the normally open contacts A16–6 (FIG. 72) and a circuit is completed through line S to an input terminal of the key trigger 582 (FIG. 49). This trigger operates as described during tape-to-card operation to suspend regeneration of memory immediately, thus causing reset of the horizontal and vertical deflection rings. After a fifty microsecond delay is initiated in the single shot 584 (FIG. 49), the usual row scanning operation is started which causes the horizontal ring to step through 72 places. In this instance, however, row scanning is used to read information into memory rather than out of memory.

Closure of the contact A16–7 (CT) (FIG. 72) completes a circuit through line DA from a +10 volt source to the input of a power cathode follower 630 (FIG. 48). The output of the cathode follower 630 constitutes one input to a three-way AND circuit 631. Another input to the AND circuit 631 is the signal V + ON ROW SCAN (FIG. 49), and the third input is the signal FH whenever a hole is present in a card being read under the reading brushes of the punch. The output of the AND circuit 631 is, therefore, a positive pulse. This pulse by way of the three-way OR circuit 506 and the inverter 507 furnishes the video blank conditioning pulse on line BX, previously described in connection with the memory circuits. A positive pulse on this line enables the memory drawers to receive information from an external source. If the line FH were pulsed other than only when a hole is present in the row of the card being scanned, the wrong information would be entered into memory.

The —30 volt condition on the line BX (FIG. 48) is transferred to the input pin of each of the three-way OR circuits 510, 511, 512 and 513 in FIG. 50. The pulse on this line conditions these three-way OR circuits so that their respective outputs will be negative unless one of the two remaining inputs to these respective circuits becomes positive. A positive output of the OR circuits 510–513, transmitted by way of their associated power cathode followers 543–546, produces pulses on the lines BY, CZ, CA and CB respectively which, as previously shown, causes the entry of dashes into the corresponding memory drawers during external read-in.

The OR circuits 510–513 were previously used in conjunction with the second input register triggers to read information from tape into memory during the tape-to-card operation. These lines enter the memory drawer circuits as shown at the top of FIG. 59. The second inputs to the OR circuits 510–513 are the outputs of associated AND circuits 542, etc., which being connected through switching circuits to the second input reigster, are now all in a negative condition, since the registers are not used in the present mode of operation and have been reset. The lines CP, QP, CR and CS (FIG. 50) comprise, respectively, the third input to the three-way OR circuits 510–513. It therefore follows that a positive condition on any of these lines during a card-to-tape row scanning operation causes entry of dashes into the corresponding drawers of memory in the column selected by the memory control deflection circuits, When a card is present in the comparing station of the reproducing punch, a circuit may be completed from D.C. ground through normally open card-to-tape relay points A16–10 (FIG. 74), to the contact roll 632. Where a hole is present in the card, the plus level is available at the associated hubs 1–80 of the control panel. This plus level may be transmitted by a plug wire to one of the hubs labeled "converter entry or exit," shown in FIG. 69. The latter hubs are connected by normally closed tape-to-card relay points through cable DS (FIG. 68), to the brush scanning commutator shown in FIGS. 66 and 67. In these figures the commutator is seen to consist of a series of AND circuits, one for each brush to be scanned, the other input of these respective AND circuits being connected to the various steps of the horizontal deflection ring.

It may be generally stated that in the left hand row of the 18 AND circuits (FIG. 66), the upper AND circuit 633 is selected by the horizontal ring at steps 1, 7, 13 and every multiple of 6 thereafter. The second AND circuit 634 is selected at steps 2, 8, 14 and every multiple of 6 thereafter. This follows because the upper six AND circuits are directly connected to outputs of the lower set of six triggers in the horizontal scanning ring, which is a closed ring of six stages. This pattern is repeated for the seventh through twelfth AND circuits and the 13th through 18th AND circuits.

The output of the top row of six AND circuits comprising AND circuits 633 through 638 is fed into an AND circuit 639. Thus, the outputs of the AND circuits 633, 634 and 635 are fed to a three-way OR circuit 640, while the outputs of the AND circuits 636, 637 and 638 are fed to an OR circuit 641. The outputs of the OR circuits 640 and 641 pass through associated respective cathode followers 642 and 643, and are combined as a single input to the AND circuit 639. The cathode follower output 641–642 is sampled in the AND circuit 639 by the + zero output of the horizontal deflection ring, so that only the first six steps of each group of 18 are sampled. Correspondingly, the other two groups of six AND circuits in FIG. 66 are sampled in columns 6 to 12 and 13 to 18, respectively. Each group of six AND circuits of FIG. 66, therefore, are capable of providing a single output, which outputs are combined in an AND circuit 644. In respect to the output from the first six AND circuits under question, i.e. the output from the AND circuit 639, it may be noted that the pulse is conditioned by a circuit comprising a cathode follower 645, an inverter 646, a cathode follower 647, an inverter 648 and a cathode follower 649. The second input of the AND circuit 644 (FIG. 66) is high only during the scanning of columns 1 through 18. The resulting AND circuit output issuing from a cathode follower 650 (FIG. 66). therefore, shows a sequence of positive levels which represent in serial sequence those of the first 18 brushes which have detected holes in the card being read. The remaining three groups of 18 AND circuits (FIG. 66 as to columns 19 through 36, and FIG. 67 as to columns 37 through 54 and as to columns 55 through 72) each is similarly effective. The four resulting outputs are passed through a pair of inverter-cathode follower combinations 651 and 652, and issue from a cathode follower 653 (FIG. 67) as a pulse on the line DL. The output on the line DL may consist of positive-going signals in any of the 72 time intervals corresponding to the memory horizontal deflection steps. A positive level on line DL indicates the presence of a hole in a brush position which corresponds to the horizontal deflection position. As the row scan operation proceeds, the brush scan line DL (FIG. 61) may be positive during a given memory cycle to indicate the presence of a punched hole in the corresponding column of the card.

If the row of holes being scanned is the zero row, +40 volt levels are available on lines EP, EQ, ER and ES (FIG. 61). These are the same coder cam outputs described in connection with the tape-to-card operation. The resulting transfer of the associated key triggers 598 through 601 places +10 volt levels on one input of four associated three-way AND circuits 654, 655, 656 and 657. One of the two remaining inputs of each of the AND circuits 654–657 is maintained at +10 volts at all times during card-to-tape operation. The three inputs of these AND circuits are all connected to the brush scan line DL. Consequently, a positive level on the brush scan line during any given memory cycle results in positive levels on lines CS, CR, CQ and CP (FIG. 61). The AND circuit 654 transmits its output pulse through a cathode follower 654a to line CP. The AND circuit 655 transmits its output pulse through a cathode follower 655a to line CQ. The AND circuit 656 transmits its output pulse through a cathode follower 656a to line CR, and the AND circuit 567 transmits its output pulse through a cathode follower 657a to the line CS. These lines are connected to the three-way OR circuits 510–513 (FIG. 50). As previously described, the resulting positive outputs of the three-way OR circuits 510–513 when a positive voltage is present on lines CP, CQ, CR or CS, causes dashes to be entered into the corresponding memory drawers. In the examples cited, a zero hole stores a dash in each of the 1, 2, 4 and 8 drawers. In other rows of the card the varying setting of the coder cams provides for the correct combination of dashes to store the binary equivalent of the number in the memory drawers.

During each of the 12 row scans for the first card, the vertical deflection is again under control of the card counting ring rather than under control of the vertical deflection ring. All bits pertaining to the first card, are therefore, stored in the top line of the four memory drawers in 12 repeated operations. Regeneration takes place during the row scanning cycles in card-to-tape operation the same as in the tape-to-card mode previously described. Following scanning of the 9's row of holes, the card count ring is advanced one step by the circuits previously described in connection with tape-to-card operation, so that when the second card is read entry is made into the second line of the memory rasters.

The above described action normally continues until 25 cards have been sensed by the comparing brushes, thereby filling all 1800 bits of memory. During the reading cycle, the 25th card is sensed at the comparing brushes, and this fires the 25th card thyratron which provides a voltage at the output of the thyratron 624 (FIG. 54). The pulse from the thyratron 624 is transmitted by way of line Z to energize the 25 card relay A10 (FIG. 72). In FIG. 71 the closure of the cam contact P8 at 9.6 index point immediately following scanning of the 9's row of holes on the 25th card completes a circuit through the 25 card relay contact A10–4, through line A, to the input of the key trigger 625 (FIG. 49). Transfer of the key trigger 625 transfers the tape run trigger 495 in the usual fashion. The resulting positive level at the output of the tape run trigger 495, following its transfer, applies a negative-going pulse to the regeneration stop trigger 467 (FIG. 48). This pulse flows by the way of the OR circuit 496 (FIG. 49), the OR circuit 497 and the OR inverter 498. The pulse on the input of the regeneration stop trigger 467 transfers this trigger to suspend regeneration of the storage pattern in the usual manner. The same positive signal is applied as an input to an AND circuit 658 (FIG. 48), the other input of the AND circuit 658 being positive at all times of card-to-tape operation. This produces a positive level on line BW by way of the inverters 590, 591 and the power cathode follower 592. The line BW is the read-out gate line which is connected to the input of the AND circuit 454 (FIG. 59). The remaining input of the AND circuit 454 is the 4.5 microsecond pulse immediately following video sample time during each memory bit cycle. The resulting output of the AND circuit 454 is taken by way of the inverters 463 and 464 and the power cathode follower 465 and applied to the line CZ (FIG. 59), and also to the read-out gate line which is applied to control the inputs of all four memory drawers. As usual, the READ-OUT GATE signal causes the memory output data lines to become active during reading of information from memory. The circuits for actually writing on tape will be described at a later point herein.

The positive tape run trigger output signal + ON TAPE RUN is also applied by way of the OR circuit 496 (FIG. 49) to an OR circuit 659 (FIG. 48). The resulting positive-going signal emitted from the OR circuit 659 will be present on the move line of the tape unit and will, therefore, be effective to start the tape unit. The tape unit move response line (FIG. 56) becomes positive immediately thereafter. The positive level on the tape unit move response line is transmitted to one input of a three-way OR circuit 660 (FIG. 56), the second input of which is always positive during card-to-tape operation as shown by line DZ and the third input, line FL, being positive at all times other than during a rewinding operation, at which time the level of line FL becomes negative. The output of the AND circuit 660 is transmitted to an eight millisecond single shot multivibrator 661, thereby firing this multivibrator. At the end of the eight millisecond period, the trailing edge of the pulse from the single shot 661, transmitted by way of a cathode follower 662, will transfer a trigger 663 which will emit a positive pulse by way of cathode followers 664 and 665 as the signal WRITE (TU).

After starting the tape, it is normally desired to delay writing of the first character for ten milliseconds in order to provide the usual inter-record space between sub-blocks. When writing the first sub-block on a tape which has just been loaded, however, it is necessary to provide a delay of thirty milliseconds. During the loading operation as described elsewhere herein, a rewind trigger 666 (FIG. 48) is turned on, so that its right output becomes positive. This positive pulse is transmitted through the line GA to one input of an OR circuit 667 (FIG. 56).

When the loading operation results in the EOT mark turning on the EOT trigger in the tape unit, the rewind trigger will be reset. Therefore, both inputs on lines FC and AG to the OR circuit 667 (FIG. 56) will be negative. The negative output from the OR circuit 667 is transmitted to the input of a trigger 668. The resulting positive potential at the right output of the trigger 668 is transmitted by way of a cathode follower 669, thereby causing one input of an AND circuit 670 to be at a plus condition. The plus condition of the tape unit move response line imposed on the other input of the AND circuit 670 causes the emission of a pulse by way of a cathode follower 671 to fire a thirty millisecond single shot multivibrator 672. The trailing edge of the thirty millisecond pulse from the single shot 672 is transmitted by way of a cathode follower 673 and an OR circuit 674 to reset the trigger 668. The resulting positive pulse at the left output of the trigger 668 is transmitted by way of a cathode follower 675 as one input of an AND circuit 676, the other input of which is the positive pulse on the line tape unit move response. The output of the AND circuit 676 is transmitted by way of a cathode follower 678 to fire a single shot multivibrator 679, which has a ten millisecond pulse. The output of the single shot 679, transmitted by way of a cathode follower 680, provides one input to an AND circuit 681 (FIG. 56), whose other input is the signal + ON C–T present on the line DZ, while the system is in card-to-tape operation. The output of the AND circuit 681 is transmitted by way of a cathode follower 682, and the inverted output from the inverter 683 and the cathode follower 684 (FIG. 56) is utilized to fire a fourteen microsecond single shot multivibrator 685. Since the pulse from the AND circuit 681 is inverted, the single shot 685 will be fired by the fall of the output from the single shot multivibrator 679. The trailing edge of the fourteen microsecond single shot 685 is transmitted by way of a cathode follower 686 and is applied to the input of a trigger 687. The resulting positive-going output of the trigger 687 is transmitted by way of a cathode follower 688 to the line AF and to the way of the previously described OR circuit 469 (FIG. 48), which causes recurrent memory cycles when any of its inputs is at a positive level. The additional fourteen microsecond delay provided before the OR circuit 469 is raised to start reading-out from memory is necessary in certain cases; namely, at the start of new blocks, to permit writing of the beginning of a 13 character, which is not available in memory but which must be written on the tape from an external source.

The negative-going trailing edge of the thirty millisecond inter-record space delay pulse resulting from the firing of the single shot 672 (FIG. 56) is passed through the OR circuit 674 and is applied to the left side of the first tape record trigger 668. The resultant reset of the trigger 668 lowers the level of the output of the cathode follower 669, so that no further pulses can proceed through the associated AND circuit 670 to fire the thirty millisecond inter-record space single shot 672. Instead, the high level output produced from the cathode follower 675 permits all subsequent move response signals to pass through the associated AND circuit 676 to fire the ten millisecond inter-record space single shot 679. In this manner, all records showing the first record on the tape are spaced at approximately the desired one inch interval. When the tape is completely recorded and rewound, the trailing edge of the positive rewind singal on the line AG (FIG. 56) again sets the inter-record space trigger 668, so that the first succeeding record will be recorded after a thirty millisecond delay following the starting of the tape.

It has been shown that during each memory cycle of read-out a dash in the position of a drawer being referred to is indicated by a positive condition on the data line (3M–18, FIG. 45). These signals for the various memory drawers are transmitted through lines CG, CH, CJ and CK to FIG. 56. By reference to FIG. 60, it will be seen that the data $\bar{1}$ is connected to CG by way of a pair of inverted cathode followers 689, the data $\bar{2}$ is connected to the CH by way of a pair of inverted cathode followers 690, the data $\bar{8}$ is connected to the line CJ by way of a pair of inverted cathode followers 691 and the data $\bar{4}$ is connected to the line CK by way of a pair of inverted cathode followers 692.

By reference to FIG. 56 it will seen that each of the lines CG, CH, CJ and CK is connected individually to a three-way AND circuit. Thus, the $\bar{1}$ line CG constitutes one input to an AND circuit 693, the $\bar{2}$ line CH constitutes one input to an AND circuit 694, the $\bar{8}$ line CJ constitutes one input to an AND circuit 695, and the $\bar{4}$ line CK constitutes one input to an AND circuit 696. A second input to each of the AND circuits 693–696 is the signal on the line DT which is held at +10 volts at all times, except during a deleting operation (to be explained at a later point). The third input to the AND circuits 693–696 is the pulse on line BV which is the signal + ON C–T, this signal being up during card-to-tape operation.

When a dash is encountered during a read-out from memory to tape, the AND circuits 693–696 into which the dash pulse is fed will emit a pulse to set a corresponding trigger. For example, if a dash is encountered in the $\bar{1}$ position, the AND circuit 693 will conduct and will transmit a pulse through an associated cathode follower 697 which pulse is inverted in an inverter 698, and upon passing through the cathode follower 699 it will serve to flip the $\bar{1}$ trigger 700. The same result follows upon encountering a dash in the $\bar{2}$, $\bar{8}$ and $\bar{4}$ positions, which pulses are gated through the AND circuits 694, 695 and 696, respectively. Thus, the $\bar{2}$ trigger 701, the $\bar{8}$ trigger 702 and the $\bar{4}$ trigger 703 (FIG. 56) are flipped upon sensing of the $\bar{2}$, $\bar{8}$ and $\bar{4}$ bits, respectively. The output of each of the triggers 700–703 is connected to the corresponding write amplifier in the tape unit by way of cathode followers such as 704 and 705 which are in the write $\bar{1}$ line. This furnishes the desired control for NRZI (non-return to zero—I.B.M.) for recording wherever a 1 bit is indicated by a change in the saturated polarity of the tape track. Where a full sub-block of 1800 characters has been stored in memory from cards, the foregoing tape feeding and writing procedure continues until the last character is read from memory. This operation proceeds at the rate of one character every fourteen microseconds, as determined by the memory control ring of FIG. 59, since the line BT is maintained continuously in a positive condition by the memory control OR circuit in FIG. 48.

Immediately following the reading of the 1800th memory character, a 25 carry line AK (FIG. 51) becomes positive. This level is applied as one input to an AND circuit 706. The resulting positive level on line AA is applied to the input of the OR inverter 569 (FIG. 49) to reset the tape run trigger 495. Resetting of the trigger 495 has the usual effect of stopping movement of the tape and re-establishing memory regeneration. The 25 carry pulse on line AJ (FIG. 56) resets the trigger 687 which had as its function the maintenance of the memory control OR circuit at a positive level by way of its output cathode follower 688 and line AF. By reference to FIG. 48 it will be seen that the line AF is an input to the OR circuit 469, whose output is one input to the AND circuit 571.

Since writing of a sub-block of 1800 characters requires less time than that available between cards in the punch reading unit, the punch runs continuously and the first card of the next sub-block is entered into memory as soon as its leading row of holes reaches the reading position at the comparing brush station. The final sub-block of a full block may contain less than 1800 characters, and correspondingly requires less than 25 cards in which to store the significant data in memory in such a case. The final card of such sub-block is indicated by a 13 code in one of four possible positions. The 13 code is punched in the card as an 11 hole. The so-called end-of-block 13's may be sensed at the reading brush station of the card feed unit. The brush plug hub is connected to an EOB hub (FIG. 69), through a column split, if necessary, so that the +40 volt signal resulting from the sensing of an 11 hole is transmitted through a line such as 19, 38, etc. through normally closed contacts of a tape-to-card relay (FIG. 68) to energize one of the relays B163–B166. A holding circuit is established for these relays through their special hold coils (FIG. 77) B163 through B166h. This circuit is maintained until 12 index time of the following punch cycle. At 13.7 index time of the following machine cycle, closure of a cam contact P17 (FIG. 76) completes a circuit through contacts of the aforementioned relay selected by an end-of-block 13 to energize a corresponding end-of-block control relay of the group B167 through B170 (FIG. 77). Hold coils and contacts (FIG. 77) maintain the selected EOB control delay relay energized until the end of the card cycle during which the card containing the 13 control hole is sensed at the comparing brushes to be read into memory. At 11.0 of the machine cycle, a circuit is completed through card-to-tape relay contact A16-8 (FIG. 77), and any closed contact of the four EOB end-of-block control delay relays above noted, to energize 13 card relay A15 (FIG. 77). Contacts of the 13 card relay A15 are provided in the circuits already described in connection with the 25 card relay to produce the same effects, namely, starting of the tape to read-out the sub-block entered into memory from cards.

Writing on the tape proceeds as previously described until the end-of-block 13 code written in the memory from the card is detected and is written on the tape. In FIG. 56 the previously described data lines represent a dash in the pertinent position of their associated memory drawer by means of a positive-going 4.5 microsecond pulse. The end-of-block 13 character is represented, therefore, by a positive condition of the $\bar{2}$ line CH, accompanied by a negative condition of the remaining three data lines CG as to $\bar{1}$, CJ as to $\bar{8}$ and CK as to $\bar{4}$. When the latter three lines, e.g. CG, CJ and CK are simultaneously negative, the output of a three-way OR inverter circuit 706 (FIG. 56) will be positive.

By reference to FIG. 56 it will be noted that the lines $\bar{1}$, $\bar{8}$ and $\bar{4}$ are inputs to the OR inverter circuit 706. If the $\bar{2}$ data lines CH is simultaneously positive, thereby representing a 13, a positive pulse will be fed to a three-way AND circuit 707 (FIG. 56) to which the inverted output of the OR inverter circuit 706 by way of a cathode follower 708 constitutes a second input. Since the third input to the AND circuit 707 is the pulse on the line BV, which is plus at all times during card-to-tape operations, the output of the AND circuit 707 by way of a cathode follower 709 will also be positive. The output of the cathode follower 709 is fed to a two-way AND circuit 710 which, when conditioned by its other input will emit the signal WRITE 13. The WRITE 13 signal is applied as an input to an OR inverter 711 (FIG. 56), and the resulting negative pulse which is the output of the OR inverter circuit 711 is passed through a cathode follower 713 and to the trigger 678 to reset this trigger to terminate recurrent memory read-out cycles, as previously described. The same WRITE 13 signal is transmitted by line BB to the OR circuit 577 (FIG. 49). The resulting inverted output from the OR circuit 577 passing by way of the OR inverter 569 is applied to the tape run trigger 495, thereby resetting the tape run trigger and stopping feeding of the tape. In this manner the tape is fed only the amount necessary to record the significant data in the partial sub-block.

The start of a new full block of information is identified by an 11 hole in a designated position of the first card of the new block. When this card is sensed by the comparing brushes, the 11 impulse is directed through a column split to the BOB hub (FIG. 77). The +10 volt pulse is transmitted through normally open contacts of the card-to-tape relay points A16-9, and through the line AH, to provide an input to a pull-over inverter 712 (FIG. 56). This causes the transfer of a write 13 trigger 713 producing a +10 volt level at the left output of this trigger.

It was previously pointed out that a fourteen microsecond delay is provided before writing the first character of a record from memory on tape. The delay is accompanied by a positive-going fourteen microsecond pulse at the output of the fourteen microsecond signal shot multivibrator 685 (FIG. 56). Said pulse from the single shot 685 is transmitted by way of a cathode follower 686 as one input of a three-way AND circuit 714 (FIG. 56). When the write 13 trigger 713 is turned on, as previously described, by a beginning of block 13 in the first card of a group, the positive voltage from its right side is applied by way of a cathode follower 715 as the second input to the AND circuit 714. Since the third input to the AND circuit 714 is positive, the output of the AND circuit 714 will be raised to +10 volts for ten microseconds. This voltage transmitted by way of a cathode follower 716 is applied to the 2 data line at the input of the inverter 717 (FIG. 56) to write a 13 character on tape immediately preceding the first character read from memory.

*Indicated bit count, checking circuit—tape-to-card.*— Each sub-block recorded on tape consists of approximately 100 words of information. Each word occupies 18 character spaces of which 16 contain the significant information digits; one space is assigned to the end of word character, usually a 12 digit, while the remaining space is a checking digit known as the indicated bit count. The indicated bit count digit is defined as the 3's complement of the modulo 4 bit count of the 16 information digits. Each information digit has a bit count equal to the number of binary digits required to represent 1. For example, a digit 7, which is represented by binary digits 1, 2 and 4, has a bit count of 3, while the number 8, which is represented by a binary digit 8 alone, has a bit count of only 1. In order to generate the bit count for the entire 16 digits of information, the procedure consists of adding the bit counts, using a number base of 4, and neglecting all but the units position of the sum. Thus, the sum of the digits 3 and 1 equals zero, 2 plus 1 equals 3, 2 plus 3 equals 1, etc. The final accumulated sum for the 16 digits will, therefore, be either zero, 1, 2 or 3. The digit actually recorded on the tape is then the 3's complement of this sum, which in turn will be a number not greater than 3.

In the tape-to-card mode of operation, the sub-block read from tape into memory is punched from memory into a group of cards which may number 25. As each card is perforated in the punching station with the significant data, the indicated bit count character associated with each of the four words per card is stored in relays. The relay storage retains the indicated count characters until the close of the following machine cycle when the punched card passes through the checking brush station, where the four words punched in the card are sensed and a modulo 4 bit count is generated for each of the words in a relay network. This generated bit count is then compared with the corresponding stored bit count character received from memory for each word group. If all four of the generated modulo 4 bit counts correspond to the 3's complement of the stored indicated bit count, the card is verified as correct and the machine operation is permitted to continue. Failure to check correctly any of the four words results in immediate stoppage of machine operation, together with operation of a suitable signal light to inform the operator of the type of error that exists.

The control of the punching thyratrons of FIGS. 64 and 65 by the memory drawers has been previously described. Upper thyratrons in each vertical column are associated with the columns of memory in which the indicated bit count characters are stored. For example, the two thyratrons 616 and 616a (FIG. 64) are both controlled by the #1 position of the 72 memory columns. This position contains the indicated bit count for the 16 columns immediately to the right. The two thyratrons 616 and 616a always fire simultaneously and are connected through the cable DR to the tape-to-card relay contacts 1 and 2 (FIG. 68) and to a pair of output hubs labeled BC (bit count) in FIG. 69. Three additional pairs of thyratrons and BC hubs are provided for the three remaining words to be punched in each card. Either one of each pair of bit count hubs may be connected to a punch magnet plug hub if it is desired to punch the bit count value read from tape. The remaining hub is connected to one of the group of four hubs labeled BVE in FIG. 76, which are the indicated bit count verifier entry hubs. During punching of a card, thyratron pulses may thus reach the BVE hubs at zero, 1, 2, or 3 punch index times. A pulse given to a BVE hub may energize either, both or neither of a pair of relays such as B143 and B144 (FIG. 76), depending on the index point at which the pulse may be received. This selection is under control of relay contacts B141–1 and B142–1, for example. In FIG. 76 it is seen that these relays are under control of cam contacts P15 and P16. The relative timing of these contacts and their associated relays is such that an indicated bit count pulse transmitted to a BVE hub at zero index time picks up neither of the pair of associated storage relays. A pulse at one index time will energize relays B143, B145, B147 or B149. An impulse at 3 index time on the other hand will energize the alternate relay of each pair, i.e. relays B144, B146, B148 or B150. An impulse at 2 index time will energize both relays of the associated pair.

A holding circuit is established for these relays through separate holding coils (FIG. 76), wherein these holding coils are indicated by reference numerals B143–H through B150–H. Therefore, early in the following machine cycle when a given card is sensed at the checking brushes, each relay picked up, as described above, may cause energization of a corresponding BCV delay relay of the group B151 through B158 (FIG. 76). These relays have corresponding holding coils B151–H through B158–H, respectively. Relays B143 through B150 are then deenergized to be ready for acceptance of the indicated bit count from the next card to be punched.

The BCV (bit count verifier) delay relays remain energized through their hold coils until the time of the checking brush cycle during which the modulo 4 bit count is being generated. It will be understood that these relays operate in pairs. Thus, relay B151 and relay B152 store the indicated bit count value for the first word. If neither of these relays is energized, a bit count of zero is represented. Energization of relay B151 alone represents 1, energization of relay B152 alone represents 3, while energization of both relays represents 2.

As the card passes through the checking brush station, the usual brush impulses are directed through plug wires to the IBC (indicated bit count) entry hubs of FIG. 75. There are 64 IBC entry hubs divided into four groups of 16, each group corresponding to one of the four words punched in a card. The arrangement of the IBC entry hubs for one word, i.e. 16, is indicated in full in these figures, whereas the remaining three groups are only schematically shown. Each IBC entry hub has associated with it a pair of relays such as B1 and B2. The bit count value for each digit is stored by the combinational energization of the relays of such pairs. The odd numbered relays B1, B3, B5 etc. represent bit count values of one, while even numbered relays B2, B4, B6, etc. represent bit count values of 2; thus, the simultaneous energization of relays B1 and B2, for example, corresponds to a bit count value of 3. The impulses reaching the IBC entry hubs may occur at any punch index time from zero through 9. Digits such as 1, 2, 4 and 8 are represented by single binary digits, and therefore, have a bit count value of 1. The digit 7 has a bit count of 3, and therefore also requires energization of an odd numbered bit count relay. Thus, in FIG. 76 cam contact C14 is closed at index points 1, 2, 4, 7 and 8 to energize relays B129 through B134. In FIG. 75 it is seen that closure of these relay contacts at such index point time permits corresponding digit pulses to enter the associated odd numbered bit count relay such as B1 or B3. Correspondingly, digits 3, 5, 6 and 9 have bit count values of 2, while the digit 7 has a bit count value of 3, so that all these digits require selection of even numbered bit count relays. Thus, in FIG. 76, cam contact C15 is closed during the 3, 5, 6, 7 and 9 index points to energize relays B135 through B140. In FIG. 75 this permits the corresponding digit pulse from the checking brushes to energize even numbered bit count relays such as B2 and B4, for example.

After reading the 9 row of holes at the checking brushes, the contacts of the bit count entry relays are used to determine the modulo 4 bit count of each of the four words. In FIG. 75 contacts of relays B1 through B32 are shown so connected that a test pulse applied to transfer point B1–2 results in a completed circuit to one and only one of transfer points A17–3 through A17–6. Analysis of the circuit will show that a modulo 4 sum of zero for the sixteen characters of the first word results in a circuit to transfer point A17–3. The modulo 4 sum of 1 provides a circuit to point A17–4, the sum of 2 to point A17–5 and a sum of 3 to A17–6.

It was previously shown how the condition of relays B151 and B152 represents the indicated bit count digit read from the tape. In order to check correctly, a modulo 4 sum of zero derived at point A17–3 (FIG. 75) should coincide with a tape bit count digit of 3 which is its 3's complement. This latter digit is represented by an energized condition of relay B152. A circuit is thus completed through point A17–3, point B151–3 normally closed, and point B152–2 normally open, to the BV (bit verifier control hubs) (FIG. 75). Normally each pair of BV control hubs shown is wired directly so that relay B159 is energized when the first word bit count is verified. Correspondingly, relay B160 is energized when the second word bit count is verified, etc. The BV control hubs are cross-wired only when bit count entry circuits are cross-wired for testing purposes.

A bit count sum of 1 should correspond with a tape bit count digit 2, so that a circuit would be completed through the normally open relay points A17–4 and B151–3 and the normally open points B152–2 to energize the relay B159. As previously stated, both relays B151 and B152 are energized for a tape bit count digit of 2. Similar circuits may be traced for bit count sums of 2 and 3. Immediately following the foregoing comparison between the generated bit count sum and the tape bit count digit, cam contact P19 (FIG. 77) closes. If, for example, the first word bit check had failed, relay B159 (FIG. 75) would not have been energized as described. A circuit is then completed through the cam contact P19, through contact A30–2 and A29–1 normally closed points, through the normally closed points B159–2 (FIG. 77) to energize the error relay B171. Similarly, three error relays B172, B173 and B174 are provided for the remaining three word checking circuits. These relays are maintained energized through respective holding coils and holding points B171–H through B174–H (FIG. 77), through the error reset contact (FIG. 70). When an indicated bit count error has been detected, therefore, the IBC error reset contact must be manually operated to restore the error detection circuit to normal.

Contacts of the error relays B171 through B174 (FIG. 77) complete circuits in FIG. 73 by closure of their B171–2 through B174–2 points to light bit count error lamps BC1, BC2, BC3 and BC4, respectively. These lamps are on the operator's panel.

It has been shown that relays B159 through B162 (FIG. 75) are energized late in each checking cycle if the bit count of the four corresponding words punched in the card is verified correctly. When all four relays are energized, a circuit is available through the bit count stop "On" hubs (FIG. 70) and contacts B159–3 through B162–3 in series to maintain the holding circuit to the motor start relay 24 of R9 (FIG. 21A of said Daly patent). Thus, when cam PC5 (FIG. 21A of the Daly patent) opens at 9.5 index time, the motor start relay R9 is not deenergized and the punch continues to run. When the bit count for any word is incorrect, one of the contacts B159–3 through B162–3 (FIG. 70) is open when cam PC5 (FIG. 21A of the Daly patent) opens at 9.5 index time. This causes the motor start relay R9 to drop out, resulting in immediate stopping of the punch in the usual manner.

Since the final card of a block may contain less than four words, it is necessary to suppress operation of the bit count checking circuits throughout those spaces in which no words are used, in order to avoid a false error indication. In describing operation of the 13 card relay A15 during card-to-tape operation, it was shown that when the end-of-block card containing an end-of-block 13 was punched in the punching station, the end-of-block relay B163 (FIG. 68) was energized for a card containing only one word. Correspondingly, relays B164, B165 and B166 are energized for cards containing 2, 3 and 4 words, respectively. It was shown that these relays cause energization of corresponding end-of-block control delay relays B167 through B170 (FIG. 77). This occurs during the following cycle when the end-of-block card passes through the checking brush station.

Referring now to the aforementioned circuit for control of error relays B171 through B174, it may be seen that if, for example, the end-of-block card contains only one word, contact B167–2 (FIG. 77) is open so that relays B172 through B174 cannot be energized. This prevents an erroneous bit count error light indication for the 2nd, 3rd and 4th words of such card, even though bit count checking relays B160 through B162 (FIG. 75) were not energized to indicate a correct bit count check for these words. Correspondingly, in the circuit of FIG. 70 through contacts B159–3, B160–3, B161–3 and B162–3, the latter three points are not closed to maintain the previously described series holding circuit to keep the punch running. In the example cited, however, where the end-of-block 13 follows the first word, a circuit is available through contacts B159–3 and B167–3 to maintain the holding circuit and keep the punch in operation. Similar circuits may be traced for cards containing two or three words only. In each case, however, the end-of-block control relay selected by the end-of-block 13 determines that only the significant words are effective in carrying out the bit checking function.

*Indicated bit count generation—card-to-tape.*—In the card-to-tape mode of operation, the indicated bit count is not available in the card. In order to generate the indicated bit counts for the four words in each card for later recording on the magnetic tape, it is necessary to sense the card at the reproducing brush station of the read feed for the purpose of bit count generation only. The four bit counts obtained during each card cycle are then stored in relays until the following cycle. When the card under discussion passes through the following comparing brush station, it is scanned as previously described for entry of the punched digits into memory. Concurrently, the stored bit count values for this card are also read from the relay storage into the appropriate positions of memory.

The IBC (indicated bit count) entry hubs (FIG. 75) are connected by plug wires to the reproducing brush plug hubs. During sensing of the card at this brush station, therefore, the indicated bit count relays B1 through B28 are operated in the same fashion as described during tape-to-card operation, except for the single difference of brush source. As previously described, the outputs of the relay network at contacts A17–3, A17–4, etc. (FIG. 75) represent the modulo 4 bit count of the four words of the card. Thus, for the first word, a completed circuit to contact A17–3 represents a zero value; a completed circuit to contact A17–4 represents a 1 value; a completed circuit to contact A17–5 represents a 2 value; and a completed circuit to contact A17–6 represents a 3 value. In this mode of operation, however, the bit count values are not checked or compared, since the relay A17 is not energized. Instead, referring to the first word circuit of FIG. 75 again, a one bit count is conducted through normally closed points A17–4 to energize relay B176. Correspondingly, a 2 bit value is conducted through points A17–5 to energize relay B177, while a 3 bit count value will result in energization of the relay B178. Holding circuits are established through hold coils of relays B176 through B178, as shown in FIG. 76, until the 4 index point of the following card cycle.

It will be recalled that the indicated bit count digit written on the tape is actually the 3's complement of the modulo 4 sum derived above. In the first word, for example, if the relay B176 (FIG. 75) is energized, thereby representing a modulo 4 sum of 1, then during the following card cycle when the same card is being sensed at the comparing brushes, a digit emitter impulse at 2 index time is conducted through contact B176-3 (FIG. 77) to IBC (indicated bit count) plug hubs. Thus, a modulo 4 sum of 1 produces a timed impulse at 2 index time, which is its 3's complement. A modulo 4 sum of zero is indicated when none of the relays B176 through B178 are energized. At 3 index time, therefore, a circuit is completed from the digit emitter, through contacts B176-2 (FIG. 77), contacts B177-3 and B178-3 to the indicated bit count plug hub IBC (FIG. 77). This impulse at 3 index time represents the 3's complement of the modulo 4 sum of zero. The plug hubs IBC, therefore, act as emitters of timed impulses similar to brush impulses and may, therefore, be connected by plug wires to the appropriate converter entry plug hubs of FIG. 69. Either of the paired hubs BC associated with each of the four word circuits (FIG. 69) may be used. Storing of these pulses proceeds in the same manner described for entry of punched information during card-to-tape operations.

*Block search.*—In the block search mode of operation, the tape unit feeds tape continuously until a predetermined block number is reached. During this time no cards are fed in the punching unit. The desired block number is set on four dials on the operator's panel. Upon reaching the selected block, the tape unit stops automatically. The operator may then change the mode of operation switch to its "tape-to-card" setting to cause punching of cards for the remainder of the tape in the usual manner.

To operate the block search mode, it is necessary to set the mode of operation switch (FIG. 70) to the search contact. Setting of the mode of operation switch to this position energizes search relay A20 (FIG. 70). Depression of the start key (FIG. 70) energizes the start relay A13. A circuit is then completed through the normally open A13-2 contacts (FIG. 71) and through the search contact A20-2 to the line AY. The line AY is connected to a key trigger 717 (FIG. 58). Setting of the key trigger provides a negative pulse at its output which, by way of a cathode follower 718, is applied to a trigger 719. Transferrance of the conducting state of the trigger 719 provides a positive level on line BC which is the output from a cathode follower 720 through which the pulse from the trigger 719 is fed. The line BC constitutes an input to the OR circuit 496 (FIG. 49). Since the output of the OR circuit 496 is also the output of the previously described tape run trigger 495, it is seen that the trigger controlling line BC has the same effect as the tape run trigger. As previously described, this causes the tape unit to feed tape. At the same time, it turns off the regeneration control circuit to permit entry of the tape information into memory. Tape information enters the trigger register of FIG. 50 in the manner described for the tape-to-card mode of operation. In the usual manner, the first 13 of a block results in a positive level at the output of the cathode follower 536 (FIG. 51). This signal starts the ring reset single shot multivibrator 557 to provide the signal RING RESET on line H at the beginning of a block. In FIG. 62 it is seen that the signal RING RESET applied to the pull-over inverters of the ring triggers is also imposed on the line EM which in FIG. 58 constitutes an input to the pull-over inverter 720. The positive signal on the line EM (FIG. 58) resets a trigger 721. This trigger is thus restored to the normal position shown before testing of the number of each block. The same beginning of block 13 also produces a positive level at the output of the OR circuit 539 in FIG. 51 to start the associated ten microsecond single shot multivibrator 559. The positive ten microsecond signal at the output of the single shot 559 is passed through the cathode follower 560 and is inverted in the inverter 561 and conducted by line AM to a trigger 722 (FIG. 57). The resulting transfer of the trigger 722 causes the emission of a positive voltage which is passed through a pair of cathode followers 723 and 724, and from thence to the input pins of four three-way AND circuits 725 through 728. The remaining inputs of these AND circuits are connected as shown to the horizontal deflection ring outputs, in such manner that the AND circuit outputs are positive on the 14th, 15th, 16th and 17th steps of the horizontal ring, respectively, from left to right. After the 18th step of the total of 1800 required to fill memory, line AL (FIG. 57) becomes negative with the result that the trigger 722 is restored to its original status, thereby returning its output to a negative level, so that the four three-way AND circuits 725 through 728 are effective only during the 14th through 17th steps of the 1800. FIG. 57 illustrates four block search set-up switches representing respectively the thousands, hundreds, tens and unit orders of a block number. The output of the AND circuit 725 is transmitted by way of a pair of cathode followers 729 and 730, and is connected to the thousands wafers of the four dial switches. In like manner the outputs of the AND circuits 726, 727 and 728 are connected by way of cathode followers to the hundreds, tens and units wafers, respectively. Each block search set-up switch is rotatable to one of the ten positions representing the decimal digits of the block number for which a search is to be made.

Each wafer of a given switch represents the $\bar{1}, \bar{2}, \bar{4}$ or $\bar{8}$ equivalent of the decimal digits to which the switch is set. When the horizontal ring is at 14, therefore, the positive level at the output of the AND circuit 725 is connected through the four levels of the left-hand dial switch to the wafers of those levels where $\bar{1}, \bar{2}, \bar{4}$ or $\bar{8}$ combination pertains to the digit for which the thousands order switch is set. Where such connection is made, the positive level appears as the output of cathode followers 731, 732, 733 and 734 for the $\bar{1}, \bar{2}, \bar{4}$ and $\bar{8}$ digits. A connection is made from the cathode followers 731 through 734 to one side of an inequality detector, the nature of which has been described in connection with FIG. 38. In FIG. 58 the inequality detector is represented by the block 735. The remaining set of inputs to the inequality detector 735 are the signals on lines AN, AP, AQ and AR, representing the presence of a $\bar{1}, \bar{2}, \bar{8}$ and $\bar{4}$, respectively, in the second input register. In FIG. 50 these lines are seen to be connected to the output lines of the second register trigger, so that a positive level appears on line AN when a $\bar{1}$ bit has been sensed on tape, etc. The output line 736 of the inequality detector 735 (FIG. 58) is positive when the digit being sensed in the block search switch is different from the digit present in the second tape register. When the digits are unequal, a positive level is present, therefore, on the output line 737 of a three-way AND circuit 738 (FIG. 58), at such times the sample line BD and the + on 14-17 line being positive.

The output of the three-way AND circuit 738 is transmitted through a cathode follower 739 and is inverted in an inverter 740. The inverted signal from the inverter 740 is transmitted through a cathode follower 741, after which it is effective to transfer the trigger 721 which, as previously pointed out, has been reset, if necessary, by the beginning of block 13 which induced the ring reset signal on the line EM.

An equality in any of the four block number digits tested will transfer the trigger 721; such transfer results in the emission of a negative pulse by way of a cathode follower 742 which becomes one input to an AND circuit 743. The other input to the AND circuit 743 is the pulse on line AX. The line AX carries a positive pulse when the end-of-block 13 is later detected. When an inequality has been detected for a given block, however, as previously described, the end-of-block signal on line AX produces no effect at the output of the AND circuit 743. When the block containing the preset number is sensed, no unequal signals are detected in the inequality detector 735 during the 14 through 17 ring steps. As a result, the aforementioned inequality trigger is not transferred, so that its output pulse by way of the cathode follower 742 remains positive. When the END-OF-BLOCK 13 signal arrives on line AX, therefore, the AND circuit 473 will be in coincidence and will emit a signal so that the output of its associated cathode follower 744 becomes positive. The output of the cathode follower 744 is inverted in an inverter 745, and by way of a cathode follower 746 this inverted signal is impressed on the line BA. The signal on the line BA is transmitted to the input of the trigger 719 (FIG. 58) which was previously set to cause the tape to run. Consequently, resetting of the trigger 719 causes the tape unit to stop at the end-of-block containing the preset block number. The return of the output pulse of the trigger 719 to a negative voltage causes a negative voltage to appear at the output of the OR circuit 496 (FIG. 49). As previously demonstrated in connection with the tape run trigger, return of this line to a negative voltage stops feeding of the tape and restores the memory regeneration process.

*Reading forward—reading backward.*—In FIG. 70 the mode of operation switch includes a read forward point and a read backward point. When the switch is closed to either of these positions, depression of the start key on the operator's panel causes the tape to feed one full block either in a forward direction or a backward direction depending on which point is closed, after which the tape will stop automatically. No cards are punched from the information which may be read from the tape during this particular type of feeding operation.

With the mode of operation switch closed to the read forward point, the read forward relay A18 (FIG. 65) is energized. Operation of the start key thereafter completes a circuit through the normally open start relay contact A13–2 (FIG. 71) and the read forward contact A18–3, now closed, will permit the line AY to charge at +40 volts. The line AY is connected as one input to the key trigger 717 (FIG. 58), and consequently when the voltage on this line is raised, the trigger 717 will transfer. Transfer of the trigger 717 has the same effect as that described in connection with the block search mode of operation, that is, it transfers the trigger 719, thereby placing a positive voltage on line BC. As long as a positive voltage is maintained on line BC, tape feeding will result. Tape feeding does not stop at the end of each sub-block, as during normal tape-to-card operation, because the auxiliary tape run trigger used in this instance is not reset at the end of sub-blocks. Tape feeding continues until the end of block 13 signal on line AX (FIG. 49) reaches an AND circuit 747. The other input of the AND circuit 747 is positive when in the read forward or read backward mode of operation, this condition being indicated by positive voltage on line BB (FIG. 58). As a result, the output of the AND circuit 747 by way of a cathode follower 748 transmits a positive signal. This signal is inverted in the inverter 745 and transmitted through the cathode follower 746 to line BA, which is an input to the trigger 719 (FIG. 58), this trigger being the auxiliary tape run trigger. The pulse on line BA will turn the auxiliary tape run trigger 719 off. Restoration of the trigger 719 to its normal condition restores line BC to a negative level, causing the tape to stop and cause regeneration to resume as described in connection with the block search mode of operation.

The read backward mode of operation is quite similar to the read forward mode described above, except that the read backward relay A19 (FIG. 70) is energized by closure of the mode of operation switch to the read backward point. A similar circuit is established through contact A19–3 (FIG. 71) to turn on the auxiliary tape trigger when the start key is depressed. At the same time closure of the contact A19–4 places a positive voltage on the line EU. In FIG. 48 the line EU is connected to an OR circuit 749. The resulting positive output of the OR circuit 749 raises the forward-backward line FB, which is connected to the tape drive, conditioning its internal circuitry to move the tape backward. The circuits for moving the tape in a reverse direction have been described heretofore. Operation of the punch during either of these modes of operation, i.e. the read backward mode or the read forward mode is prevented by the opening of the read backward contacts A19–1 or the read forward contacts A18–1 (FIG. 70), these contacts being in the pick-up circuit of the run relay A7. One of these normally closed points opens during their respective modes of operation to interrupt the pick-up circuit.

*Delete.*—Machine operation for the delete mode of operation is similar to the card-to-tape mode, except that writing on tape is suppressed. If the mode of operation switch in FIG. 70 is closed to the delete point, the delete relay A24 will be energized. At the same time a parallel circuit is completed through contact A24–1 to energize the card-to-tape relay A16. This effectively places the machine in the card-to-tape mode. In FIG. 72, however, opening of contact A24–2, which is normally closed, causes a line DT to be broken. The line DT is connected to one of the input terminals of each of the four three-way AND circuits 693–696 in FIG. 56. In the description of the card-to-tape operation it was pointed out that suppressing the outputs of these three-way AND circuits prevents switching of the write triggers which are fed thereby, i.e. the triggers 700 through 703, and therefore prevents writing of significant information on tape.

At the same time, connection of the line DT as one input to the three-way AND circuit 714 (FIG. 56) prevents writing of the beginning of block 13 in the manner described in connection with the card-to-tape mode of operation. When, therefore, the start key is depressed to cause feeding of cards in the punch reading station, the words from a sub-block of cards is stored in the usual manner. This may consist of up to 25 cards. At the end of the card sub-block the tape unit is started in the normal manner, and memory attempts to read out to cause writing on tape. Owing to the above mentioned deconditioning of the AND circuits 693 through 696, however, the tape unit will feed the required length of tape to record the sub-block, but since the write triggers 700 through 703 are not energized, the condition of the writing heads will remain unchanged, so that any previous information written on that particular section of the tape is effectively erased.

What is claimed is:

1. In a machine for transcribing differently coded records from one record medium to another, a storage device adapted to receive a record in a single coded notation, a first input record reading device adapted to read a record medium having recorded thereon a record in the same coded notation to which said storage device is adapted, a second input record reading device adapted to read a record medium having recorded thereon a record in a different coded notation, data input circuits for said storage device, switching circuits connected between said input circuits and said input record reading devices, means for conditioning said switching circuits to enter into said storage device data from either of said input record reading devices, a record reading coder in said input circuits between said switching circuits and said second input record reading device adapted to translate the coded record read in said second input record reading device to the coded notation adapted for entry into said storage device, a record reproducing device adapted to reproduce records in a coded notation different from that in which a record is stored in said storage device, means for transcribing records in said storage device in said record reproducing device, and an output record coder between said storage device and said record reproducing device adapted to translate a record from the coded notation in which it is entered in said storage device to a coded notation adapted for reproduction in said reproducing device.

2. In a machine for transcribing differently coded records from one record medium to another, a storage device adapted to receive a record in a single coded notation, a magnetic tape record reading device adapted to read a magnetic record tape having recorded thereon a record in the same coded notation to which said storage device is adapted, a punched statistical card input record reading device adapted to read a punched card having recorded thereon a record in a different coded notation, data input circuits for said storage device, switching circuits connected between said input circuits and said tape reading and card reading devices, means for conditioning said switching circuits to enter into said storage device data from either of said tape reading or card reading devices, a record reading coder in said input circuits between said switching circuits and said card reading device adapted to translate a coded record read in said card reading device to the coded notation adapted for entry into said storage device, a record reproducing device adapted to reproduce records in a coded notation different from that in which a record is stored in said storage device, means for transcribing records in said storage device in said record reproducing device, and an output record coder between said storage device and said record reproducing device adapted to translate a record from the coded notation in which it is entered in said storage device to a coded notation adapted for reproduction in said reproducing device.

3. In a data processing machine, a data storage device, means for reading data from a record medium on which each character is represented in a coded notation having pulse generating bits of each character disposed in at least one of two adjacent tracks of the record medium, a character register between said data reading means and said data storage device, means for entering characters read in said data reading means into said character register, and means responsive to the pulse generated by a bit read in either of said two adjacent tracks only of the record being read in said data reading means for causing the emission of a character from said character register to said data storage device.

4. In a data processing machine, a data storage device, means for reading data from a record medium on which each character is represented in a coded notation having pulse generating bits of each character disposed in at least one of two adjacent tracks of the record medium, a first and a second character register between said data reading means and said data storage device, means for entering characters read in said data reading means into said first character register, and means responsive to the pulse generated by a bit read in either of said two adjacent tracks only of the record being read in said data reading means for causing the transfer of a character from said first character register to said second character register.

5. In a data processing machine, a data storage device, means for reading data from a magnetic tape record on which each character is represented in a coded notation having pulse generating bits of each character disposed in at least one of two adjacent tracks of the record tape, a character register between said tape reading means and said data storage device, means for entering characters read in said tape reading means into said character register, and means responsive to the pulse generated by a bit read in either of said two adjacent tracks only of a tape being read in said tape reading means for causing the transfer of a character from said character register to said data storage device.

6. In a machine for transcribing data from punched statistical cards to record tape, a storage device adapted to receive data from a punched card, a punched card reader having a plurality of individual means for simultaneously sensing the presence of holes at a corresponding plurality of index point positions comprising a card row, data input circuits connecting said storage device and said card reader, means for testing said individual sensing means to determine which of the same have sensed a card hole, means responsive to said testing means for energizing said data input circuits to transmit data read in said card reader to said storage device, a record tape reproducing device, data transmission circuits connecting said storage device and said record tape reproducing device, and means for transmitting data from said storage device to said record tape reproducing device by way of said data transmission circuits.

7. In a machine for transcribing data from punched statistical cards to magnetic record tape, a storage device adapted to receive data from a punched card, a punched card reader having a plurality of individual electrical means for simultaneously sensing the presence of holes at a corresponding plurality of index point positions comprising a card row, data input circuits connecting said storage device and said sensing means, means for testing the electrical potential of said individual sensing means to determine which of the same have sensed a card hole, means responsive to said testing means for energizing said data input circuits to transmit data read in said card reader to said storage device, a magnetic record tape reproducing device, data transmission circuits connecting said storage device and said magnetic record tape reproducing device, and means for transmitting data from said storage device to said magnetic record tape reproducing device by way of said data transmission circuits.

8. In a machine for transcribing data from punched statistical cards to record tape, an electrostatic storage device adapted to receive data from a punched card, means for serially scanning a plurality of storage positions in said storage device, a punched card reader having a plurality of individual means for simultaneously sensing the presence of holes at a corresponding plurality of index point positions comprising a card row, data input circuits connecting said storage device and said card reader, means for serially testing said individual sensing means synchronously with said scanning means to determine which of the same have sensed a card hole, means responsive to said testing means for energizing said data input circuits to transmit data read in said card reader to said storage device, a record tape reproducing device, data transmission circuits connecting said storage device and said record tape reproducing device, and means for transmitting data from said storage device to said record tape reproducing device by way of said data transmission circuits.

9. In a machine for transcribing data from punched statistical cards to record tape, a storage device adapted to receive data from a punched card of which the index point positions of successive rows represent a different character, a punched card reader having a plurality of individual means for simultaneously sensing the presence of holes at a corresponding plurality of index point positions comprising a card row, means for advancing a punched card in said reader in row-by-row progression, data input circuits connecting said storage device and said card reader, means in said data input circuits responsive to said card advancing means for representing in the binary notation the character value of a row of index point positions present at said sensing means, means operative upon each card advance in said card reader for testing said individual sensing means to determine which of the same have sensed a card hole, means responsive to said testing means for energizing said data input circuits to transmit data read in said card reader to said storage device, a record tape reproducing device, data transmission circuits connecting said storage device and said record tape reproducing device, and means for transmitting data from said storage device to said record tape reproducing device by way of said data transmission circuits.

10. In a machine for transcribing data from punched statistical cards to magnetic record tape, a storage device adapted to receive data from a punched card of which the index point positions of successive rows represent a different character, a punched card reader having a plurality of individual electrical means for simultaneously sensing the presence of holes at a corresponding plurality of index point positions comprising a card row, means for advancing a punched card in said reader in row-by-row progression, data input circuits connecting said storage device and said sensing means, means in said data input circuits responsive to said card advancing means for representing in the binary notation the character value of a row of index point positions present at said sensing means, means operative upon each card advance in said card reader for testing the electrical potential of said individual sensing means to determine which of the same have sensed a card hole, means responsive to said testing means for energizing said data input circuits to transmit data read in said card reader to said storage device, a magnetic record tape reproducing device, data transmission circuits connecting said storage device and said magnetic record tape reproducing device, and means for transmitting data from said storage device to said magnetic record tape reproducing device by way of said data transmission circuits.

11. In a machine for transcribing data from punched statistical cards to record tape, an electrostatic storage device adapted to receive data from a punched card of which the index point positions of successive rows represent a different character, means for serially scanning a plurality of storage positions in said storage device, a punched card reader having a plurality of individual means for simultaneously sensing the presence of holes at a corresponding plurality of index point positions comprising a card row, means for advancing a punched card in said reader in row-by-row progression, data input circuits connecting said storage device and said card reader, means in said data input circuits responsive to said card advancing means for representing in the binary notation the character value of a row of index point positions present at said sensing means, means operative upon each card advance in said card reader for serially testing said individual sensing means synchronously with said scanning means to determine which of the same have sensed a card hole, means responsive to said testing means for energizing said data input circuits to transmit data read in said card reader to said storage device, a record tape reproducing device, data transmission circuits connecting said storage device and said record tape reproducing device, and means for transmitting data from said storage device to said record tape reproducing device by way of said data transmission circuits.

12. In a record processing machine, record reading means, a storage device for records read in said record reading means, means for storing in said storage device a plurality of characters comprising a record read in said record reading means, means for successively sensing the same record in said storage device a plurality of times, a record reproducing device, means for detecting a different character of a record in said storage device upon each successive sensing operation, and means under control of said detecting means for controlling said record reproducing device for reproducing a record during successive sensing thereof in said storage device.

13. In an electronic machine for transcribing from one record medium to another, an electrostatic storage device adapted to receive data from a magnetic record tape, a magnetic tape input record reading device, connections between said magnetic tape input record reading device and said storage device for transmitting to said storage device records read in said magnetic tape input record reading device, a punched statistical card record reproducing device having means for feeding a statistical card in row-by-row progression, means responsive to the operation of said reproducing device to indicate the position of a statistical card therein and thereby the value of a digit to be punched, a comparing device having circuits for receiving said reproducing device indication and also a digit read from said storage device and for comparing the same, and means controlled by said comparing device upon detecting equality between said reproducing device indication and a digit read from said storage device for controlling said reproducing device to punch into a card therein said digit from said storage device.

14. In an electronic machine for transcribing from one record medium to another, a storage device adapted to receive data from a magnetic record tape, a magnetic tape input record reading device, connections between said magnetic tape input record reading device and said storage device for transmitting to said storage device records read in said magnetic tape input record reading device, a punched statistical card record reproducing device having means for feeding a statistical card in row-by-row progression, means responsive to the operation of said reproducing device to indicate the position of a statistical card therein and thereby the value of a digit to be punched, a comparing device having circuits for receiving said reproducing device indication and also a digit read from said storage device and for comparing the same, and means controlled by said comparing device upon detecting equality between said reproducing device indication and a digit read from said storage device for controlling said reproducing device to punch into a card therein said digit from said storage device.

15. In a record processing machine, record reading means, an electrostatic storage device for records read in said record reading means, means for storing in said storage device a plurality of characters comprising a record read in said record reading device, means for successively deflecting a cathode-ray beam for scanning the same record in said storage device a plurality of times, a record card punch, means responsive to the position of a statistical card in said record card punch for detecting a different character of a record in said storage device upon each successive scanning operation on the same record therein, and means under control of said detecting means for controlling said record card punch for reproducing a record repeatedly scanned in said storage device.

16. In a record processing machine, record reading means, a storage device for records read in said record reading means, means for storing in said storage device a plurality of characters comprising a record read in said record reading means, means for successively sensing the same record in said storage device a plurality of times, a statistical record card punching device, means responsive to the position of a statistical card in said card punching device for detecting a different character of a record in said storage device upon each successive sensing operation on the same record therein, and means under control of said detecting means for controlling said punching device for punching operation in row-by-row progression at each successive scanning operation.

17. In a data processing machine, a data storage device, means for reading data from a record medium on which characters are represented in a coded binary notation having bits disposed in four adjacent tracks of the record medium and in which significant pulse generating bits of each character are disposed in at least the second and third track of said medium, a character register between said data reading means and said data storage device, means for entering characters read in said data reading means into said character register, and means responsive to a pulse generated by a significant character bit in either of said second or third track only of the record being read in said data reading means for causing the emission of a character from said character register to said data storage device.

18. In a data processing machine, a data storage device, means for reading data from a magnetic record tape on which characters are represented in a coded binary notation having bits disposed in four adjacent tracks of the record tape and in which significant pulse generating bits of each character are disposed in at least the second and third track of said tape, a character register between said record tape reading means and said data storage device, means for entering characters read in said record tape reading means into said character register, and means responsive to a pulse generated by a significant character bit in either of said second or third track only of the record tape being read in said record tape reading means for causing the emission of a character from said character register to said data storage device.

19. In a record processing machine, record reading means, a storage device for records read in said record reading means, means for storing in said storage device a plurality of characters comprising a record read in said record reading means, means for successively sensing the same record in said storage device a plurality of times equal to the different characters comprising said record, a statistical record card punching device adapted to advance a statistical card therein in row-by-row progression, means responsive to the row-by-row advance of a statistical card in said punching device for detecting a different character of a record in said storage device upon each successive sensing operation on the same record therein, and means under control of said detecting means for controlling said punching device for punching into said card in row-by-row progression on each successive scanning operation the character detected during such scanning operation.

References Cited in the file of this patent
UNITED STATES PATENTS

| | | |
|---|---|---|
| 2,609,050 | Roth | Sept. 2, 1952 |
| 2,652,554 | Williams | Sept. 15, 1953 |
| 2,653,996 | Wright | Sept. 29, 1953 |
| 2,688,656 | Wright | Sept. 7, 1954 |
| 2,689,950 | Bayliss | Sept. 21, 1954 |
| 2,702,380 | Brustman | Feb. 15, 1955 |
| 2,708,267 | Wiedenhammer | May 10, 1955 |
| 2,718,356 | Burrell et al. | Sept. 20, 1955 |
| 2,721,990 | McNaney | Oct. 25, 1955 |

OTHER REFERENCES

SEAC Dedication Program, June 20, 1950, 11 pages.
Computer Memory Uses Conventional C-R Tubes, by A. W. Holt and W. W. Davis, "Electronics," December 1953, pp. 178–182.

UNITED STATES PATENT OFFICE
CERTIFICATION OF CORRECTION

Patent No. 2,990,538                                     June 27, 1961

James A. Weidenhammer

It is hereby certified that error appears in the above numbered patent requiring correction and that the said Letters Patent should read as corrected below.

Column 10, line 28, for "menchanism" read -- mechanism --; column 11, line 26, for "capstant" read -- capstan --; line 31, strike out "and"; same line 31, for "81" read -- 80 --; same line, for "forward" read -- reverse --; same line 31, after "capstan." insert -- Another rotating --; line 32, strike out -- ing --; column 36, line 27, beginning with "In the three-way AND" strike out all to and including "read-in operations." in line 34, same column.

Signed and sealed this 3rd day of April 1962.

Attest:

ERNEST W. SWIDER                                       DAVID L. LADD
Attesting Officer                                           Commissioner of Patents